United States Patent
Tsai et al.

(10) Patent No.: US 9,807,619 B2
(45) Date of Patent: Oct. 31, 2017

(54) METHODS AND APPARATUSES FOR USE OF SIMULTANEOUS MULTIPLE CHANNELS IN THE DYNAMIC FREQUENCY SELECTION BAND IN WIRELESS NETWORKS

(71) Applicant: NETWORK PERFORMANCE RESEARCH GROUP LLC, San Jose, CA (US)

(72) Inventors: Kun Ting Tsai, Fremont, CA (US); Terry F. K. Ngo, Bellevue, WA (US); Seung Baek Yi, Norwich, VT (US); Erick Kurniawan, San Francisco, CA (US)

(73) Assignee: NETWORK PERFORMANCE RESEARCH GROUP LLC, Campbell, CA (US)

( * ) Notice: Subject to any disclaimer, the term of this patent is extended or adjusted under 35 U.S.C. 154(b) by 0 days.

(21) Appl. No.: 15/263,985

(22) Filed: Sep. 13, 2016

(65) Prior Publication Data
US 2017/0041954 A1 Feb. 9, 2017

Related U.S. Application Data

(63) Continuation-in-part of application No. 14/920,568, filed on Oct. 22, 2015, and a continuation-in-part of
(Continued)

(51) Int. Cl.
*H04W 74/08* (2009.01)
*H04W 16/14* (2009.01)
*H04W 76/02* (2009.01)

(52) U.S. Cl.
CPC ........ *H04W 16/14* (2013.01); *H04W 74/0816* (2013.01); *H04W 76/023* (2013.01)

(58) Field of Classification Search
CPC . H04W 16/14; H04W 72/04; H04W 72/0453; H04W 74/00; H04W 74/006;
(Continued)

(56) References Cited

U.S. PATENT DOCUMENTS 6,870,815 B2 * 3/2005 McFarland ............... H04L 1/22
370/250
7,548,750 B2 6/2009 Kruys et al.
(Continued)

FOREIGN PATENT DOCUMENTS

EP 2512169 A1 10/2012
EP 1925108 B1 3/2014
(Continued)

OTHER PUBLICATIONS

Office Action for U.S. Appl. No. 14/920,568, dated Mar. 29, 2016, 29 pages.
(Continued)

*Primary Examiner* — Tri H Phan
(74) *Attorney, Agent, or Firm* — Amin, Turocy & Watson, LLP

(57) ABSTRACT

The present invention relates to wireless networks and more specifically to systems and methods for selecting available channels free of radar signals from a plurality of 5 GHz radio frequency channels. In non-limiting embodiments, exemplary systems, methods, and apparatuses are provided that can facilitate reducing false detections and/or network downtime in exemplary mesh networks employing dynamic frequency selection (DFS) channels. In a non-limiting aspect, radar information can be propagated among exemplary mesh nodes, including location information, to facilitate reducing false detections and/or network downtime in exemplary mesh networks. In addition, in further non-limiting aspects, exemplary embodiments can transmit sig-
(Continued)

nals to facilitate silencing one or more DFS channels and/or collaborative mesh node identification and/or discrimination of radar signals and false detections, among other non-limiting aspects provided.

23 Claims, 51 Drawing Sheets

Related U.S. Application Data application No. 15/171,911, filed on Jun. 2, 2016, and a continuation-in-part of application No. 15/214,437, filed on Jul. 19, 2016, and a continuation-in-part of application No. 15/259,359, filed on Sep. 8, 2016.

(60) Provisional application No. 62/200,764, filed on Aug. 4, 2015, provisional application No. 62/314,042, filed on Mar. 28, 2016.

(58) Field of Classification Search
CPC ............ H04W 74/08; H04W 74/0808; H04W 74/0816; H04W 76/023; H04L 29/08; H04L 67/104; H04B 17/30
See application file for complete search history.

(56) References Cited

U.S. PATENT DOCUMENTS

| | | | |
|---|---|---|---|
| 7,606,193 B2 * | 10/2009 | McFarland | H04W 72/02 342/159 |
| 7,813,744 B2 | 10/2010 | Johnson | |
| 8,213,942 B2 | 7/2012 | Likar et al. | |
| 8,260,357 B2 | 9/2012 | Likar et al. | |
| 8,472,334 B2 | 6/2013 | Likar et al. | |
| 8,483,059 B2 | 7/2013 | Likar et al. | |
| 8,565,106 B2 | 10/2013 | Likar et al. | |
| 8,654,782 B2 | 2/2014 | Meil et al. | |
| 8,699,341 B2 | 4/2014 | Likar et al. | |
| 8,867,490 B1 | 10/2014 | Krishna et al. | |
| 8,879,996 B2 | 11/2014 | Kenney et al. | |
| 8,885,511 B2 | 11/2014 | Likar et al. | |
| 9,060,289 B2 | 6/2015 | Chandrasekhar et al. | |
| 9,066,251 B2 | 6/2015 | Madan et al. | |
| 9,131,391 B2 | 9/2015 | Madan et al. | |
| 9,131,392 B2 | 9/2015 | Madan et al. | |
| 9,131,504 B2 | 9/2015 | Kenney et al. | |
| 9,307,413 B2 * | 4/2016 | Lenzini | H04W 16/14 |
| 9,439,197 B1 * | 9/2016 | Ngo | H04W 72/0453 |
| 9,622,089 B1 * | 4/2017 | Ngo | H04W 16/14 |
| 2003/0107512 A1 | 6/2003 | McFarland et al. | |
| 2003/0181213 A1 | 9/2003 | Sugar et al. | |
| 2004/0033789 A1 | 2/2004 | Tsien | |
| 2004/0151137 A1 | 8/2004 | McFarland et al. | |
| 2004/0156336 A1 | 8/2004 | McFarland et al. | |
| 2005/0059364 A1 | 3/2005 | Hansen et al. | |
| 2005/0192016 A1 | 9/2005 | Zimmermann et al. | |
| 2005/0215266 A1 | 9/2005 | Tsien et al. | |
| 2006/0082489 A1 | 4/2006 | Liu et al. | |
| 2007/0060065 A1 | 3/2007 | Kruys et al. | |
| 2008/0089280 A1 | 4/2008 | Hu | |
| 2009/0077620 A1 | 3/2009 | Ravi et al. | |
| 2009/0116411 A1 | 5/2009 | Castagnoli et al. | |
| 2009/0160696 A1 | 6/2009 | Pare et al. | |
| 2009/0201851 A1 * | 8/2009 | Kruys | H04W 16/14 370/328 |
| 2010/0216480 A1 | 8/2010 | Park et al. | |
| 2010/0271948 A1 | 10/2010 | Challapali et al. | |
| 2012/0258749 A1 * | 10/2012 | Lenzini | H04W 16/14 455/509 |
| 2012/0300759 A1 | 11/2012 | Patanapongpibul et al. | |
| 2013/0072106 A1 | 3/2013 | Koskela et al. | |
| 2013/0201928 A1 | 8/2013 | Kim et al. | |
| 2013/0252640 A1 | 9/2013 | Kenney et al. | |
| 2013/0314267 A1 | 11/2013 | Kenney et al. | |
| 2014/0253361 A1 | 9/2014 | Rezk et al. | |
| 2014/0301328 A1 * | 10/2014 | Yacovitch | H04W 16/02 370/329 |
| 2014/0328286 A1 | 11/2014 | Crowle et al. | |
| 2014/0349669 A1 | 11/2014 | Qi et al. | |
| 2015/0063321 A1 * | 3/2015 | Sadek | G01S 7/021 370/336 |
| 2015/0208330 A1 | 7/2015 | Park et al. | |
| 2015/0271829 A1 | 9/2015 | Amini et al. | |
| 2016/0014613 A1 | 1/2016 | Ponnampalam et al. | |
| 2016/0261657 A1 | 9/2016 | Bruhn et al. | |
| 2016/0345323 A1 | 11/2016 | Krishnamoorthy et al. | |
| 2017/0026845 A1 * | 1/2017 | Garg | H04W 16/10 |
| 2017/0041949 A1 * | 2/2017 | Ngo | H04W 74/006 |
| 2017/0041954 A1 | 2/2017 | Tsai et al. | |
| 2017/0048864 A1 * | 2/2017 | Ngo | H04W 72/0453 |
| 2017/0079007 A1 | 3/2017 | Carbajal | |
| 2017/0142728 A1 * | 5/2017 | Tsai | H04W 72/0453 |

FOREIGN PATENT DOCUMENTS

| | | |
|---|---|---|
| WO | 2007032790 A2 | 3/2007 |
| WO | 2007032790 A3 | 4/2009 |
| WO | 2014176503 A1 | 10/2014 |
| WO | 2014190004 A1 | 11/2014 |

OTHER PUBLICATIONS

Office Action for U.S. Appl. No. 15/085,573, dated Jun. 24, 2016, 15 pages.
Notice of Allowance dated Jul. 19, 2016 for U.S. Appl. No. 15/085,573, 27 pages.
Office Action for U.S. Appl. No. 14/920,568, dated Sep. 30, 2016, 28 pages.
Extended European Search Report for EP Patent Application Serial No. 16182672.2, dated Dec. 16, 2016, 8 pages.
Office Action for U.S. Appl. No. 15/214,437 dated Jan. 23, 2017, 33 pages.
Extended European Search Report for EP Patent Application Serial No. 16187611.5, dated Jan. 30, 2017, 8 pages.
Office Action for U.S. Appl. No. 15/259,386, dated Jan. 9, 2017, 37 Pages.
Kerry et al., "Liaison Statement on the Compatibility Between IEEE 802.11a and Radars in the Radiolocation and Radionavigation Service in the 5250-5350 MHz and 5470-5725 MHz bands", Jan. 17, 2001, IEEE, 6 pages, See U.S. Appl. No. 15/171,911 (IDS Mar. 15, 2017).
Office Action for U.S. Appl. No. 14/920,568, dated Jan. 20, 2017, 26 pages.
Extended European Search Report for EP Patent Application Serial No. 16182722.5, dated Dec. 15, 2016, 11 pages.
Office Action for U.S. Appl. No. 15/171,911, dated Feb. 28, 2017, 34 Pages.
European Office Action dated Feb. 13, 2017 for European Application Serial No. 16182722.5, 2 pages.
Notice of Allowance dated Apr. 12, 2017 for U.S. Appl. No. 15/171,911, 30 pages.
European Search Report for European Application Serial No. 17163289.6 dated Jul. 12, 2017, 11 pages.
Holma, et al., "LTE for UMTS. Evolution to LTE-advanced, " Mar. 4, 2011, pp. 26-29, XP055386245.
Office Action for U.S. Appl. No. 15/450,940 dated Aug. 10, 2017, 28 pages.

* cited by examiner

METHODS AND APPARATUSES FOR USE OF SIMULTANEOUS MULTIPLE CHANNELS IN THE DYNAMIC FREQUENCY SELECTION BAND IN WIRELESS NETWORKS

CROSS-REFERENCE TO RELATED APPLICATIONS

This application is a continuation-in-part of and claims priority to U.S. patent application Ser. No. 14/920,568, entitled METHOD AND APPARATUS FOR USE OF SIMULTANEOUS MULTIPLE CHANNELS IN THE DYNAMIC FREQUENCY SELECTION BAND IN WIRELESS NETWORKS, and filed on Oct. 22, 2015, which in turn, claims priority to U.S. Provisional Patent Application No. 62/200,764, entitled METHOD AND APPARATUS FOR USE OF SIMULTANEOUS MULTIPLE CHANNELS IN THE DYNAMIC FREQUENCY SELECTION BAND IN WIRELESS NETWORKS, and filed on Aug. 4, 2015, the disclosures of which are hereby incorporated herein by reference in their entireties. This application is a also a continuation-in-part of and claims priority to U.S. patent application Ser. No. 15/171,911, entitled METHOD AND APPARATUS FOR INTEGRATING RADIO AGENT DATA IN NETWORK ORGANIZATION OF DYNAMIC CHANNEL SELECTION IN WIRELESS NETWORKS, and filed on Jun. 2, 2016, and U.S. patent application Ser. No. 15/214,437, entitled CLOUD DFS SUPER MASTER SYSTEMS AND METHODS, and filed on Jun. 2, 2016, and/or their respective provisional applications, the disclosures of which are hereby incorporated herein by reference in their entireties. In addition, this application is a continuation-in-part of and claims priority to U.S. patent application Ser. No. 15/259,359, entitled METHOD AND APPARATUS FOR PROVIDING DYNAMIC FREQUENCY SELECTION SPECTRUM ACCESS IN PEER-TO-PEER WIRELESS NETWORKS, and filed on Sep. 8, 2016, which in turn, claims priority to U.S. Provisional Patent Application No. 62/314,042, entitled METHOD AND APPARATUS FOR PROVIDING DYNAMIC FREQUENCY SELECTION SPECTRUM ACCESS IN PEER-TO-PEER WIRELESS NETWORKS, and filed on Mar. 28, 2016, the disclosures of which are hereby incorporated herein by reference in their entireties.

BACKGROUND

The present invention relates to wireless networks and more specifically to systems and methods for selecting available channels free of occupying signals from a plurality of radio frequency channels. Embodiments of the present invention provide methods and systems for exploiting licensed and unlicensed bands requiring radar detection and detection of other occupying signals, such as the Dynamic Frequency Selection (DFS) channels in the Unlicensed National Information Infrastructure (U-NII) bands, to enable additional bandwidth for 802.11 ac/n and LTE in unlicensed spectrum (LTE-U) networks employing a wireless agility agent.

Wi-Fi networks are crucial to today's portable modern life. Wi-Fi is the preferred network in the growing Internet-of-Things (IoT). But, the technology behind current Wi-Fi has changed little in the last ten years. The Wi-Fi network and the associated unlicensed spectrum are currently managed in inefficient ways. For example, there is little or no coordination between individual networks and equipment from different manufacturers. Such networks generally employ primitive control algorithms that assume the network consists of "self-managed islands," a concept originally intended for low density and low traffic environments. The situation is far worse for home networks, which are assembled in completely chaotic ad hoc ways. Further, with more and more connected devices becoming commonplace, the net result is growing congestion and slowed networks with unreliable connections.

Similarly, LTE-U networks operating in the same or similar unlicensed bands as 802.11ac/n Wi-Fi suffer similar congestion and unreliable connection issues and will often create congestion problems for existing Wi-Fi networks sharing the same channels. Additional bandwidth and better and more efficient utilization of spectrum is key to sustaining the usefulness of wireless networks including the Wi-Fi and LTE-U networks in a fast growing connected world.

Devices operating in certain parts of the 5 GHz U-NII-2 band, known as the DFS channels, require active radar detection. This function is assigned to a device capable of detecting radar known as a DFS master, which is typically an access point or router. The DFS master actively scans the DFS channels and performs a channel availability check (CAC) and periodic in-service monitoring (ISM) after the channel availability check. The channel availability check lasts 60 seconds as required by the FCC Part 15 Subpart E and ETSI 301 893 standards. The DFS master signals to the other devices in the network (typically client devices) by transmitting a DFS beacon indicating that the channel is clear of radar. Although the access point can detect radar, wireless clients typically cannot. Because of this, wireless clients must first passively scan DFS channels to detect whether a beacon is present on that particular channel. During a passive scan, the client device switches through channels and listens for a beacon transmitted at regular intervals by the access point on an available channel.

Once a beacon is detected, the client is allowed to actively scan on that channel. If the DFS master detects radar in that channel, the DFS master no longer transmits the beacon, and all client devices upon not sensing the beacon within a prescribed time must vacate the channel immediately and remain off that channel for 30 minutes. For clients associated with the DFS master network, additional information in the beacons (i.e. the channel switch announcement) can trigger a rapid and controlled evacuation of the channel. Normally, a DFS master device is an access point with only one radio and is able to provide DFS master services for just a single channel. A significant problem of this approach is, in the event of a radar event or a more-common false-detect, the single channel must be vacated and the ability to use DFS channels is lost. This disclosure recognizes and addresses, in at least certain embodiments, the problems with current devices for detecting occupying signals including current DFS devices.

SUMMARY

The present invention relates to wireless networks and more specifically to systems and methods for selecting available channels free of occupying signals from a plurality of radio frequency channels. The present invention employs a wireless agility agent to access additional bandwidth for wireless networks, such as IEEE 802.11ac/n and LTE-U networks. The additional bandwidth is derived from channels that require avoidance of channels with occupying signals. For example, additional bandwidth is derived from special compliance channels that require radar detection, such as the DFS channels of the U-NII-2 bands, by employing multi-channel radar detection and in-service monitoring, and active channel selection controls.

In an embodiment, the present invention utilizes an agility agent employing proprietary embedded radio techniques including continuous multi-carrier spectrum monitoring, an embedded computation element employing proprietary real-time spectrum analysis algorithms, and proprietary signaling and control protocols to provide detection and continuous real-time monitoring of multiple radar types and patterns, and other signals such as interferers and measures of congestion and traffic, across simultaneous multiple channels.

The present invention may also utilize a cloud-based computation and control element, which together with the wireless agility agent forms a split-intelligence architecture. In this architecture, the embedded sensor information from the agility agent—such as radar detection channel availability check and in-service monitoring together with measurements of interference, traffic, identification of neighboring devices, and other spectrum and location information—is communicated to and integrated over time within the cloud intelligence engine. Also the embedded sensor information from the agility agent may be fused with spectrum information from other agility agents distributed in space, filtered, and post-processed. The embedded sensor information from the agility agent may further be merged with other data from other sources to provide improvements to fundamental signal measurement and network reliability problems such as augmented radar sensitivity, reduced false-detect rates, and reliable discovery of hidden nodes.

In further non-limiting embodiments, exemplary systems, methods, and apparatuses are provided that can facilitate reducing false detections and/or network downtime in exemplary mesh networks employing dynamic frequency selection (DFS) channels. In a non-limiting aspect, radar information can be propagated among exemplary mesh nodes, including location information, to facilitate reducing false detections and/or network downtime in exemplary mesh networks. In addition, in further non-limiting aspects, exemplary embodiments can transmit signals to facilitate silencing one or more DFS channels and/or collaborative mesh node identification and/or discrimination of valid radar signals and false detections, among other non-limiting aspects provided.

For instance, exemplary methods can comprise receiving in a mesh network an indication of a suspected radar event on one or more dynamic frequency selection (DFS) channel, determining whether the suspected radar event is a valid radar event, based on the suspected radar event, and propagating, in the mesh network, radar information regarding the suspected radar event or the valid radar event to another mesh node or a cloud intelligence engine associated with the mesh network. In further non-limiting aspects, exemplary methods can further comprise transmitting a Clear To Send (CTS) signal or a hold signal on a DFS channel based on the receiving an indication of the suspected radar event to facilitate collaborative identification or discrimination between valid radar signals and false detections, and/or receiving additional radar information from another mesh node or the cloud intelligence engine, determining that the suspected radar event is a valid radar event or an invalid radar event and propagating such information in the mesh network.

As another non-limiting example, exemplary systems can comprise one or more radar detectors configured to receive an indication of a suspected radar event on one or more DFS channels in a mesh network, a multi-channel DFS master device configured to determine whether the suspected radar event is a valid radar event, based at least in part on the suspected radar event, and one or more communications component associated the multi-channel DFS master device configured to propagate, in the mesh network, radar information regarding the suspected radar event or the valid radar event to another mesh node or a cloud intelligence engine associated with the mesh network. In further non-limiting aspects, the multi-channel DFS master device can be further configured to determine that the suspected radar event is a valid or an invalid radar event (e.g., a false detection), for example, based in part on additional radar information, including location information, associated with other mesh nodes or the cloud intelligence engine associated with the mesh network.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION

The present invention relates to wireless networks and more specifically to systems and methods for selecting available channels free of occupying signals from a plurality of radio frequency channels. As used herein, a channel "free" of occupying signals may include a channel with occupying signals that are lower than a signal threshold including signal strength, quantity, or traffic. The present invention employs a wireless agility agent to access additional bandwidth for wireless networks, such as IEEE 802.11ac/n and LTE-U networks. The additional bandwidth is derived from channels that require avoidance of occupying signals. For example, additional bandwidth is derived from special compliance channels that require radar detection—such as the DFS channels of the U-NII-2 bands—by employing multi-channel radar detection and in-service monitoring, and active channel selection controls. The DFS master actively scans the DFS channels and performs a channel availability check and periodic in-service monitoring after the channel availability check.

Figure 1:
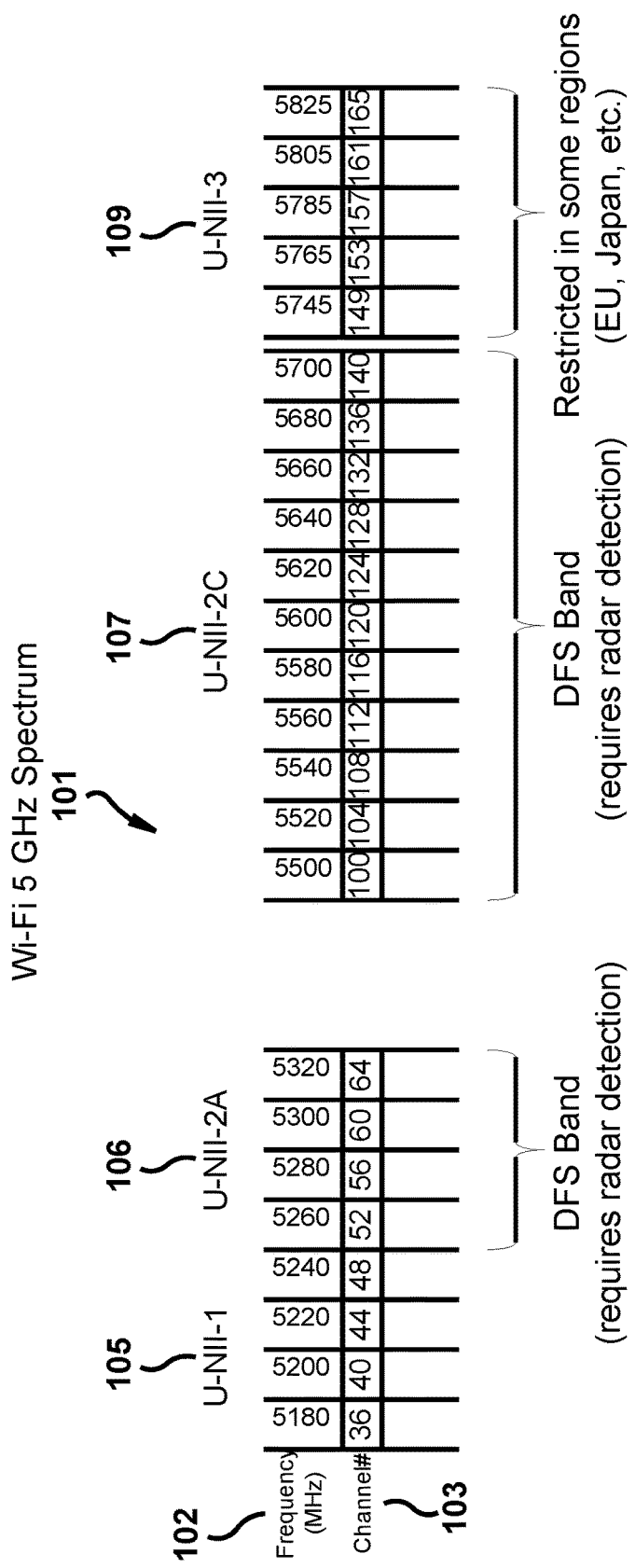
FIG. 1 illustrates portions of the 5 GHz Wi-Fi spectrum including portions that require active monitoring for radar signals.

FIG. 1 illustrates portions of the 5 GHz Wi-Fi spectrum 101. FIG. 1 shows the frequencies 102 and channels 103 that make up portions of the 5 GHz Wi-Fi spectrum 101. The U-NII band is an FCC regulatory domain for 5-GHz wireless devices and is part of the radio frequency spectrum used by IEEE 802.11ac/n devices and by many wireless ISPs. It operates over four ranges. The U-NII-1 band 105 covers the 5.15-5.25 GHz range. The U-NII-2A band 106 covers the 5.25-5.35 GHz range. The U-NII-2A band 106 is subject to DFS radar detection and avoidance requirements. The U-NII-2C band 107 covers the 5.47-5.725 GHz range. The U-NII-2C band 107 is also subject to DFS radar detection and avoidance requirements. The U-NII-3 band 109 covers the 5.725 to 5.850 GHz range. Use of the U-NII-3 band 109 is restricted in some jurisdictions like the European Union and Japan.

When used in an 802.11ac/n or LTE-U wireless network, the agility agent of the present invention functions as an autonomous DFS master device. In contrast to conventional DFS master devices, the agility agent is not an access point or router, but rather is a standalone wireless device employing inventive scanning techniques described herein that provide DFS scan capabilities across multiple channels, enabling one or more access point devices and peer-to-peer client devices to exploit simultaneous multiple DFS channels. The standalone autonomous DFS master of the present invention may be incorporated into another device such as an access point, LTE-U host, base station, cell, or small cell, media or content streamer, speaker, television, mobile phone, mobile router, software access point device, or peer to peer device but does not itself provide network access to client devices. In particular, in the event of a radar event or a false-detect, the enabled access point and clients or wireless device are able to move automatically, predictively and very quickly to another DFS channel.

Figure 2:
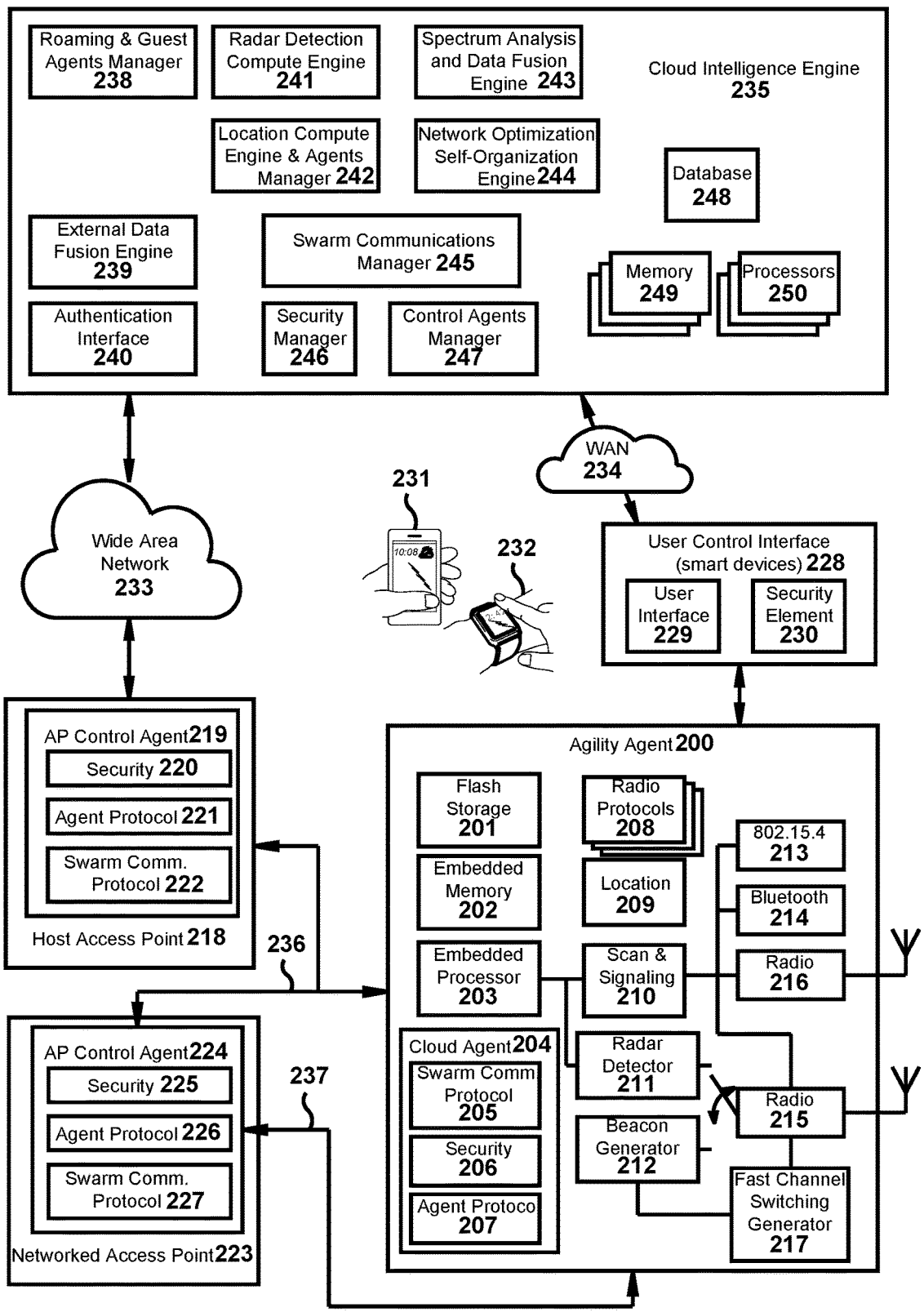
FIG. 2 illustrates how such an exemplary autonomous DFS master may interface with a conventional host access point, a cloud-based intelligence engine, and client devices in accordance with the present invention.

FIG. 2 provides a detailed illustration of an exemplary system of the present invention. As illustrated in FIG. 2, the agility agent 200, in the role of an autonomous DFS master device, may control at least one access point, the host access point 218, to dictate channel selection primarily by (a) signaling availability of one or more DFS channels by simultaneous transmission of one or more beacon signals; (b) transmitting a listing of both the authorized available DFS channels, herein referred to as a whitelist, and the prohibited DFS channels in which a potential radar signal has been detected, herein referred to as a blacklist, along with control signals and a time-stamp signal, herein referred to as a dead-man switch timer via an associated non-DFS channel; (c) transmitting the same signals as (b) over a wired medium such as Ethernet or serial cable; and (d) receiving control, coordination and authorized and preferred channel selection guidance information from the cloud intelligence engine 235. The agility agent 200 sends the time-stamp signal, or dead-man switch timer, with communications to ensure that the access points 218, 223 do not use the information, including the whitelist, beyond the useful life-time of the information. For example, a whitelist will only be valid for certain period of time. The time-stamp signal avoids using noncompliant DFS channels by ensuring that an access point will not use the whitelist beyond its useful lifetime. The present invention allows currently available 5 GHz access points without radar detection—which cannot operate in the DFS channels—to operate in the DFS channels by providing the radar detection required by the FCC or other regulatory agencies.

The host access point 218 and any other access point devices 223 under control of the autonomous DFS master 200 typically have the control agent portion 219, 224 installed within their communication stack. The control agent 219, 224 is an agent that acts under the direction of the agility agent 200 to receive information and commands from the agility agent 200. The control agent 219, 224 acts on information from the agility agent 200. For example, the control agent 219, 224 listens for information like a whitelist or blacklist from the agility agent. If a radar signal is detected by the agility agent 200, the agility agent 200 communicates that to the control agent 219, 224, and the control agent 219, 224 acts to evacuate the channel immediately. The control agent can also take commands from the agility agent 200. For example, the host access point 218 and network access point 223 can offload DFS monitoring to the agility agent 200 as long as they can listen to the agility agent 200 and take commands from the agility agent regarding available DFS channels.

The host access point 218 is connected to a wide area network 233 and includes an access point control agent 219 to facilitate communications with the agility agent 200. The access point control agent 219 includes a security module 220 and agent protocols 221 to facilitate communication with the agility agent 200, and swarm communication protocols 222 to facilitate communications between agility agents, access points, client devices, and other devices in the network. The agility agent 200 connects to the cloud intelligence engine 235 via the host access point 218 and the wide area network 233. The access point sets up a secure tunnel to communicate with the cloud intelligence engine 235 through, for example, an encrypted control API in the host access point 218. The agility agent 200 transmits information to the cloud intelligence engine 235 such as whitelists, blacklists, state information, location information, time signals, scan lists (for example, showing neighboring access points), congestion (for example, number and type of re-try packets), and traffic information. The cloud intelligence engine 235 communicates information to the agility agent 200 via the secure communications tunnel such as access point location (including neighboring access points), access point/cluster current state and history, statistics (including traffic, congestion, and throughput), whitelists, blacklists, authentication information, associated client information, and regional and regulatory information. The agility agent 200 uses the information from the cloud intelligence engine 235 to control the access points and other network devices.

The agility agent 200 may communicate via wired connections or wirelessly with the other network components. In the illustrated example, the agility agent 200 includes a primary radio 215 and a secondary radio 216. The primary radio 215 is for DFS and radar detection and is typically a 5 GHz radio. The agility agent 200 may receive radar signals, traffic information, and/or congestion information through the primary radio 215. And the agility agent 200 may transmit information such as DFS beacons via the primary radio 215. The second radio 216 is a secondary radio for sending control signals to other devices in the network and is typically a 2.4 GHz radio. The agility agent 200 may receive information such as network traffic, congestion, and/or control signals with the secondary radio 216. And the agility agent 200 may transmit information such as control signals with the secondary radio 216. The primary radio 215 is connected to a fast channel switching generator 217 that includes a switch and allows the primary radio 215 to switch rapidly between a radar detector 211 and beacon generator 212. The channel switching generator 217 allows the radar detector 211 to switch sufficiently fast to appear to be on multiple channels at a time.

In one embodiment, a standalone multi-channel DFS master includes a beacon generator 212 to generate a beacon in each of a plurality of 5 GHz radio channels, a radar detector 211 to scan for a radar signal in each of the plurality of 5 GHz radio channels, a 5 GHz radio transceiver 215 to transmit the beacon in each of the plurality of 5 GHz radio channels and to receive the radar signal in each of the plurality of 5 GHz radio channels, and a fast channel switching generator 217 coupled to the radar detector, the beacon generator, and the 5 GHz radio transceiver. The fast channel switching generator 217 switches the 5 GHz radio to a first channel of the plurality of 5 GHz radio channels and then causes the beacon generator 212 to generate the beacon in the first channel of the plurality of 5 GHz radio channels. Then the fast channel switching generator 217 causes the radar detector 211 to scan for the radar signal in the first channel of the plurality of 5 GHz radio channels. The fast channel switching generator 217 then repeats these steps for each other channel of the plurality of 5 GHz radio channels during a beacon transmission duty cycle and, in some examples, during a radar detection duty cycle. The beacon transmission duty cycle is the time between successive beacon transmissions on a given channel and the radar detection duty cycle which is the time between successive scans on a given channel. Because the agility agent 200 cycles between beaconing and scanning in each of the plurality of 5 GHz radio channels in the time window between a first beaconing and scanning in a given channel and a subsequent beaconing and scanning the same channel, it can provide effectively simultaneous beaconing and scanning for multiple channels.

The agility agent 200 also may contain a Bluetooth radio 214 and an 802.15.4 radio 213 for communicating with other devices in the network. The agility agent 200 may include various radio protocols 208 to facilitate communication via the included radio devices.

The agility agent 200 may also include a location module 209 to geolocate or otherwise determine the location of the agility agent 200. As shown in FIG. 2, the agility agent 200 may include a scan and signaling module 210. The agility agent 200 includes embedded memory 202, including for example flash storage 201, and an embedded processor 203. The cloud agent 204 in the agility agent 200 facilitates aggregation of information from the cloud agent 204 through the cloud and includes swarm communication protocols 205 to facilitate communications between agility agents, access points, client devices, and other devices in the network. The cloud agent 204 also includes a security module 206 to protect and secure the agility agent's 200 cloud communications as well as agent protocols 207 to facilitate communication with the access point control agents 219, 224.

As shown in FIG. 2, the agility agent 200 may control other access points, for example networked access point 223, in addition to the host access point 218. The agility agent 200 may communicate with the other access points 223 via a wired or wireless connection 236, 237. The other access points 223 include an access point control agent 224 to facilitate communication with the agility agent 200 and other access points. The access point control agent 224 includes a security module 225, agent protocols 226 and swarm communication protocols 227 to facilitate communications with other agents (including other access points and client devices) on the network.

The cloud intelligence engine 235 includes a database 248 and memory 249 for storing information from the agility agent 200, other agility agents (not shown) connected to the intelligence engine 235, and external data sources (not shown). The database 248 and memory 249 allow the cloud intelligence engine 235 to store information over months and years received from agility agents and external data sources.

The cloud intelligence engine 235 also includes processors 250 to perform the cloud intelligence operations described herein. The roaming and guest agents manager 238 in the cloud intelligence engine 235 provides optimized connection information for devices connected to agility agents that are roaming from one access point to other or from one access point to another network. The roaming and guest agents manager 238 also manages guest connections to networks for agility agents connected to the cloud intelligence engine 235. The external data fusion engine 239 provides for integration and fusion of information from agility agents with information from external data sources for example GIS information, other geographical information, FCC information regarding the location of radar transmitters, FCC blacklist information, NOAA databases, DOD information regarding radar transmitters, and DOD requests to avoid transmission in DFS channels for a given location. The cloud intelligence engine 235 further includes an authentication interface 240 for authentication of received communications and for authenticating devices and users. The radar detection compute engine 241 aggregates radar information from agility agents and external data sources and computes the location of radar transmitters from those data to, among other things, facilitate identification of false positive radar detections or hidden nodes and hidden radar. The radar detection compute engine 241 may also guide or steer multiple agility agents to dynamically adapt detection parameters and/or methods to further improve detection sensitivity. The location compute and agents manager 242 determines the location the agility agent 200 and other connected devices through Wi-Fi lookup in a Wi-Fi location database, querying passing devices, scan lists from agility agents, or geometric inference.

The spectrum analysis and data fusion engine 243 and the network optimization self-organization engine 244 facilitate dynamic spectrum optimization with information from the agility agents and external data sources. Each of the agility agents connected to the cloud intelligence engine 235 have scanned and analyzed the local spectrum and communicated that information to the cloud intelligence engine 235. The cloud intelligence engine 235 also knows the location of each agility agent and the access points proximate to the agility agents that do not have a controlling agent as well as the channel on which each of those devices is operating. With this information, the spectrum analysis and data fusion engine 243 and the network optimization self-organization engine 244 can optimize the local spectrum by telling agility agents to avoid channels subject to interference. The swarm communications manager 245 manages communications between agility agents, access points, client devices, and other devices in the network. The cloud intelligence engine includes a security manager 246. The control agents manager 247 manages all connected control agents.

Independent of a host access point 218, the agility agent 200, in the role of an autonomous DFS master device, may also provide the channel indication and channel selection control to one or more peer-to-peer client devices 231, 232 within the coverage area by (a) signaling availability of one or more DFS channels by simultaneous transmission of one or more beacon signals; (b) transmitting a listing of both the authorized available DFS channels, herein referred to as a whitelist and the prohibited DFS channels in which a potential radar signal has been detected, herein referred to as a blacklist along with control signals and a time-stamp signal, herein referred to as a dead-man switch timer via an associated non-DFS channel; and (c) receiving control, coordination and authorized and preferred channel selection guidance information from the cloud intelligence engine 235. The agility agent 200 sends the time-stamp signal, or dead-man switch timer, with communications to ensure that the devices do not use the information, including the whitelist, beyond the useful lifetime of the information. For example, a whitelist will only be valid for certain period of time. The time-stamp signal avoids using noncompliant DFS channels by ensuring that a device will not use the whitelist beyond its useful lifetime.

Such peer-to-peer devices may have a user control interface 228. The user control interface 228 includes a user interface 229 to allow the client devices 231, 232 to interact with the agility agent 200 via the cloud intelligence engine 235. For example, the user interface 229 allows the user to modify network settings via the agility agent 200 including granting and revoking network access. The user control interface 228 also includes a security element 230 to ensure that communications between the client devices 231, 232 and the agility agent 200 are secure. The client devices 231, 232 are connected to a wide area network 234 via a cellular network for example. Peer-to-peer wireless networks are used for direct communication between devices without an access point. For example, video cameras may connect directly to a computer to download video or images files using a peer-to-peer network. Also, device connections to external monitors and device connections to drones currently use peer-to-peer networks. Because there is no access point in a peer-to-peer network, traditional peer-to-peer networks cannot use the DFS channels because there is no access point to control the DFS channel selection and tell the devices what DFS channels to use. The present invention overcomes this limitation.

Figure 3:
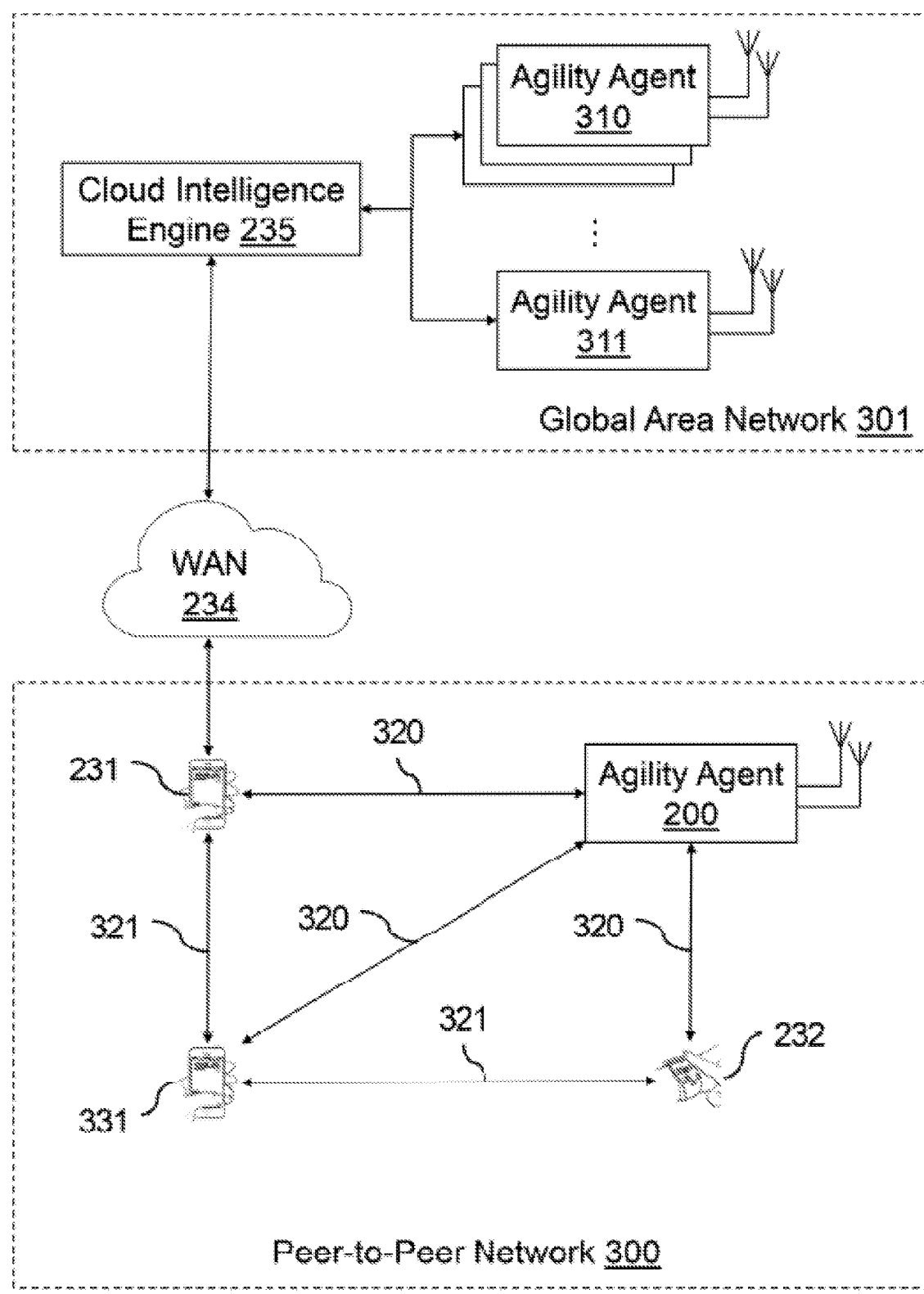
FIG. 3 illustrates how an exemplary autonomous DFS master in a peer-to-peer network may interface with client devices and the cloud intelligence engine independent of any access point, in accordance with the present invention.

FIG. 3 illustrates how the agility agent 200 acting as an autonomous DFS master in a peer-to-peer network 300 (a local area network for example) would interface to client devices 231, 232, 331 and the cloud intelligence engine 235 independent of any access point, in accordance with the present invention. As shown in FIG. 3, the cloud intelligence engine 235 may be connected to a plurality of network-connected agility agents 200, 310. The agility agent 200 in the peer-to-peer network 300 may connect to the cloud intelligence engine 235 through one of the network-connected client devices 231, 331 by, for example, piggy-backing a message to the cloud intelligence engine 235 on a message send to the client devices 231, 331 or otherwise coopting the client devices' 231, 331 connection to the wide area network 234. In the peer-to-peer network 300, the agility agent 200 sends over-the-air control signals 320 to the client devices 231, 232, 331 including indications of channels free of occupying signals such as DFS channels free of radar signals. Alternatively, the agility agent communicates with just one client device 331 which then acts as the group owner to initiate and control the peer-to-peer communications with other client devices 231, 232. The client devices 231, 232, 331 have peer-to-peer links 321 through which they communicate with each other.

The agility agent may operate in multiple modes executing a number of DFS scan methods employing different algorithms. Two of these methods are illustrated in FIG. 4 and FIG. 5.

Figure 4:
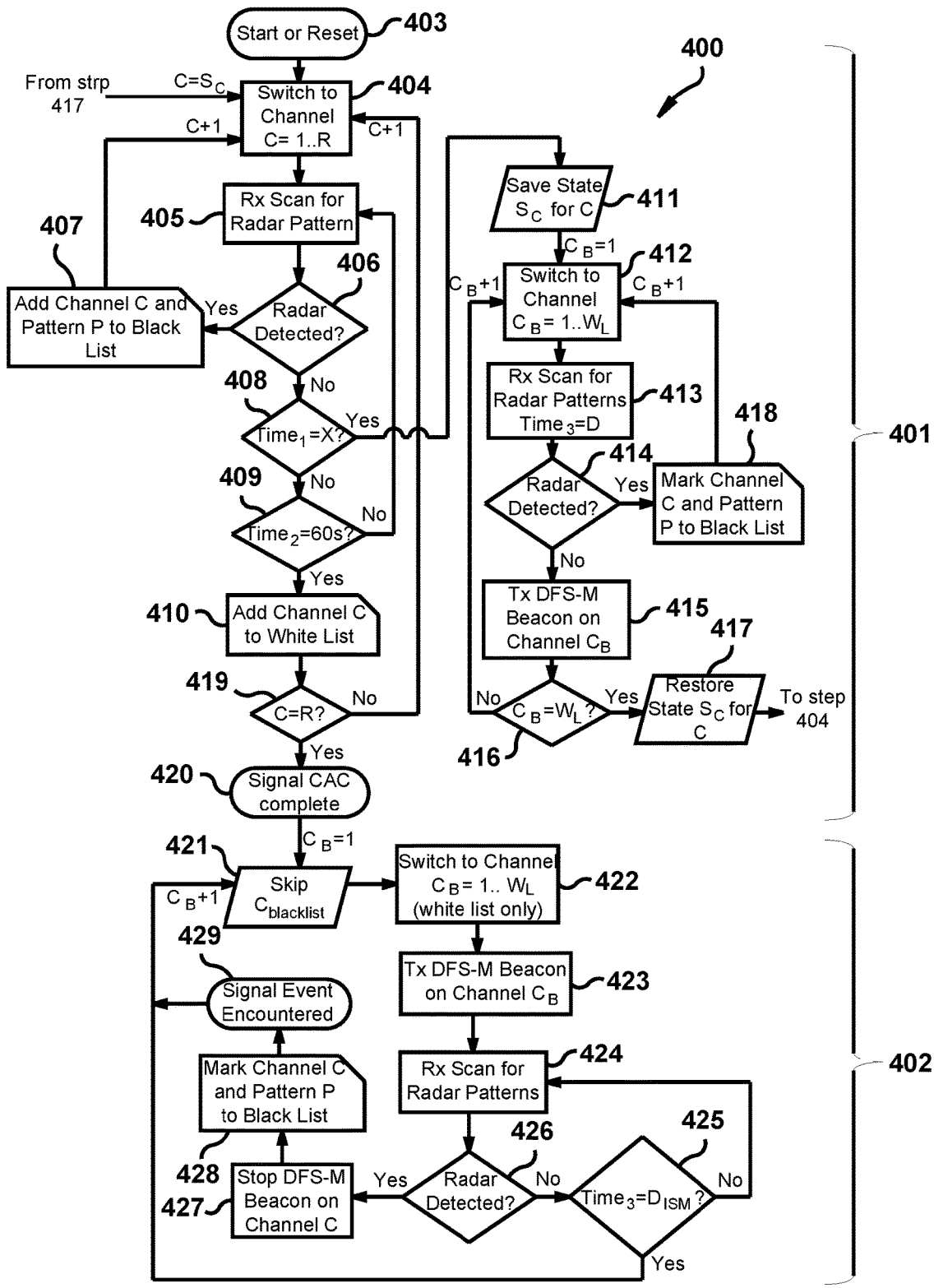
FIG. 4 illustrates a method of performing a channel availability check phase and in-service monitoring phase in a DFS scanning operation with an autonomous DFS master to make multiple DFS channels of the 5 GHz band simultaneously available for use according to the present invention using a time-division multiplexed sequential channel availability check followed by continuous in-service monitoring.
Figure 5:
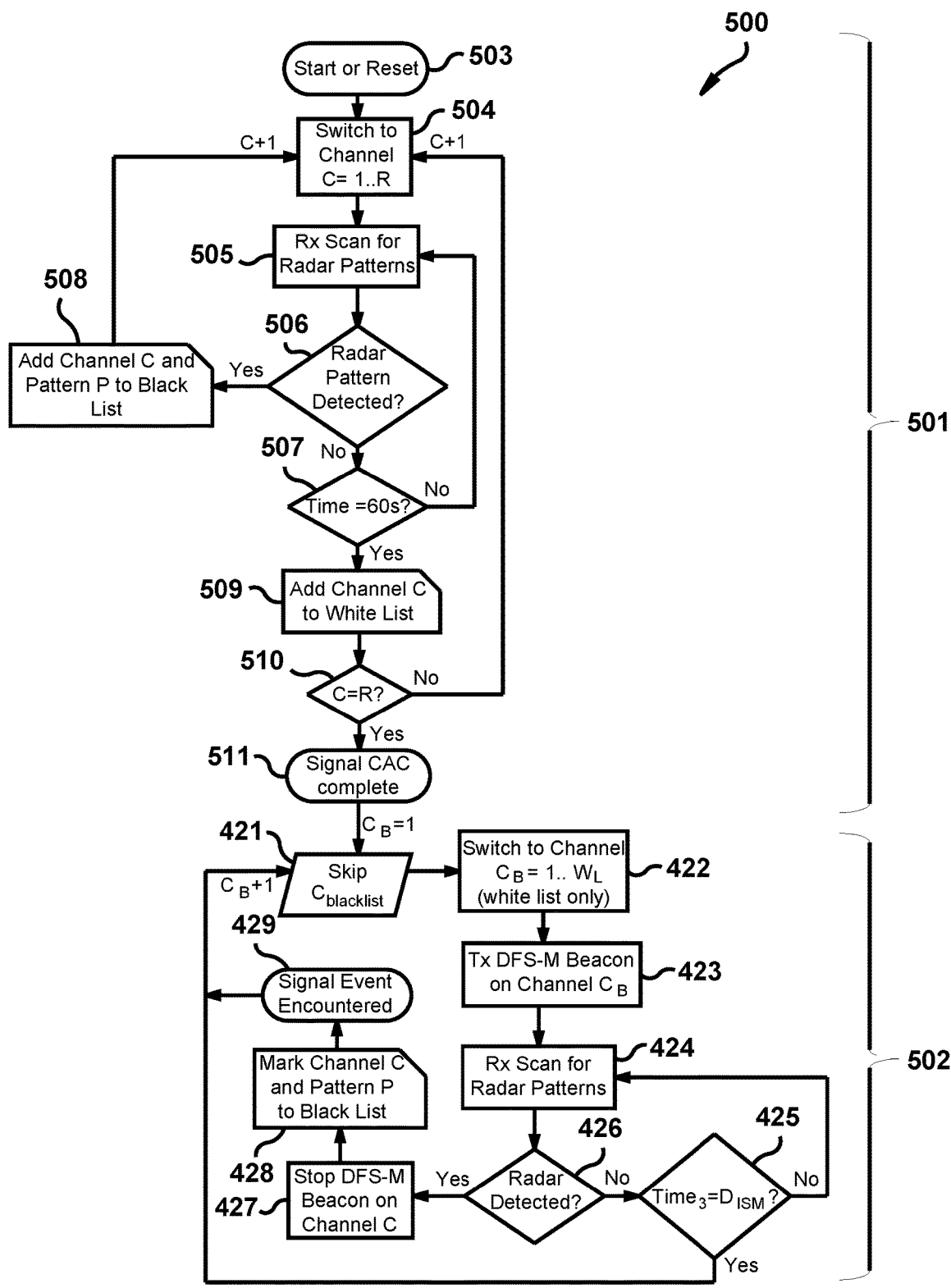
FIG. 5 illustrates a method of performing a channel availability check phase and in-service monitoring phase in a DFS scanning operation with an autonomous DFS master to make multiple DFS channels of the 5 GHz band simultaneously available for use according to the present invention using a continuous sequential channel availability check followed by continuous in-service monitoring.

FIG. 4 illustrates a first DFS scan method 400 for a multi-channel DFS master of the present invention. This method uses a time division sequential CAC 401 followed by continuous ISM 402. The method begins at step 403 with the multi-channel DFS master at startup or after a reset. At step 404 the embedded radio is set to receive (Rx) and is tuned to the first DFS channel (C=1). In one example, the first channel is channel 52. Next, because this is the first scan after startup or reset and the DFS master does not have information about channels free of radar, the DFS master performs a continuous CAC 405 scan for a period of 60 seconds (compliant with the FCC Part 15 Subpart E and ETSI 301 893 requirements). At step 406 the DFS master determines if a radar pattern is present in the current channel. If radar pattern is detected 407, then the DFS master marks this channel in the blacklist. The DFS master may also send additional information about the detected radar including the signal strength, radar pattern, type of radar, and a time stamp for the detection.

At the first scan after startup or reset, if a radar pattern is detected in the first channel scanned, the DFS master may repeat the above steps until a channel free of radar signals is found. Alternatively, after a startup or reset, the DFS master may be provided a whitelist indicating one or more channels that have been determined to be free of radar signals. For example, the DFS master may receive a message that channel 52 is free of radar signals from the cloud intelligence engine 235 along with information fused from other sources.

If at step 406 the DFS master does not detect a radar pattern 410, the DFS master marks this channel in the whitelist and switches the embedded radio to transmit (Tx) (not shown in FIG. 4) at this channel. The DFS master may include additional information in the whitelist including a time stamp. The DFS master then transmits (not shown in FIG. 4) a DFS master beacon signal for minimum required period of n (which is the period of the beacon transmission defined by IEEE 802.11 requirements, usually very short on the order of a few microseconds). A common SSID may be used for all beacons of our system.

For the next channel scan after the DFS master finds a channel free of radar, the DFS master sets the radio to receive and tunes the radio to the next DFS channel 404 (for example channel 60). The DFS master then performs a non-continuous CAC radar detection scan 405 for period of X, which is the maximum period between beacons allowable for a client device to remain associated with a network ($P_M$) less a period of n required for a quick radar scan and the transmission of the beacon itself ($X=P_M-n$) 408. At 411, the DFS master saves the state of current non-continuous channel state ($S_C$) from the non-continuous CAC scan so that the DFS master can later resume the current non-continuous channel scan at the point where the DFS master left off. Then, at step 412, the DFS master switches the radio to transmit and tunes to the first DFS channel (in this example it was CH 52), performs quick receive radar scan 413 (for a period of D called the dwell time) to detect radar 414. If a radar pattern is detected, the DFS master marks the channel to the blacklist 418. When marking the channel to the blacklist, the DFS master may also include additional information about the detected radar pattern including signal strength, type of radar, and a time stamp for the detection. If no radar pattern is detected, the DFS master transmits again 415 the DFS master beacon for the first channel (channel 52 in the example). Next, the DFS master determines if the current channel ($C_B$) is the last channel in the whitelist ($W_L$) 416. In the current example, the current channel, channel 52, is the only channel in the whitelist at this point. Then, the DFS master restores 417 the channel to the saved state from step 411 and switches the radio back to receive mode and tunes the radio back to the current non-continuous CAC DFS channel (channel 60 in the example) 404. The DFS master then resumes the non-continuous CAC radar scan 405 for period of X, again accommodating the period of n required for the quick scan and transmission of the beacon. This is repeated until 60 seconds of non-continuous CAC scanning is accumulated 409—in which case the channel is marked in the whitelist 410—or until a radar pattern is detected—in which case this channel is marked in the blacklist 407.

Next, the DFS master repeats the procedure in the preceding paragraph for the next DFS channel (for example channel 100). The DFS master periodically switches 412 to previous whitelisted DFS channels to do a quick scan 413 (for a period of D called the dwell time), and if no radar pattern detected, transmits a beacon 415 for period of n in each of the previously CAC scanned and whitelisted DFS channels. Then the DFS master returns 404 to resume the non-continuous CAC scan 405 of the current CAC channel (in this case CH 100). The period X available for non-continuous CAC scanning before switching to transmit and sequentially beaconing the previously whitelisted CAC scanned channels is reduced by n for each of the previously whitelisted CAC scanned channels, roughly $X=P_M-n*(W_L)$ where $W_L$ is the number of previously whitelisted CAC scanned channels. This is repeated until 60 seconds of non-continuous CAC scanning is accumulated for the current channel 409. If no radar pattern is detected the channel is marked in the whitelist 410. If a radar pattern is detected, the channel is marked in the blacklist 407 and the radio can immediately switch to the next DFS channel to be CAC scanned.

The steps in the preceding paragraph are repeated for each new DFS channel until all desired channels in the DFS band have been CAC scanned. In FIG. 4, step 419 checks to see if the current channel C is the last channel to be CAC scanned R. If the last channel to be CAC scanned R has been reached, the DFS master signals 420 that the CAC phase 401 is complete and begins the ISM phase 402. The whitelist and blacklist information may be communicated to the cloud intelligence engine where it is integrated over time and fused with similar information from other agility agents.

During the ISM phase, the DFS master does not scan the channels in the blacklist 421. The DFS master switches 422 to the first channel in the whitelist and transmits 423 a DFS beacon on that channel. Then the DFS master scans 424 the first channel in the whitelist for a period of $D_{ISM}$ (the ISM dwell time) 425, which may be roughly $P_M$ (the maximum period between beacons allowable for a client device to remain associated with a network) minus n times the number of whitelisted channels, divided by the number of whitelisted channels ($D_{ISM}=(P_M-n*W_L)/n$). Then the DFS master transmits 423 a beacon and scans 424 each of the channels in the whitelist for the dwell time and then repeats starting at the first channel in the whitelist 422 in a round robin fashion for each respective channel. If a radar pattern is detected 426, the DFS master beacon for the respective channel is stopped 427, and the channel is marked in the blacklist 428 and removed from the whitelist (and no longer ISM scanned). The DFS master sends alert messages 429, along with the new whitelist and blacklist to the cloud intelligence engine. Alert messages may also be sent to other access points and/or client devices in the network.

FIG. 5 illustrates a second DFS scan method 500 for a multi-channel DFS master of the present invention. This method uses a continuous sequential CAC 501 followed by continuous ISM 502. The method begins at step 503 with the multi-channel DFS master at startup or after a reset. At step 504 the embedded radio is set to receive (Rx) and is tuned to the first DFS channel (C=1). In this example, the first channel is channel 52. The DFS master performs a continuous CAC scan 505 for a period of 60 seconds 507 (compliant with the FCC Part 15 Subpart E and ETSI 301 893 requirements). If radar pattern is detected at step 506 then the DFS master marks this channel in the blacklist 508.

If the DFS master does not detect radar patterns, it marks this channel in the whitelist 509. The DFS master determines if the current channel C is the last channel to be CAC scanned R at step 510. If not, then the DFS master tunes the receiver to the next DFS channel (for example channel 60) 504. Then the DFS master performs a continuous scan 505 for full period of 60 seconds 507. If a radar pattern is detected, the DFS master marks the channel in the blacklist 508 and the radio can immediately switch to the next DFS channel 504 and repeat the steps after step 504.

If no radar pattern is detected 509, the DFS master marks the channel in the whitelist 509 and then tunes the receiver next DFS channel 504 and repeats the subsequent steps until all DFS channels for which a CAC scan is desired. Unlike the method depicted in FIG. 4, no beacon is transmitted between CAC scans of sequential DFS channels during the CAC scan phase.

The ISM phase 502 in FIG. 5 is identical to that in FIG. 4 described above.

Figure 6A:
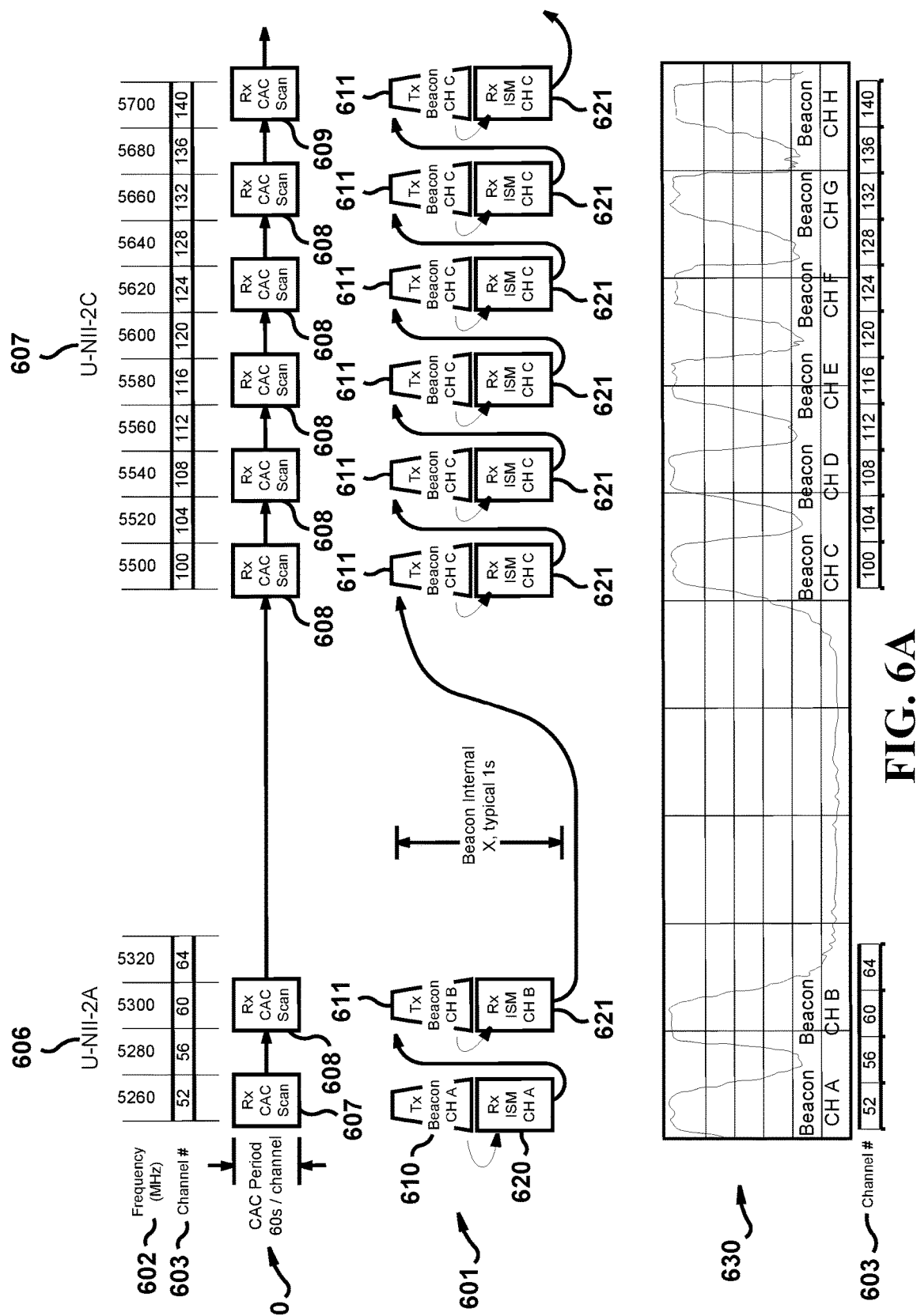
FIG. 6A illustrates a method of performing a channel availability check phase and in-service monitoring phase in a DFS scanning operation with an autonomous DFS master to make multiple DFS channels of the 5 GHz band simultaneously available for use according to the present invention.

FIG. 6A illustrates how multiple channels in the DFS channels of the 5 GHz band are made simultaneously available by use of the invention. FIG. 6A illustrates the process of FIG. 5 wherein the autonomous DFS Master performs the DFS scanning CAC phase 600 across multiple channels and upon completion of CAC phase, the autonomous DFS Master performs the ISM phase 601. During the ISM phase the DFS master transmits multiple beacons to indicate the availability of multiple DFS channels to nearby host and non-host (ordinary) access points and client devices, in accordance with the present invention.

FIG. 6A shows the frequencies 602 and channels 603 that make up portions of the DFS 5 GHz Wi-Fi spectrum. U-NII-2A 606 covers the 5.25-5.35 GHz range. U-NII-2C 607 covers the 5.47-5.725 GHz range. The first channel to undergo CAC scanning is shown at element 607. The subsequent CAC scans of other channels are shown at elements 608. And the final CAC scan before the ISM phase 601 is shown at element 609.

In the ISM phase 601, the DFS master switches to the first channel in the whitelist. In the example in FIG. 6A, each channel 603 for which a CAC scan was performed was free of radar signals during the CAC scan and was added to the whitelist. Then the DFS master transmits 610 a DFS beacon on that channel. Then the DFS master scans 620 the first channel in the whitelist for the dwell time. Then the DFS master transmits 611 a beacon and scans 621 each of the other channels in the whitelist for the dwell time and then repeats starting 610 at the first channel in the whitelist in a round robin fashion for each respective channel. If a radar pattern is detected, the DFS master beacon for the respective channel is stopped, and the channel is marked in the blacklist and removed from the whitelist (and no longer ISM scanned).

FIG. 6A also shows an exemplary waveform 630 of the multiple beacon transmissions from the DFS master to indicate the availability of the multiple DFS channels to nearby host and non-host (ordinary) access points and client devices.

Figure 6B:
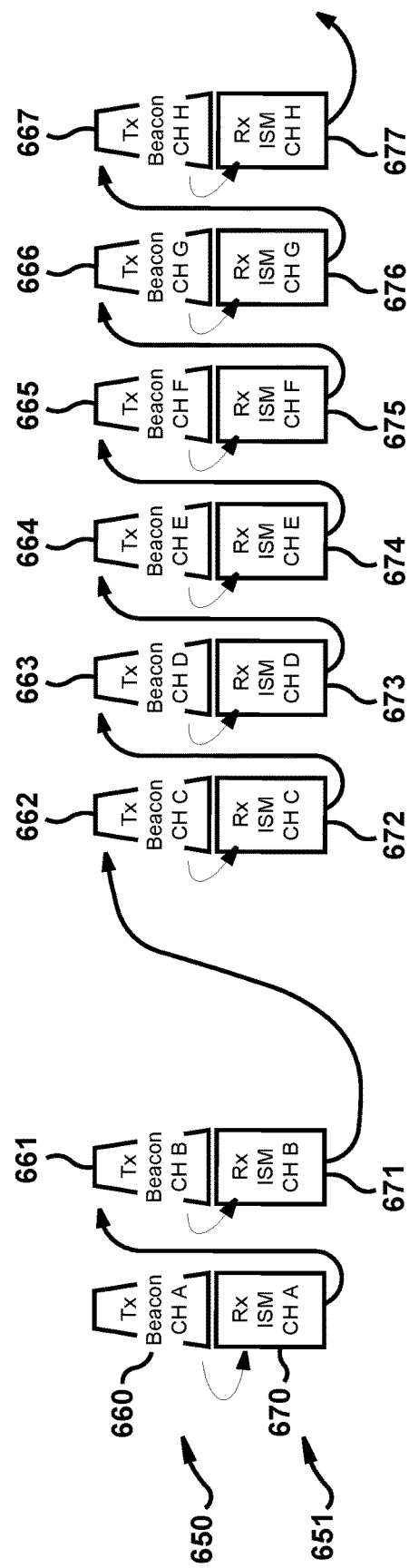
FIG. 6B illustrates an exemplary beacon transmission duty cycle and an exemplary radar detection duty cycle.

FIG. 6B illustrates a beacon transmission duty cycle 650 and a radar detection duty cycle 651. In this example, channel A is the first channel in a channel whitelist. In FIG. 6B, a beacon transmission in channel A 660 is followed by a quick scan of channel A 670. Next a beacon transmission in the second channel, channel B, 661 is followed by a quick scan of channel B 671. This sequence is repeated for channels C 662, 672; D 663, 673; E 664, 674; F 665, 675; G 666, 676, and H 667, 677. After the quick scan of channel H 677, the DFS master switches back to channel A and performs a second beacon transmission in channel A 660 followed by a second quick scan of channel A 670. The time between starting the first beacon transmission in channel A and starting the second beacon transmission in channel A is a beacon transmission duty cycle. The time between starting the first quick scan in channel A and starting the second quick scan in channel A is a radar detection duty cycle. In order to maintain connection with devices on a network, the beacon transmission duty cycle should be less than or equal to the maximum period between the beacons allowable for a client device to remain associated with the network.

One embodiment of the present invention provides a standalone multi-channel DFS master that includes a beacon generator 212 to generate a beacon in each of a plurality of 5 GHz radio channels, a radar detector 211 to scan for a radar signal in each of the plurality of 5 GHz radio channels, a 5 GHz radio transceiver 215 to transmit the beacon in each of the plurality of 5 GHz radio channels and to receive the radar signal in each of the plurality of 5 GHz radio channels, and a fast channel switching generator 217 and embedded processor 203 coupled to the radar detector, the beacon generator, and the 5 GHz radio transceiver. The fast channel switching generator 217 and embedded processor 203 switch the 5 GHz radio transceiver 215 to a first channel of the plurality of 5 GHz radio channels and cause the beacon generator 212 to generate the beacon in the first channel of the plurality of 5 GHz radio channels. The fast channel switching generator 217 and embedded processor 203 also cause the radar detector 211 to scan for the radar signal in the first channel of the plurality of 5 GHz radio channels. The fast channel switching generator 217 and embedded processor 203 then repeat these steps for each of the other channels of the plurality of 5 GHz radio channels. The fast channel switching generator 217 and embedded processor 203 perform all of the steps for all of the plurality of 5 GHz radio channels during a beacon transmission duty cycle which is a time between successive beacon transmissions on a specific channel and, in some embodiments, a radar detection duty cycle which is a time between successive scans on the specific channel.

Figure 7:
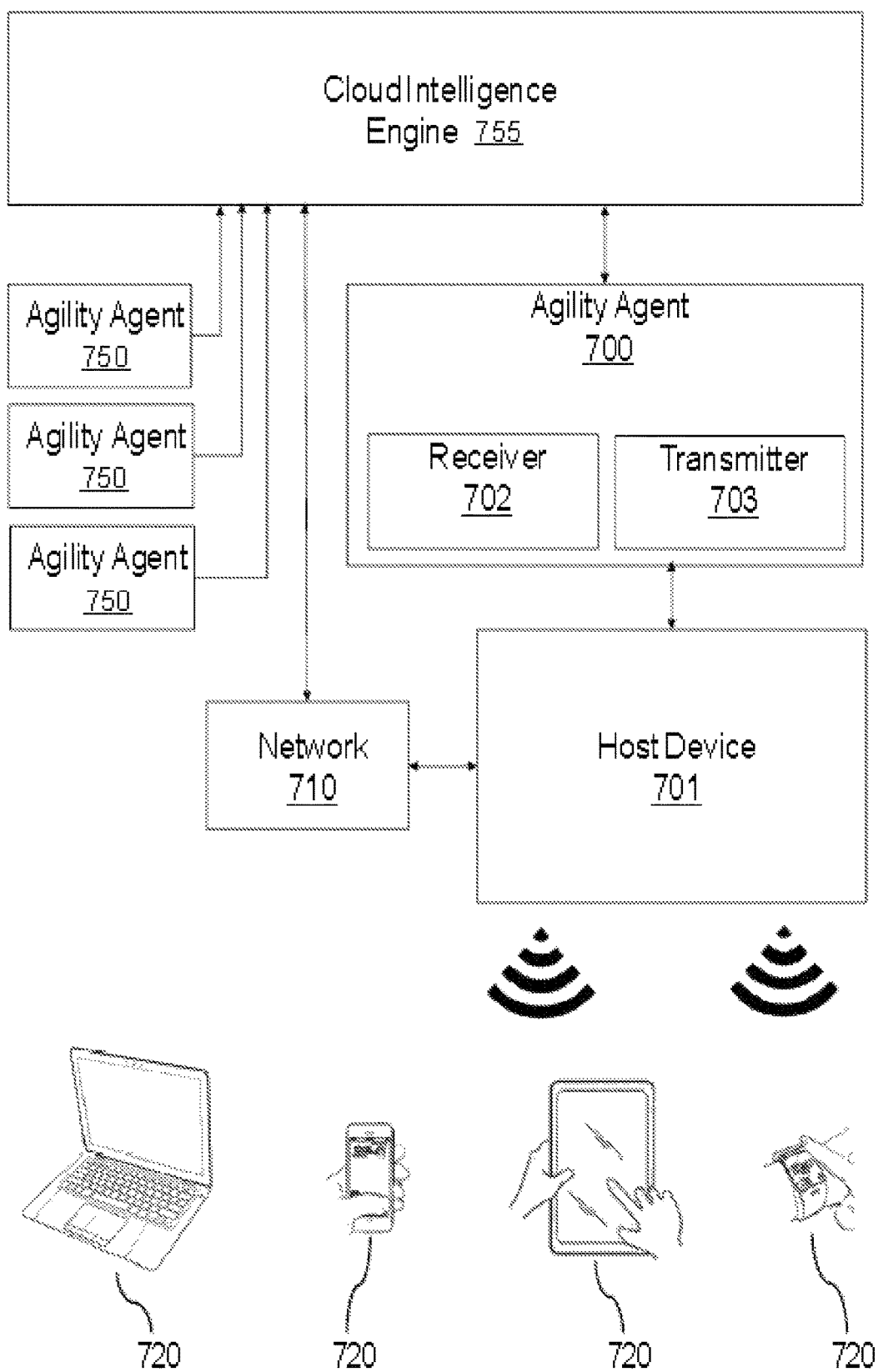
FIG. 7 illustrates an embodiment of the present invention in which the agility agent is connected to a host device and connected to a network via the host device.

In the embodiment illustrated in FIG. 7, the present invention includes systems and methods for selecting available channels free of occupying signals from a plurality of radio frequency channels. The system includes an agility agent 700 functioning as an autonomous frequency selection master that has both an embedded radio receiver 702 to detect the occupying signals in each of the plurality of radio frequency channels and an embedded radio transmitter 703 to transmit an indication of the available channels and an indication of unavailable channels not free of the occupying signals. The agility agent 700 is programmed to connect to a host device 701 and control a selection of an operating channel selection of the host device by transmitting the indication of the available channels and the indication of the unavailable channels to the host device. The host device 701 communicates wirelessly with client devices 720 and acts as a gateway for client devices to a network 710 such as the Internet, other wide area network, or local area network. The host device 701, under the control of the agility agent 700, tells the client devices 720 which channel or channels to use for wireless communication. Additionally, the agility agent 700 may be programmed to transmit the indication of the available channels and the indication of the unavailable channels directly to client devices 720.

The agility agent 700 may operate in the 5 GHz band and the plurality of radio frequency channels may be in the 5 GHz band and the occupying signals are radar signals. The host device 701 may be a Wi-Fi access point or an LTE-U host device.

Further, the agility agent 700 may also be programmed to transmit the indication of the available channels by simultaneously transmitting multiple beacon signals. And the agility agent 700 may be programmed to transmit the indication of the available channels by transmitting a channel whitelist of the available channels and to transmit the indication of the unavailable channels by transmitting a channel blacklist of the unavailable channels. In addition to saving the channel in the channel blacklist, the agility agent 700 may also be programmed to determine and save in the channel blacklist information about the detected occupying signals including signal strength, traffic, and type of the occupying signals.

Figure 8:
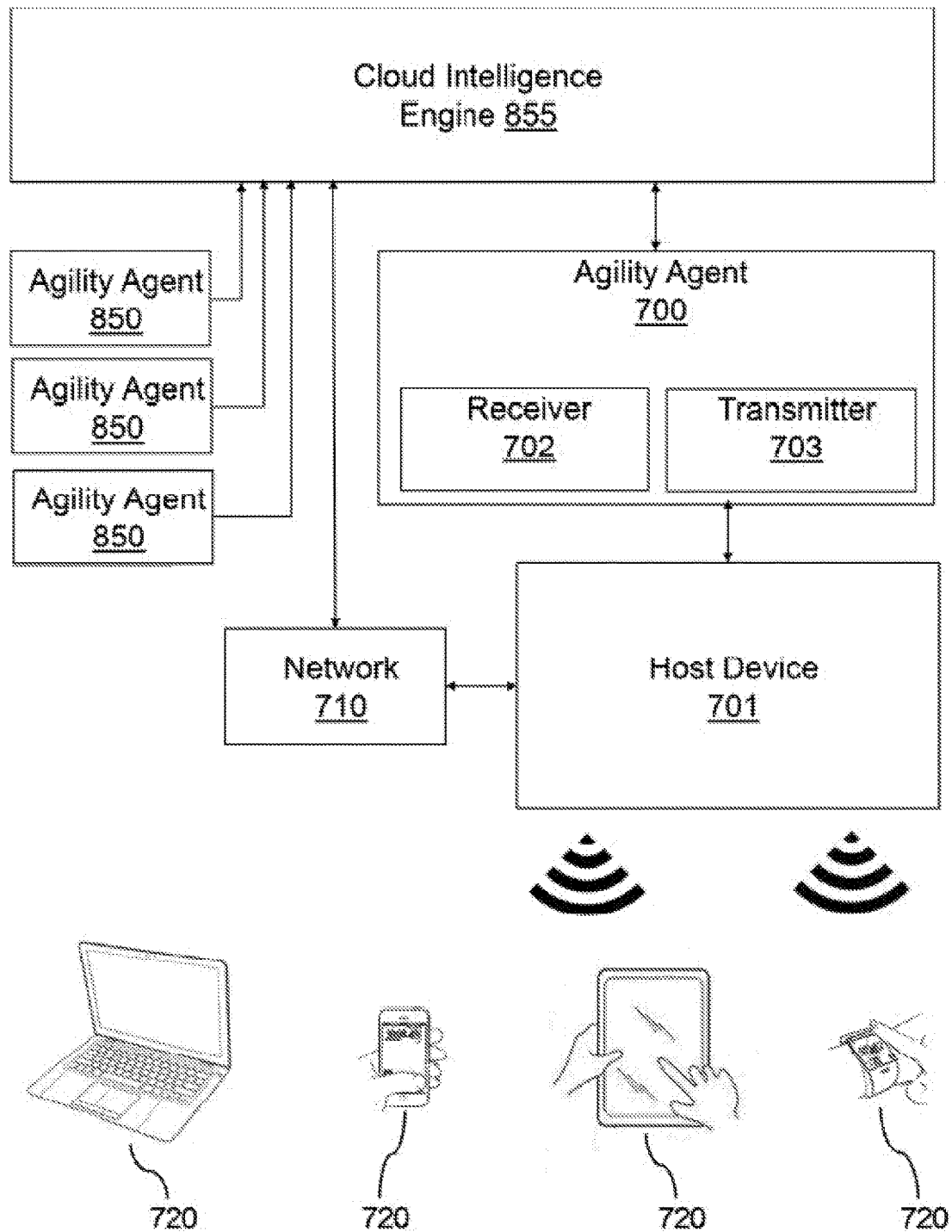
FIG. 8 illustrates another embodiment of the present invention in which the agility agent is connected to a host device and connected to a network and a cloud intelligence engine via the host device.

As shown in FIG. 8, in some embodiments, the agility agent 700 is connected to a cloud-based intelligence engine 855. The agility agent 700 may connect to the cloud intelligence engine 855 directly or through the host device 701 and network 710. The cloud intelligence engine 855 integrates time distributed information from the agility agent 700 and combines information from a plurality of other agility agents 850 distributed in space and connected to the cloud intelligence engine 855. The agility agent 700 is programmed to receive control and coordination signals and authorized and preferred channel selection guidance information from the cloud intelligence engine 755.

Figure 9:
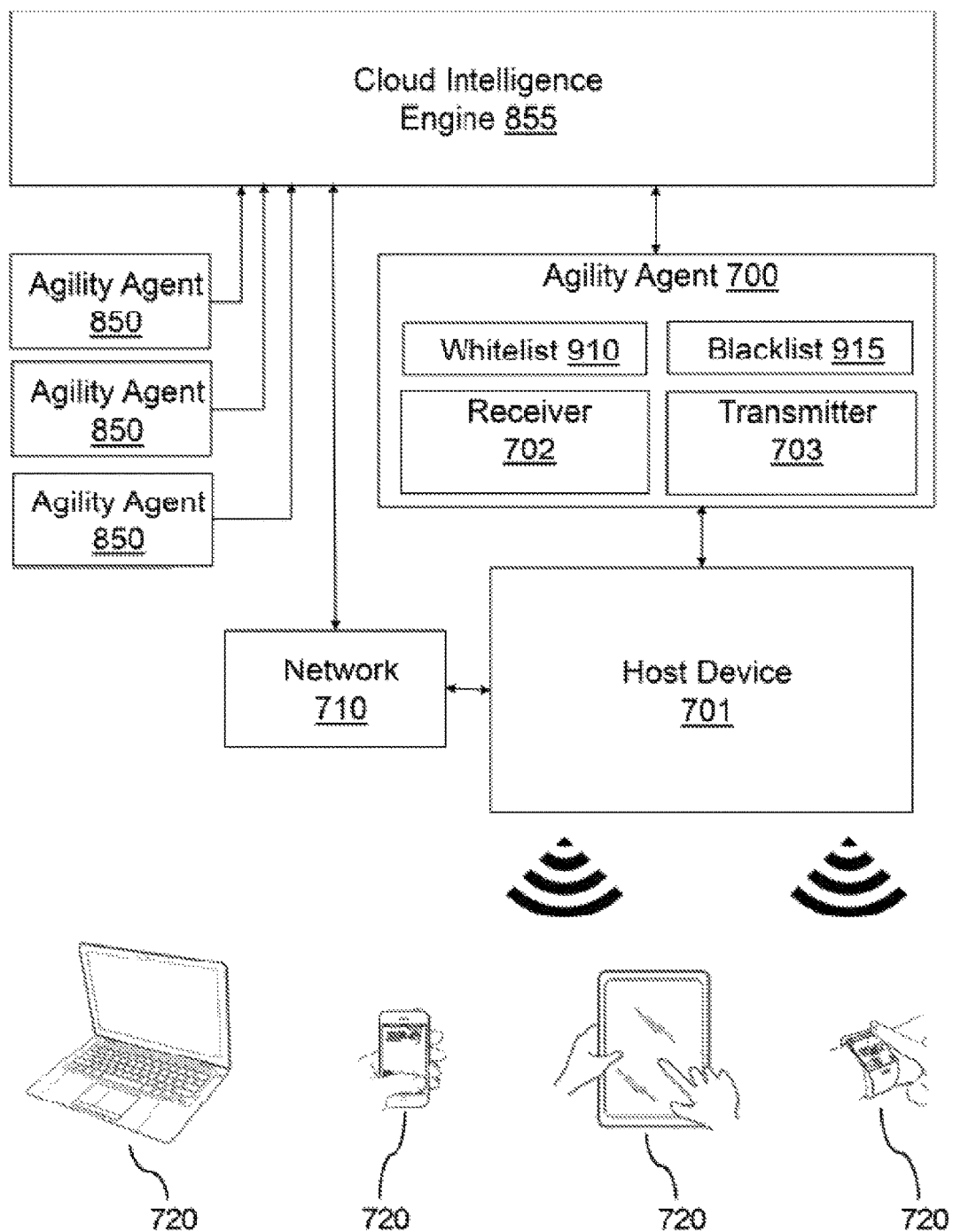
FIG. 9 illustrates another embodiment of the present invention in which the agility agent is connected to a host device and connected to a network and a cloud intelligence engine via the host device.

In another embodiment shown in FIG. 9, the present invention includes a system and method for selecting available channels free of occupying signals from a plurality of radio frequency channels in which an agility agent 700 functioning as an autonomous frequency selection master includes an embedded radio receiver 702 to detect the occupying signals in each of the plurality of radio frequency channels and an embedded radio transmitter 703 to indicate the available channels and unavailable channels not free of the occupying signals. The agility agent 700 contains a channel whitelist 910 of one or more channels scanned and determined not to contain an occupying signal. The agility agent 700 may receive the whitelist 910 from another device including a cloud intelligence engine 855. Or the agility agent 700 may have previously derived the whitelist 910 through a continuous CAC for one or more channels. In this embodiment, the agility agent 700 is programmed to cause the embedded radio receiver 702 to scan each of the plurality of radio frequency channels non-continuously interspersed with periodic switching to the channels in the channel whitelist 910 to perform a quick occupying signal scan in each channel in the channel whitelist 910. The agility agent 700 is further programmed to cause the embedded radio transmitter 703 to transmit a first beacon transmission in each channel in the channel whitelist 910 during the quick occupying signal scan and to track in the channel whitelist 910 the channels scanned and determined not to contain the occupying signal during the non-continuous scan and the quick occupying signal scan. The agility agent 700 is also programmed to track in a channel blacklist 915 the channels scanned and determined to contain the occupying signal during the non-continuous scan and the quick occupying signal scan and then to perform in-service monitoring for the occupying signal, including transmitting a second beacon for each of the channels in the channel whitelist 910, continuously and sequentially.

Figure 10:
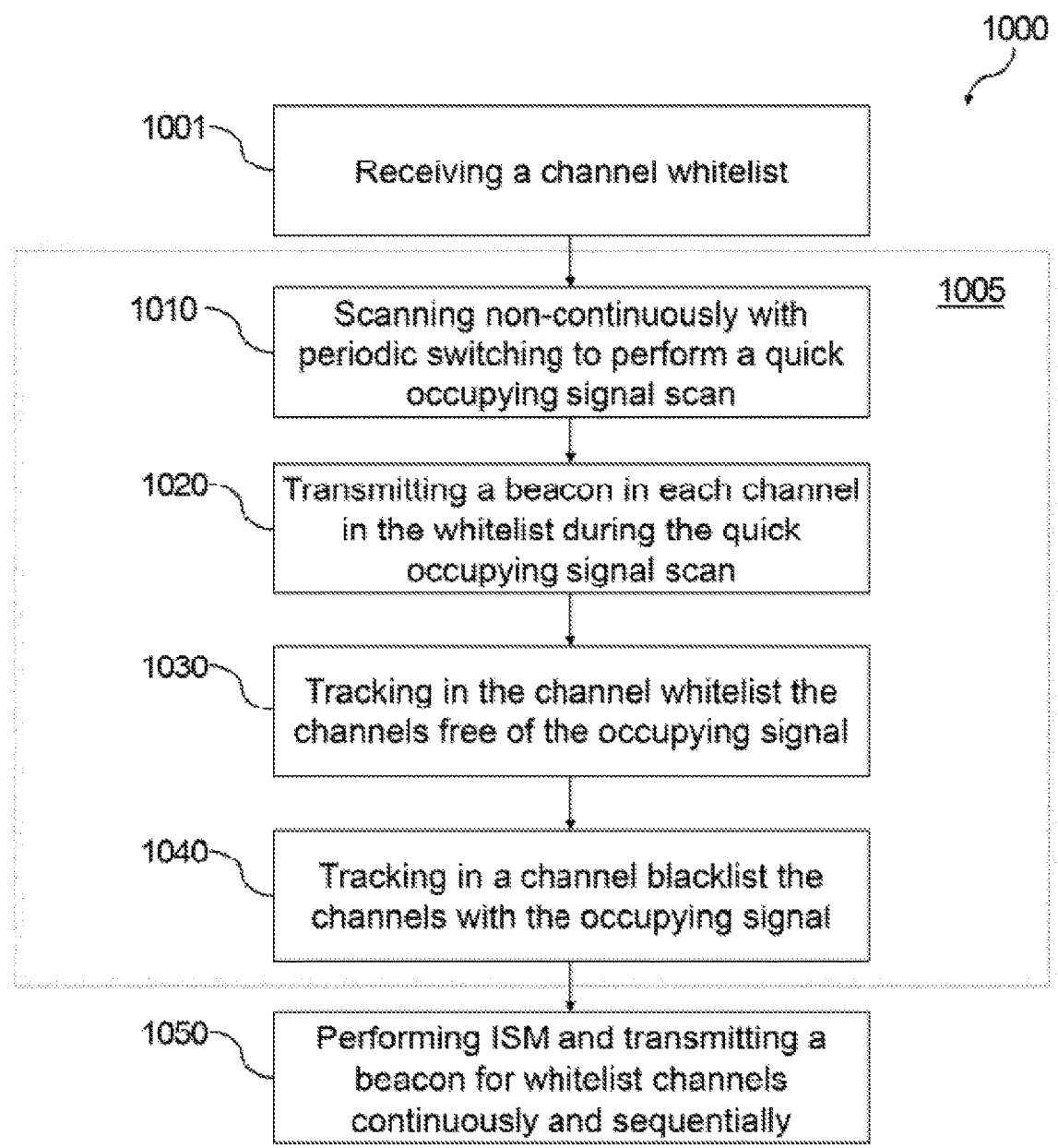
FIG. 10 illustrates a method of performing a channel availability check and in-service monitoring of the present invention.

FIG. 10 illustrates an exemplary method 1000 according to the present invention for selecting an operating channel from a plurality of radio frequency channels in an agility agent functioning as an autonomous frequency selection master. The method includes receiving a channel whitelist of one or more channels scanned and determined not to contain an occupying signal 1010. Next, the agility agent performs a channel availability check 1005 for the plurality of radio frequency channels in a time-division manner. The time-division channel availability check includes scanning 1010 with an embedded radio receiver in the agility agent each of the plurality of radio frequency channels non-continuously interspersed with periodic switching to the channels in the channel whitelist to perform a quick occupying signal scan and transmitting 1020 a first beacon with an embedded radio transmitter in the agility agent in each channel in the channel whitelist during the quick occupying signal scan. The agility agent also tracks 1030 in the channel whitelist the channels scanned in step 1010 and determined not to contain the occupying signal and tracks 1040 in a channel blacklist the channels scanned in step 1010 and determined to contain the occupying signal. Finally, the agility agent performs in-service monitoring for the occupying signal and a second beaconing transmission for each of the channels in the channel whitelist continuously and sequentially 1050.

Figure 11:
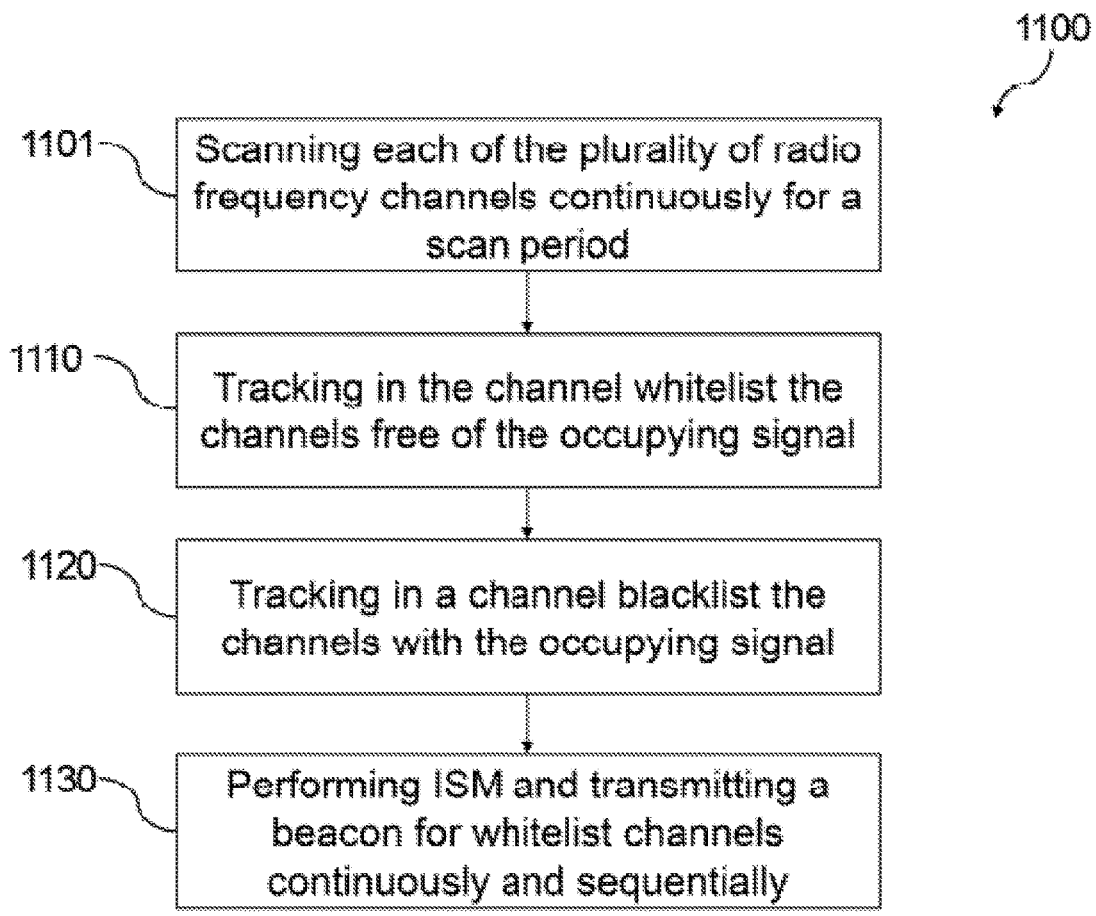
FIG. 11 illustrates another method of performing a channel availability check and in-service monitoring of the present invention.

FIG. 11 illustrates another exemplary method 1100 for selecting an operating channel from a plurality of radio frequency channels in an agility agent functioning as an autonomous frequency selection master. The method 1100 includes performing a channel availability check for each of the plurality of radio frequency channels by scanning 1101 with an embedded radio receiver in the agility agent each of the plurality of radio frequency channels continuously for a scan period. The agility agent then tracks 1110 in a channel whitelist the channels scanned and determined not to contain an occupying signal and tracks 1120 in a channel blacklist the channels scanned and determined to contain the occupying signal. Then the agility agent performs in-service monitoring for the occupying signal and transmits a beacon with an embedded radio transmitter in the agility agent for each of the channels in the channel whitelist continuously and sequentially 1130.

Figure 12:
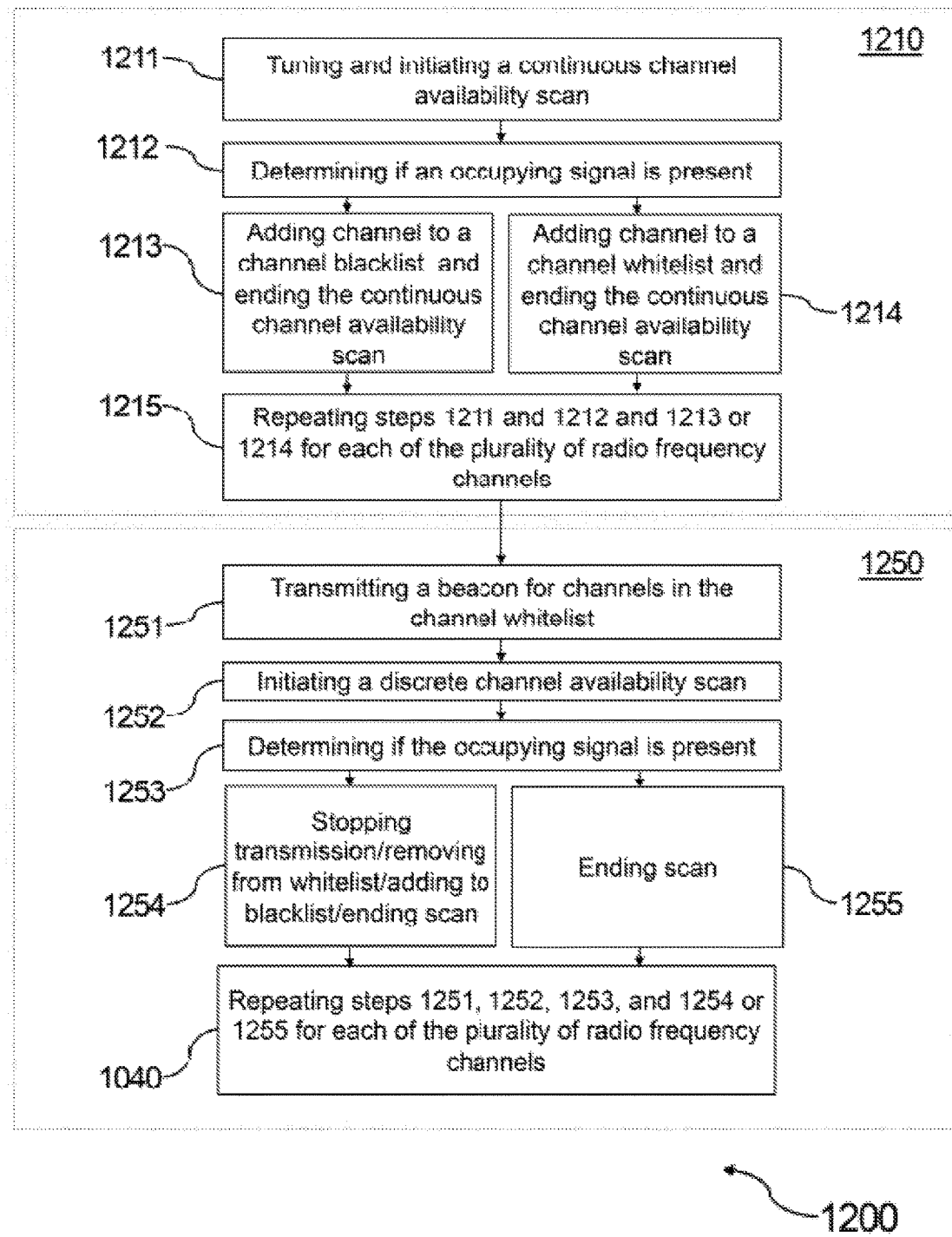
FIG. 12 illustrates another method of performing a channel availability check and in-service monitoring of the present invention.

FIG. 12 illustrates a further exemplary method 1200 for selecting an operating channel from a plurality of radio frequency channels in an agility agent functioning as an autonomous frequency selection master. The method 1200 includes performing a channel availability check 1210 for each of the plurality of radio frequency channels and performing in-service monitoring and beaconing 1250 for each of the plurality of radio frequency channels. The channel availability check 1210 includes tuning an embedded radio receiver in the autonomous frequency selection master device to one of the plurality of radio frequency channels and initiating a continuous channel availability scan in the one of the plurality of radio frequency channels with the embedded radio receiver 1211. Next, the channel availability check 1210 includes determining if an occupying signal is present in the one of the plurality of radio frequency channels during the continuous channel availability scan 1212. If the occupying signal is present in the one of the plurality of radio frequency channels during the continuous channel availability scan, the channel availability check 1210 includes adding the one of the plurality of radio frequency channels to a channel blacklist and ending the continuous channel availability scan 1213. If the occupying signal is not present in the one of the plurality of radio frequency channels during the continuous channel availability scan during a first scan period, the channel availability check 1210 includes adding the one of the plurality of radio frequency channels to a channel whitelist and ending the continuous channel availability scan 1214. Next, the channel availability check 1210 includes repeating steps 1211 and 1212 and either 1213 or 1214 for each of the plurality of radio frequency channels.

The in-service monitoring and beaconing 1250 for each of the plurality of radio frequency channels includes determining if the one of the plurality of radio frequency channels is in the channel whitelist and if so, tuning the embedded radio receiver in the autonomous frequency selection master device to the one of the plurality of radio frequency channels and transmitting a beacon in the one of the plurality of radio frequency channels with an embedded radio transmitter in the autonomous frequency selection master device 1251.

Next, the in-service monitoring and beaconing 1250 includes initiating a discrete channel availability scan (a quick scan as described previously) in the one of the plurality of radio frequency channels with the embedded radio receiver 1252. Next, the in-service monitoring and beaconing 1250 includes determining if the occupying signal is present in the one of the plurality of radio frequency channels during the discrete channel availability scan 1253. If the occupying signal is present, the in-service monitoring and beaconing 1250 includes stopping transmission of the beacon, removing the one of the plurality of radio frequency channels from the channel whitelist, adding the one of the plurality of radio frequency channels to the channel blacklist, and ending the discrete channel availability scan 1254. If the occupying signal is not present in the one of the plurality of radio frequency channels during the discrete channel availability scan for a second scan period, the in-service monitoring and beaconing 1250 includes ending the discrete channel availability scan 1255. Thereafter, the in-service monitoring and beaconing 1250 includes repeating steps 1251, 1252, and 1253 as well as either 1254 or 1255 for each of the plurality of radio frequency channels.

Figure 13:
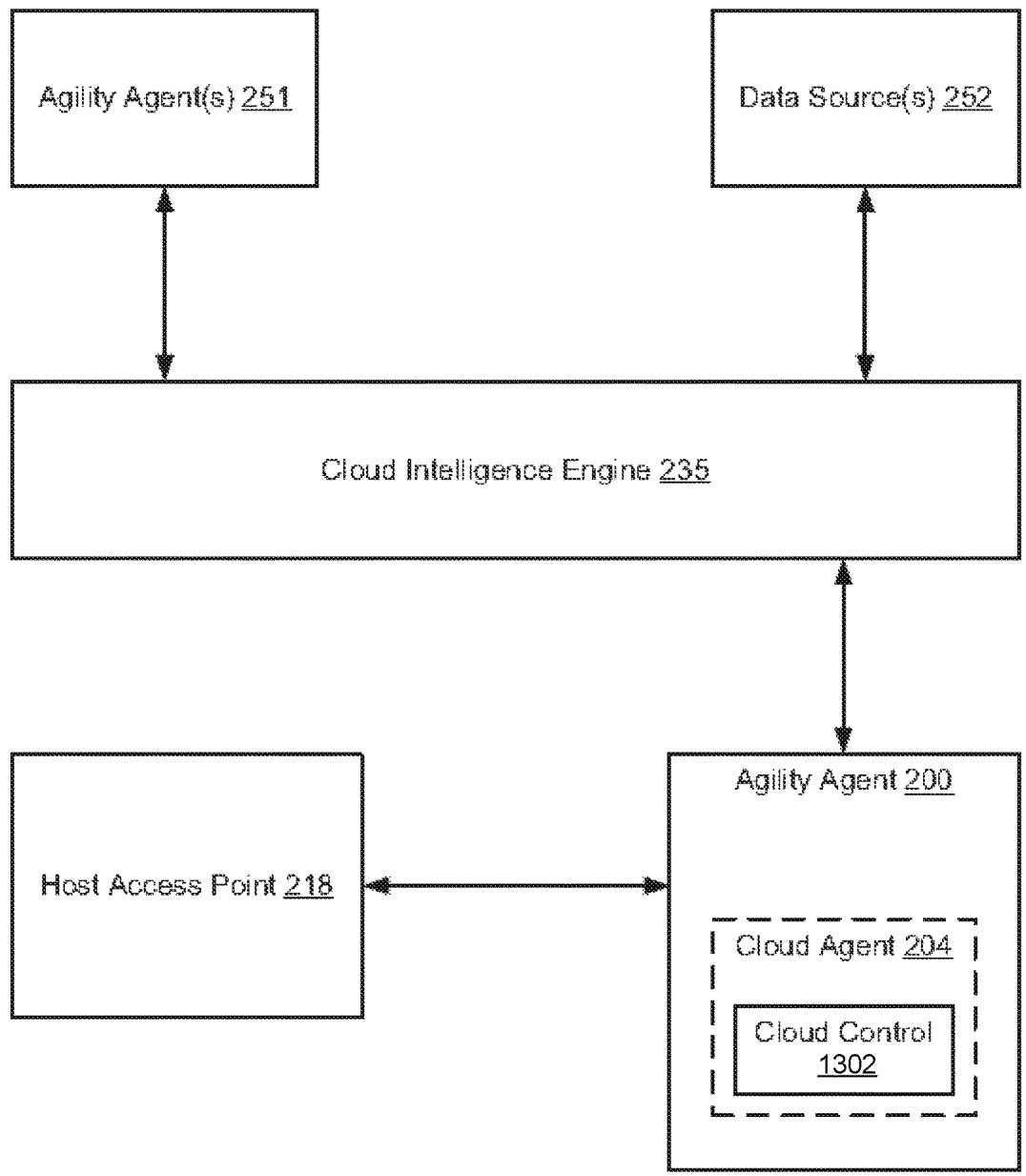
FIG. 13 illustrates a system that includes a cloud intelligence engine, agility agent(s), a host access point and data source(s), in accordance with the present invention.

FIG. 13 illustrates a system that includes the cloud intelligence engine 235, the agility agent 200 and the host access point 218. The agility agent 200 may be directed by the cloud intelligence engine 235 (e.g., a cloud-based data fusion and computation element) to enable adaptive control of dynamic channel selection for the host access point 218 and/or other functions (e.g., dynamic configuration of radio parameters, etc.) associated with the host access point 218. As disclosed herein, in an aspect, the agility agent 200 includes the cloud agent 204. For example, the cloud agent 204 may enable the agility agent 200 to communicate with the host access point 218. The cloud agent 204 may additionally or alternatively communicate with one or more other devices (not shown) such as, for example, a base station (e.g., a small cell base station), a DFS slave device, a peer-to-peer group owner device, a mobile hotspot device, a radio access node device (e.g., an LTE-small cell device), a software access point device and/or another device. In an implementation, the cloud agent 204 includes cloud control 1302. The cloud control 1302 may further enable the agility agent 200 to communicate with the cloud intelligence engine 235. Furthermore, the cloud control 1302 may facilitate dynamic selection of radio channels and/or other radio frequency parameters for the host access point 218. For example, the agility agent 200 may analyze a plurality of 5 GHz radio channels (e.g., a plurality of 5 GHz radio channels associated with the 5 GHz Wi-Fi spectrum 161) for the host access point 218. Additionally or alternatively, the agility agent 200 may analyze a plurality of 5 GHz radio channels (e.g., a plurality of 5 GHz radio channels associated with the 5 GHz Wi-Fi spectrum 161) for the DFS slave device, the peer-to-peer group owner device, the mobile hotspot device, the radio access node device (e.g., the LTE-small cell device), the software access point device and/or another device. In an aspect, the agility agent 200 may actively scan the plurality of 5 GHz radio channels (e.g., the plurality of 5 GHz radio channels associated with the 5 GHz Wi-Fi spectrum 161) during a CAC phase and/or during an ISM phase.

Then, the agility agent 200 may generate spectral information based on the analysis of the plurality of 5 GHz radio channels (e.g., the plurality of 5 GHz radio channels for the host access point 218, the DFS slave device, the peer-to-peer group owner device, the mobile hotspot device, the radio access node device, the software access point device and/or another device). For example, the agility agent 200 may provide information (e.g., spectral information) to the cloud intelligence engine 235 that indicates a set of channels from the plurality of 5 GHz radio channels which are clear of radar and are thus available to use by nearby devices (e.g., the host access point 218). The spectral information may include information such as, for example, a whitelist (e.g., a whitelist of each of the plurality of 5 GHz radio channels that does not contain a radar signal), a blacklist (e.g., a blacklist of each of the plurality of 5 GHz radio channels that contains a radar signal), scan information associated with a scan for a radar signal in the plurality of 5 GHz radio channels, state information, location information associated with the agility agent 200 and/or the host access point 218, time signals, scan lists (e.g., scan lists showing neighboring access points, etc.), congestion information (e.g., number of re-try packets, type of re-try packets, etc.), traffic information, other channel condition information, and/or other spectral information. The cloud control 1302 may transmit the spectral information to the cloud intelligence engine 235. In an aspect, the agility agent 200 may transmit the spectral information to the cloud intelligence engine 235 via a wide area network. Additionally or alternatively, the agility agent 200 may transmit the spectral information to the cloud intelligence engine 235 via a set of DFS slave devices in communication with the agility agent 200 (e.g., via a backhaul of DFS slave devices in communication with the agility agent 200). In another aspect, the agility agent 200 may be in communication with the host access point 218 via a local area network (e.g., a wireless local area network). Additionally or alternatively, the agility agent 200 may be in communication with the host access point 218 via a wide area network (e.g., a wireless wide area network), an ad hoc network (e.g., an IBSS network), a peer-to-peer network (e.g., an IBSS peer-to-peer network), a short range wireless network (e.g., a Bluetooth network), another wireless network and/or another wired network.

The cloud intelligence engine 235 may integrate the spectral information with other spectral information (e.g., other spectral information associated with the agility agent(s) 251) to generate integrated spectral information. For example, the cloud intelligence engine 235 may receive the other spectral information from the agility agent(s) 251. The other spectral information may be generated by the agility agents(s) 251 via an analysis of the plurality of 5 GHz radio channels (e.g., an analysis similarly performed by the agility agent 200). In an aspect, the cloud intelligence engine 235 may include a cloud-based data fusion and computation element for intelligent adaptive network organization, optimization, planning, configuration, management and/or coordination based on the spectral information and the other spectral information. The cloud intelligence engine 235 may geo-tag, filter and/or process the integrated spectral information. In an implementation, the cloud intelligence engine 235 may combine the integrated spectral information with regulation information associated with the data source(s) 252. For example, the regulation information (e.g., non-spectral information) associated with the data source(s) 252 may include information such as, but not limited to, geographical information system (GIS) information, other geographical information, FCC information regarding the location of radar transmitters, FCC blacklist information, National Oceanic and Atmospheric Administration (NOAA) databases, Department of Defense (DOD) information regarding radar transmitters, DOD requests to avoid transmission in DFS channels for a given location, and/or other regulatory information. Based on the integrated spectral information and/or the regulation information associated with the data source(s) 252, the cloud intelligence engine 235 may select a radio channel from the plurality of 5 GHz radio channels for the host access point 218 associated with the agility agent 200. Additionally or alternatively, the cloud intelligence engine 235 may select other radio frequency parameters for the host access point 218 based on the integrated spectral information and/or the regulation information associated with the data source(s) 252.

The cloud control 1302 may receive control information and/or coordination information (e.g., authorized and/or preferred channel selection guidance) from the cloud intelligence engine 235. For example, the cloud control 1302 may receive the radio channel selected by the cloud intelligence engine 235. Additionally or alternatively, the cloud control 1302 may receive the other radio frequency parameters selected by the cloud intelligence engine 235. The agility agent 200 (e.g., the cloud agent 204) may communicate the control information and/or the coordination information (e.g., the control information and/or the coordination information received from the cloud intelligence engine 235) to the host access point 218 (and/or any other access points within a certain distance from the agility agent 200), enabling direct control of the host access point 218 by the cloud intelligence engine 235. For example, the agility agent 200 (e.g., the cloud agent 204) may then configure the host access point 218 to receive data via the radio channel selected by the cloud intelligence engine 235 and/or based on the other radio frequency parameters selected by the cloud intelligence engine 235. In an alternate implementation, the control agent 1302 may be employed in an access point not directly connected to the agility agent 200, or in a peer-to-peer capable mobile device, to enable faster and/or improved access to DFS channels.

The agility agent 200 may generate the spectral information based on an analysis of the plurality of 5 GHz radio channels associated with the 5 GHz Wi-Fi spectrum 161. For example, the agility agent 200 may switch a 5 GHz transceiver (e.g., the primary radio 215) of the agility agent 200 to a channel of the plurality of 5 GHz radio channels associated with the 5 GHz Wi-Fi spectrum 161, generate a beacon in the channel of the plurality of 5 GHz radio channels associated with the 5 GHz Wi-Fi spectrum 161, and scan for a radar signal in the channel of the plurality of 5 GHz radio channels associated with the 5 GHz Wi-Fi spectrum 161. Additionally, the agility agent 200 may switch a 5 GHz transceiver (e.g., the primary radio 215) of the agility agent 200 to another channel of the plurality of 5 GHz radio channels associated with the 5 GHz Wi-Fi spectrum 161, generate a beacon in the other channel of the plurality of 5 GHz radio channels associated with the 5 GHz Wi-Fi spectrum 161, and scan for a radar signal in the other channel of the plurality of 5 GHz radio channels associated with the 5 GHz Wi-Fi spectrum 161. The agility agent 200 may repeat this process for each channel of the plurality of 5 GHz radio channels associated with the 5 GHz Wi-Fi spectrum 161. The cloud intelligence engine 235 may receive the spectral information via a wide area network. Furthermore, the cloud intelligence engine 235 may integrate the spectral information with other spectral information generated by the agility agents(s) 251 (e.g., to generate integrated spectral information). Then, the cloud intelligence engine 235 may determine a radio channel from the plurality of 5 GHz radio channels based at least on the integrated spectral information. In certain implementations, the cloud intelligence engine 235 may receive the regulation information from the data source(s) 252. Therefore, the cloud intelligence engine 235 may determine a radio channel from the plurality of 5 GHz radio channels based on the integrated spectral information and the regulation information associated with the data source(s) 252.

Figure 14A:
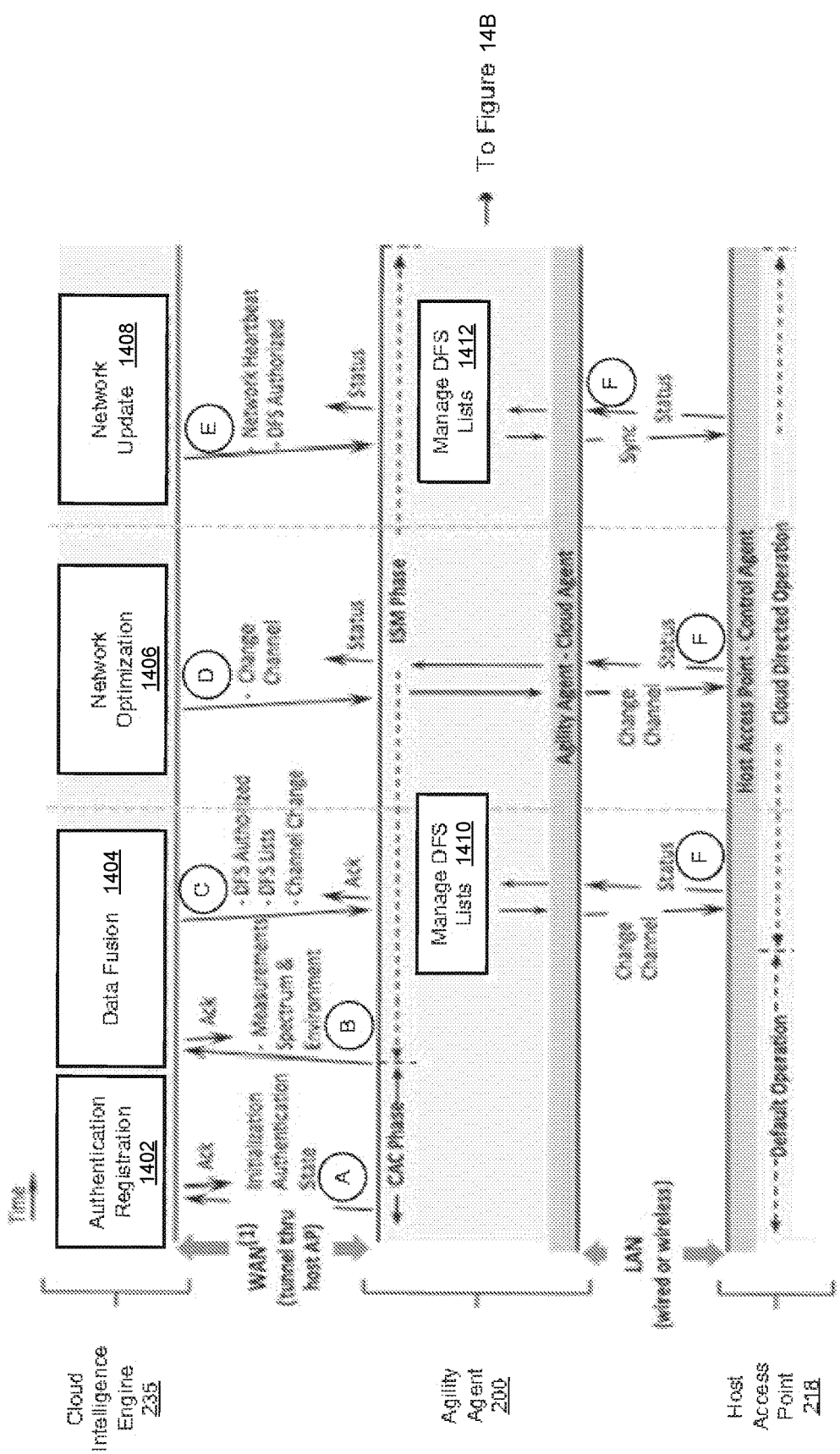
FIGS. 14A and 14B illustrates the logical interface between the wireless agility agent, the cloud intelligence engine, and an access point (or similarly a small cell LTE-U base station).

FIG. 14A illustrates an interface between the cloud intelligence engine 235, the agility agent 200 and the host access point 218, in accordance with the present invention. For example, signaling and/or messages may be exchanged between the cloud intelligence engine 235 and the agility agent 200. The signaling and/or messages between the cloud intelligence engine 235 and the agility agent 200 may be exchanged during a DFS scan operation, during an ISM operation and/or when a radar event occurs that results in changing of a radio channel. In an aspect, the signaling and/or messages between the cloud intelligence engine 235 and the agility agent 200 may be exchanged via a WAN (e.g., WAN 234) and/or a secure communication tunnel.

An authentication registration process 1402 of the cloud intelligence engine 235 may be associated with a message A. The message A may be exchanged between the cloud intelligence engine 235 and the agility agent 200. Furthermore, the message A may be associated with one or more signaling operations and/or one or more messages. The message A may facilitate an initialization and/or authentication of the agility agent 200. For example, the message may include information associated with the agility agent 200 such as, but not limited to, a unit identity, a certification associated with the agility agent 200, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location (e.g., a global positioning system location) associated with the agility agent 200 and/or the host access point 218, a derived location associated with the agility agent 200 and/or the host access point 218 (e.g., derived via a nearby AP or a nearby client), time information, current channel information, status information and/or other information associated with the agility agent 200 and/or the host access point 218. In one example, the message A can be associated with a channel availability check phase.

A data fusion process 1404 of the cloud intelligence engine 235 may facilitate computation of a location associated with the agility agent 200 and/or the host access point 218. Additionally or alternatively, the data fusion process 1404 of the cloud intelligence engine 235 may facilitate computation of a set of DFS channel lists. The data fusion process 1404 may be associated with a message B and/or a message C. The message B and/or the message C may be exchanged between the cloud intelligence engine 235 and the agility agent 200. Furthermore, the message B and/or the message C may be associated with one or more signaling operations and/or one or more messages. The message B may be associated with spectral measurement and/or environmental measurements associated with the agility agent 200. For example, the message B may include information such as, but not limited to, a scanned DFS whitelist, a scanned DFS black list, scan measurements, scan statistics, congestion information, traffic count information, time information, status information and/or other measurement information associated with the agility agent 200. The message C may be associated with an authorized DFS, DFS lists and/or channel change. For example, the message C may include information such as, but not limited to, a directed (e.g., approved) DFS whitelist, a directed (e.g., approved) DFS black list, a current time, a list valid time, a computed location associated with the agility agent 200 and/or the host access point 218, a network heartbeat and/or other information associated with a channel and/or a dynamic frequency selection.

A network optimization process 1406 of the cloud intelligence engine 235 may facilitate optimization of a network topology associated with the agility agent 200. The network optimization process 1406 may be associated with a message D. The message D may be exchanged between the cloud intelligence engine 235 and the agility agent 200. Furthermore, the message D may be associated with one or more signaling operations and/or one or more messages. The message D may be associated with a change in a radio channel. For example, the message D may be associated with a radio channel for the host access point 218 in communication with the agility agent 200. The message D can include information such as, but not limited to, a radio channel (e.g., a command to switch to a particular radio channel), a valid time of a list, a network heartbeat and/or other information for optimizing a network topology.

A network update process 1408 of the cloud intelligence engine 235 may facilitate an update for a network topology associated with the agility agent 200. The network update process 1408 may be associated with a message E. The message E may be exchanged between the cloud intelligence engine 235 and the agility agent 200. Furthermore, the message E may be associated with one or more signaling operations and/or one or more messages. The message E may be associated with a network heartbeat and/or a DFS authorization. For example, the message E may include information such as, but not limited to, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location update (e.g., a global positioning system location update) associated with the agility agent 200 and/or the host access point 218, a derived location update (e.g., derived via a nearby AP or a nearby client) associated with the agility agent 200 and/or the host access point 218, time information, current channel information, status information and/or other information. In one example, the message B, the message C, the message D and/or the message E can be associated with an ISM phase.

A manage DFS lists process 1410 of the agility agent 200 may facilitate storage and/or updates of DFS lists. The manage DFS lists process 1410 may be associated with a message F. The message F may be exchanged between the agility agent 200 and the host access point 218. In one example, the message F may be exchanged via a local area network (e.g., a wired local area network and/or a wireless local area network). Furthermore, the message F may be associated with one or more signaling operations and/or one or more messages. The message F may facilitate a change in a radio channel for the host access point 218. For example, the message F may include information such as, but not limited to, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location update (e.g., a global positioning system location update) associated with the agility agent 200 and/or the host access point 218, a derived location update (e.g., derived via a nearby AP or a nearby client) associated with the agility agent 200 and/or the host access point 218, time information, current channel information, status information and/or other information. In one example, the message F may be associated with a cloud directed operation (e.g., a cloud directed operation where DFS channels are enabled).

Figure 14B:
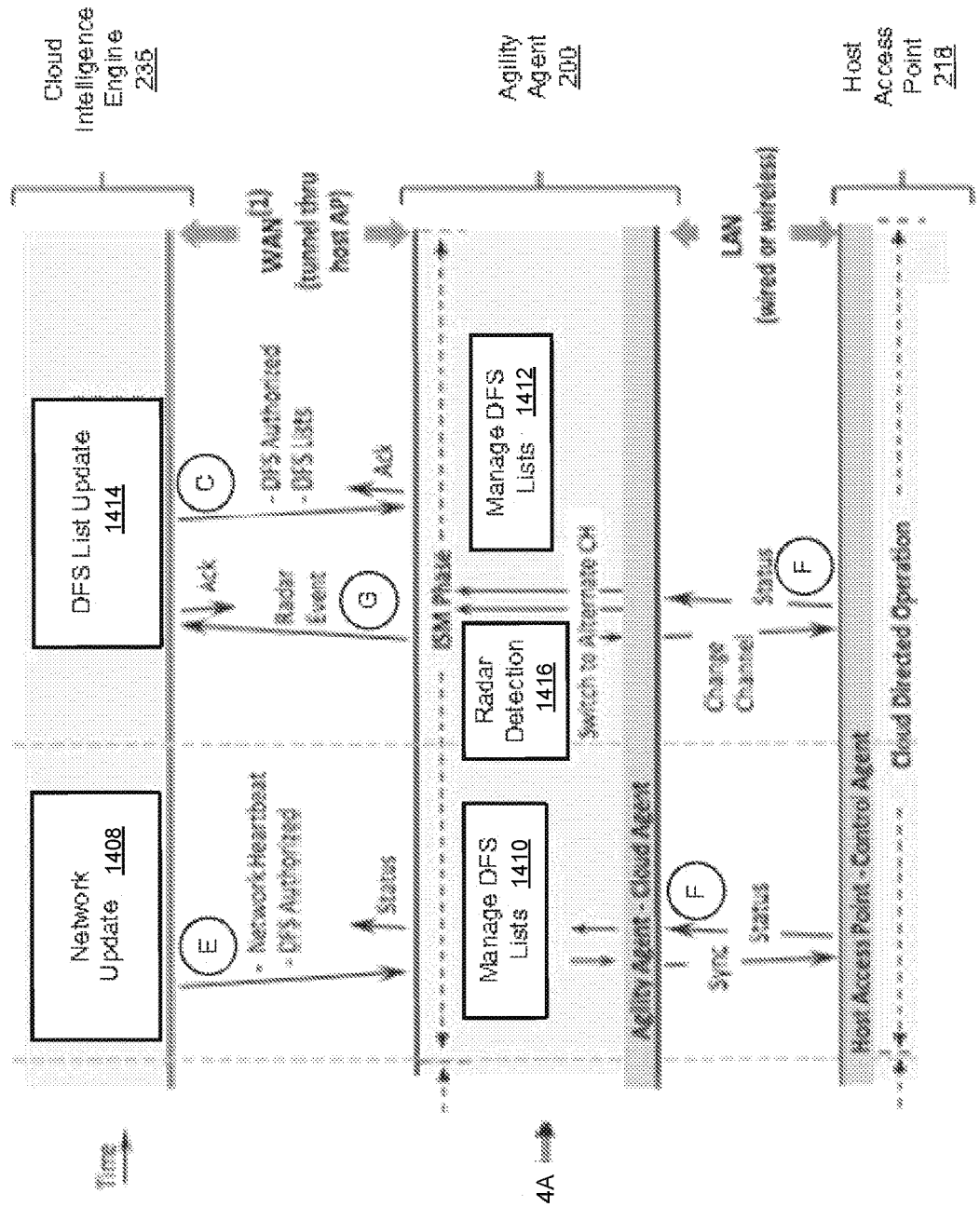

FIG. 14B also illustrates an interface between the cloud intelligence engine 235, the agility agent 200 and the host access point 218, in accordance with the present invention. For example, FIG. 14B may provide further details in connection with FIG. 14A. As shown in FIG. 14B, signaling and/or messages may be exchanged between the cloud intelligence engine 235 and the agility agent 200. The signaling and/or messages between the cloud intelligence engine 235 and the agility agent 200 may be exchanged during a DFS scan operation, during ISM and/or when a radar event occurs that results in changing of a radio channel. In an aspect, the signaling and/or messages between the cloud intelligence engine 235 and the agility agent 200 may be exchanged via a WAN (e.g., WAN 234) and/or a secure communication tunnel.

As also shown in FIG. 14B, the network update process 1408 of the cloud intelligence engine 235 may facilitate an update for a network topology associated with the agility agent 200. The network update process 1408 may be associated with the message E. Then, a DFS list update process 1414 of the cloud intelligence engine 235 may facilitate an update to one or more DFS channel lists. The DFS list update process 1414 may be associated with a message G. The message G may be exchanged between the cloud intelligence engine 235 and the agility agent 200. In one example, the message G may be exchanged via a WAN (e.g., WAN 234) and/or a secure communication tunnel. Furthermore, the message G may be associated with one or more signaling operations and/or one or more messages. The message G may be associated with a radar event. For example, the message G may signal a radar event. Additionally or alternatively, the message G may include information associated with a radar event. For example, the message G may include information such as, but not limited to, a radar measurement channel, a radar measurement pattern, a time associated with a radar event, a status associated with a radar event, other information associated with a radar event, etc. The radar event may associated with one or more channels from a plurality of 5 GHz communication channels (e.g., a plurality of 5 GHz communication channels associated with the 5 GHz Wi-Fi spectrum 161). In one example, the message G can be associated with an ISM phase. The DFS list update process 1414 may also be associated with the message C.

Moreover, as also shown in FIG. 14B, the manage DFS lists process 1410 may be associated with the message F. The message F may be exchanged between the agility agent 200 and the host access point 218. A radar detection process 1416 of the agility agent 200 may detect and/or generate the radar event. Additionally, the radar detection process 1416 may notify the host access point 218 to change a radio channel (e.g., switch to an alternate radio channel). The message F and/or a manage DFS lists process 1412 may be updated accordingly in response to the change in the radio channel. In an aspect, signaling and/or messages may be exchanged between the cloud intelligence engine 235 and the host access point 218 during a DFS scan operation, during an ISM operation and/or when a radar event occurs that results in changing of a radio channel for the host access point 218.

Figure 15:
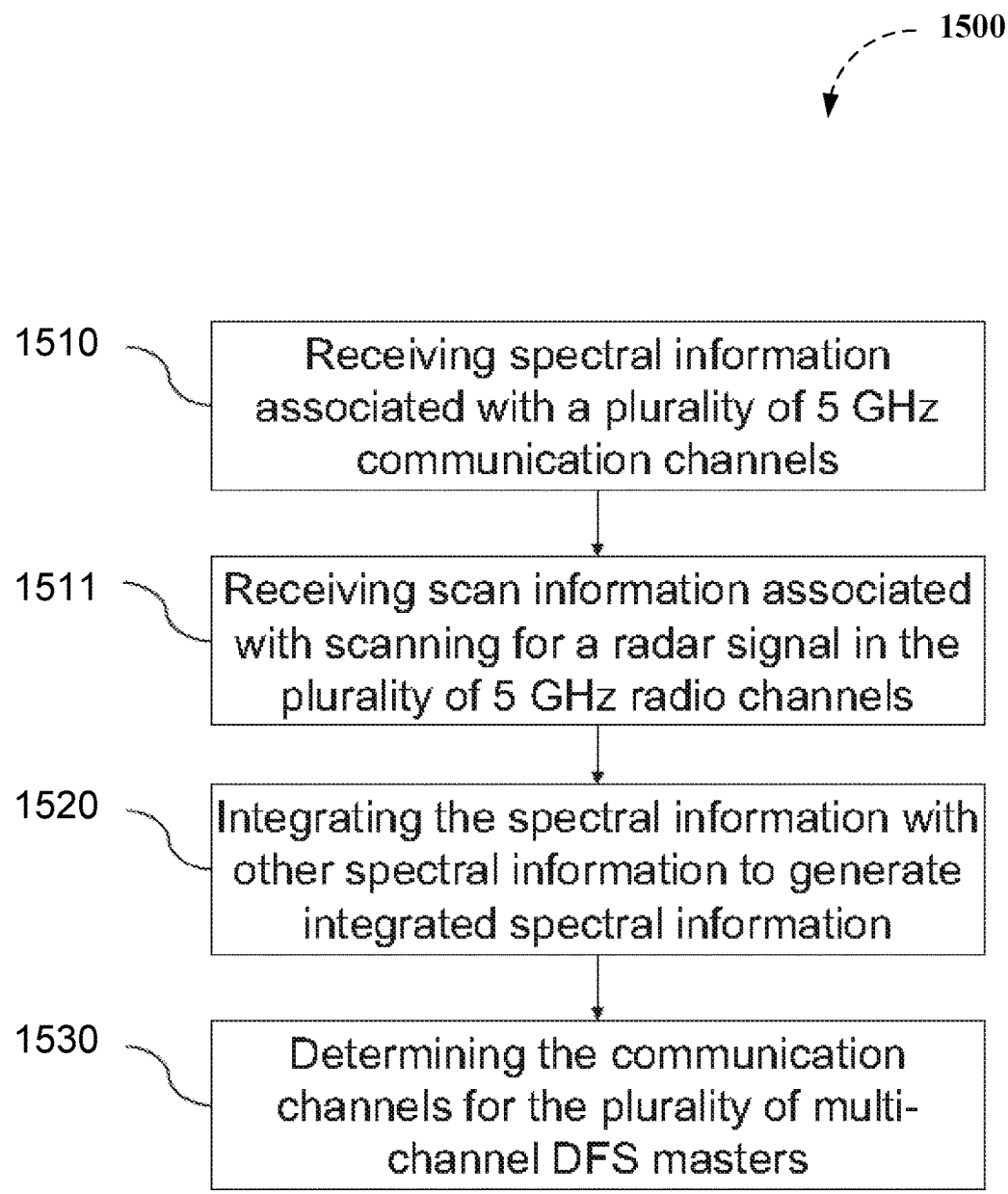
FIG. 15 illustrates a method of determining an operating channel for a plurality of multi-channel DFS masters using a cloud intelligence engine, according to the present invention.

FIG. 15 illustrates an exemplary method 1500 according to the present invention for determining the communication channels that will be used in a plurality of multi-channel DFS masters. First, at 1510 the cloud intelligence engine receives spectral information associated with a plurality of 5 GHz communication channels from a plurality of multi-channel DFS masters via one or more network devices. Optionally, at 1511 receiving the spectral information includes receiving scan information associated with scanning for a radar signal in the plurality of 5 GHz radio channels. The spectral information may be generated using an agility agent device (e.g., agility agent 200 or agility agent 700) based on an analysis of the plurality of 5 GHz communication channels. Analysis of the plurality of 5 GHz communication channels may include switching a 5 GHz radio transceiver of the agility agent device to a channel of the plurality of 5 GHz communication channels, generating a beacon in the channel of the plurality of 5 GHz communication channels, and scanning for a radar signal in the channel of the plurality of 5 GHz communication channels. The spectral information may include information such as, for example, a whitelist (e.g., a whitelist of each of the plurality of 5 GHz communication channels that does not contain a radar signal), a blacklist (e.g., a blacklist of each of the plurality of 5 GHz communication channels that contains a radar signal), scan information associated with a scan for a radar signal in the plurality of 5 GHz communication channels, state information, location information associated with the agility agent device and/or the access point device, time signals, scan lists (e.g., scan lists showing neighboring access points, etc.), congestion information (e.g., number of re-try packets, type of re-try packets, etc.), traffic information and/or other spectral information. Next, at 1520, the cloud intelligence engine integrates the spectral information with other spectral information to generate integrated spectral information. The other spectral information may generated by at least one other agility agent device. In one example, the spectral information may be integrated with the other spectral information via one or more data fusion processes.

Then, at 1530, the cloud intelligence engine determines the communication channels for the plurality of multi-channel DFS masters from the plurality of 5 GHz communication channels based at least on the integrated spectral information. For example, a communication channel may be selected from the plurality of 5 GHz communication channels based at least on the integrated spectral information. In an aspect, regulation information associated with the plurality of 5 GHz communication channels and/or stored in at least one database may be received by the cloud intelligence device. Furthermore, the communication channel may be further determined based on the regulation information. In another aspect, an indication of the communication channel may be provided to the agility agent device and/or the access point device.

Figure 16:
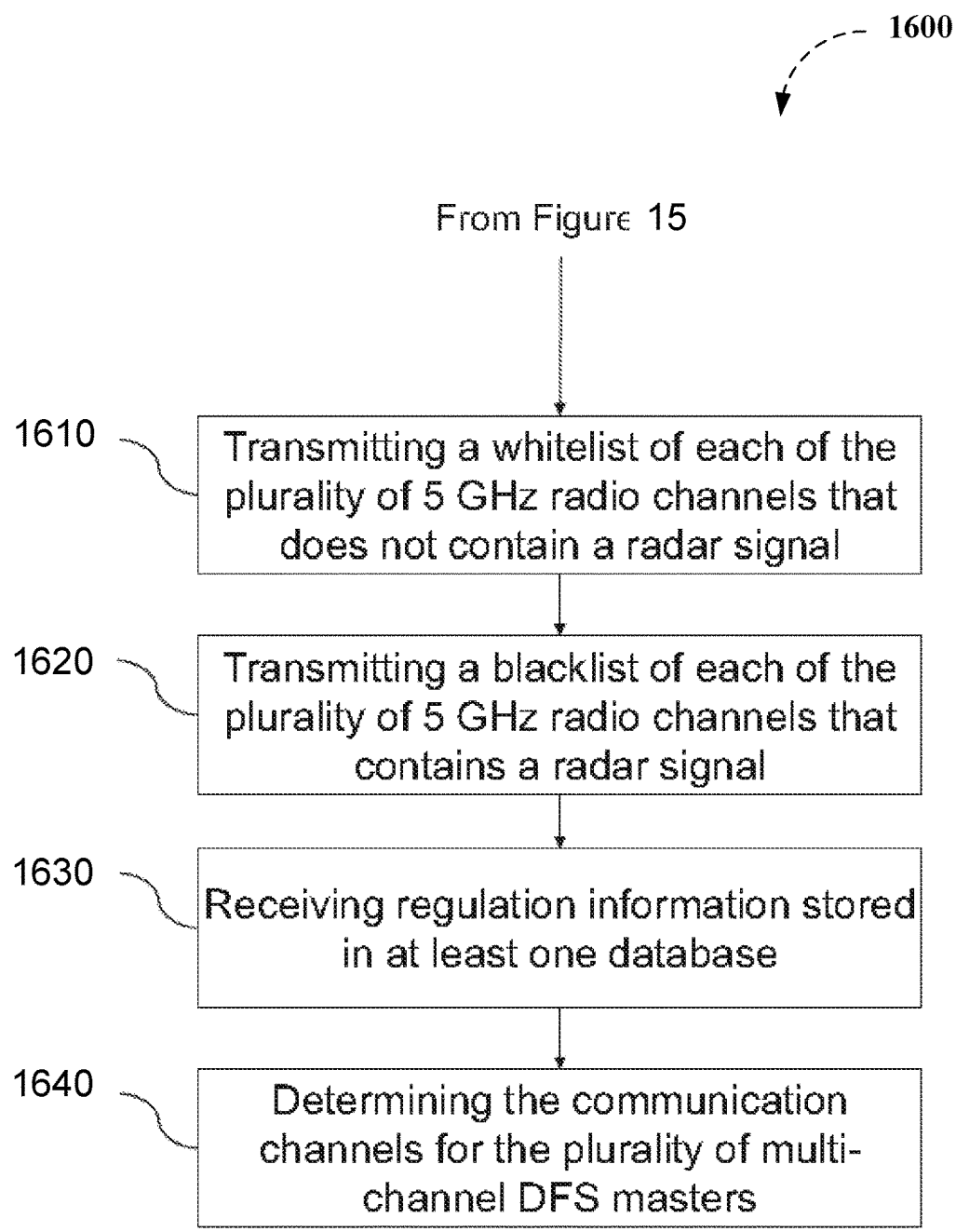
FIG. 16 also illustrates additional methods of determining an operating channel for a plurality of multi-channel DFS masters using a cloud intelligence engine, according to the present invention.

FIG. 16 illustrates an exemplary method 1600 according to the present invention for determining the communication channels that will be used in a plurality of multi-channel DFS masters. The method illustrated in FIG. 16 includes the steps described in relation to FIG. 15 above but also includes the following optional additional steps. At 1610, the method includes transmitting a whitelist of each of the plurality of 5 GHz radio channels that does not contain a radar signal to the plurality of multi-channel DFS masters via the one or more network devices. At 1620 the method includes transmitting a blacklist of each of the plurality of 5 GHz radio channels that contains a radar signal to the plurality of multi-channel DFS masters via the one or more network devices. At 1630 the method includes receiving regulation information stored in at least one database. The regulation information may include, but is not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other regulatory information. At 1640, the method may include determining the communication channels based on the integrated spectral information and the regulation information.

As discussed herein, the disclosed systems are fundamentally different from the current state of art in that: (a) the disclosed wireless agility agents enable multiple simultaneous dynamic frequency channels, which is significantly more bandwidth than provided by conventional standalone DFS master access points or small cell base stations; (b) the additional DFS channels may be shared with nearby (suitably equipped with a control agent) access points or small cells, enabling the network as a whole to benefit from the additional bandwidth; and (c) the selection of operating channels by the access points and/or small cell base stations can be coordinated by a centralized network organization element (the cloud intelligence engine) to avoid overlapping channels thus avoiding interference and relieving congestion.

The capability and functions in (a) to (c) are enabled by the centralized cloud intelligence engine which collects and combines the DFS radar and other spectrum information from each agility agent and geo-tags, stores, filters, and integrates the data over time, and combines it together by data fusion technique with information from a plurality of other agility agents distributed in space, and performs filtering and other post-processing on the collection with proprietary algorithms, and merges with other data from vetted sources (such as GIS, Federal Aviation Administration (FAA), FCC, and DoD databases, etc.).

Specifically, the cloud intelligence engine performs the following: continuously collects the spectrum, location and network congestion/traffic information from all wireless agility agents, the number and density of which grows rapidly as more access points and small cell base stations are deployed; continuously applying sophisticated filtering, spatial and time correlation and integration operations, and novel array-combining techniques, and pattern recognition, etc. across the data sets; applying inventive network analysis and optimization techniques to compute network organization decisions to collectively optimize dynamic channel selection of access points and small cell base stations across networks; and directing the adaptive control of dynamic channel selection and radio configuration of 802.11 a/n/ac access points and/or LTE-U small cell base stations via said wireless agility agents.

Agility agents, due to their attachment to Wi-Fi access points and LTE-U small cell base stations, are by nature deployed over wide geographical areas in varying densities and often with overlapping coverage. Thus the spectrum information collected by agility agents, in particular the signatures of DFS radar and congestion conditions of local networks, similarly represent multi-point overlapping measurements of the radio spectrum over wide areas, or viewed a different way, the information represents spectrum measurements by random irregular arrays of sensors measuring radar and sources of interference and/or congestion from different angles (see FIG. 17).

Figure 17:
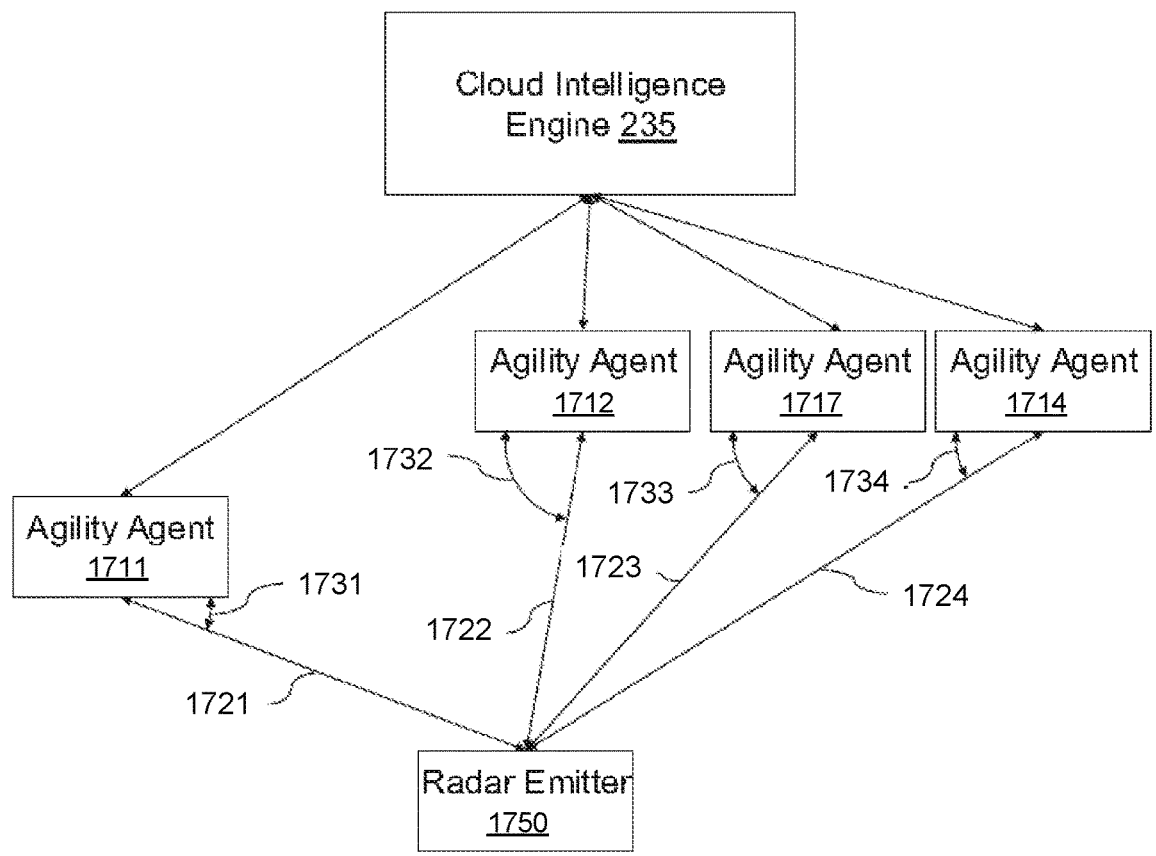
FIG. 17 illustrates how multiple agility agents provide geographically distributed overlapping views of a radar emitter.

FIG. 17 illustrates how multiple agility agents 1711, 1712, 1713, 1714 (for example, each attached to an 802.11 a/n/ac Wi-Fi network) provide geographically distributed overlapping views (sets of sensor data) of a radar emitter 1750. The Figure also shows how by reporting to the centralized cloud intelligence engine 235, the collective multiple view data when pieced together by the cloud intelligence engine 235 takes on the attributes of both spatial diversity (different range and fading/reflective channel conditions 1721, 1722, 1723, 1724) and angular diversity (for example, look angles 1731, 1732, 1733, 1734) all of which can thus be leveraged to generate a pseudo synthetic aperture view of the target radar 1750 or any other emitter source with considerably more effective gain and sensitivity than was represented by any single view from a single access point or small cell base station. Different positions 1721, 1722, 1723, 1724 and look angles 1731, 1732, 1733, 1734 results in different timing offset of received radar pulse train and different distortion of received signal due to different fading and reflective channel conditions. A subset of the agility agents 1711, 1712, 1713, 1714 may form a pseudo-synthetic antenna array that provides improved sensitivity to radar signals due to effective higher gain and robustness in radar detection due to redundancy. The data from the agility agents 1711, 1712, 1713, 1714 are transmitted to the cloud intelligence engine 235 which performs data correlation and integration to determine the location of the target radar 1750.

The cloud intelligence engine having considerable processing capabilities and infinitely scalable memory/storage, is able to store the time-stamped spectrum information from each agility agent over very long periods of time, thus enabling the cloud intelligence engine to also integrate and correlate the signatures of DFS radar and congestion conditions of the local network over time as well as over geographic space. Given a sufficient number of agility agents continuously acquiring spectral information over time, the cloud intelligence engine can construct an increasingly accurate and reliable spatial map of spectrum information in the 5 GHz band, including the presence or absence of radar signals. The spectral information may be location-tagged and/or time-stamped. The device may be, for example, an access point device, a DFS slave device, a peer-to-peer group owner device, a mobile hotspot device, a radio access node device or a dedicated sensor node device. With this information, client devices can directly query the cloud intelligence engine to find out what DFS channels are available and free of radar at the location of the client device. With this system, the client device no longer needs to wait for a beacon that would have otherwise been provided by an access point or agility agent as the client device can communicate with the cloud intelligence engine via a network connection to determine the available channels. In this situation, the cloud intelligence engine becomes a cloud DFS super master as it can provide DFS channel selection information for a plurality of client devices distributed over a wide range of geographies.

Further, the cloud intelligence engine is also able to access and combine data from other sources (data fusion), such as topographic and map information from GIS (Geographical Information System) servers, FCC databases, NOAA databases, etc. enabling the cloud intelligence engine to further compare, correlate, overlay and otherwise polish the baseline spectrum data from agility agents and augment the network self-organization algorithm to further improve the overall accuracy and robustness of the invention.

The cloud intelligence engine having thus formed a detailed picture of the dynamic spectrum conditions of 802.11 a/n/ac and LTE-U networks is able to use this data to compute optimal network configurations, in particular the selection of operating channels (in both DFS and non-DFS bands) and radio parameters, of individual access points and/or small cell base stations to avoid overlap with other nearby access points or base stations, interferers, and noisy or congested channels. The overall system embodied by this can thus be viewed as a large wide-area closed control system, as illustrated in FIG. 18.

In one example, a system of the present invention includes a cloud DFS super master and a plurality of radar detectors communicatively coupled to the cloud DFS super master. The radar detectors are programmed to scan for a radar signal in each of a plurality of 5 GHz radio channels, to transmit the results of the scan for the radar signal to the cloud DFS super master, and to transmit geo-location information for each of the plurality of radar detectors to the cloud DFS super master. The cloud DFS super master is programmed to receive the results of the scan for the radar signal from each of the plurality of radar detectors and the geo-location information for the plurality of radar detectors and determine if a first radar detector of the plurality of radar detectors detected the radar signal in a first channel of the plurality of 5 GHz radio channels. If the cloud DFS super maser determines that the radar signal is present in the first channel, the cloud DFS super master is programmed to determine one or more radar detector (e.g., second radar detectors) of the plurality of radar detectors to evaluate the first radar detector's detection of the radar signal in the first channel based on the geo-location information for the first radar detector and the geo-location for the second radar detector. In one example, the cloud DFS super master is programmed to cause the one or more second radar detectors to switch to the first channel and scan for radar in the first channel. And in another example, the cloud DFS super master is programmed to cause the one or more second radar detectors increase a dwell time in the first channel. In these examples, the cloud DFS super master can coordinate the radar detectors when any one detector sees radar. The cloud DFS super master and network of radar detectors acts like a large synthetic aperture array, and the cloud DFS super master can control the radar detectors to take action. Some of the actions include moving one or more radar detector to the channel in which radar was detected and looking for radar or causing one or more radar detectors to dwell longer in the channel in which radar was detected. The more sensors looking at the radar signal, the better the radar signal can be characterized. Further, through geo-location the cloud DFS supertaster may determine that there are other detectors in a better position to measure or characterize the radar and may use data from one or more detectors (e.g., fusing data from multiple detectors). This could be driven by historical data or by knowing the type/model of detectors. Indeed, as sensors are upgraded their sensitivity may be better than previous generation of products. The cloud DFS supertaster may track what detectors (and their capabilities) are deployed in a given area and optimally select which ones will provide the secondary verifying radar scans.

Figure 18:
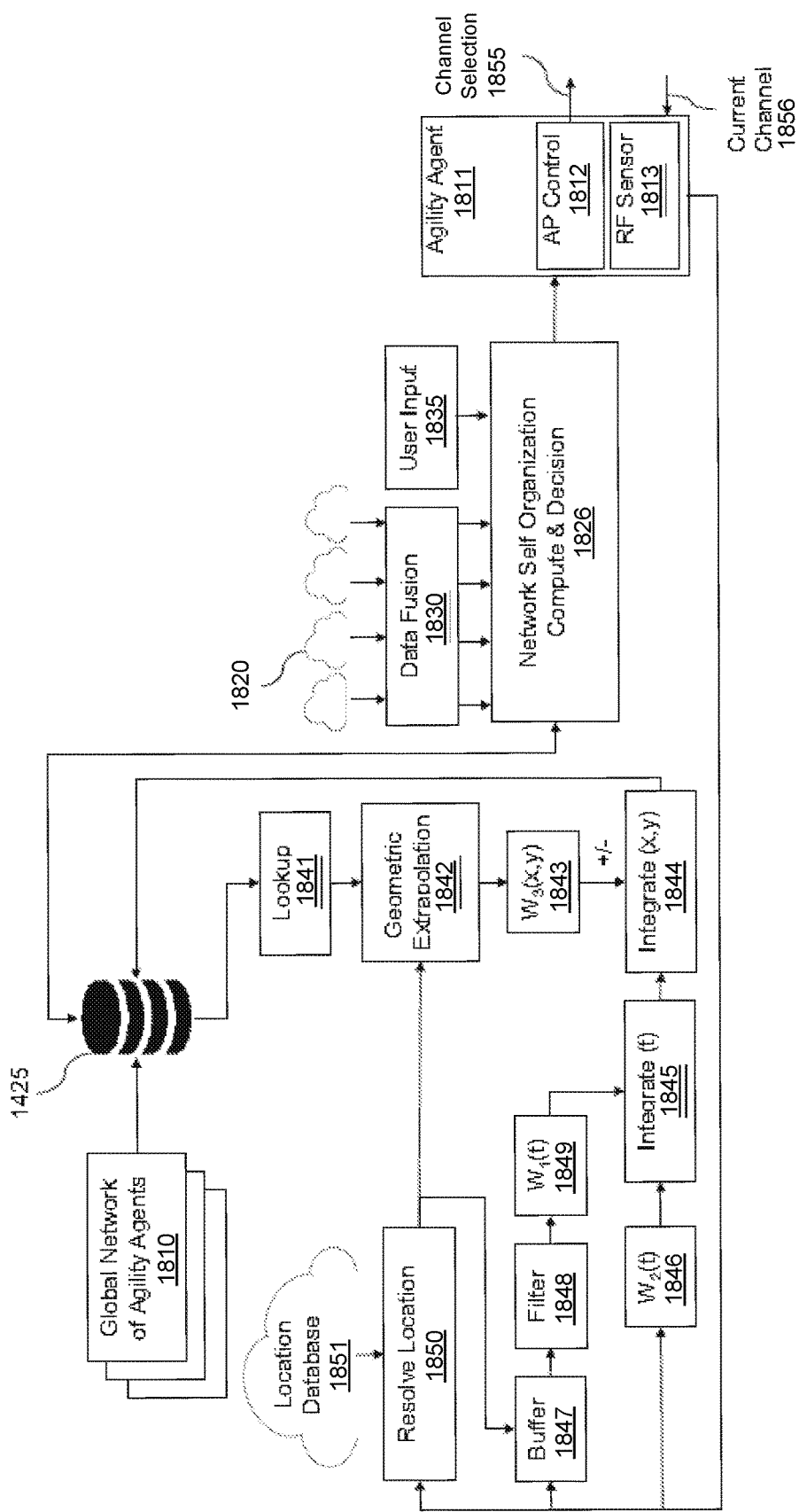
FIG. 18 illustrates in a control loop diagram how the cloud intelligence engine takes the spectrum data from each agility agent, and after storing and filtering the data, combines it with similar data from a plurality of other agility agents and cloud data from other sources.

FIG. 18 illustrates in a control loop diagram how the cloud intelligence engine takes the spectrum data (radar lists and patterns, whitelists, blacklists, RSSI, noise floor, nearest neighbors, congestion & traffic signatures, etc.) from a network of agility agents (e.g., each of the global network of agility agents 1810), and after storing (in storage 1825) and filtering the data, combines them with similar data from an agility agent 1811, cloud data 1820 from other sources (such as the GIS, FCC, FAA, DoD, NOAA, etc.), and user input

1835. Then applying the data to the network self-organization compute process 1826, the control loop performs optimum dynamic channel selection 1855 for each of the 802.11 a/n/ac access points or LTE-U small cell base stations in the network(s) and under control of the system embodied by this invention. In this way, the cloud intelligence engine tells the agility agent 1811 to change to the selected channel 1855 for the access point (using access point control 1812) from the current channel 1856 (the channel previously used by the access point). In contrast, conventional access points and small cell base stations behave as open control loops with limited single-source sensor input and without the benefit of the cloud intelligence engine to close the control loop.

Information (including spectral and location information) from the agility agent 1811 is used with information from a location database 1851 to resolve the location 1850 of the agility agent 1811 and the 802.11 a/n/ac access points or LTE-U small cell base stations in the network(s) and under control of the agility agent 1811. The lookup 1841 accesses stored data from the agility agents 1810. This information can be combined with the information from the resolve location step 1850 for geometric extrapolation 1842 of spectral conditions applicable for agility agent 1811 and the 802.11 a/n/ac access points or LTE-U small cell base stations in the network(s) and under control of the agility agent 1811.

As illustrated in FIG. 18, the control loop includes time integration of data 1845 from the agility agents 1811, spatial integration of data 1844 from the agility agents 1811, and fusion 1830 with data from other sources and user input 1835 to make an operating channel selection 1855 for agility agent 1811. As shown, the control loop also may include buffers 1847, 1849 (temporal), 1843 (spatial), 1846 (temporal) and filters 1848 as needed. The other agility agents 1810 may also have their own control loops similar to that illustrated in FIG. 18.

As previously discussed, the agility agent transmits information to the cloud intelligence engine including information about the detected radar pattern including signal strength, type of radar, and a time stamp for the detection. The type of radar detected includes information such as burst duration, number of bursts, pulses per burst, burst period, scan pattern, pulse repetition rate and interval, pulse width, chirp width, beam width, scan rate, pulse rise and fall times, frequency modulation, frequency hopping rate, hopping sequence length, and pulses per hop. The cloud intelligence engine uses this information to improve its false detection algorithms. For example, if an agility agent detects a particular radar type that it knows cannot be present in a certain location, the cloud intelligence engine can use that information in it probability algorithm for assessing the validity of that signal. The agility agent may transmit information to the cloud intelligence engine via an access point or via a client device as shown in FIG. 2.

Because the cloud intelligence engine has location information for the attached radar sensors, when the cloud intelligence engine receives a radar detection signal from one sensor, the cloud intelligence engine may use the location information for that sensor to verify the signal. The cloud intelligence engine may determine nearby sensors in the vicinity of the first sensor that detected the radar signal and search for the whitelist/blacklist channel history in the other sensors, and if the nearby sensors have current and sufficient information, the cloud intelligence engine may validate or invalidate the original radar detection from the first sensor.

Alternatively, the cloud intelligence engine or the first sensor may instruct nearby sensors (either through the cloud or locally) to focus on the detected channel and report their whitelist and blacklist back to the cloud. If the nearby sensors have current and sufficient information, the cloud intelligence engine may validate or invalidate the original radar detection from the first sensor. Further, based on the location information for the first sensor, the cloud intelligence engine may direct other nearby sensors to modify their scan times or characteristics or signal processing to better detect the signal detected by the first sensor.

As described above FIGS. 14A and 14B illustrates the logical interface between the wireless agility agent, the cloud intelligence engine, and an access point (or similarly a small cell LTE-U base station). In particular FIGS. 14A-14B also illustrate examples of the signaling and messages that can be exchanged between the agility agent and the cloud intelligence engine, and between the cloud intelligence engine and an access point (via the agility agent) during the phases of DFS scan operations, In-Service Monitoring (ISM) and when a radar event occurs forcing a channel change. In addition to traditional infrastructure network topologies (e.g., host Access point and clients and peer-to-peer networks or Wi-Fi-Direct), the present inventions apply to extended infrastructure network topologies (e.g., mesh networks). For example, the host access points discussed herein could be a mesh peer participating in a mesh network and simultaneously providing infrastructure connectivity.

Figure 19A:
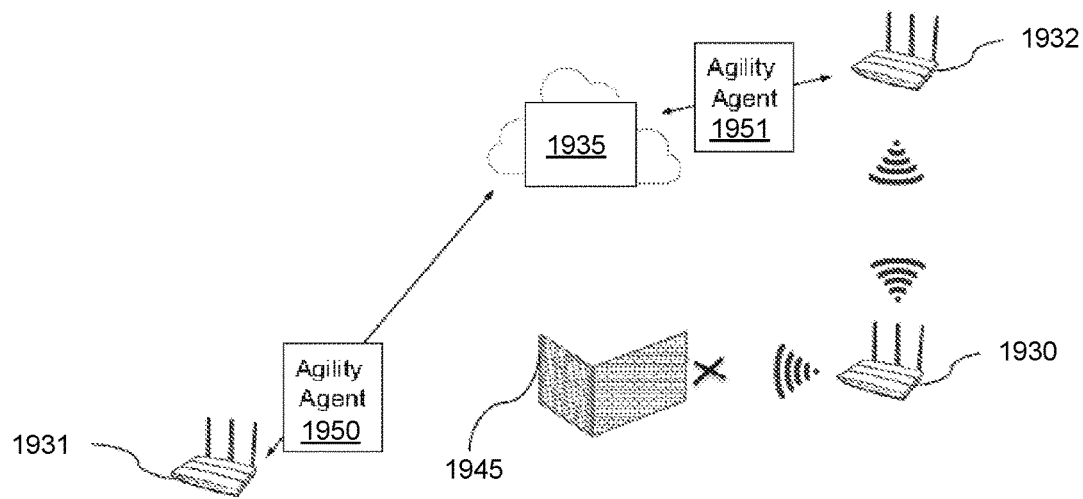
FIG. 19A illustrates the hidden node problem where an access points or small cell base station is hidden from view of other access points or small cell base stations by topography, obstruction, distance or channel conditions.

FIG. 19A illustrates the hidden node problem where an access points or small cell base station 1930 is hidden from view of other access points or small cell base stations 1931 by topography, obstruction, distance or channel conditions 1945. The hidden node problem is a particularly difficult issue with mesh networks or peer-to-peer sessions where these access points are communicating with each other; the hidden node 1930 may not detect the frame and would be unable to synchronize its network allocation vector (NAV). With this impairment the hidden node 1930 transmissions can potentially collide and interfere with communications between the other two nodes 1931, 1932. As shown in FIG. 19A, the agility agent 1950 reports scan lists to the cloud intelligence engine 1935 but cannot detect the hidden node 1930. Accordingly, the agility agent 1950 does not report the hidden node 1930 to the cloud intelligence engine 1935 in the reported scan lists. Agility agents 1951 associated with access points 1932 in neighboring networks also report scan lists to the cloud intelligence engine 1935. Because the hidden node 1930 may be detected by these agility agents 1951, the reported scan lists include the hidden node 1930. The cloud intelligence engine 1935 collects scan lists, from all agility agents 1950, 1951 including geographic information about the agility agents 1950, 1951. The cloud intelligence engine 1935 then determines the presence of the hidden node 1930 and reports the presence of the hidden node 1930 to agility agents 1950, 1951.

Figure 19B:
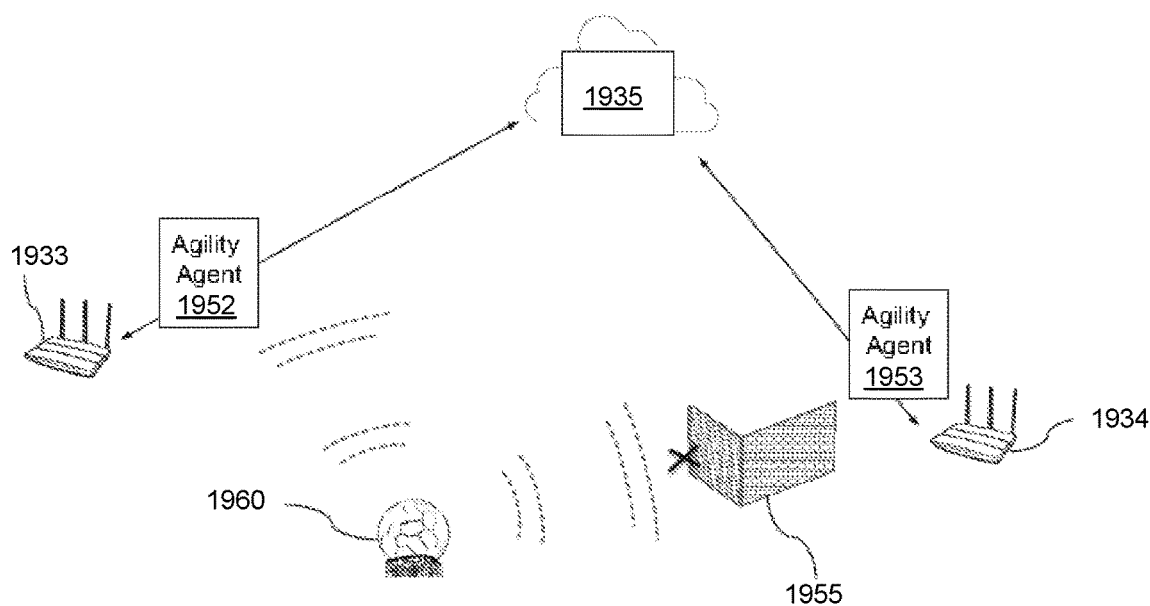
FIG. 19B illustrates the hidden radar problem, where a radar emitter is unseen by an agility agent due to topography or obstruction.

FIG. 19B illustrates the hidden radar problem, where a radar emitter 1960 is unseen by an agility agent 1953 due to topography or obstruction 1955. The hidden radar problem is a very serious concern of the FCC (and other regulators) because agility agent 1953 acting as a DFS master device for access points 1934 but not seeing the hidden radar 1960 may cause unintended interference. Agility agents 1952 near exposed nodes 1933 detect radar from a radar emitter 1960 and report to the cloud intelligence engine 1935 via an uplink back list message for example. The cloud intelligence engine 1935 informs agility agents 1953 near hidden nodes 1934 of the radar via a downlink black list message for example.

Figure 19C:
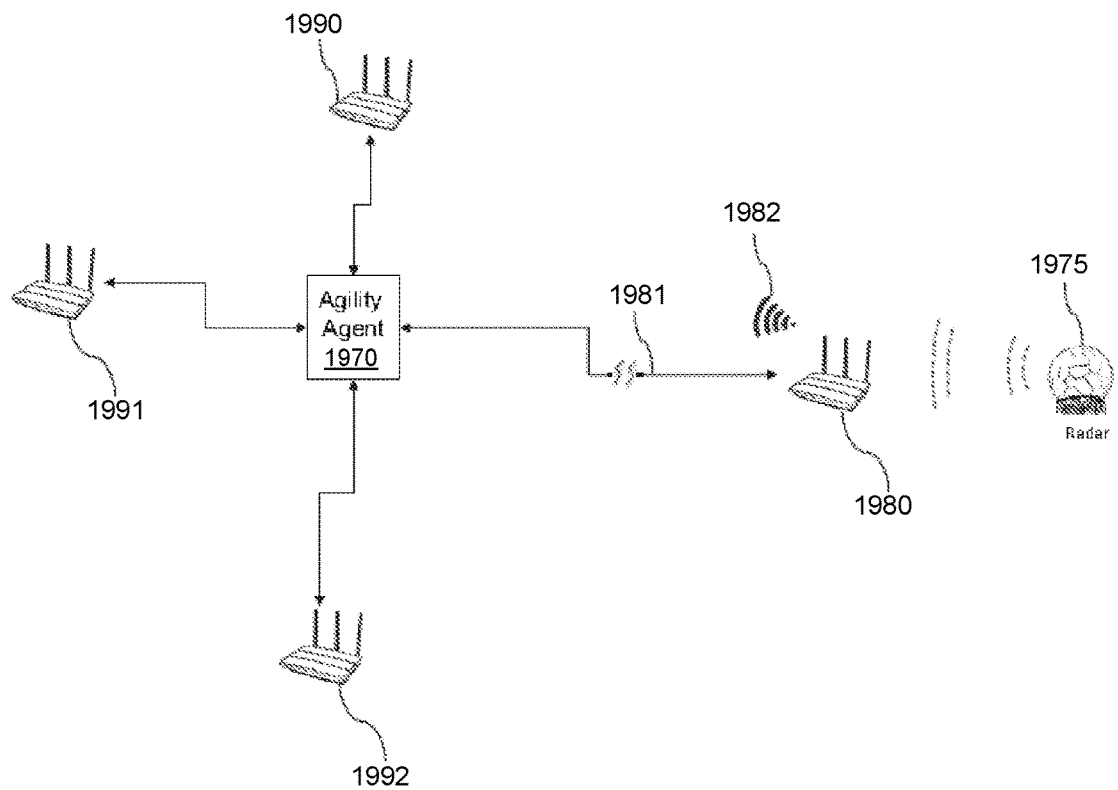
FIG. 19C illustrates the hidden radar problem where a radar emitter is unseen by an agility agent due to distance.

In some embodiments, an agility agent may be linked to multiple host access points. In one such possible configuration, a significant issue arises when the networking connection between the agility agent and an access point over Ethernet is long. FIG. 19C illustrates the hidden radar problem where a radar emitter is unseen by an agility agent due to distance. Networked nodes 1990, 1991, 1992 are far from a radar emitter 1975 and therefore do not detect the presence of radar signals. The nodes 1990, 1991, 1992 communicate this information to the agility agent 1970. The agility agent 1970 causes corresponding whitelists and black lists to be broadcast wirelessly and over wired connections. A hidden node 1980 receives the lists from the agility agent 1970 but is in the presence of radar from the radar emitter 1975. The hidden node 1980 is separated from the agility agent 1970 by a long distance and is connected to the agility agent by a very long Ethernet connection 1981 for example.

Because the hidden node 1980 is distant from the agility agent 1970, its signature 1982 is not on the agility agent's 1970 scan list. Also, because the hidden node 1980 is too distant from the agility agent 1970, the hidden node 1980 cannot receive the wireless whitelist and/or black list from the agility agent 1970 or the time stamps of the wireless lists do not match those received via Ethernet when received by the hidden node 1980. To solve this problem, the whitelists and/or black lists broadcast over wired Ethernet must match with the lists and timing broadcast over wireless in order for the node 1980 to use DFS channels. Also, the agility agent 1970 may broadcast list of authorized access points (e.g., 1990, 1991, 1992), and the control agent in the access point must see its SSID in the authorization list in order to use DFS channels. The agility agent 1970 only authorizes access points (e.g., 1990, 1991, 1992) which it sees by scan list and above a certain RSSI threshold. Access points 1980 who are not seen or have RSSI too low are deemed too far to use the agility agent's 1970 whitelist.

FIG. 19A-C illustrate how a cloud intelligence engine collecting data from a plurality of wireless agility agents proximal to the hidden node or hidden radar is able to discover the said hidden node or hidden radar. Any access point or small cell base station that is now aware that there is a hidden node to another access point on the same channel can now react to the node being hidden, and similarly any (and all) access points or small cells within probable range of a radar signal, even though hidden to some of the nodes, could be directly prevented from using a radar-occupied channel.

In one embodiment of a system using a cloud DFS super master, the cloud DFS super master receives information from a plurality of agility agents and/or access points. Additionally, because the cloud DFS super master provides the DFS channel information for client devices, some agility agents and access points will no longer need to transmit a beacon identifying available channels. In this situation, the system using a cloud DFS super master may include sensors that are radar detectors that perform the radar-sensing function of the agility agent described herein but do not transmit a beacon to identify the available channels.

The cloud DFS super master may provide the DFS super master function for a region for which the cloud DFS super master has sufficient information. For example, if agility agents and/or radar detecting sensors are distributed with a sufficient density in a given locality and the cloud DFS super master has received enough information for enough time for the locality to determine the radar signal signature for the locality with enough certainty to comply with FCC or other applicable requirements, the cloud DFS super master may provide DFS master services for devices located in the locality.

With a cloud DFS super master system, traditional DFS masters and agility agents can be eliminated or operate as sensors that continue to do radar detection, but do not tell client devices what channels to use. In this system, client devices do not have to look for a beacon, but instead can query the cloud DFS super master to determine what channels are available to use.

This cloud DFS super master systems solve several problems inherent to prior-art DFS master systems. For example, the cloud DFS super master system may receive information from external sources (such as topographic and map information from GIS servers, FCC databases, NOAA databases, DoD databases) that the cloud DFS super master uses to geo-fence an area from DFS communications in one or more channels. In one example, the DoD instructs the cloud DFS super master to prevent communications in the DFS spectrum in a given area for a time period. The cloud DFS super master system would instruct client devices not to use the DFS spectrum when the devices are in that area. In another example, the cloud DFS super master is programmed to receive a request to vacate one or more 5 GHz radio channels from a priority user. A priority user can be a radar producer that includes a system of a radar producing entity such as an airport or military body, or the priority user can be a government or emergency entity that needs priority access to the DFS spectrum. In this example, the cloud DFS super master is also programmed to transmit a message to the client devices within the affected areas of the request instructing the client devices to vacate the 5 GHz radio channels in response to the request from the priority user. Using this system, an airplane or airport could request the cloud DFS super master to block out a 5 GHz channel along its route as it is taking off. In another embodiment, the request to vacate one or more 5 GHz radio channels could come from governmental, regulatory, or emergency systems. For example, an ambulance or other emergency vehicle can send real time requests to the cloud DFS super master to block out a 5 GHz channel along its route in order to optimize communications for the emergency vehicle. Current beaconing systems cannot efficiently solve this problem unlike the disclosed cloud DFS super master. The cloud DFS super master can further receive and use location information for the priority user to dynamically change the area in which the DFS super master instructs devices to vacate the channel(s) requested by the priority user. This allows the DFS super master to geo-fence a limited area to maximize the availability of the DFS channels to other devices while still complying with the request to vacate from the priority user.

Additionally, the cloud DFS super master systems addresses current limitations of use of the DFS spectrum. Currently, many DFS master devices are private access points that only provide access to the DFS spectrum to member client devices. Accordingly, most users in the area cannot utilize the available DFS spectrum because they are not members of the group with access to the access point acting as the DFS master. In this situation, even though the DFS spectrum is unlicensed and generally available to the public for use, only a select group with access to the private access point can use the DFS spectrum. The cloud DFS super master addresses this inefficiency by providing DFS channel availability information directly to client devices in any area for which the cloud DFS super master has sufficient spectral information.

Further, the cloud DFS super master systems addresses problems with proliferation of LTE-U devices and interoperability of LTE-U devices and Wi-Fi devices. LTE-U devices use the same bands as Wi-Fi devices. However, Wi-Fi devices cannot detect LTE-U devices, and LTE-U devices cannot detect Wi-Fi devices. Consequentially, signals from LTE-U and proximate Wi-Fi devices collide and interfere with each other. The cloud DFS super master can control the timing and frequencies used by connected devices. And because the cloud DFS super master can see all of the client devices—including LTE-U and Wi-Fi devices—the cloud DFS super master can coordinate traffic to mitigate collisions for, by example, making sure that two devices in the same area are not on the same channel. The cloud DFS super master addresses the issue of proximate LTE-U and Wi-Fi devices without a need for the LTE-U and Wi-Fi devices to talk to each other.

Also, as discussed above, the cloud DFS super master solves the hidden node issue. And the cloud DFS super master can coordinate traffic among client devices.

In one embodiment of the cloud DFS super master system, the cloud DFS super master is connected to an access point that receives channel selection information from the cloud DFS super master (such as a whitelist or blacklist) and transmits beacons according to the received channel selection information. In this case the cloud DFS super master still controls the channel selection for the access point.

Figure 20:
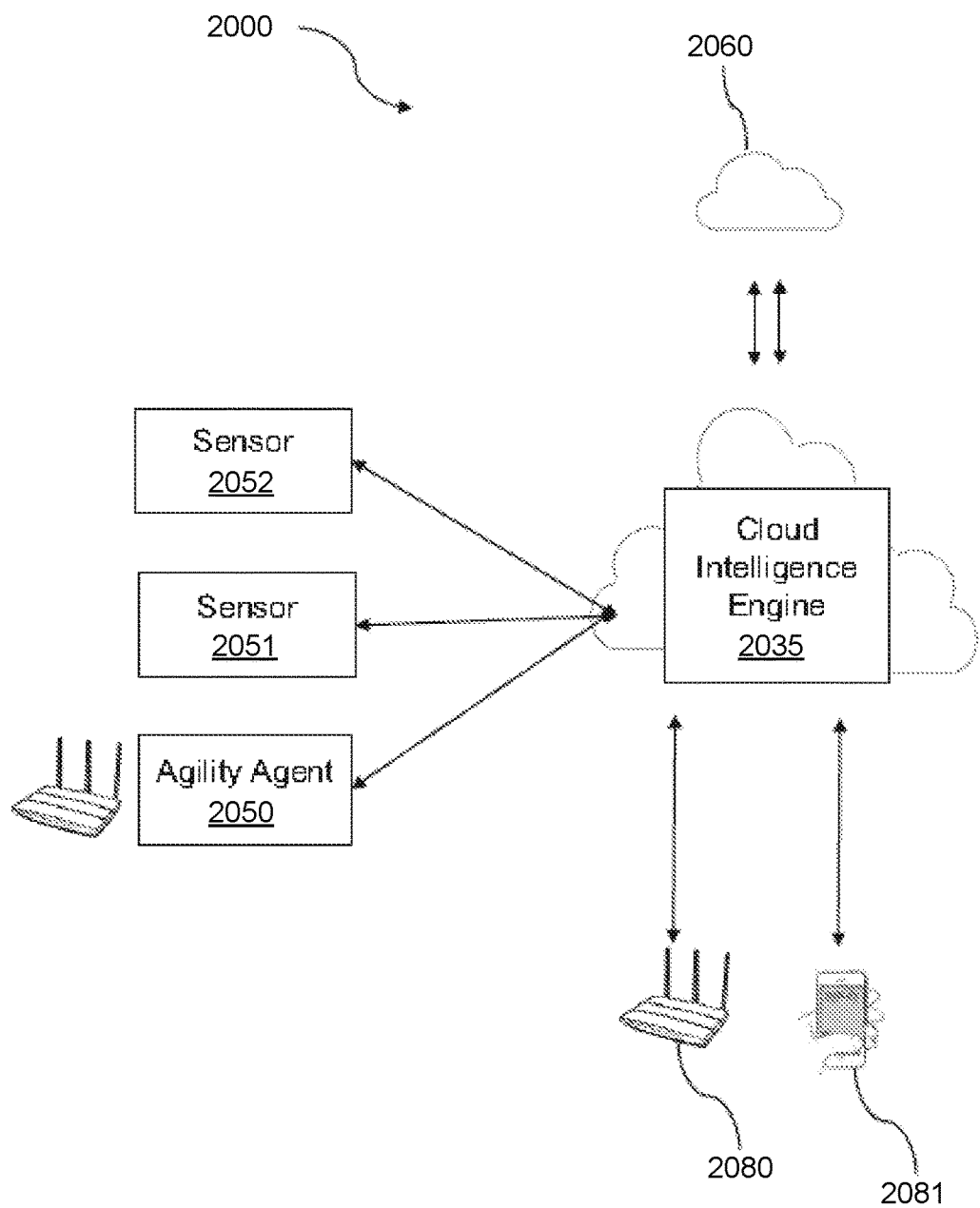
FIG. 20 illustrates an exemplary embodiment of the cloud DFS super master system in which the cloud DFS super master is communicatively coupled to a plurality of sensors that detect radar signals in the DFS band and detect wireless traffic information and is communicatively coupled to one or more client devices.

FIG. 20 illustrates an exemplary embodiment of the cloud DFS super master system 2000 in which the cloud intelligence engine 2035 operates as a cloud DFS super master. In the system 2000, the cloud DFS super master 2035 is communicatively coupled to a plurality of sensors 2050, 2051, 2052 that detect radar signals in the DFS band and detect wireless traffic information. The plurality of sensors 2050, 2051, 2052 may be in agility agents or may be standalone sensors. In one example, the standalone sensor includes a power supply and is self-contained in an enclosure and comprises a self-contained plug-in device. The sensors' communication with the cloud DFS super master 2035 may be continuous or intermittent. The sensors transmit information about detected radar signals, traffic information, and geo-location information for the sensor to the cloud DFS super master 2035. The cloud DFS super master 2035 may also be connected to external data sources 2060 such as topographic and map information from GIS servers, FCC databases, NOAA databases, DoD databases. The cloud DFS super master 2035 uses the information from the sensors 2050, 2051, 2052 and the external databases 2060 to determine available DFS channels for the areas for which the cloud DFS super master has sufficient information. Then as shown in FIG. 20, client devices 2080, 2081 then connect to the cloud DFS super master 2035 to request authorized DFS channels according to the location of the client devices 2080, 2081. The client devices 2080, 2081 transmit geo-location information to the cloud DFS super master 2035 so that the cloud DFS super master 2035 can determine the appropriate channels based on that location information.

In one embodiment, the cloud DFS super master system is a system for detecting radar signals and avoiding interference with the radar signals that includes a cloud DFS super master, a plurality of radar detectors, and at least one client device. The plurality of radar detectors (or radar sensors) are communicatively coupled to the cloud DFS super master and programmed to scan for a radar signal in each of a plurality of 5 GHz radio channels, to transmit the results of the scan for the radar signal to the cloud DFS super master, and to transmit geo-location information for each of the plurality of radar detectors to the cloud DFS super master. The client device (or client devices) is communicatively coupled to the cloud DFS super master and programmed to transmit geo-location information for the client device and a request for available 5 GHz radio channels to the cloud DFS super master. The cloud DFS super master is programmed to receive the results of the scan for the radar signal from each of the plurality of radar detectors, the geo-location information for the plurality of radar detectors, the geo-location information for the client device and the request for available 5 GHz radio channels and is programmed to determine one or more 5 GHz radio channels that are free of radar signals within a distance of the client device from the results of the scan for the radar signal from each of the plurality of radar detectors, the geo-location information for the plurality of radar detectors, and the geo-location information for the client device and to transmit the one or more 5 GHz radio channels that are free of radar signals within a distance of the client device to the client device.

In another embodiment, the cloud DFS super master is programmed to receive information from an external data source and is programmed to determine which of the one or more 5 GHz radio channels that are free of radar signals within a distance of the client device from the information from the external data source and the results of the scan for the radar signal from each of the plurality of radar detectors, the geo-location information for the plurality of radar detectors, and the geo-location information for the client device. The external data source can be a GIS, an FAA radar database, a DoD radar database, an FCC database, or a NOAA database for example.

Along with radar detection information, the plurality of radar detectors may be programmed to transmit wireless spectrum information (such as traffic, congestion, channels used by proximate access points) to the cloud DFS super master and the cloud DFS super master is programmed to coordinate transmissions of the client device. This way, the cloud DFS super master can coordinate traffic for several devices including access points to reduce congestion and collisions from using the same channel at the same time. The cloud DFS super master may apply time division and/or frequency division coordination to improve the client devices' performance.

Figure 21:
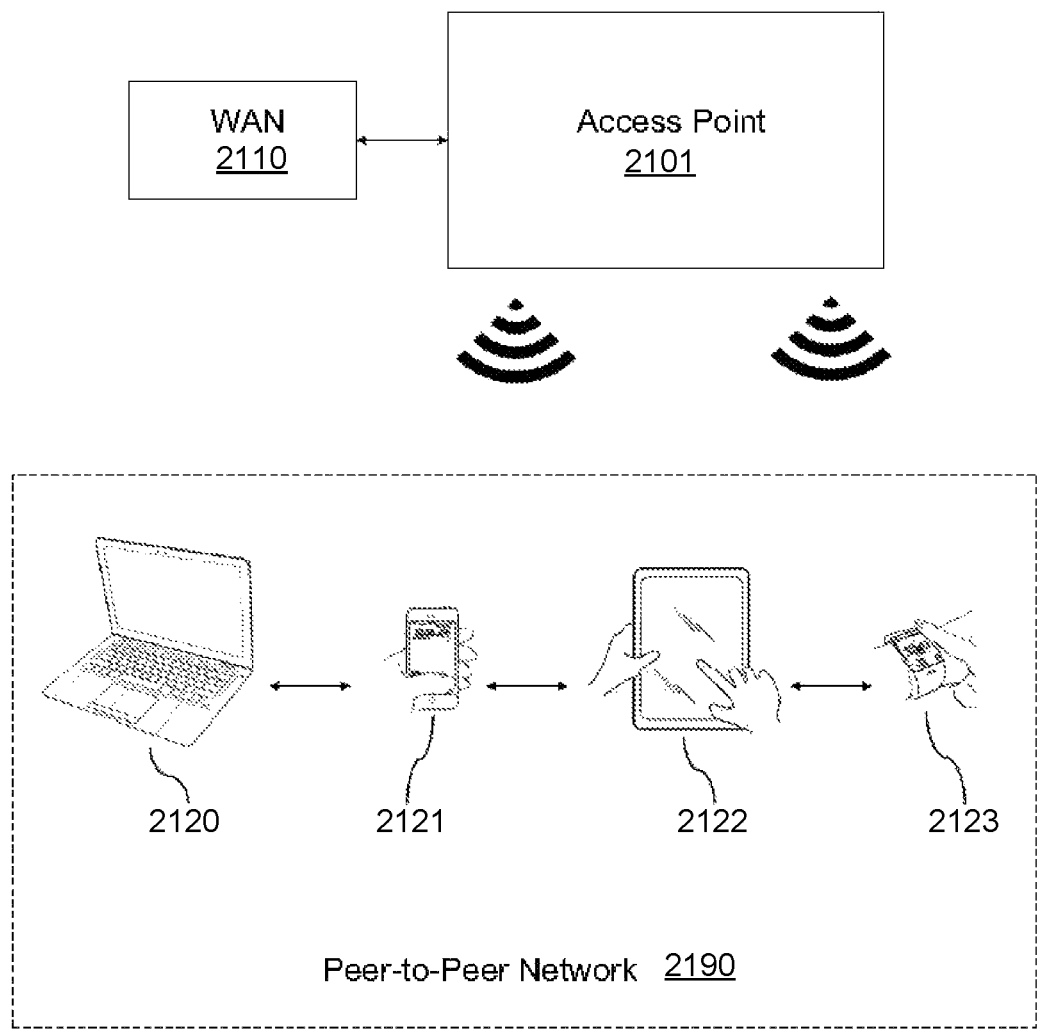
FIG. 21 illustrates a standard non-DFS enabled peer-to-peer network.

FIG. 21 provides an illustration of a standard peer-to-peer network 2190. As shown in FIG. 21, an access point 2101 such as a wireless access point is connected to a wide area network (WAN) 2110. The access point 2101 provides wireless access to the wide area network 2110 to the client devices 2120, 2121, 2122, 2123. The client devices 2120, 2121, 2122, 2123 also form a peer-to-peer network 2100 through which the client devices 2120, 2121, 2122, 2123 can communicate with each other without utilizing the access point 2101. Note that in this configuration, the client devices 2120, 2121, 2122, 2123 cannot use DFS channels to communicate with each other because they do not have sufficient information about available DFS channels to allow DFS communication that complies with regulatory standards.

Figure 22:
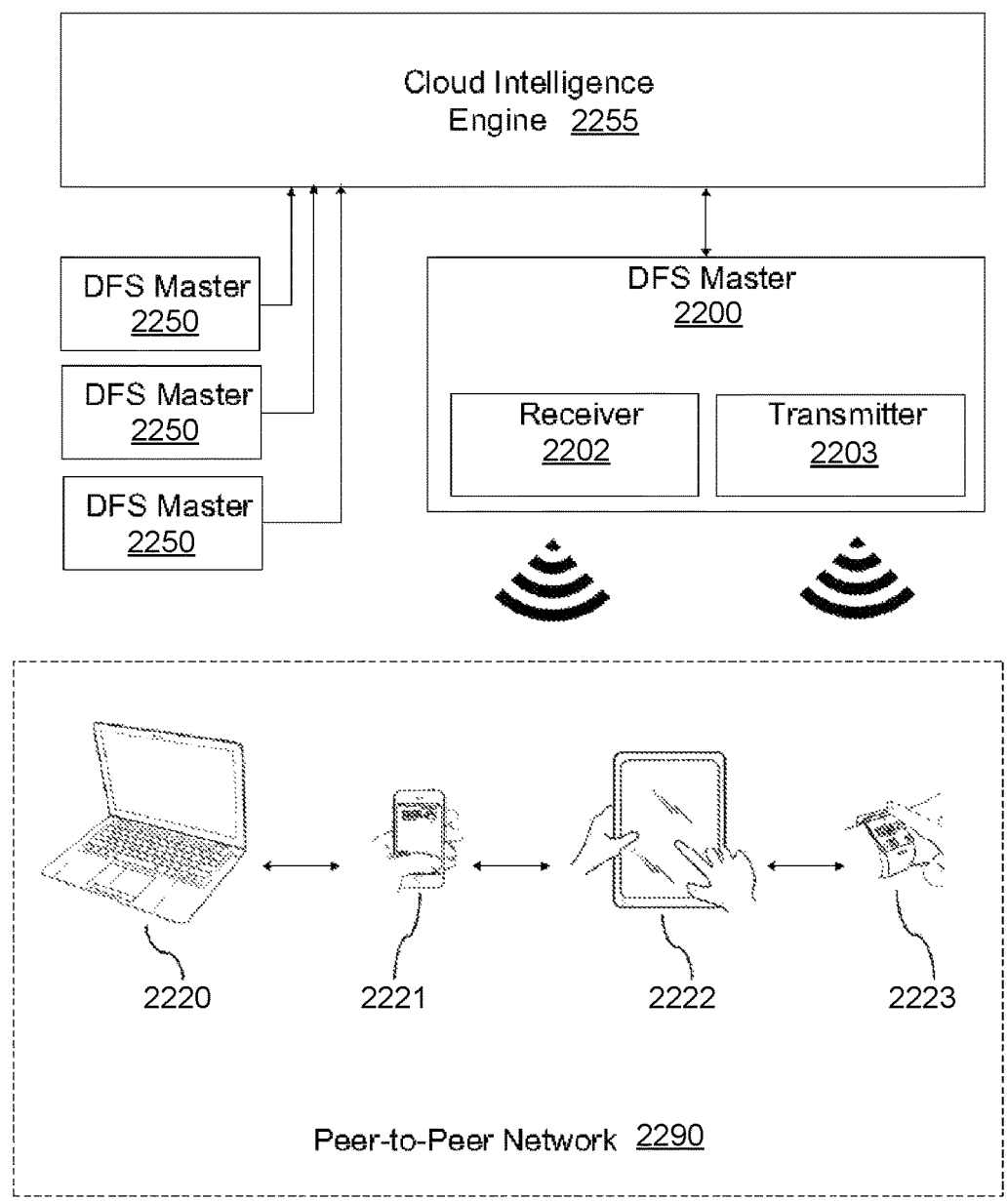
FIG. 22 illustrates an exemplary DFS enabled peer-to-peer network and system of the present invention.

FIG. 22 illustrates an embodiment of the present invention in which a DFS master 2200 is coupled to a cloud intelligence engine 2255 and provides available DFS channels to client devices 2220, 2221, 2222, 2223. As show in this illustration, the DFS master 2200 includes a receiver 2202 and a transmitter 2203. The DFS master 2200 provides spectral information to the cloud intelligence engine 2255. Further, the cloud intelligence engine 2255 is coupled to other DFS masters 2250 that provide additional spectral information to the cloud intelligence engine 2255. The DFS master 2200 may broadcast a beacon to client devices 2220, 2221, 2222, 2223 to notify the client devices 2220, 2221, 2222, 2223 of the available DFS channels. Also, the DFS master 2200 can connect to one or more of the client devices 2220, 2221, 2222, 2223 via an installed application on the client devices 2220, 2221, 2222, 2223, for example, to communicate the available DFS channels. Alternatively, the cloud intelligence engine 2255 can connect to one or more of the client devices 2220, 2221, 2222, 2223 via an installed application on the client devices 2220, 2221, 2222, 2223, for example, to communicate the available DFS channels. Using the available DFS channels, the client devices 2220, 2221, 2222, 2223 can communicate directly with each other in a peer-to-peer network 2290.

Figure 23:
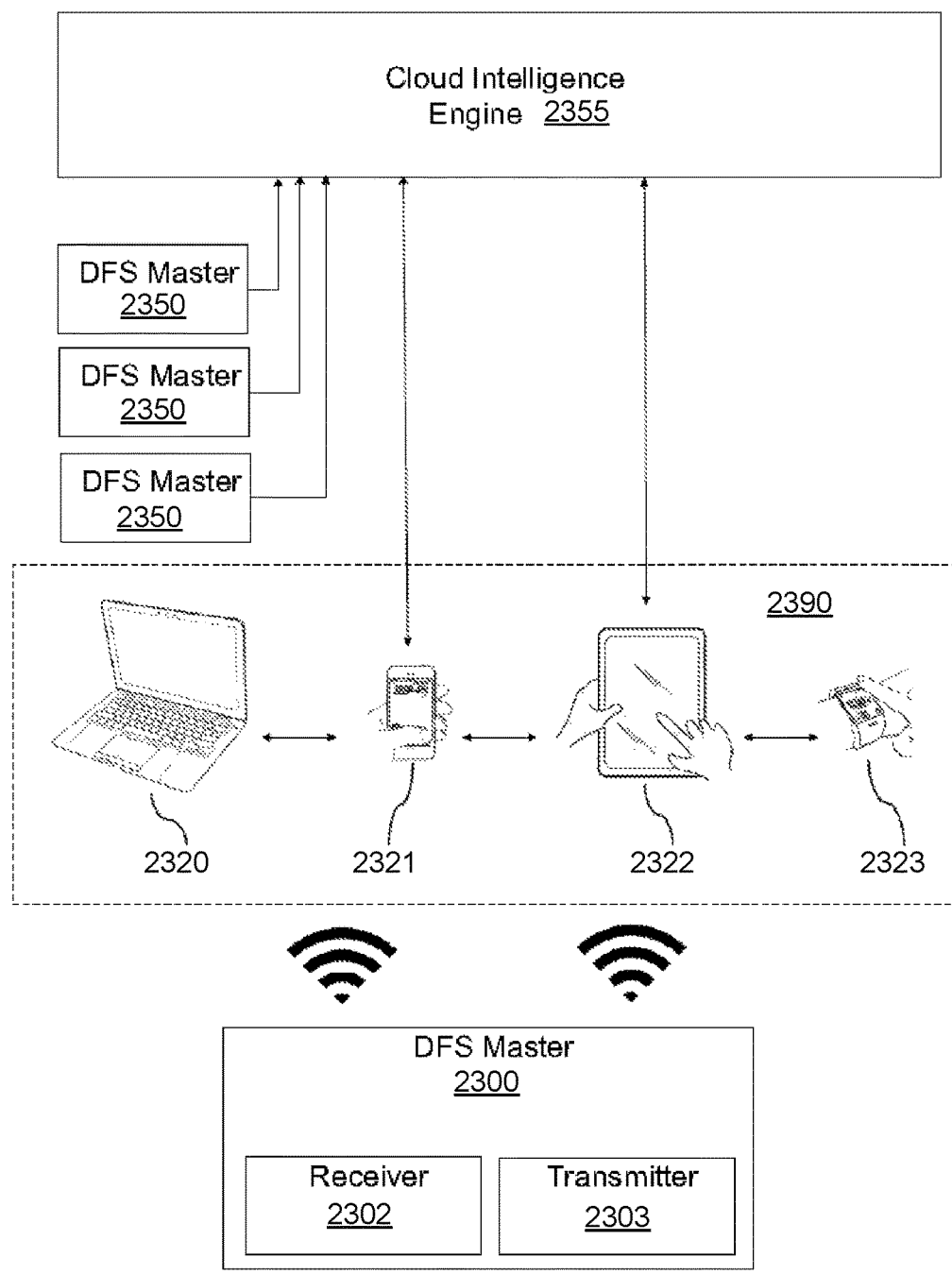
FIG. 23 illustrates an exemplary DFS enabled peer-to-peer network and system of the present invention.

FIG. 23 illustrates another embodiment of the present invention in which the DFS master 2300 is not directly connected to the cloud intelligence engine 2355. As show in this illustration, the DFS master 2300 includes a receiver 2302 and a transmitter 2303. The DFS master 2300 provides spectral information to the cloud intelligence engine 2355. Further, the cloud intelligence engine 2355 is coupled to other DFS masters 2350 that provide additional spectral information to the cloud intelligence engine 2355. The DFS master 2300 connects to and communicates with the cloud intelligence engine 2355 via a network connection in the client devices 2321, 2322. In this illustration, the DFS master 2300 connects to and communicates with the cloud intelligence engine 2355 via a network connection in two client devices 2321, 2322, but the DFS master 2300 may connect to and communicate with the cloud intelligence engine 2355 via a network connection in one or more client devices. Via this connection, the DFS master 2300 transmits spectral information to the cloud intelligence engine 2355 and receives DFS channel availability information from the cloud intelligence engine 2355. The DFS master 2300 may broadcast a beacon to client devices 2320, 2321, 2322, 2323 to notify the client devices 2320, 2321, 2322, 2323 of the available DFS channels. Also, the DFS master 2300 can connect to one or more of the client devices 2320, 2321, 2322, 2323 via an installed application on the client devices 2320, 2321, 2322, 2323, for example, to communicate the available DFS channels. Alternatively, the cloud intelligence engine 2355 can connect to one or more of the client devices 2321, 2322 via an installed application on the client devices 2321, 2322, for example, to communicate the available DFS channels. Using the available DFS channels, the client devices 2320, 2321, 2322, 2323 can communicate directly with each other in a peer-to-peer network 2390.

Figure 24:
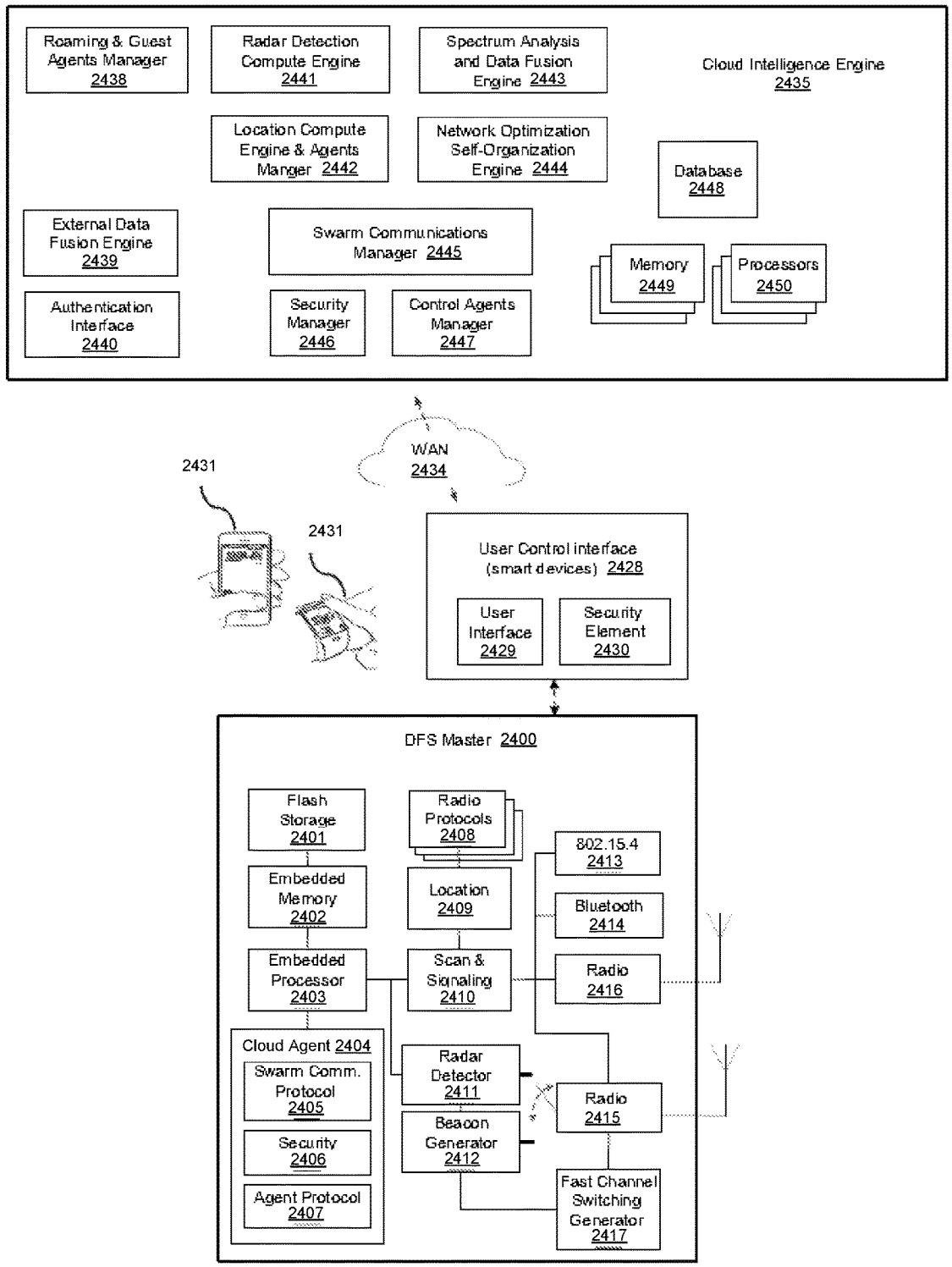
FIG. 24 illustrates an exemplary DFS enabled peer-to-peer network and system of the present invention.

FIG. 24 provides a more-detailed illustration of an exemplary system of the present invention. As illustrated in FIG. 24, the cloud intelligence engine 2435 may be connected to a plurality of DFS masters 2400 and client or user devices 2431, 2432 that form a peer-to-peer network. The peer-to-peer devices 2431, 2432 may have a user control interface 2428. The user control interface 2428 includes a user interface 2429 to allow the client devices 2431, 2432 to interact with the DFS master 2400 via the cloud intelligence engine 2435. For example, the user interface 2429 may allow the user to modify DFS master 2400 settings. The user control interface 2428 also includes a security element 2430 to ensure that communications between the client devices 2431, 2432 and the DFS master 2400 are secure. The client devices 2431, 2432 are connected to a wide area network 2434 via a cellular network for example.

The cloud intelligence engine 2435 includes a database 2448 and memory 2449 for storing information from the DFS master 2400, one or more other DFS masters connected to the cloud intelligence engine 2435 and/or one or more external data source (e.g., data source(s) 2452). The database 2448 and memory 2449 allow the cloud intelligence engine 2435 to store information associated with the DFS master 2400, the other DFS master(s) and/or the data source (s) 2452 over a certain period of time (e.g., days, weeks, months, years, etc.). The data source(s) 2452 may be associated with a set of databases. Furthermore, the data source (s) 2452 may include regulatory information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other regulatory information.

The cloud intelligence engine 2435 also includes processors 2450 to perform the cloud intelligence operations described herein. In an aspect, the processors 2450 may be communicatively coupled to the memory 2449. Coupling can include various communications including, but not limited to, direct communications, indirect communications, wired communications, and/or wireless communications. In certain implementations, the processors 2450 may be operable to execute or facilitate execution of one or more of computer-executable components stored in the memory 2449. For example, the processors 2450 may be directly involved in the execution of the computer-executable component(s), according to an aspect. Additionally or alternatively, the processors 2450 may be indirectly involved in the execution of the computer executable component(s). For example, the processors 2450 may direct one or more components to perform the operations.

The cloud intelligence engine 2435 also knows the location of each DFS master and the access points proximate to the DFS masters that do not have a controlling agent as well as the channel on which each of those devices is operating. With this information, the spectrum analysis and data fusion engine 2443 and the network optimization self-organization engine 2444 can optimize the local spectrum by telling DFS masters to avoid channels subject to interference. The swarm communications manager 2445 manages communications between DFS masters, access points, client devices, and other devices in the network. The cloud intelligence engine includes a security manager 2446. The control agents manager 2447 manages all connected control agents.

The cloud intelligence engine 2435 may combine the spectral information with other spectral information (e.g., other spectral information associated with DFS master(s)) to generate combined spectral information. Then, the cloud intelligence engine 2435 may determine one or more particular communication channels (e.g., a particular communication channel associated with the 24 GHz Wi-Fi spectrum 291) and may communicate the particular communication channels to the DFS master 2400 (e.g., via a secure communications tunnel through the client devices 2431, 2432). The DFS master 2400 and/or the cloud intelligence engine 2435 use the information from the cloud intelligence engine 2435 to determine the DFS channels to make available to client devices 2431, 2432.

Independent of any host access point, the DFS master 2400, in the role of an autonomous DFS master device, may provide the channel indication and channel selection control to one or more peer-to-peer client devices 2431, 2432 within the coverage area by (a) signaling availability of one or more DFS channels by simultaneous transmission of one or more beacon signals; (b) transmitting a listing of both the authorized available DFS channels, herein referred to as a whitelist and the prohibited DFS channels in which a potential radar signal has been detected, herein referred to as a blacklist along with control signals and a time-stamp signal, herein referred to as a dead-man switch timer via an associated non-DFS channel; and (c) receiving control, coordination and authorized and preferred channel selection guidance information from the cloud intelligence engine 2435.

The capability and functions in (a) to (c) are enabled by the centralized cloud intelligence engine which collects and combines the DFS radar and other spectrum information from each DFS master and geo-tags, stores, filters, and integrates the data over time, and combines it together by data fusion technique with information from a plurality of other DFS masters distributed in space, and performs filtering and other post-processing on the collection with proprietary algorithms, and merges with other data from vetted sources (such as GIS—Geographical Information System, FAA, FCC, and DoD databases, etc.).

Specifically, the cloud intelligence engine performs the following; (a) continuously collects the spectrum, location and network congestion/traffic information from all wireless DFS masters, the number and density of which grows rapidly as more access points and small cell base stations are deployed; (b) continuously applies sophisticated filtering, spatial and time correlation and integration operations, and novel array-combining techniques, and pattern recognition, etc. across the data sets; (c) applies inventive network analysis and optimization techniques to compute network organization decisions to collectively optimize dynamic channel selection of access points and small cell base stations across networks; and (d) directs the adaptive control of dynamic channel selection and radio configuration of said wireless DFS masters.

In the illustrated example, the DFS master 2400 includes a primary radio 2415 and a secondary radio 2416. The primary radio 2415 is for DFS and radar detection. The primary radio 2415 is typically a 24 GHz radio. In one example, the primary radio 2415 can be a 24 GHz transceiver. The DFS master 2400 may receive radar signals, traffic information, and/or congestion information through the primary radio 2415. And the DFS master 2400 may transmit information, such as DFS beacons, via the primary radio 2415. The secondary radio 2416 is a secondary radio for sending control signals to other devices in the network. The secondary radio 2416 is typically a 21.4 GHz radio. The DFS master 2400 may receive information such as network traffic, congestion, and/or control signals with the secondary radio 2416. And the DFS master 2400 may transmit information, such as control signals, with the secondary radio 2416. The primary radio 2415 is connected to a fast channel switching generator 2417 that includes a switch and allows the primary radio 2415 to switch rapidly between a radar detector 2411 and beacon generator 2412. The fast channel switching generator 2417 allows the radar detector 2411 to switch sufficiently fast to appear to be on multiple channels at a time.

The standalone multi-channel DFS master may include a beacon generator 2412 to generate a beacon in each of a plurality of 24 GHz DFS radio channels (e.g., a plurality of 24 GHz DFS radio channels associated with the 24 GHz Wi-Fi spectrum 291), a radar detector 2411 to scan for a radar signal in each of the plurality of 24 GHz DFS radio channels, a 24 GHz radio transceiver (e.g., the primary radio 2415) to transmit the beacon in each of the plurality of 24 GHz DFS radio channels and to receive the radar signal in each of the plurality of 24 GHz DFS radio channels, and a fast channel switching generator 2417 coupled to the radar detector, the beacon generator, and the 24 GHz radio transceiver. The fast channel switching generator 2417 switches the 24 GHz radio to a first channel of the plurality of 24 GHz DFS radio channels and then causes the beacon generator 2412 to generate the beacon in the first channel of the plurality of 24 GHz DFS radio channels. Then, the fast channel switching generator 2417 causes the radar detector 2411 to scan for the radar signal in the first channel of the plurality of 24 GHz DFS radio channels. The fast channel switching generator 2417 then repeats these steps for each other channel of the plurality of 24 GHz DFS radio channels during a beacon transmission duty cycle and, in some examples, during a radar detection duty cycle. The beacon transmission duty cycle is the time between successive beacon transmissions on a given channel and the radar detection duty cycle which is the time between successive scans on a given channel. Because the DFS master 2400 cycles between beaconing and scanning in each of the plurality of 24 GHz DFS radio channels in the time window between a first beaconing and scanning in a given channel and a subsequent beaconing and scanning the same channel, it can provide effectively simultaneous beaconing and scanning for multiple channels.

The DFS master 2400 also may contain a Bluetooth radio 2414 and/or an 802.15.4 radio 2413 for communicating with other devices in the network. The DFS master 2400 may include various radio protocols 2408 to facilitate communication via the included radio devices.

The DFS master 2400 may also include a location module 2409 to geolocate or otherwise determine the location of the DFS master 2400. In addition, the DFS master 2400 may determine the location of the DFS master 2400 by querying the client devices 2431, 2432, which may have GPS or other location-determining capabilities.

As shown in FIG. 24, the DFS master 2400 may include a scan and signaling module 2410. The DFS master 2400 includes embedded memory 2402, including for example flash storage 2401, and an embedded processor 2403. The cloud agent 2404 in the DFS master 2400 facilitates aggregation of information from the cloud agent 2404 through the cloud and includes swarm communication protocols 2405 to facilitate communications between DFS masters, access points, client devices, and other devices in the network. The cloud agent 2404 also includes a security module 2406 to protect and secure the cloud communications of the DFS master 2400, as well as agent protocols 2407 to facilitate communication with the access point control agents 2419, 2424.

The roaming and guest agents manager 2438 in the cloud intelligence engine 2435 provides optimized connection information for devices connected to DFS masters that are roaming from one access point to another access point (or from one access point to another network). The roaming and guest agents manager 2438 also manages guest connections to networks for DFS masters connected to the cloud intelligence engine 2435. The external data fusion engine 2439 provides for integration and fusion of information from DFS masters with information from the data source(s) 2452. For example, the external data fusion engine 2439 may integrate and/or fuse information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other information. The cloud intelligence engine 2435 further includes an authentication interface 2440 for authentication of received communications and for authenticating devices and users. The radar detection compute engine 2441 aggregates radar information from the DFS master 2400, the DFS master(s) 2451 and/or the data source(s) 2452. The radar detection compute engine 2441 also computes the location of radar transmitters from those data to, among other things, facilitate identification of false positive radar detections or hidden nodes and hidden radar. The radar detection compute engine 2441 may also guide or steer multiple DFS masters to dynamically adapt detection parameters and/or methods to further improve detection sensitivity. The location compute and agents manager 2442 determines the location of the DFS master 2400 and other connected devices (e.g., DFS master(s) 2151) through Wi-Fi lookup in a Wi-Fi location database, querying passing devices, scan lists from DFS masters, or geometric inference.

The spectrum analysis and data fusion engine 2443 and the network optimization self-organization engine 2444 facilitate dynamic spectrum optimization with information from the DFS master 2400, the other DFS master(s) and/or the data source(s) 2452. Each of the DFS masters (e.g., the DFS master 2400 and/or the other DFS master(s)) connected to the cloud intelligence engine 2435 have scanned and analyzed the local spectrum and communicated that information to the cloud intelligence engine 2435.

The DFS master 2400 sends the time-stamp signal, or dead-man switch timer, with communications to ensure that the devices do not use the information, including the whitelist, beyond the useful lifetime of the information. For example, a whitelist will only be valid for certain period of time. The time-stamp signal avoids using noncompliant DFS channels by ensuring that a device will not use the whitelist beyond its useful lifetime.

Figure 25:
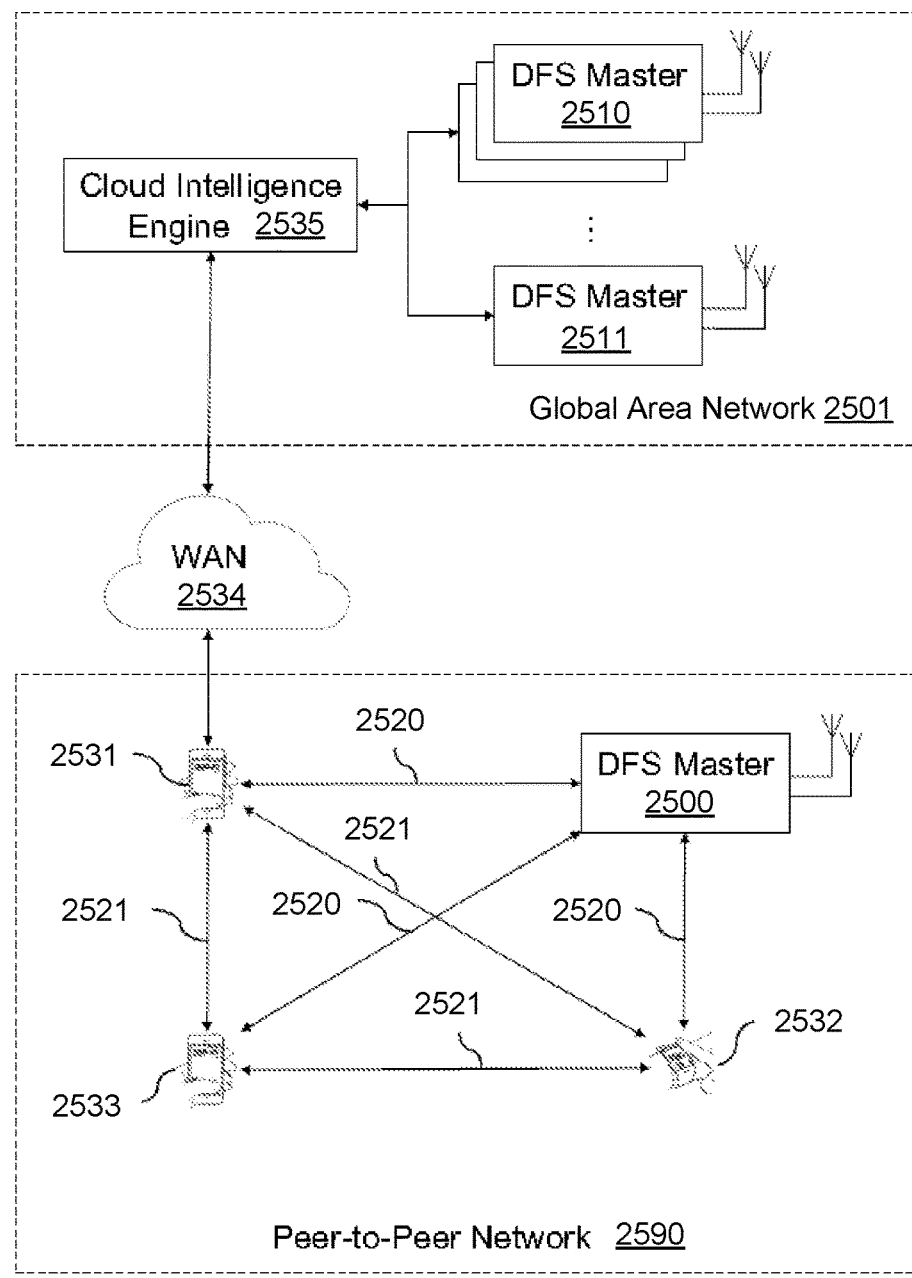
FIG. 25 illustrates an exemplary DFS enabled peer-to-peer network and system of the present invention.

FIG. 25 illustrates how the cloud intelligence engine 2535 would interface with client devices 2531, 2532, 2533 in a peer-to-peer network 2590 and the DFS master 2500 acting as an autonomous DFS master independent of any access point. As shown in FIG. 25, the cloud intelligence engine 2535 may be connected to a plurality of network-connected (either directly or via network enabled devices) DFS masters 2500, 2510. The DFS master 2500 in the peer-to-peer network 2500 may connect to the cloud intelligence engine 2535 through one of the network-connected client devices 2531 by, for example, piggy-backing a message to the cloud intelligence engine 2535 on a message send to the client devices 2531 or otherwise co-opting a connection of the client devices 2531 to the wide area network 2534. In the peer-to-peer network 2500, the DFS master 2500 sends over-the-air control signals 2520 to the client devices 2531, 2532, 2533 including indications of channels free of occupying signals such as DFS channels free of radar signals. Alternatively, the DFS master communicates with just one client device 2531 (e.g., a single client device 2531) which then acts as the group owner to initiate and control the peer-to-peer communications with other client devices 2532, 2533. The client devices 2531, 2532, 2533 have peer-to-peer links 2521 through which they communicate with each other. The DFS master 2500 may operate in multiple modes executing a number of DFS scan methods employing different algorithms.

Figure 26:
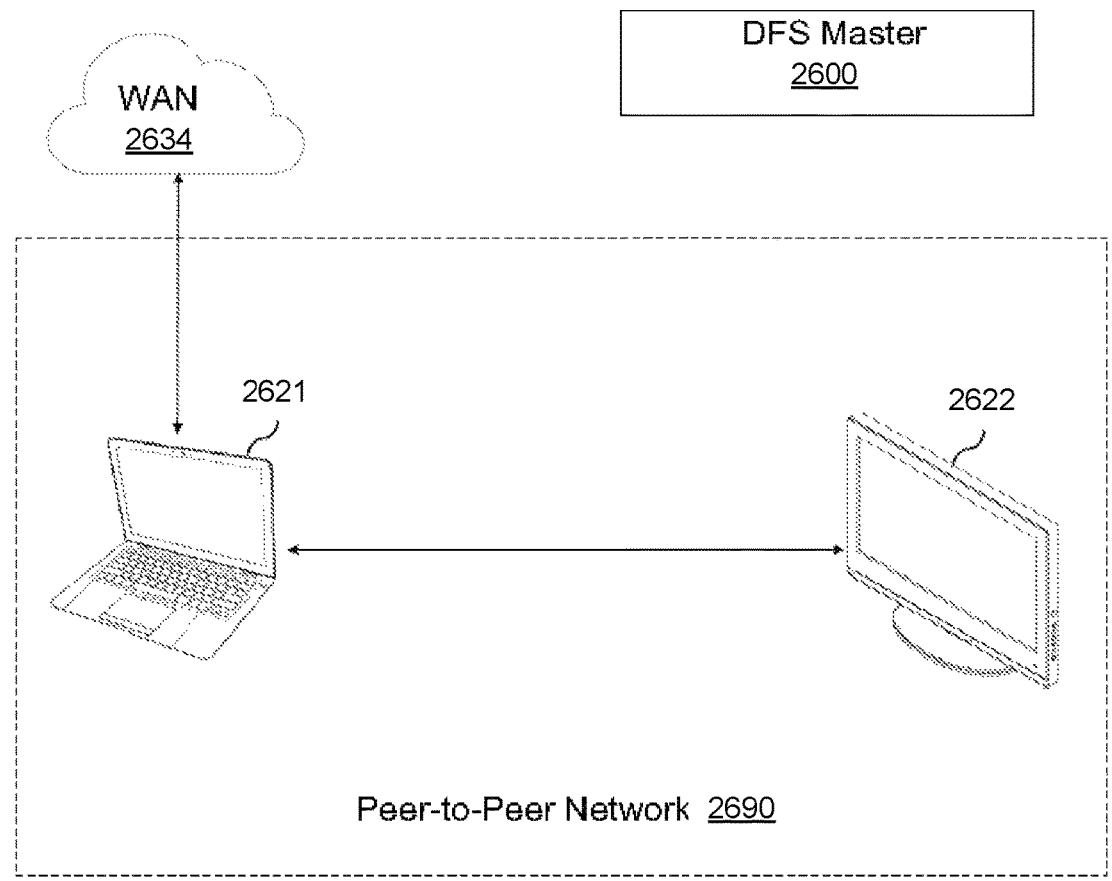
FIG. 26 further illustrates a type of DFS peer-to-peer network that is enabled by the present invention.
Figure 27:
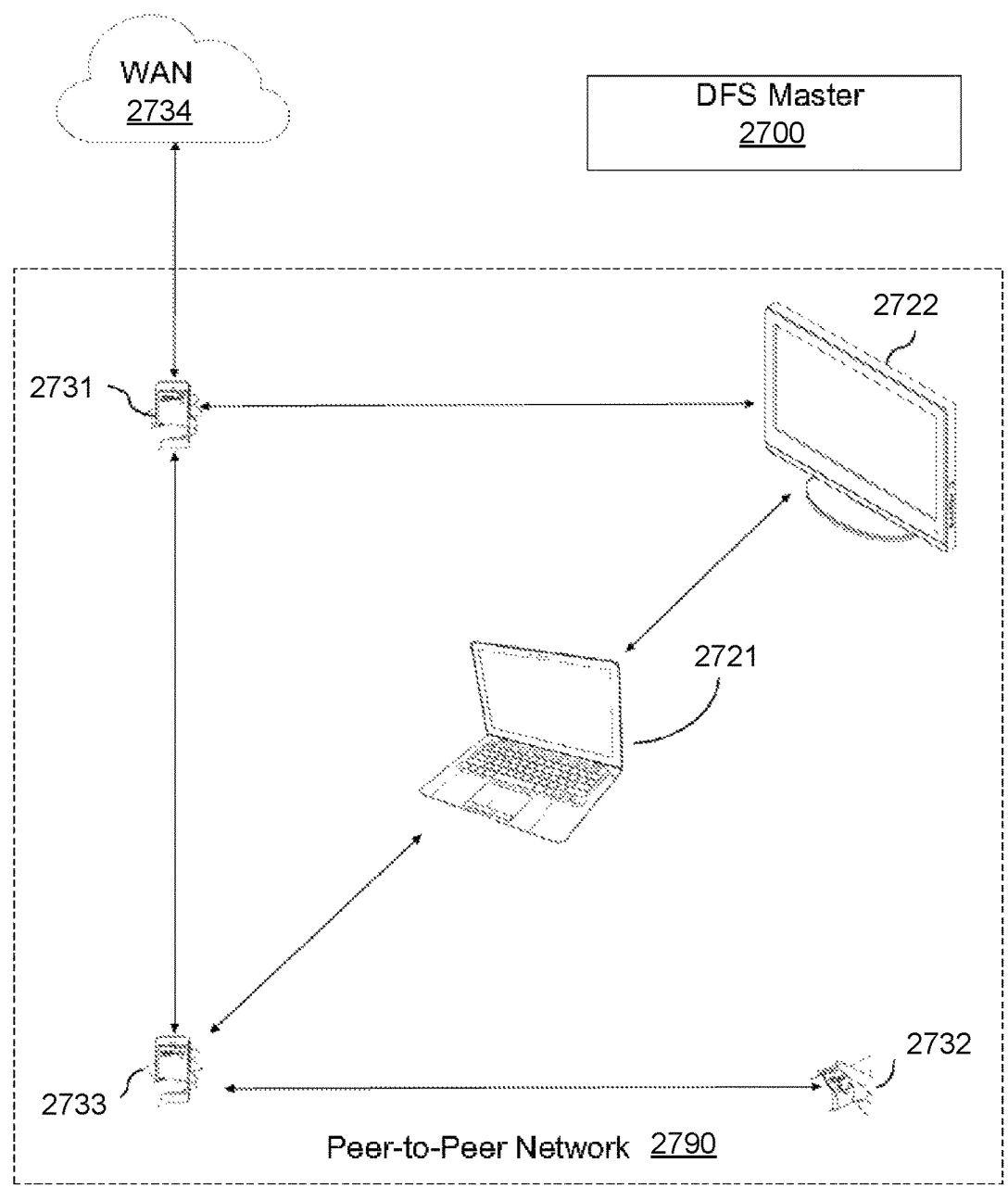
FIG. 27 further illustrates a type of DFS peer-to-peer network that is enabled by the present invention.

FIGS. 26 and 27 further illustrate DFS peer-to-peer networks that are enabled by the present invention. As shown in FIG. 26, a computer client device 2621 may be coupled to a wide area network 2634. This coupling may be through an access point such as an access point. Independent of any access point, the computer client device 2621 communicates via a DFS channel with a television client device 2622 and forms a peer-to-peer network 2690. The DFS master device 2600 communicates with at least one of the client devices 2621, 2622 to communicate an available DFS channel for the peer-to-peer communication. FIG. 27 shows another exemplary peer-to-peer network. In FIG. 27, a mobile client device 2731 may be coupled to a wide area network 2734. This coupling may be through an access point such as an access point. Independent of any access point, the mobile client device 2731 communicates via a DFS channel with a television client device 2722 and another mobile client device 2733 and forms a peer-to-peer network 2790 with a computer client device 2721 and a wearable client device 2732. As illustrated in FIG. 27, each of the client devices may communicate with one or more of the other client devices in the peer-to-peer network 2790. The DFS master device 2700 communicates with at least one of the client devices 2721, 2722, 2731, 2732, 2733 to communicate an available DFS channel for the peer-to-peer communication.

Figure 28:
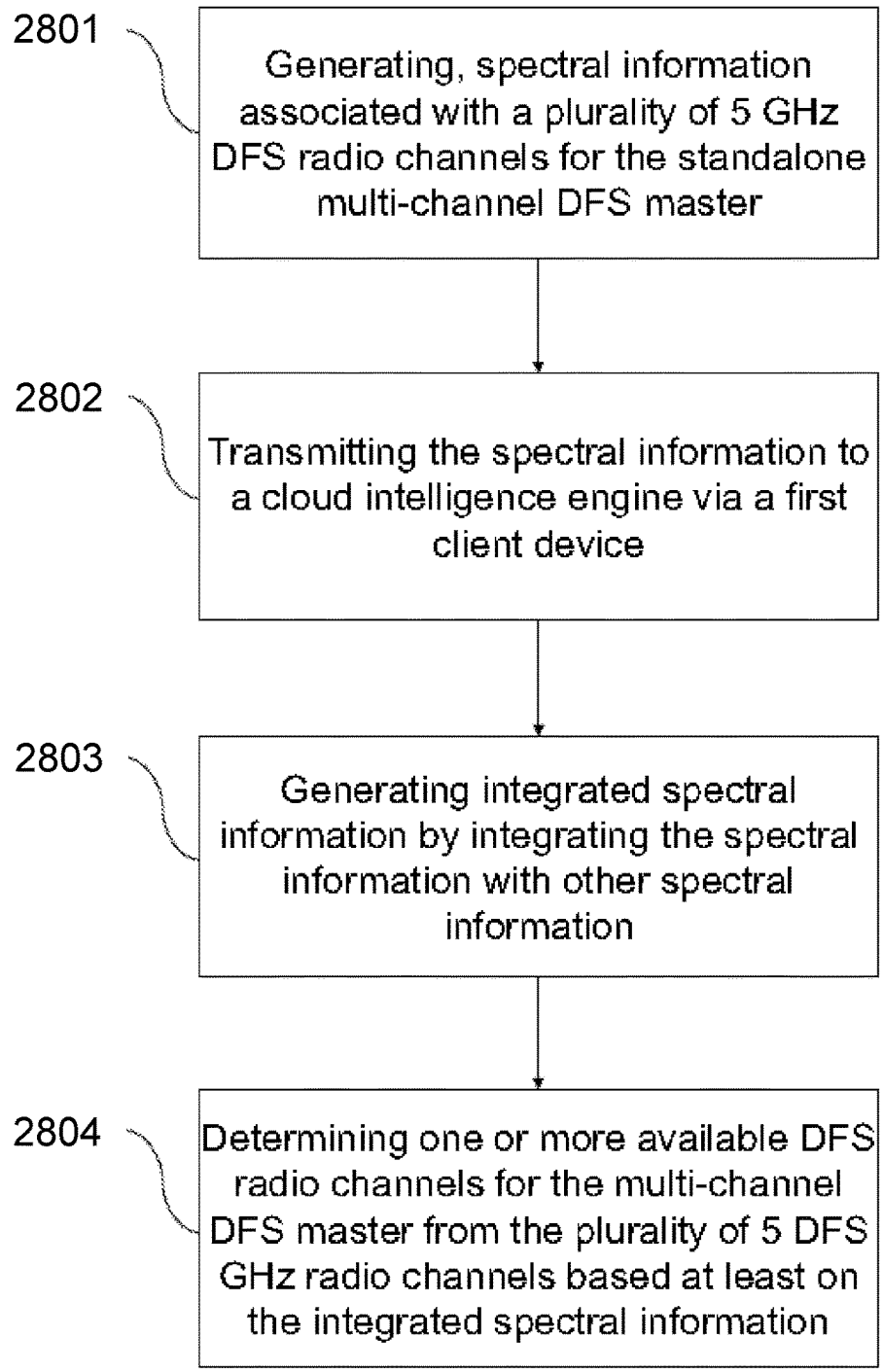
FIG. 28 illustrates an exemplary method according to the present invention for providing DFS spectrum access in peer-to-peer wireless networks.
Figure 29:
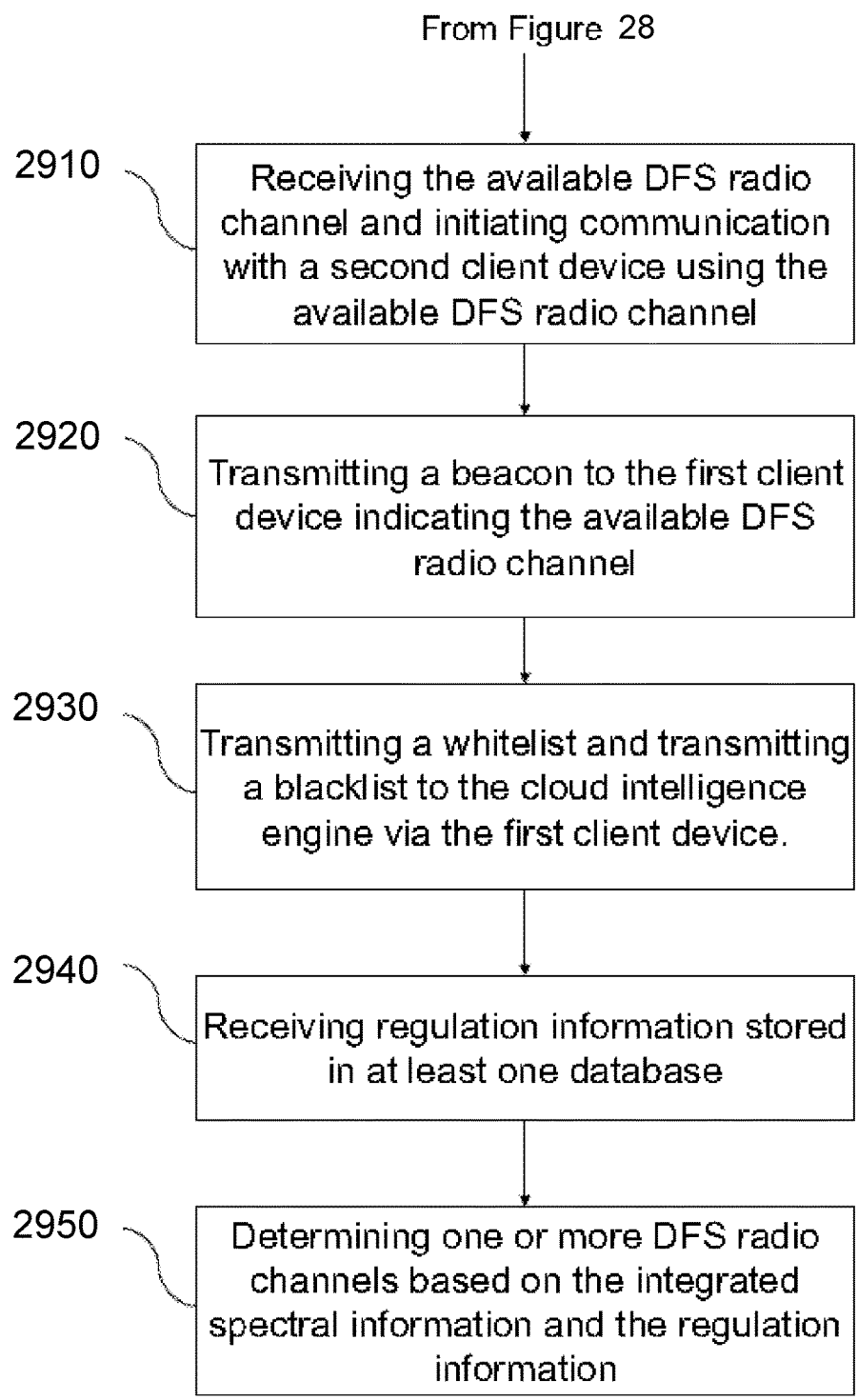
FIG. 29 illustrates additional optional steps in a method according to the present invention for providing DFS spectrum access in peer-to-peer wireless networks.

In view of the subject matter described herein, methods that can be implemented in accordance with the subject disclosure will be better appreciated with reference to the flowcharts of FIGS. 28-29 and with further reference to FIGS. 33-43. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Where non-sequential, or branched, flow illustrated via a flowchart, it can be understood to indicate that various other branches, flow paths, and orders of the blocks, can be implemented which achieve the same or a similar result. Moreover, not all illustrated blocks may be required to implement the methods described hereinafter. Additionally, it should be further understood that the methods and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program accessible from any computer-readable device or media such as a tangible computer readable storage medium.

FIG. 28 illustrates an exemplary method 2800 according to the present invention for providing DFS spectrum access in peer-to-peer wireless networks. First, at 2801 the standalone multi-channel DFS master generates spectral information associated with a plurality of 24 GHz DFS radio channels for the standalone multi-channel DFS master. The spectral information may include information such as, for example, a whitelist (e.g., a whitelist of each of the plurality of 24 GHz DFS communication channels that does not contain a radar signal), a blacklist (e.g., a blacklist of each of the plurality of 24 GHz DFS communication channels that contains a radar signal), scan information associated with a scan for a radar signal in the plurality of 24 GHz DFS communication channels, state information, location information associated with the DFS master device and/or client devices, time signals, scan lists (e.g., scan lists showing neighboring access points, etc.), congestion information (e.g., number of re-try packets, type of re-try packets, etc.), traffic information and/or other spectral information. Next, at 2802 the standalone multi-channel DFS master transmits the spectral information to a cloud intelligence engine via a first client device. The first client device is a network enabled device such as a cellular device that can connect to a wide area network and provide that connection to the standalone multi-channel DFS master. The cloud intelligence engine may also receive spectral information associated with a plurality of 24 GHz DFS communication channels from a plurality of multi-channel DFS masters via one or more network devices. Optionally, receiving the spectral information includes receiving scan information associated with scanning for a radar signal in the plurality of 24 GHz DFS radio channels. Analysis of the plurality of 24 GHz DFS communication channels may include switching a 24 GHz radio transceiver of the DFS master device to a channel of the plurality of 24 GHz DFS communication channels, generating a beacon in the channel of the plurality of 24 GHz DFS communication channels, and scanning for a radar signal in the channel of the plurality of 24 GHz DFS communication channels.

Next, at 2803 the method of FIG. 28 includes the cloud intelligence engine generating integrated spectral information by integrating the spectral information with other spectral information. The other spectral information may generated by at least one other DFS master device. In one example, the spectral information may be integrated with the other spectral information via one or more data fusion processes. Then, at 2804 the cloud intelligence engine determines a set of available DFS radio channels for the multi-channel DFS master from the plurality of 24 DFS GHz radio channels based at least on the integrated spectral information. For example, a communication channel may be selected from the plurality of 24 GHz DFS communication channels based at least on the integrated spectral information. In an aspect, regulatory information associated with the plurality of 24 GHz DFS communication channels and/or stored in at least one database may be received by the cloud intelligence engine. Furthermore, the communication channel may be further determined based on the regulatory information. In another aspect, an indication of the communication channel may be provided to the DFS master device and/or the client device(s).

FIG. 29 illustrates an exemplary method 2900 according to the present invention for providing DFS spectrum access in peer-to-peer wireless networks. The method illustrated in FIG. 29 includes the steps described in relation to FIG. 28 above but also includes the following optional additional steps. At 2910, the method includes the first client device receiving the available DFS radio channel and initiating communication with a second client device using the available DFS radio channel. In this step, the first client device initiates a peer-to-peer communication network using the available DFS radio channel. At 2920, the method includes the standalone multi-channel DFS master transmitting a beacon to the first client device indicating the available DFS radio channel. At 2930, the method includes transmitting a whitelist of each of the plurality of 24 GHz DFS radio channels that does not contain a radar signal to the cloud intelligence engine via the first client device and transmitting a blacklist of each of the plurality of 24 GHz DFS radio channels that contains a radar signal to the cloud intelligence engine via the first client device. At 2940, the method includes the cloud intelligence engine receiving regulatory information stored in at least one database. And at 2950, the step of determining the DFS radio channel includes determining which DFS radio channel to use based on the integrated spectral information and the regulatory information.

As described above, in addition to traditional infrastructure network topologies (e.g., host Access point and clients and peer-to-peer networks or Wi-Fi-Direct), the present inventions apply to extended infrastructure network topologies (e.g., mesh networks). For example, the host access points discussed herein could be a mesh peer participating in a mesh network and simultaneously providing infrastructure connectivity. For example, whereas peer-to-peer networks are described herein as comprising client devices in communication with each other and, in non-limiting aspects, in communication through an access point to a wide area network, wireless mesh network can comprise a communications network made up of radio nodes organized in a mesh configuration. For instance, exemplary wireless mesh networks, as described herein, can comprise mesh clients, routers, access points, and/or gateways. In a non-limiting aspect, wireless mesh clients can comprise any of a variety of wireless devices, as described herein, in reference to peer-to-peer networks, for example, while routers and/or access points can forward wireless mesh client and/or other communications to gateways which can be connected to one or more wide area networks, such as the Internet. Accordingly, FIGS. 30-45, for example, depict various systems, devices, and methods for reducing false detections and/or network downtime in exemplary mesh networks employing DFS channels, as described herein.

Figure 30:
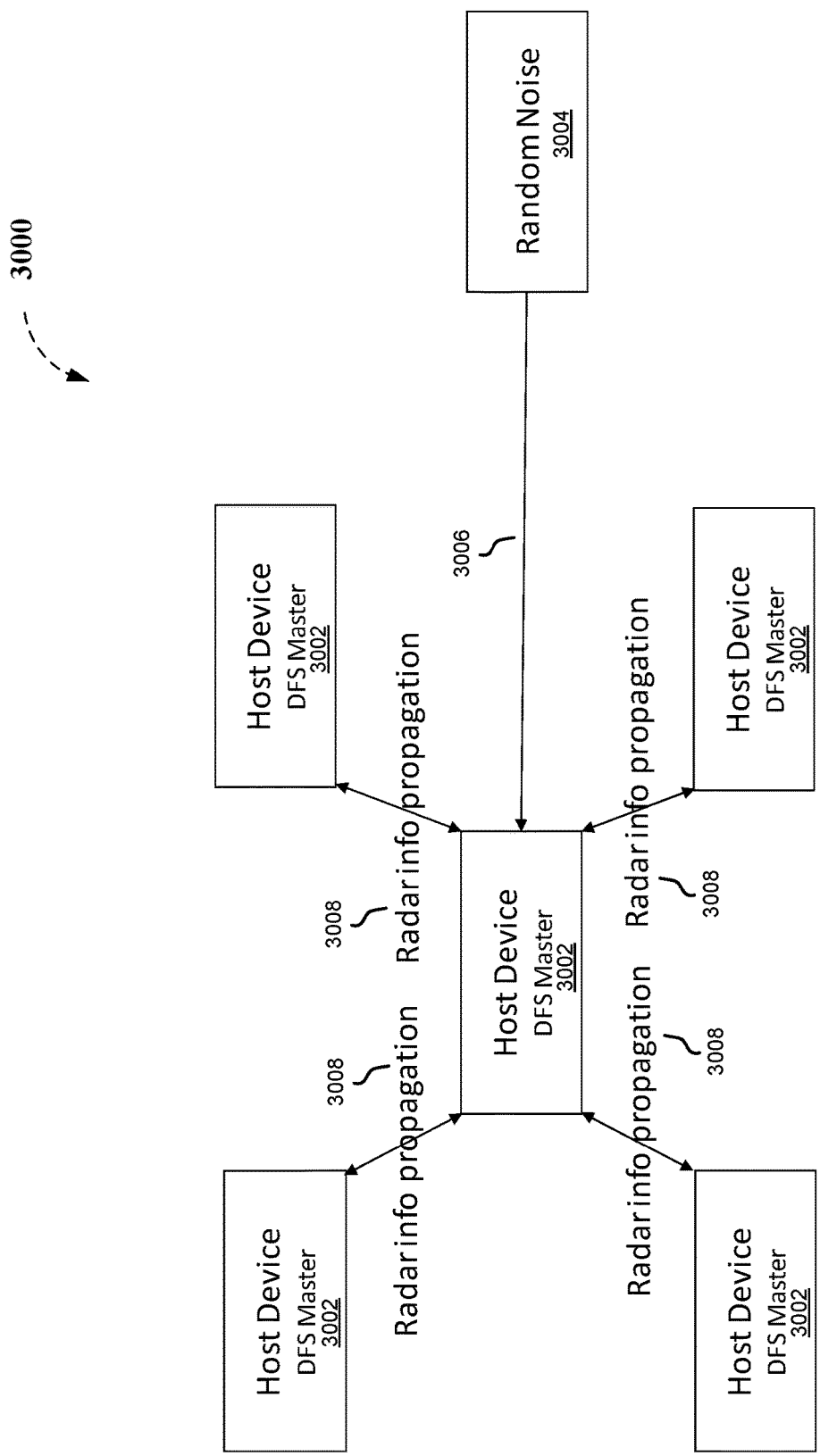
FIG. 30 depicts an exemplary functional block diagram of a mesh network, according to various non-limiting aspects as described herein.

For instance, FIG. 30 depicts an exemplary functional block diagram of a mesh network 3000, according to various non-limiting aspects as described herein. In non-limiting aspects, exemplary mesh network 3000 can comprise any number of host devices 3002 (e.g., router, access point, etc., configured as a DFS master (e.g., a multi-channel DFS master), as described herein, for example, regarding FIGS. 13, 24, etc.) in communication with each other in a mesh network configuration employing DFS channels. In conventional implementations of DFS, when a potential radar event is detected on a DFS channel, a device communicating on a DFS channel has to vacate a DFS channel within 200 milliseconds (ms) and stay off the DFS channel for 30 minutes. It is noted that, while a DFS channel must be vacated within 10 seconds after a radar detection event (e.g., a valid radar event), the 200 ms limit is derived from a test specification that limits aggregate data transmission data over the 10 seconds with a 17 percent channel load. As a result, as described herein, the device formerly communicating on the DFS channel cannot use the DFS channel after the 10 second specification and until the 30 minute duration has expired, whereupon the device is required to monitor the DFS channel for a radar signal for 1 minute prior to renewing communications on the DFS channel. Conventionally, a DFS master device is an access point with only one radio and is able to provide DFS master services for just a single channel. As described above a significant problem of this approach is, in the event of a radar event or a more common false detect, the single channel must be vacated and the ability to use the DFS channel is lost.

However, as depicted in FIG. 30, for host devices 3002 (e.g., router, access point, etc., configured as a DFS master (e.g., a multi-channel DFS master), as described herein), communicating in the presence of various sources of interference (e.g., random noise 3004, adjacent channel leakages and/or interference from other channels, etc.), host devices 3002 can receive and/or detect 3006 such sources of interference (e.g., random noise 3004, adjacent channel leakages and/or interference from other channels, etc.), which are not valid radar events, but which can be misdiagnosed as valid radar events (e.g., a false radar detection or false detect), resulting in the loss DFS channel for mesh network communication, unnecessarily. FIG. 30 further depicts exemplary mesh network 3000 comprising any number of host devices 3002 (e.g., router, access point, etc., configured as a DFS master (e.g., a multi-channel DFS master), as described herein, for example, regarding FIGS. 13, 24, etc.) that can be configured for radar information propagation 3008, according to various aspects described herein. As used herein, random noise 3004 refers to any source of interference that can be misdiagnosed as a valid radar event, for example, at exemplary host device 3002, or otherwise, including, but not limited to, noise, random, or otherwise, adjacent channel interference or leakages, fleeting, diminishing, weak and/or transient radar pulses, and so on.

Figure 31:
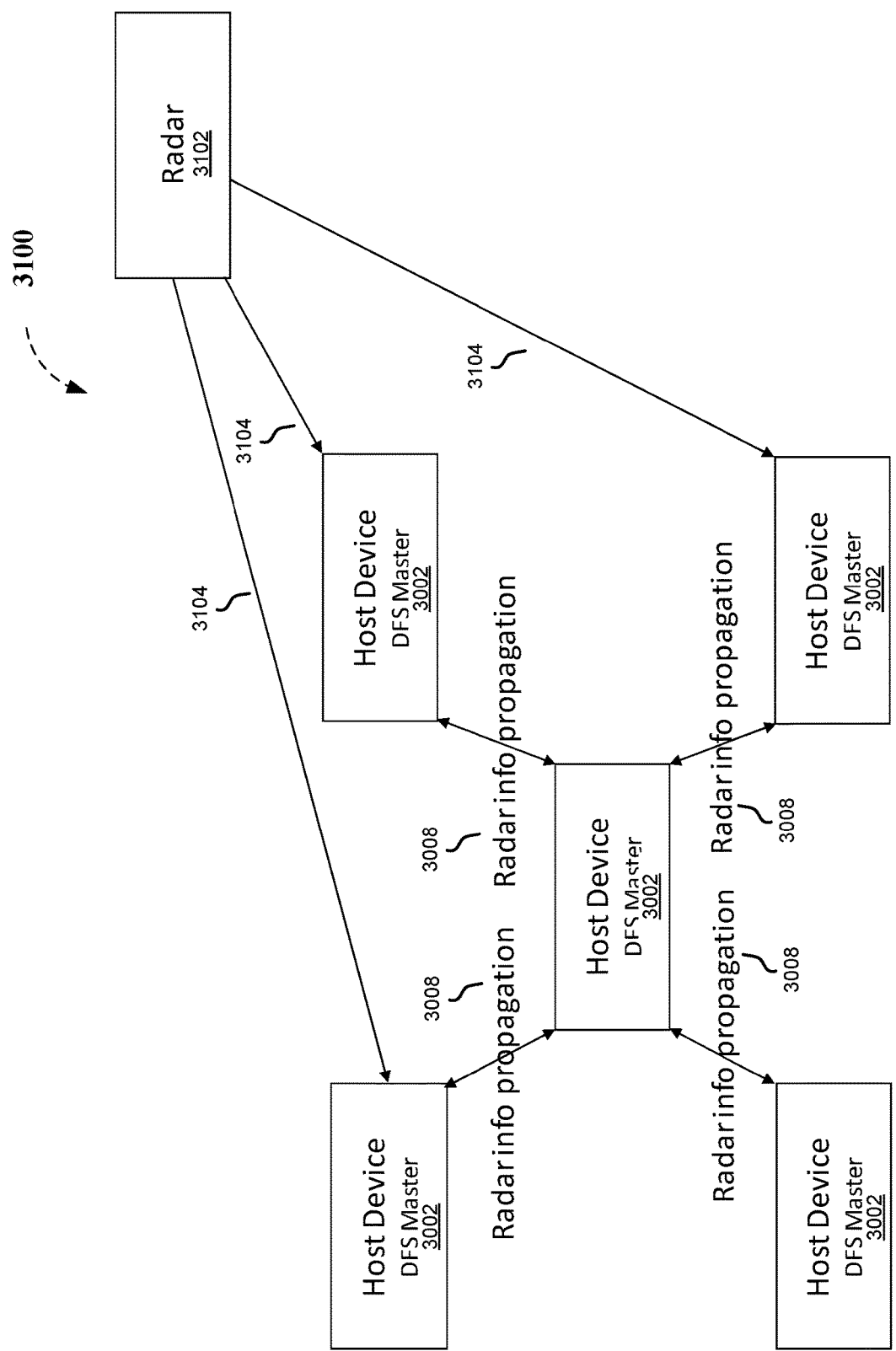
FIG. 31 depicts another exemplary functional block diagram of a mesh network, according to further non-limiting aspects as described herein.

FIG. 31 depicts another exemplary functional block diagram of a mesh network 3100, according to further non-limiting aspects as described herein. It is noted, that while the central mesh node host device 3002 is depicted as receiving 3006 random noise 3004 in FIG. 30, the other exemplary mesh node host devices 3002 are not subjected to random noise 3004. Furthermore, FIG. 31 depicts exemplary mesh network 3100 subjected to radar 3102 (e.g., an actual radar source, capable of resulting in a detected valid radar event). While three of five of the exemplary mesh node host devices 3002 are depicted as receiving 3104 radar 3102 in exemplary mesh network 3100, the other exemplary mesh node host devices 3002 are not. For instance, exemplary mesh node host devices 3002 can be hidden, obstructed from radar, and/or subjected to differing interference, as described above, regarding, FIGS. 19A-19C, which illustrate the hidden node or hidden radar problem (e.g., where a node or radar is hidden from view by topography, obstruction, distance or channel conditions, etc.). Accordingly, in various non-limiting embodiments of the disclosed systems, methods, and devices, redundant and/or conflicting information, as well as related information (e.g., location information, etc.) associated with the exemplary mesh networks, exemplary mesh network node devices, and so on, can be propagated and/or employed to facilitate reducing false detections and/or network downtime in exemplary mesh networks employing DFS channels, as described herein. Thus, various embodiments as described herein can comprise systems, methods, and devices that can employ inference and/or algorithms to discriminate between random noise 3004 and radar 3102 to facilitate reducing false detections and/or network downtime in exemplary mesh networks employing DFS channels, as described herein.

Figure 32:
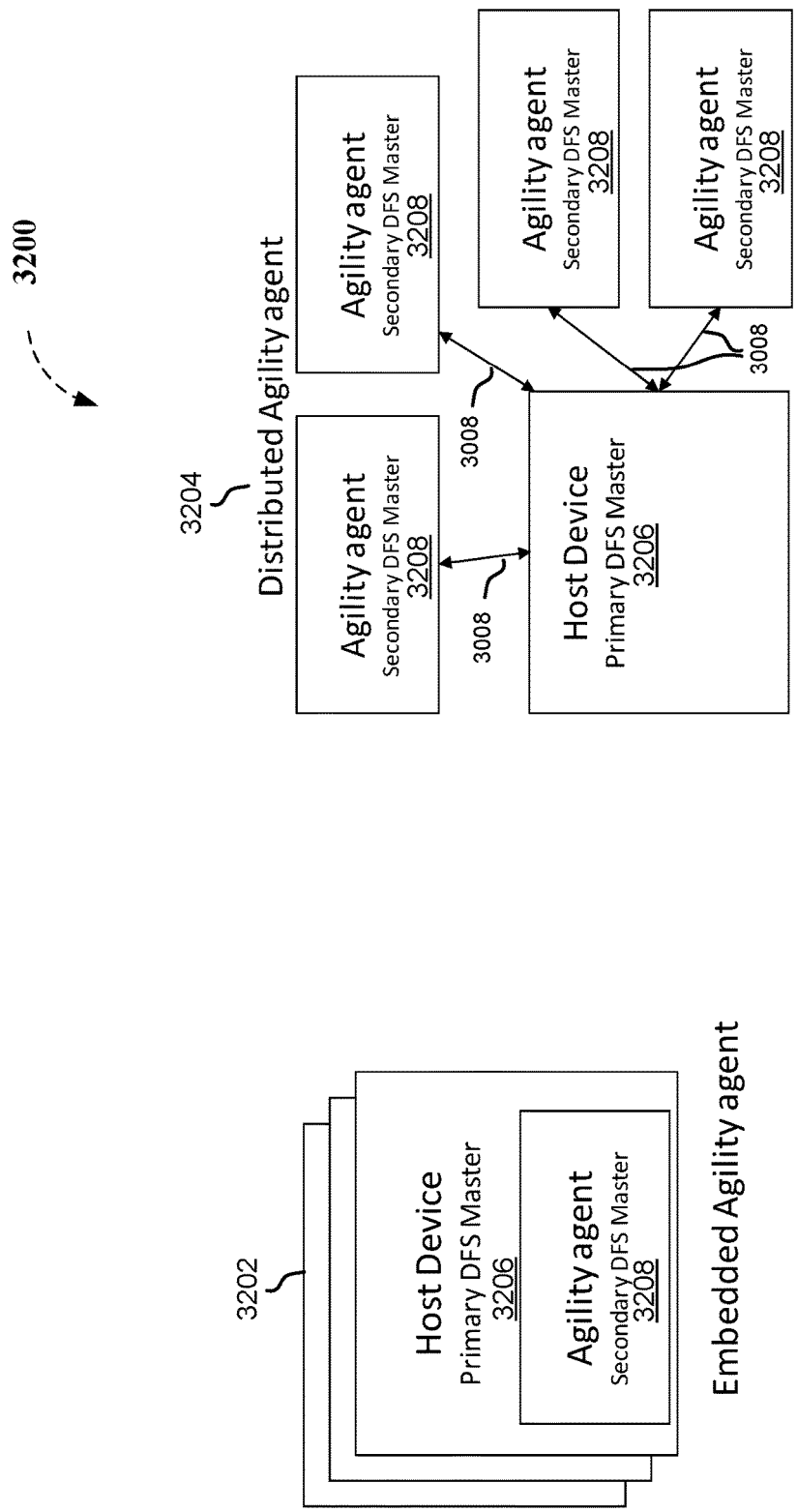
FIG. 32 depicts other exemplary functional block diagrams of mesh networks, according to still further non-limiting aspects as described herein.

FIG. 32 depicts other exemplary functional block diagrams of mesh networks 3200, according to still further non-limiting aspects as described herein. For example, FIG. 32 depicts a set of exemplary mesh network node host devices 3202, one or more comprising a host device 3206, configured as a DFS master (e.g., a primary DFS master such as a multi-channel DFS master), and an embedded agility agent 3208, configured as a DFS master (e.g., a secondary DFS master such as a multi-channel DFS master), as described herein, for example, regarding FIGS. 2, 13, 24, etc. FIG. 32 further depicts an exemplary mesh network node host device 3206, configured as a DFS master (e.g., a primary DFS master), and a set 3204 of distributed agility agents 3208, configured as secondary DFS masters, as described herein, for example, regarding FIGS. 2, 13, 24, etc. It is noted that either employing an embedded agility agent 3208, configured as a secondary DFS master, as described herein, for example, regarding FIGS. 2, 13, 24, etc., or employing a set of distributed agility agents 3208, configured as a secondary DFS master, as described herein, for example, regarding FIGS. 2, 13, 24, etc., can both provide redundant and/or conflicting information regarding radar/noise detections, as well as related information (e.g., location information, channel switch information, etc.) to facilitate reducing false detections and/or network downtime in exemplary mesh networks employing DFS channels, as described herein, whereas employing a set of distributed agility agents 3208 can also provide other information (e.g., location information, channel switch information, etc.) useful for reducing false detections and/or network downtime in exemplary mesh networks employing DFS channels, whereas radar information propagation 3008, in the case of embedded agility agent 3208 can be facilitated internally by the device communications functions. It is noted that radar information propagation 3008 can also employ embedded communications channels, wired communications channels, wireless communications, whether on a DFS channel or otherwise, out of band communications channels, such as Bluetooth, etc., and so on. In addition, while FIGS. 30-32 depict various configurations of exemplary mesh networks, exemplary mesh network nodes, and combinations thereof, for the purposes of illustration and not limitation, it can be appreciated that permutations of exemplary mesh networks that can employ various non-limiting systems, methods, devices, as described herein are virtually without limitation.

For example, while not shown in FIGS. 30-32, exemplary mesh networks can comprise various other devices or mesh nodes such as non-DFS-master nodes, client devices, routers, access points, gateways and so, as well as other devices and systems such as cloud intelligence engines, etc., or portions thereof, that can employ aspects of exemplary methods as described herein or send or receive communications or other transmissions that employ aspects of or are incident to exemplary methods as described herein, for example regarding FIGS. 2, 13-14, 24, etc.

Accordingly, in a non-limiting aspect, exemplary mesh nodes can be configured to store one or more of its location, distance, proximity, etc. relative to other mesh nodes in the mesh. According to further aspects described herein, an exemplary mesh node can be configured to detect radar 3102 (e.g., an actual radar source, capable of resulting in a detected valid radar event), to propagate a radar event (e.g., radar information propagation 3008, regarding a suspected radar event, a validated radar event, etc.) throughout the exemplary mesh network, to propagate the radar event to the cloud, and/or to propagate the radar event to nearby devices, whether to mesh network devices or otherwise, e.g., radar information propagation. According to still further aspects described herein, exemplary mesh nodes, the cloud intelligence engine, nearby devices, etc. can be configured to cast a vote based on whether it has also detected a similar radar event (e.g., a suspected radar event, etc.), and can be configured to propagate the vote back to the originating mesh network node or device. The originating mesh network node or device can then perform inferences or algorithms configured to generate a determination whether the radar event detected by itself, and/or other combination of voting devices, is a valid radar event (e.g., radar 3102, from an actual radar source), based on the voting from other mesh nodes or device in the mesh network, inferences, and algorithms, as described herein.

Thus, in an exemplary mesh network, if one mesh node of the exemplary mesh network detects radar, various embodiments as described herein, can compare such information to radar information propagated from neighbor mesh nodes in the mesh network. Referring again to FIGS. 30 and 31, for an exemplary mesh network 3000, 3100, where each exemplary mesh node host device 3002 knows its location, distance, and/or proximity, etc. relative to other exemplary mesh node host devices 3002 in the mesh network, if the central mesh node host device 3002 detects radar (e.g., which may be a result receiving 3006 random noise 3004 in FIG. 30), it is also very likely at least some of the neighbor mesh nodes also detect radar. In this non-limiting example, because other exemplary mesh node host devices 3002 in the mesh network, do not detect radar (e.g., as a result of not receiving being subjected to or random noise 3004 in FIG. 30), it can be inferred, based on one or more of an algorithm, voting, location, distance, and/or proximity, etc. relative to other exemplary mesh node host devices 3002 in the mesh network, the central mesh node host device 3002, or otherwise, can determine that the signal detected is not a valid radar event (e.g., a false radar detection or false detect), according to further non-limiting aspects. As a result, instead of needlessly vacating the DFS channel based on the central mesh node host device 3002 detecting a suspected radar event (e.g., which may be a result receiving 3006 random noise 3004 in FIG. 30), various embodiments, as described herein, can determine whether such a suspected radar event is a valid radar event, such as from radar 3102 (e.g., an actual radar source, capable of resulting in a detected valid radar event), based on radar information propagation 3008, among exemplary neighbor mesh nodes in the exemplary mesh network, and/or other information, inferences, and or algorithms.

In a further non-limiting example, exemplary embodiments can comprise an exemplary device configured for DFS detection, as described herein. For instance, as described above, a standalone autonomous DFS master, or agility agent can be incorporated into another device such as an access point, LTE-U host, base station, cell, or small cell, media or content streamer, speaker, television, mobile phone, mobile router, software access point device, or peer to peer device, without limitation. Upon detection of a suspected radar event, instead of vacating all DFS channels and only listening, suitably configured exemplary devices can be directed, e.g., via agility agents, DFS masters, etc., to focus on listening on the same DFS channel having the suspected radar event, to create redundant radar event information, in another non-limiting aspect. Accordingly, in a further non-limiting aspect, such redundant radar event information can be propagated throughout the network, e.g., an exemplary mesh network, to facilitate further reducing instances of false radar detection, and resultant network downtime associated with false detections.

In yet another non-limiting example, assuming a plurality of devices on a network employing DFS detection, as described herein, various embodiments can employ inference and algorithms employing this redundant radar event information, to facilitate further reducing instances of false radar detection. For instance, in an exemplary mesh network of five nodes, where each node comprises an exemplary DFS detector, for example, as described above, regarding FIGS. 30-31, if the central mesh node host device 3002 detects radar (e.g., which may be a result receiving 3104 radar 3102 in FIG. 31), it is also very likely at least some of the neighbor mesh node host devices 3002 also detect radar. If one or more of the other four neighbor mesh node host devices 3002 also detect radar senses a radar event as well, various non-limiting embodiments can infer that the radar event sensed by the central mesh node host device 3002 is a valid radar event. Accordingly, by exploiting knowledge of location, distance, and proximity, and so on relative to other mesh nodes in the exemplary mesh network, various embodiments as described herein can further ensure that spurious interference (e.g., noise, etc) on the DFS channel is not mistaken for a real radar signal, thus further reducing the probability of false detections and/or resultant network downtime.

In a non-limiting aspect, exemplary embodiments as described herein can be configured to one or more of perform radar information propagation 3008 (e.g., including transmitting a call for validation from neighbor mesh nodes of a detected radar event), to perform voting (e.g., receive a call for validation of a neighbor mesh node detected radar event, make a determination as to its own radar detection and/or vote status, and transmit its vote), and to receive vote results prompted by the neighbor mesh node detected radar event. In another non-limiting aspect, radar information propagation 3008 can be undertaken by employing one or more action frames (subject to the 200 ms limit) and/or using encoded beacons, for example, as further described herein. In yet another non-limiting aspect, voting can be undertaken by employing one or more data frames subject to the 200 ms limit after the detected radar event and/or by employing an encoded beacon thereafter, for example, as further described herein.

Returning to FIG. 32, in another non-limiting aspect, one or more of the exemplary mesh nodes can be embedded with one or more agility agents and/or radar detectors or sensors, for example, as further described herein, regarding FIGS. 2, 20, 32, etc. To reduce the likelihood of false detects, the exemplary mesh nodes (e.g., a host device 3206, configured as a DFS master, and an embedded agility agent 3208, configured as a DFS master, etc.) can employ multiple radar detectors or sensors (e.g., a primary DFS master such as a multi-channel DFS master, a secondary DFS master such as a multi-channel DFS master) to validate a detected radar event. In another non-limiting aspect, the one or more agility agents and/or radar detectors or sensors, whether embedded or distributed, can have differing priorities (e.g., primary DFS master, secondary DFS master, etc.), and/or characteristics and the final decision of whether the detected radar event is valid can be determined by the data fusion of the multiple agility agents and/or radar detectors or sensors, for example, as described herein regarding FIGS. 2, 14A, 14B, etc. As a non-limiting example, an exemplary mesh node can include two radar detectors or sensors, for example, as further described herein, regarding FIGS. 2, 20, 32, etc., such as a sensor on the primary radio 215 interface, and another sensor on a dedicated radar sensing device, such as an embedded agility agent 3208, configured as a DFS master, a standalone agility agent and/or radar detector or sensor of FIG. 20, etc. An exemplary inference for validating a detected radar event can comprise concluding the detected radar event is valid in such a case if both sensors detected the same radar event, where it can be presumed that the probability of the detected radar event being a real radar (e.g., radar 2102) event is high. Another exemplary inference for validating a detected radar event can comprise basing the conclusion that the detected radar event is valid on a probability (e.g., two of three radar sensing mesh nodes detecting, three of five radar sensing mesh nodes detecting, two of ten radar sensing mesh nodes in a geographically dispersed radar sensing mesh network detecting, etc. being above a predetermined threshold, etc.). In alternative non-limiting aspects, another predetermined threshold can be employed, wherein if the number of radar sensing mesh nodes detecting a radar event is below the predetermined threshold, exemplary mesh nodes can make a determination that a longer period of time is to be employed to determine whether more radar signals can be detected. According to a further non-limiting aspect, an exemplary mesh node can further make a determination to and temporarily suspend its transmitter to facilitate focusing on radar detection and gathering further radar signals.

Figure 33:
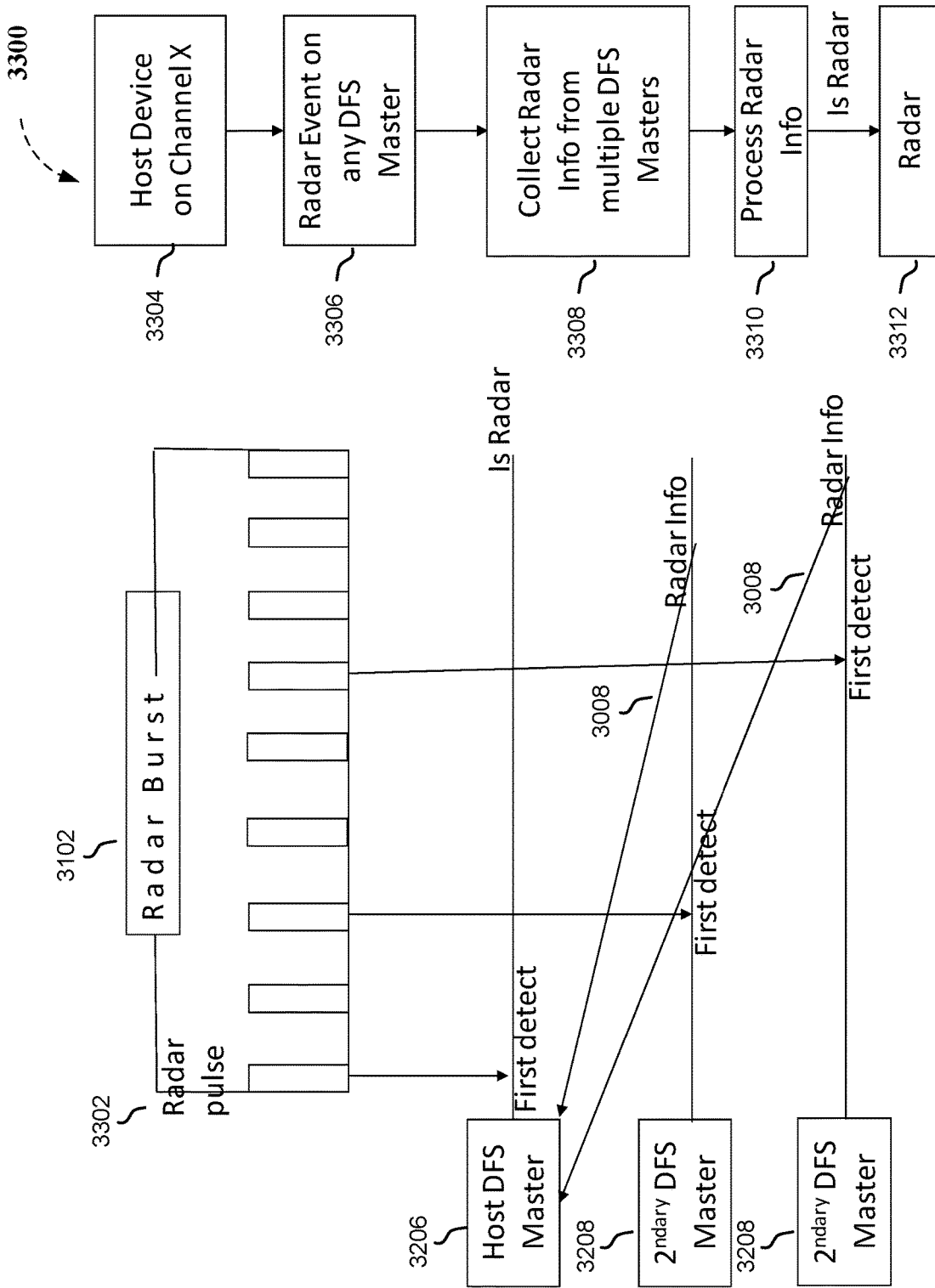
FIG. 33 depicts exemplary methods for reducing false detections and/or network downtime in exemplary mesh networks employing DFS channels, according to various non-limiting aspects.

FIG. 33 depicts exemplary methods 3300 for reducing false detections and/or network downtime in exemplary mesh networks employing DFS channels, according to various non-limiting aspects. FIG. 33 depicts portions of an exemplary mesh network 3200 comprising an exemplary mesh network node host device 3206, configured as a DFS master (e.g., a primary DFS master), and a set 3204 of distributed agility agents 3208, configured as secondary DFS masters, as described herein, for example, regarding FIGS. 2, 13, 14, 24, etc. FIG. 33 further depicts exemplary mesh network 3200 in the presence of a radar 3102 burst, comprising a series of radar pulses (e.g., radar pulses of a pulse repetition interval (PRI)). In a non-limiting aspect, FIG. 33 depicts exemplary mesh network node host device 3206, configured as a DFS master (e.g., a primary DFS master) detecting a first radar pulse 3302 in the series of radar pulses of radar 3102 burst. As further described herein, exemplary mesh network node host device 3206, configured as a DFS master (e.g., a primary DFS master) can make an independent determination that it has detected a suspected radar event, as described herein, for example, regarding FIGS. 2, 13, 14, 24, etc. Subsequently, FIG. 33 depicts a first one of the set 3204 of distributed agility agents 3208, configured as a secondary DFS master, detecting a third radar pulse 3302 in the series of radar pulses of radar 3102 burst, whereupon the first one of the set 3204 of distributed agility agents 3208 can undertake radar information propagation 3008, as further described herein. It is noted that radar information propagation 3008 can be undertaken in response to a call from exemplary mesh network node host device 3206, configured as a DFS master (e.g., a primary DFS master) based on its own detection of a suspected radar event and signaling thereof or based on the first one of the set 3204 of distributed agility agents 3208, configured as a secondary DFS master, detecting the third radar pulse 3302, as described herein, for example, regarding FIGS. 2, 13, 14, 24, etc. FIG. 33 depicts a second one of the set 3204 of distributed agility agents 3208, configured as a secondary DFS master, detecting a sixth radar pulse 3302 in the series of radar pulses of radar 3102 burst, whereupon the second one of the set 3204 of distributed agility agents 3208 can also undertake radar information propagation 3008, as further described herein. In various non-limiting embodiments, the suspected radar events detected by exemplary mesh network node host device 3206, configured as a DFS master (e.g., a primary DFS master), the first one of the set 3204 of distributed agility agents 3208 can undertake radar information propagation 3008, and the second one of the set 3204 of distributed agility agents 3208, configured as a secondary DFS master can be validated according to inferences, algorithms, voting, and/or data fusion, etc., as further described herein, for example, regarding FIGS. 2, 13, 14, 24, 30-32, etc. It is noted that, as depicted in FIG. 33, an exemplary inference for validating a detected radar event comprises basing the conclusion that the detected radar event is valid on a probability exceeding a threshold (e.g., three of three radar sensing mesh nodes detecting suspected radar events within a predetermined period of time, such as a low numbered multiple of PRI after a first detection of a suspected radar event, etc.).

Figure 34:
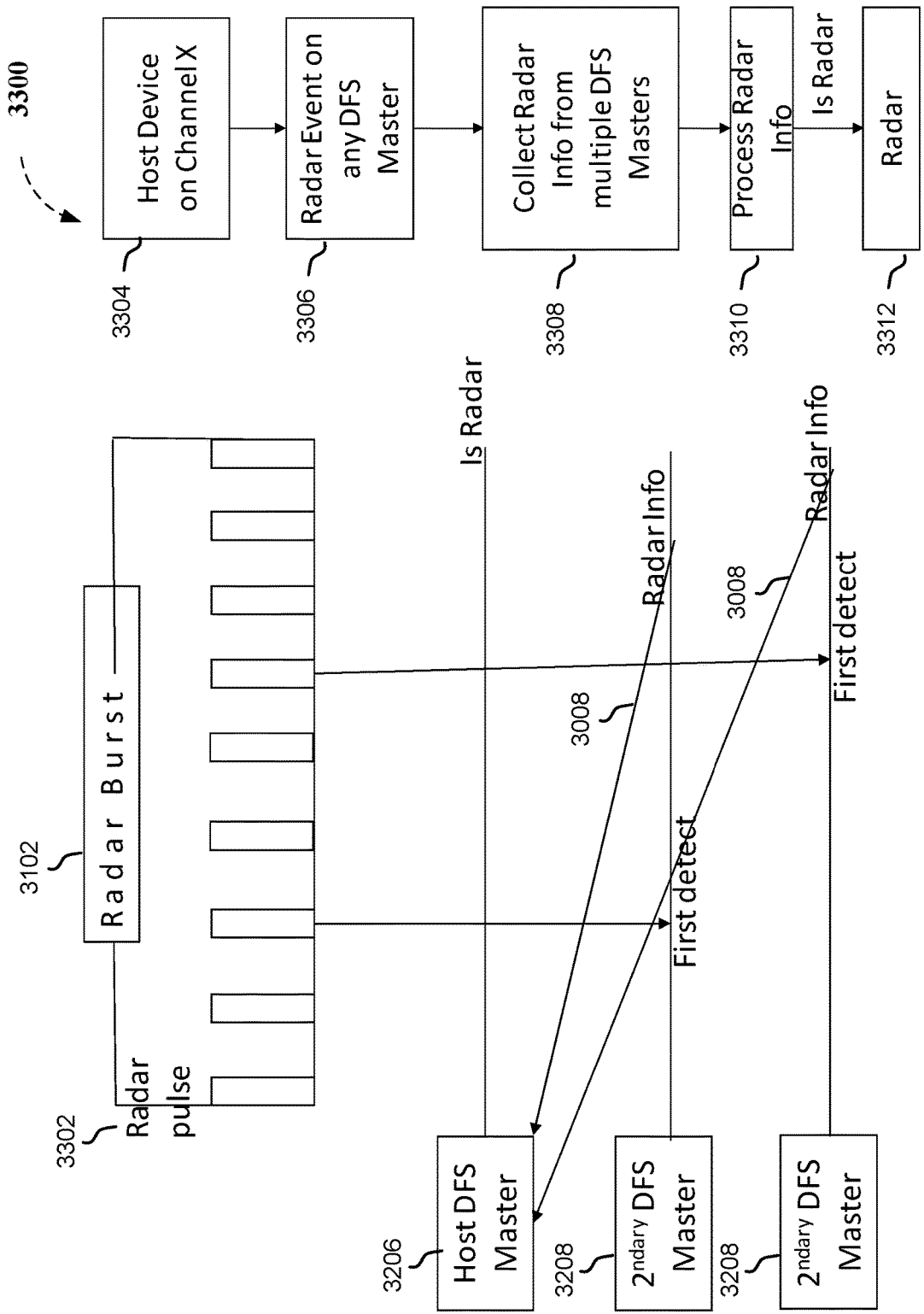
FIG. 34 depicts further non-limiting aspects of exemplary methods for reducing false detections and/or network downtime in exemplary mesh networks employing DFS channels.

Accordingly, at 3304, FIG. 33 depicts exemplary methods 3300 comprising a host device (e.g., exemplary mesh network node host device 3206, configured as a DFS master, such as a primary DFS master) of exemplary mesh network 3200 operating on channel X (e.g., communicating on and sensing of a DFS channel), as further described herein, for example, regarding FIGS. 2, 13, 14, 24, 30-32, etc. At 3306, exemplary methods 3300 can comprise any DFS master (e.g., a primary DFS master, a secondary DFS master, a multi-channel DFS master, a standalone DFS master, an agility agent 3208, whether embedded or distributed, etc.) detecting a suspected radar event, as further described herein. In contrast to FIG. 33, FIG. 34 depicts a first one of the set 3204 of distributed agility agents 3208 can undertake radar information propagation 3008 after first detecting a suspected radar event. In addition, exemplary methods 3300 can further comprise collecting radar information from multiple DFS masters (e.g., primary DFS masters, secondary DFS masters, multi-channel DFS masters, standalone DFS masters, agility agents 3208, whether embedded or distributed, etc.) at 3308, as further described herein. As described herein, radar information propagation 3008 can be undertaken in response to a call from exemplary mesh network node host device 3206, configured as a DFS master (e.g., a primary DFS master) based on its own detection of a suspected radar event and signaling thereof or based on the first one of the set 3204 of distributed agility agents 3208, configured as a secondary DFS master, detecting the third radar pulse 3302, and so on as described herein, for example, regarding FIGS. 2, 13, 14, 24, etc., and can be collected between exemplary mesh network 3200 mesh nodes, whether employing a cloud intelligence engine, or otherwise. Exemplary methods 3300 can further comprise, at 3310, processing the collected radar information to facilitate making a determination about the validity of one or more detected radar events, or lack thereof, among exemplary mesh network 3200 mesh nodes. As depicted in FIG. 33, an exemplary inference that validates the one or more detected radar events results in the determination that the detected radar event is valid, at 3312, can be based on a probability exceeding a threshold (e.g., three of three radar sensing mesh nodes detecting suspected radar events within a predetermined period of time, such as a low numbered multiple of PRI after a first detection of a suspected radar event, etc.).

FIG. 34 depicts further non-limiting aspects of exemplary methods 330 for reducing false detections and/or network downtime in exemplary mesh networks employing DFS channels. It can be understood that the non-limiting embodiments of FIG. 34 can represent a case where exemplary mesh network node host device 3206, configured as a DFS master (e.g., a primary DFS master) can be hidden, obstructed from radar 3102, and/or subjected to differing interference, as described above, regarding, FIG. 31, and FIGS. 19A-19C, which illustrate the hidden node or hidden radar problem (e.g., where a node or radar is hidden from view by topography, obstruction, distance or channel conditions, etc.). As with FIG. 33, FIG. 34 depicts portions of an exemplary mesh network 3200 comprising an exemplary mesh network node host device 3206, configured as a DFS master (e.g., a primary DFS master), and a set 3204 of distributed agility agents 3208, configured as secondary DFS masters, as described herein, for example, regarding FIGS. 2, 13, 14, 24, etc. FIG. 34 further depicts exemplary mesh network 3200 in the presence of a radar 3102 burst, comprising a series of radar pulses (e.g., radar pulses of a PRI). In a non-limiting aspect, FIG. 34 depicts exemplary mesh network node host device 3206, configured as a DFS master (e.g., a primary DFS master) failing to detect any radar pulse 3302 in the series of radar pulses of radar 3102 burst. Concurrently, FIG. 34 depicts a first one of the set 3204 of distributed agility agents 3208, configured as a secondary DFS master, detecting a third radar pulse 3302 in the series of radar pulses of radar 3102 burst, whereupon the first one of the set 3204 of distributed agility agents 3208 can undertake radar information propagation 3008, as further described herein. As described above, radar information propagation 3008 can be undertaken based on the first one of the set 3204 of distributed agility agents 3208, configured as a secondary DFS master, detecting the third radar pulse 3302, as described herein, for example, regarding FIGS. 2, 13, 14, 24, etc. FIG. 34 also depicts a second one of the set 3204 of distributed agility agents 3208, configured as a secondary DFS master, detecting a sixth radar pulse 3302 in the series of radar pulses of radar 3102 burst, whereupon the second one of the set 3204 of distributed agility agents 3208 can also undertake radar information propagation 3008, as further described herein. In various non-limiting embodiments, the suspected radar events detected by the first one of the set 3204 of distributed agility agents 3208 can undertake radar information propagation 3008 and the second one of the set 3204 of distributed agility agents 3208, configured as a secondary DFS master, can be validated according to inferences, algorithms, voting, and/or data fusion, etc., as further described herein, for example, regarding FIGS. 2, 13, 14, 24, 30-32, etc. It is noted that, as depicted in FIG. 34, an exemplary inference for validating a detected radar event comprises basing the conclusion that the detected radar event is valid on a probability (e.g., two of three radar sensing mesh nodes detecting suspected radar events within a predetermined period of time, such as a low numbered multiple of PRI after a first detection of a suspected radar event, etc.).

Accordingly, at 3304, FIG. 34 depicts exemplary methods 3300 comprising a host device (e.g., exemplary mesh network node host device 3206, configured as a DFS master, such as a primary DFS master) of exemplary mesh network 3200 operating on channel X (e.g., communicating on and sensing of a DFS channel), as further described herein, for example, regarding FIGS. 2, 13, 14, 24, 30-32, etc. At 3306, exemplary methods 3300 can comprise any DFS master (e.g., a primary DFS master, a secondary DFS master, a multi-channel DFS master, a standalone DFS master, an agility agent 3208, whether embedded or distributed, etc.) detecting a suspected radar event, as further described herein. In addition, exemplary methods 3300 can further comprise collecting radar information from multiple DFS masters (e.g., primary DFS masters, secondary DFS masters, multi-channel DFS masters, standalone DFS masters, agility agents 3208, whether embedded or distributed, etc.) at 3308, as further described herein. As described herein, radar information propagation 3008 can be undertaken based on the first one of the set 3204 of distributed agility agents 3208, configured as a secondary DFS master, detecting the third radar pulse 3302, and so on as described herein, for example, regarding FIGS. 2, 13, 14, 24, etc., and can be collected between exemplary mesh network 3200 mesh nodes, whether employing a cloud intelligence engine, or otherwise. Exemplary methods 3300 can further comprise, at 3310, processing the collected radar information to facilitate making a determination about the validity of one or more detected radar events, or lack thereof, among exemplary mesh network 3200 mesh nodes. As depicted in FIG. 34, an exemplary inference that validates the one or more detected radar events results in the determination that the detected radar event is valid, at 3312, can be based on a probability exceeding a threshold (e.g., two of three radar sensing mesh nodes detecting suspected radar events within a predetermined period of time, such as a low numbered multiple of PRI after a first detection of a suspected radar event, etc.).

Figure 35:
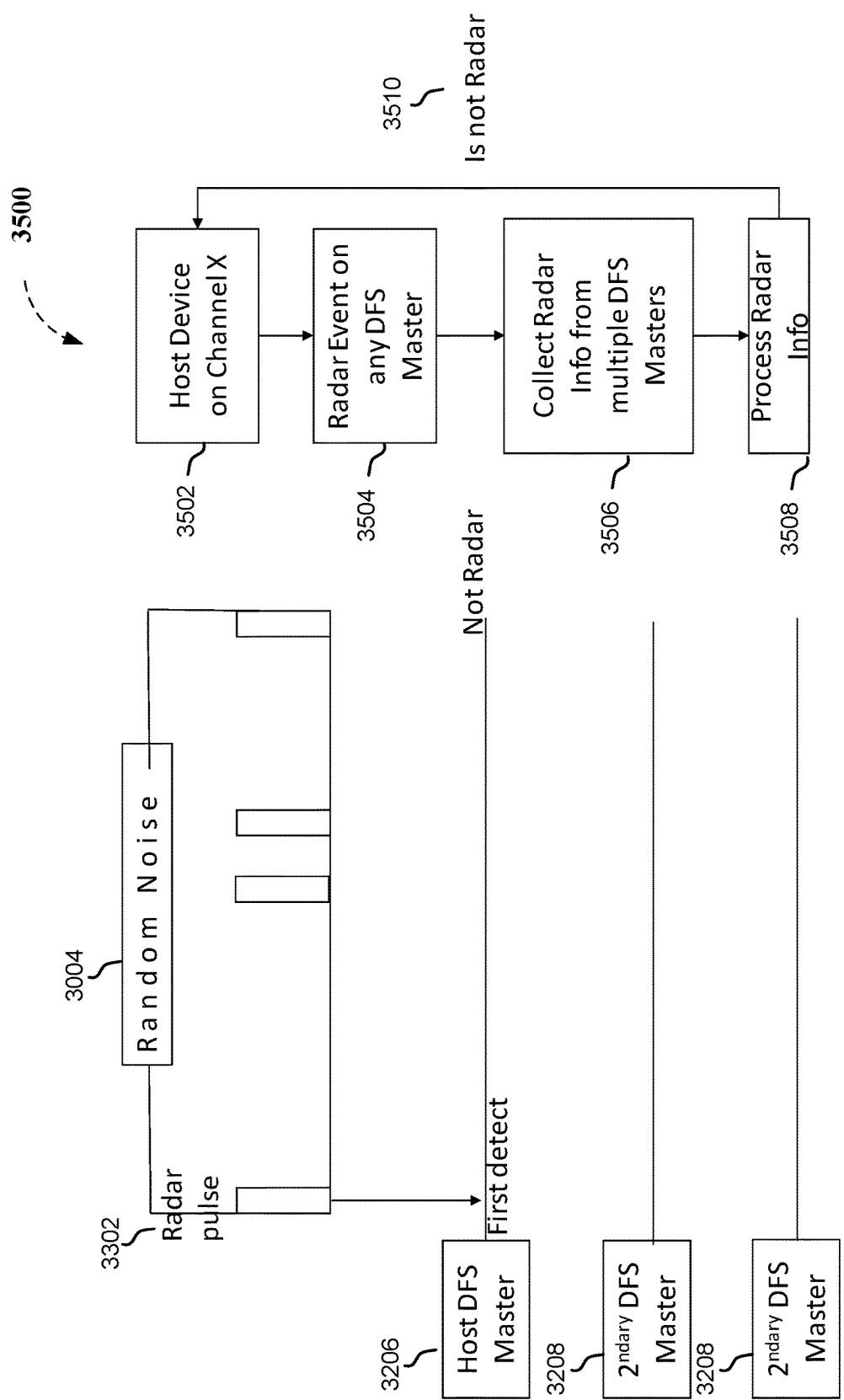
FIG. 35 depicts other exemplary methods for reducing false detections and/or network downtime in exemplary mesh networks employing DFS channels, according to various non-limiting aspects.

FIG. 35 depicts other exemplary methods 3500 for reducing false detections and/or network downtime in exemplary mesh networks employing DFS channels, according to various non-limiting aspects. FIG. 35 depicts portions of an exemplary mesh network 3200 comprising an exemplary mesh network node host device 3206, configured as a DFS master (e.g., a primary DFS master), and a set 3204 of distributed agility agents 3208, configured as secondary DFS masters, as described herein, for example, regarding FIGS. 2, 13, 14, 24, etc. FIG. 35 further depicts exemplary mesh network 3200 in the presence of sources of interference (e.g., random noise 3004, adjacent channel leakages and/or interference from other channels, etc.), which are not valid radar events, but which can be misdiagnosed as valid radar events (e.g., a false radar detection or false detect). As described above, random noise 3004 refers to any source of interference that can be misdiagnosed as a valid radar event, for example, at exemplary mesh network node host device 3206, or otherwise, including, but not limited to, noise, random, or otherwise, adjacent channel interference or leakages, fleeting, diminishing, weak and/or transient radar pulses, and so on. In a non-limiting aspect, FIG. 35 depicts exemplary mesh network node host device 3206, configured as a DFS master (e.g., a primary DFS master) detecting a first pulse which could appear as a radar pulse 3302 in a series of radar pulses a series of radar pulses (e.g., radar pulses of a PRI) of a radar 3102 burst, which as depicted in FIG. 35 is not present in the context of exemplary mesh network 3200. As further described herein, exemplary mesh network node host device 3206, configured as a DFS master (e.g., a primary DFS master) can make an independent determination that it has detected a suspected radar event, as described herein, for example, regarding FIGS. 2, 13, 14, 24, etc. Subsequently, FIG. 35 depicts a first one and a second one of the set 3204 of distributed agility agents 3208, configured as secondary DFS masters, not detecting any subsequent expected radar pulse 3302 in a series of radar pulses (e.g., radar pulses of a radar 3102 burst, which is not present in the context of exemplary mesh network 3200), whereupon the first one and the second one of the set 3204 of distributed agility agents 3208 does not undertake radar information propagation 3008, as further described herein. It is noted that lack of radar information propagation 3008 by one or more of the first one or the second one of the set 3204 of distributed agility agents 3208, configured as secondary DFS masters, as described herein, for example, regarding FIGS. 2, 13, 14, 24, etc., can be taken as an indication that the detected first pulse, which could appear as a radar pulse 3302 in a series of radar pulses a series of radar pulses (e.g., radar pulses of a PRI) of a radar 3102 burst, detected by exemplary mesh network node host device 3206, configured as a DFS master (e.g., a primary DFS master), independently or along with independent analysis of exemplary mesh network node host device 3206, configured as a DFS master (e.g., a primary DFS master), is an invalid detected radar event. In a non-limiting aspect, this determination of invalidity of the detected first pulse can be undertaken passively (e.g., by waiting for and noting lack of radar information propagation 3008 from one or more of the first one or the second one of the set 3204 of distributed agility agents 3208, configured as secondary DFS masters, on independent analysis of the detected first pulse, etc.) or actively (e.g., where radar information propagation 3008 can be undertaken in response to a call from exemplary mesh network node host device 3206, configured as a DFS master (e.g., a primary DFS master), where radar information propagation 3008 comprises a negative acknowledgement of the lack of radar on a DFS channel, etc.). In various non-limiting embodiments, the suspected radar event (e.g., the first detected pulse) detected by exemplary mesh network node host device 3206, configured as a DFS master (e.g., a primary DFS master) can be validated according to inferences, algorithms, voting, and/or data fusion, etc., as further described herein, for example, regarding FIGS. 2, 13, 14, 24, 30-32, etc. It is noted that, as depicted in FIG. 35, an exemplary inference for invalidating a detected radar event (e.g., the first detected pulse) comprises basing the conclusion that the detected radar event is invalid on a probability being below a threshold (e.g., one of three radar sensing mesh nodes detecting suspected radar events within a predetermined period of time, such as a low numbered multiple of PRI after a first detection of a suspected radar event, etc.).

Accordingly, at 3502, FIG. 35 depicts exemplary methods 3500 comprising a host device (e.g., exemplary mesh network node host device 3206, configured as a DFS master, such as a primary DFS master) of exemplary mesh network 3200 operating on channel X (e.g., communicating on and sensing of a DFS channel), as further described herein, for example, regarding FIGS. 2, 13, 14, 24, 30-32, etc. At 3504, exemplary methods 3500 can comprise any DFS master (e.g., a primary DFS master, a secondary DFS master, a multi-channel DFS master, a standalone DFS master, an agility agent 3208, whether embedded or distributed, etc.) detecting a suspected radar event, as further described herein. In addition, exemplary methods 3500 can further comprise collecting radar information from multiple DFS masters (e.g., primary DFS masters, secondary DFS masters, multi-channel DFS masters, standalone DFS masters, agility agents 3208, whether embedded or distributed, etc.) at 3506, as further described herein. As described herein, radar information propagation 3008 can be undertaken in response to a call from exemplary mesh network node host device 3206, configured as a DFS master (e.g., a primary DFS master) based on its own detection of a suspected radar event (e.g., the first detected pulse) and signaling thereof or based on another one of the first one or the second one of the set 3204 of distributed agility agents 3208, configured as a secondary DFS master, detecting a suspected radar event (e.g., the first detected pulse), and so on as described herein, for example, regarding FIGS. 2, 13, 14, 24, etc., and can be collected between exemplary mesh network 3200 mesh nodes, whether with a cloud intelligence engine, or otherwise. It is further noted that lack radar information propagation 3008 by other exemplary mesh network 3200 mesh nodes during a time frame of interest can be employed in an inference that no other of exemplary mesh network 3200 mesh nodes experienced a corroborating suspected radar event (e.g., a detected pulse) during the time frame of interest. Exemplary methods 3500 can further comprise, at 3508, processing the collected radar information, or lack thereof, to facilitate making a determination about the validity of one or more detected radar events, or lack thereof, among exemplary mesh network 3200 mesh nodes. As depicted in FIG. 35, an exemplary inference that invalidates a detected radar event (e.g., the first detected pulse) results in the determination that the detected radar event is invalid at 3510, based on a probability being below a threshold (e.g., one of three radar sensing mesh nodes detecting suspected radar events within a predetermined period of time, such as a low numbered multiple of PRI after a first detection of a suspected radar event, etc.).

Figure 36:
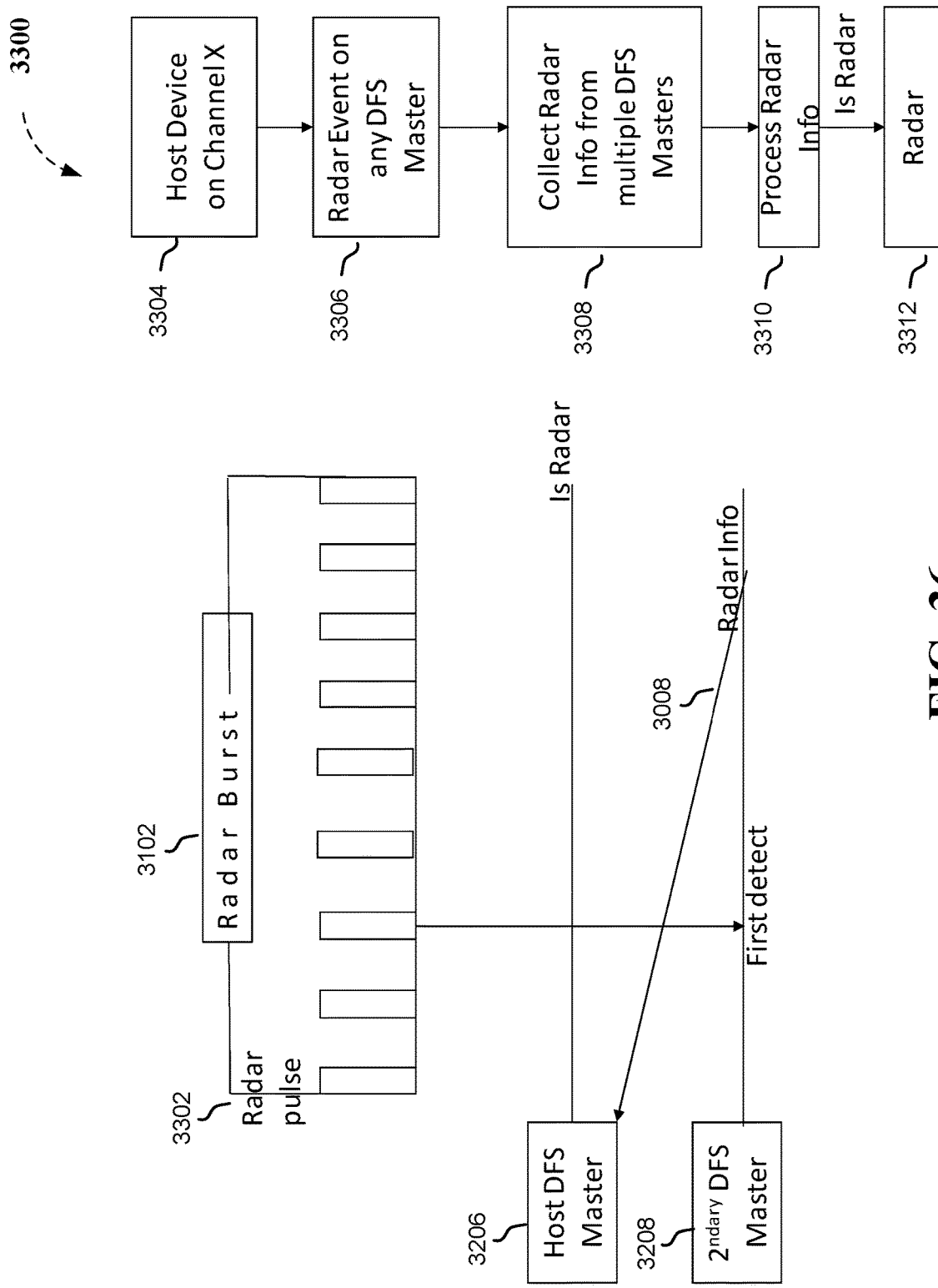
FIG. 36 depicts further non-limiting aspects of exemplary methods for reducing false detections and/or network downtime in exemplary mesh networks employing DFS channels.

FIG. 36 depicts further non-limiting aspects of exemplary methods 3300 for reducing false detections and/or network downtime in exemplary mesh networks employing DFS channels. FIG. 36 depicts exemplary methods 3300 for reducing false detections and/or network downtime in exemplary mesh networks employing DFS channels, according to various non-limiting aspects. FIG. 36 depicts portions of an exemplary mesh network 3200 comprising an exemplary mesh network node host device 3206, configured as a DFS master (e.g., a primary DFS master), and an exemplary secondary DFS master 3208, which can comprise an embedded or a distributed agility agent configured as a secondary DFS master, as described herein, for example, regarding FIGS. 2, 13, 14, 24, etc. FIG. 36 further depicts exemplary mesh network 3200 in the presence of a radar 3102 burst, comprising a series of radar pulses (e.g., radar pulses of a PRI). In a non-limiting aspect, FIG. 36 depicts exemplary secondary DFS master 3208 detecting a third radar pulse 3302 in the series of radar pulses of radar 3102 burst. As further described herein, exemplary secondary DFS master 3208, which can comprise an embedded or a distributed agility agent configured as a secondary DFS master, can make an independent determination that it has detected a suspected radar event, as described herein, for example, regarding FIGS. 2, 13, 14, 24, etc. Subsequently, FIG. 36 depicts a neither the exemplary mesh network node host device 3206, configured as a DFS master (e.g., a primary DFS master), nor the exemplary secondary DFS master 3208, detecting a subsequent radar pulse 3302 in the series of radar pulses of radar 3102 burst, the exemplary secondary DFS master 3208 undertaking radar information propagation 3008, as further described herein. It is noted that radar information propagation 3008 can be undertaken in response to a call from exemplary mesh network node host device 3206, configured as a DFS master (e.g., a primary DFS master) based on its own detection of a suspected radar event and signaling thereof (not shown) or based on the exemplary secondary DFS master 3208, detecting the third radar pulse 3302, as described herein, for example, regarding FIGS. 2, 13, 14, 24, etc. In various non-limiting embodiments, the suspected radar event detected by exemplary secondary DFS master 3208 can be validated according to inferences, algorithms, voting, and/or data fusion, etc., as further described herein, for example, regarding FIGS. 2, 13, 14, 24, 30-32, etc. It is noted that, as depicted in FIG. 36, an exemplary inference for validating a detected radar event comprises basing the conclusion that the detected radar event is valid on a probability exceeding a threshold (e.g., any of the radar sensing mesh nodes detecting suspected radar events having specified radar associated characteristics, etc.). It is noted that the instance depicted in FIG. 36 can be appropriate in particular instances of embodiments of operations of disclosed embodiments. As non-limiting examples, exemplary secondary DFS master 3208 can be associated with highly sensitive and accurate radar detection in DFS channels, regulatory information available, for example, via cloud intelligence engine may dictate a lower threshold or higher sensitivity for the operation in DFS channels in the presence of radar for particular geographic areas, particular times, special contexts, etc.

Accordingly, at 3304, FIG. 36 depicts exemplary methods 3300 comprising a host device (e.g., exemplary mesh network node host device 3206, configured as a DFS master, such as a primary DFS master) of exemplary mesh network 3200 operating on channel X (e.g., communicating on and sensing of a DFS channel), as further described herein, for example, regarding FIGS. 2, 13, 14, 24, 30-32, etc. At 3306, exemplary methods 3300 can comprise any DFS master (e.g., a primary DFS master, a secondary DFS master, a multi-channel DFS master, a standalone DFS master, an agility agent 3208, whether embedded or distributed, etc.) detecting a suspected radar event, as further described herein. In contrast to FIG. 33, FIG. 36 depicts that exemplary secondary DFS master 3208 can undertake radar information propagation 3008 after first detecting a suspected radar event. In addition, exemplary methods 3300 can further comprise collecting radar information from multiple DFS masters (e.g., primary DFS masters, secondary DFS masters, multi-channel DFS masters, standalone DFS masters, agility agents 3208, whether embedded or distributed, etc.) at 3308, as further described herein. As described herein, radar information propagation 3008 can be undertaken in response to call from exemplary mesh network node host device 3206, configured as a DFS master (e.g., a primary DFS master) based on its own detection of a suspected radar event and signaling thereof (not shown) or based on the exemplary secondary DFS master 3208, detecting the third radar pulse 3302, and so on as described herein, for example, regarding FIGS. 2, 13, 14, 24, etc., and can be collected between exemplary mesh network 3200 mesh nodes, whether employing a cloud intelligence engine, or otherwise. Exemplary methods 3300 can further comprise, at 3310, processing the collected radar information to facilitate making a determination about the validity of one or more detected radar events, or lack thereof, among exemplary mesh network 3200 mesh nodes. As depicted in FIG. 36, an exemplary inference that validates the one or more detected radar events results in the determination that the detected radar event is valid, at 3312, can be based on a probability exceeding a threshold (e.g., any of the radar sensing mesh nodes detecting suspected radar events having specified radar associated characteristics, etc.).

Figure 37:
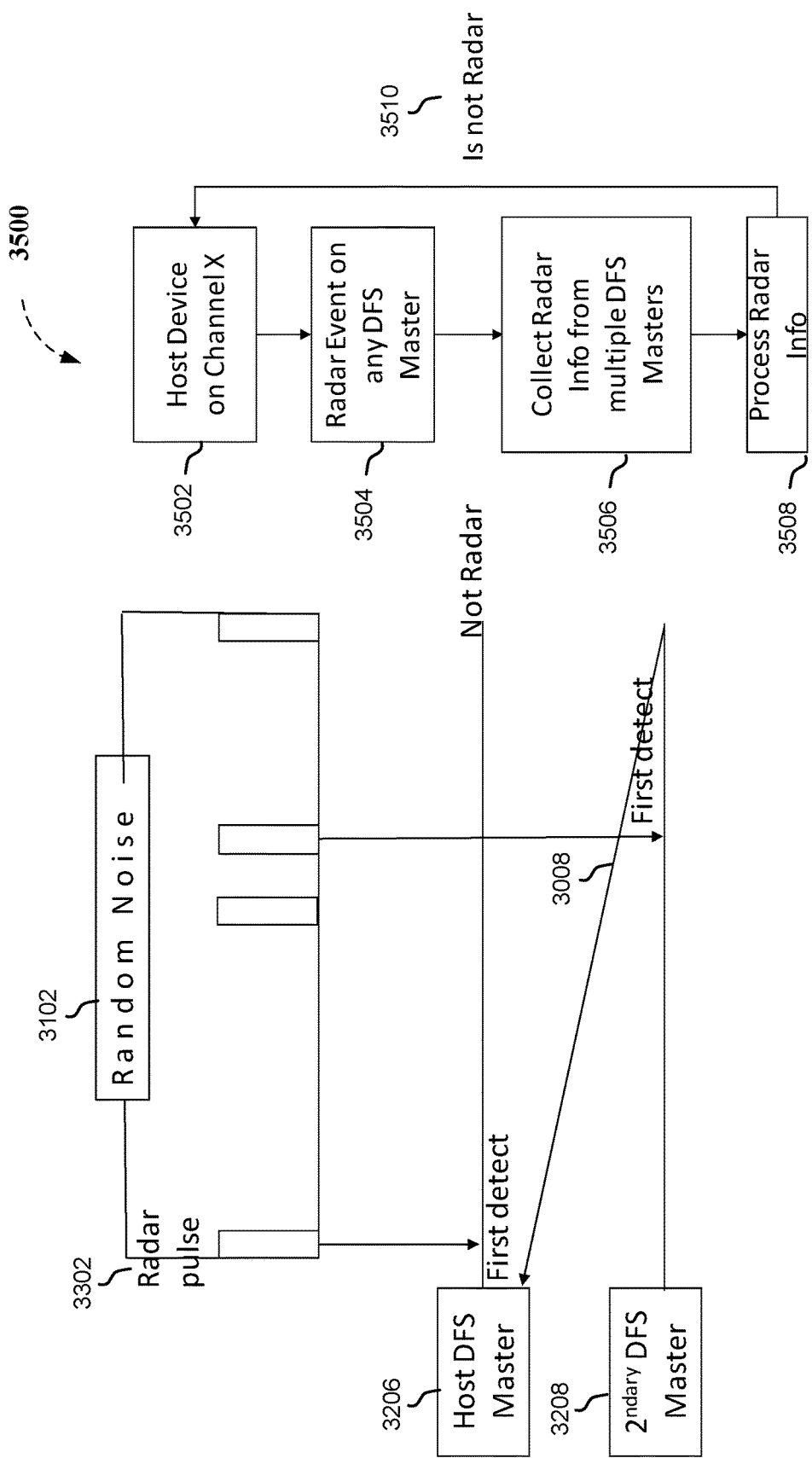
FIG. 37 depicts still further non-limiting aspects of exemplary methods for reducing false detections and/or network downtime in exemplary mesh networks employing DFS channels.

FIG. 37 depicts still further non-limiting aspects of exemplary methods 3500 for reducing false detections and/or network downtime in exemplary mesh networks employing DFS channels. FIG. 37 depicts portions of an exemplary mesh network 3200 comprising an exemplary mesh network node host device 3206, configured as a DFS master (e.g., a primary DFS master), and an exemplary secondary DFS master 3208, which can comprise an embedded or a distributed agility agent configured as a secondary DFS master, as described herein, for example, regarding FIGS. 2, 13, 14, 24, etc. FIG. 37 further depicts exemplary mesh network 3200 in the presence of sources of interference (e.g., random noise 3004, adjacent channel leakages and/or interference from other channels, etc.), which are not valid radar events, but which can be misdiagnosed as valid radar events (e.g., a false radar detection or false detect). As described above, random noise 3004 refers to any source of interference that can be misdiagnosed as a valid radar event, for example, at exemplary mesh network node host device 3206, or otherwise, including, but not limited to, noise, random, or otherwise, adjacent channel interference or leakages, fleeting, diminishing, weak and/or transient radar pulses, and so on. In a non-limiting aspect, FIG. 37 depicts exemplary mesh network node host device 3206, configured as a DFS master (e.g., a primary DFS master) detecting a first pulse which could appear as a radar pulse 3302 in a series of radar pulses a series of radar pulses (e.g., radar pulses of a PRI) of a radar 3102 burst, which as depicted in FIG. 37 is not present in the context of exemplary mesh network 3200. As further described herein, exemplary mesh network node host device 3206, configured as a DFS master (e.g., a primary DFS master) can make an independent determination that it has detected a suspected radar event, as described herein, for example, regarding FIGS. 2, 13, 14, 24, etc. Subsequently, FIG. 37 depicts exemplary secondary DFS master 3208 detecting a subsequent pulse which could appear as a radar pulse 3302 in a series of radar pulses a series of radar pulses (e.g., radar pulses of a radar 3102 burst, which is not present in the context of exemplary mesh network 3200), whereupon the exemplary secondary DFS master 3208 can undertake radar information propagation 3008, as further described herein. It is noted that radar information propagation 3008 by exemplary secondary DFS master 3208, as described herein, for example, regarding FIGS. 2, 13, 14, 24, etc., can include an independent preliminary determination or analysis of the detected pulse (e.g., voting) or associated information, which can be taken as an indication that the detected pulse at exemplary secondary DFS master 3208, which could appear as a radar pulse 3302 in a series of radar pulses a series of radar pulses (e.g., radar pulses of a PRI) of a radar 3102 burst, detected by exemplary secondary DFS master 3208, independently or along with independent analysis of exemplary mesh network node host device 3206, configured as a DFS master (e.g., a primary DFS master), is an invalid detected radar event. In addition, in a further non-limiting aspect, a determination of invalidity of the detected first pulse can be undertaken passively (e.g., by waiting for and noting lack of radar pulse 3302 in a series of radar pulses a series of radar pulses (e.g., radar pulses of a PRI) of a radar 3102 burst, noting lack of radar information propagation 3008 (not shown) from exemplary secondary DFS master 3208, based on independent analysis of the detected first pulse, etc.) or actively (e.g., where radar information propagation 3008 can be undertaken in response to a call from exemplary mesh network node host device 3206, configured as a DFS master (e.g., a primary DFS master), where radar information propagation 3008 comprises a negative acknowledgement of the lack of radar on a DFS channel, etc.). In various non-limiting embodiments, the suspected radar event (e.g., the first detected pulse) detected by exemplary mesh network node host device 3206, configured as a DFS master (e.g., a primary DFS master) can be invalidated according to inferences, algorithms, voting, and/or data fusion, etc., as further described herein, for example, regarding FIGS. 2, 13, 14, 24, 30-32, etc. It is noted that, as depicted in FIG. 37, an exemplary inference for invalidating a detected radar event (e.g., the first detected pulse) comprises basing the conclusion that the detected radar event is invalid on detected pulse characteristics not meeting a predetermined characteristic (e.g., no subsequently detected pulses within a multiple of PRI after a first detection of a suspected radar event, etc.) and/or voting.

Accordingly, at 3502, FIG. 37 depicts exemplary methods 3300 comprising a host device (e.g., exemplary mesh network node host device 3206, configured as a DFS master, such as a primary DFS master) of exemplary mesh network 3200 operating on channel X (e.g., communicating on and sensing of a DFS channel), as further described herein, for example, regarding FIGS. 2, 13, 14, 24, 30-32, etc. At 3504, exemplary methods 3500 can comprise any DFS master (e.g., a primary DFS master, a secondary DFS master, a multi-channel DFS master, a standalone DFS master, an agility agent 3208, whether embedded or distributed, etc.) detecting a suspected radar event, as further described herein. In addition, exemplary methods 3500 can further comprise collecting radar information from multiple DFS masters (e.g., primary DFS masters, secondary DFS masters, multi-channel DFS masters, standalone DFS masters, agility agents 3208, whether embedded or distributed, etc.) at 3506, as further described herein. As described herein, radar information propagation 3008 can be undertaken in response to a call from exemplary mesh network node host device 3206, configured as a DFS master (e.g., a primary DFS master) based on its own detection of a suspected radar event (e.g., the first detected pulse) and signaling thereof or based on exemplary secondary DFS master 3208 detecting a suspected radar event (e.g., a detected pulse), and so on as described herein, for example, regarding FIGS. 2, 13, 14, 24, etc., and can be collected between exemplary mesh network 3200 mesh nodes, whether with a cloud intelligence engine, or otherwise. It is further noted that lack radar information propagation 3008 by other exemplary mesh network 3200 mesh nodes during a time frame of interest can be employed in an inference that no other of exemplary mesh network 3200 mesh nodes experienced a corroborating suspected radar event (e.g., a detected pulse) during the time frame of interest. Exemplary methods 3500 can further comprise, at 3508, processing the collected radar information, or lack thereof, to facilitate making a determination about the validity of one or more detected radar events, or lack thereof, among exemplary mesh network 3200 mesh nodes. As depicted in FIG. 37, an exemplary inference that invalidates a detected radar event (e.g., the first detected pulse) results in the determination that the detected radar event is invalid at 3510, based on detected pulse characteristics not meeting a predetermined characteristic (e.g., no subsequently detected pulses within a multiple of PRI after a first detection of a suspected radar event, etc.) and/or voting.

As described herein, conventional DFS masters can signal devices in a DFS network (typically client devices) by transmitting a DFS beacon, which is taken as an indication that the channel is clear of radar. Although the access point can detect radar, wireless clients typically cannot. Because of this, wireless clients must first passively scan DFS channels to detect whether a beacon is present on that particular channel. During a passive scan, the client device switches through channels and listens for a beacon transmitted at regular intervals by the access point on an available channel. Once a beacon is detected, the client is allowed to actively scan on that channel. Conventionally, when a DFS master detects radar in that channel, the DFS master no longer transmits the beacon, and all client devices upon not sensing the beacon within a prescribed time must vacate the channel immediately and remain off that channel for 30 minutes. For clients associated with the DFS master network, additional information in the beacons (e.g., the channel switch announcement) can trigger a rapid and controlled evacuation of the channel.

However, in an exemplary mesh network (e.g., exemplary mesh network 3200) comprising multiple exemplary mesh network node host devices 3206, configured as a DFS master (e.g., a primary DFS master), and/or agility agents 3208, configured as secondary DFS masters, awaiting DFS channel switching based on passive scanning for beacons transmitted at regular intervals would result in unduly slow transition of the mesh network devices to new or available DFS channels and/or needless network downtime. In addition, with each of multiple conventional mesh network node host devices, configured as a DFS master, independently discovering (e.g., detecting) radar in DFS channels (and possibly incorrectly or incompletely), the transition of the mesh network to a new DFS can be slow as each DFS master independently discovers radar, suspends its beacon, client devices vacate the DFS channel, move to another DFS channel, passively scan, and so on, or unnecessary (e.g., as a result of false detections).

As a non-limiting example, as described above, when radar is detected in a conventional DFS network, a device has to vacate a DFS channel (e.g., subject to the 200 ms limit data transmission limit) and stay off the channel for 30 minutes. As a result, the device cannot use the DFS channel during that duration for anything other than its beacon (e.g., data transmission is not allowed). In a mesh network, there are multiple mesh network nodes. As a result, it may not be possible for all nodes in the mesh network to vacate a DFS channel within 200 ms, especially if the mesh network topology is large and/or complex. However, because beacon transmission may still be allowed on the DFS channel to be vacated for up to a specified amount of time (e.g., 10 seconds), various non-limiting embodiments as described herein can employ beacon signals encoded with information to facilitate identifying to other mesh network nodes at least one of the radar event and/or next or new channel on which to begin transmitting.

As a result, rather than being limited to 200 ms of data transmission with which to communicate next channel or other information to the various nodes of the mesh network, exemplary embodiments as described herein can facilitate propagating such information for up to a specified amount of time (e.g., 10 seconds). Accordingly, in further non-limiting embodiments, exemplary mesh nodes as described herein can be configured to indicate one or more of a radar event (e.g., a suspected radar event, a validated detected radar event, etc.), e.g., radar information propagation 3008, and a next or a new channel information in its beacon so that all neighbor exemplary mesh nodes in the exemplary mesh network can receive indication of the radar event (e.g., a suspected radar event, a validated detected radar event, etc.) and next or a new channel information. Thus, in a non-limiting aspect, exemplary mesh nodes as described herein can be configured to indicate the radar event (e.g., a suspected radar event, a validated detected radar event, etc.) and the next or a new channel information to facilitate efficiently moving the mesh network to another channel when radar is detected (e.g., a suspected radar event, a validated detected radar event, etc.). In a further non-limiting aspect, exemplary mesh nodes in the exemplary mesh network can be further configured to update its own beacon with the same information (e.g., the radar event and next or new channel information) in response to receiving the radar event (e.g., a suspected radar event, a validated detected radar event, etc.) and next or new channel information from neighbor exemplary mesh node(s) beacon(s), to facilitate rapidly propagating the information throughout the exemplary mesh network. In yet another non-limiting aspect, exemplary mesh nodes as described herein can be configured to encode a countdown tick or timestamp inside the beacon, such that each successive beacon reduces the countdown tick or timestamp as the information propagates across the exemplary mesh nodes. As a result, exemplary mesh nodes of the exemplary mesh network can be further configured to coordinate their channel switch to the next or new channel based on the next or new channel information on the countdown tick or timestamp when the countdown tick or timestamp reaches the final value. In other non-limiting implementations as described herein, exemplary mesh nodes as described herein can be configured to indicate one or more of a radar event (e.g., a suspected radar event, a validated detected radar event, etc.), e.g., radar information propagation 3008, and a next or a new channel information to neighbor exemplary mesh nodes using other mechanisms such as data, action, management frames, or using out of band mechanisms such as another radio, Bluetooth, or via an exemplary cloud intelligence engine.

As a non-limiting example, for a radar event detected (e.g., a suspected radar event, a validated detected radar event, etc.) by an exemplary mesh node of the exemplary mesh network, the radar event can be propagated by exemplary mesh nodes configured as described herein throughout the exemplary mesh network, via encoding such information or other information in the exemplary mesh node's beacon signal (e.g., in the beacon signal's information element). In contrast, conventional node's beacon signal's information element for channel switching is used only for its immediately connected devices (e.g., client devices of an access point). For example, if conventional access point is to switch to a different DFS channel, the access point would indicate in the beacon signal a channel switch announcement (CSA), which would communicate to connected devices what the next or new channel is in the CSA. However, conventionally, there is no mechanism to communicate such channel switch information to other access points (e.g., nodes in a mesh network), except using data frames, which are subject to the 200 ms limit on data transmission after the radar event, which can be subject to a packet storm, where every mesh node is sending such data frames (e.g., channel switch information propagation via data frames) to every other node in the mesh network.

Accordingly, in various embodiments, exemplary mesh nodes as described herein can be configured to indicate one or more of a radar event (e.g., a suspected radar event, a validated detected radar event, etc.), e.g., radar information propagation 3008, and a next or a new channel information in its beacon so that all neighbor exemplary mesh nodes in the exemplary mesh network can receive indication of the radar event (e.g., a suspected radar event, a validated detected radar event, etc.) and next or a new channel information. As a result, for a radar event (e.g., a suspected radar event, a validated detected radar event, etc.) detected by an exemplary mesh node of an exemplary mesh network, according to various non-limiting embodiments as described herein, the radar event (e.g., a suspected radar event, a validated detected radar event, etc.) can be propagated throughout the mesh network, via encoding such information or other information in the exemplary mesh node's beacon signal (e.g., in the beacon signal's information element), which beacons are synchronized for all exemplary mesh nodes participating in the mesh network. Accordingly, each exemplary mesh node receiving the information encoded beacon can be configured to indicate one or more of the radar event (e.g., a suspected radar event, a validated detected radar event, etc.) and the next or new channel information in its beacon so that all neighbor exemplary mesh nodes receives the radar event (e.g., a suspected radar event, a validated detected radar event, etc.) and the next or new channel information. Exemplary mesh nodes, as described herein, can be configured to update its own beacon with the same information, upon receiving the radar event (e.g., a suspected radar event, a validated detected radar event, etc.) and the next or new channel information from its neighbor exemplary mesh nodes' beacons.

In other disclosed embodiments, various non-limiting implementations, as described herein, can be configured to employ out of band mechanisms such as another radio, Bluetooth, LTE, etc., or via an exemplary cloud intelligence engine, for radar information propagation 3008, or to propagate other information, such as channel switch information, and can be configured to employ other mechanisms, e.g., data, action, management frames, to facilitate propagation radar and/or other information, for example, as described herein regarding FIGS. 2, 21-24, 30-32, etc. As a non-limiting example, for another device that is not part of the exemplary mesh network (e.g., a peer to peer device, etc.), which may or may not have the ability to detect radar, is operating on the same DFS channel, various non-limiting embodiments, as described herein, can employ out of band mechanisms such as another radio, Bluetooth, LTE, etc., or via an exemplary cloud intelligence engine, to facilitate radar information propagation or propagation of other information, such as channel switch information, and can employ other mechanisms, e.g., data, action, management frames, to facilitate radar information propagation 3008 and/or propagation of other information. Accordingly, various non-limiting embodiments as described herein, can facilitate radar information propagation and propagation of other information, such as channel switch information beyond devices participating in the exemplary mesh network, e.g., peer to peer devices, etc. For example, traditionally, when an access point leaves a DFS channel, a peer to peer device operating on the same DFS channel must vacate the DFS channel. Without the benefit of radar information propagation 3008 and channel switch information propagation, as described herein, the peer to peer device must scan the next DFS channel for one minute prior to switching to it.

Figure 38:
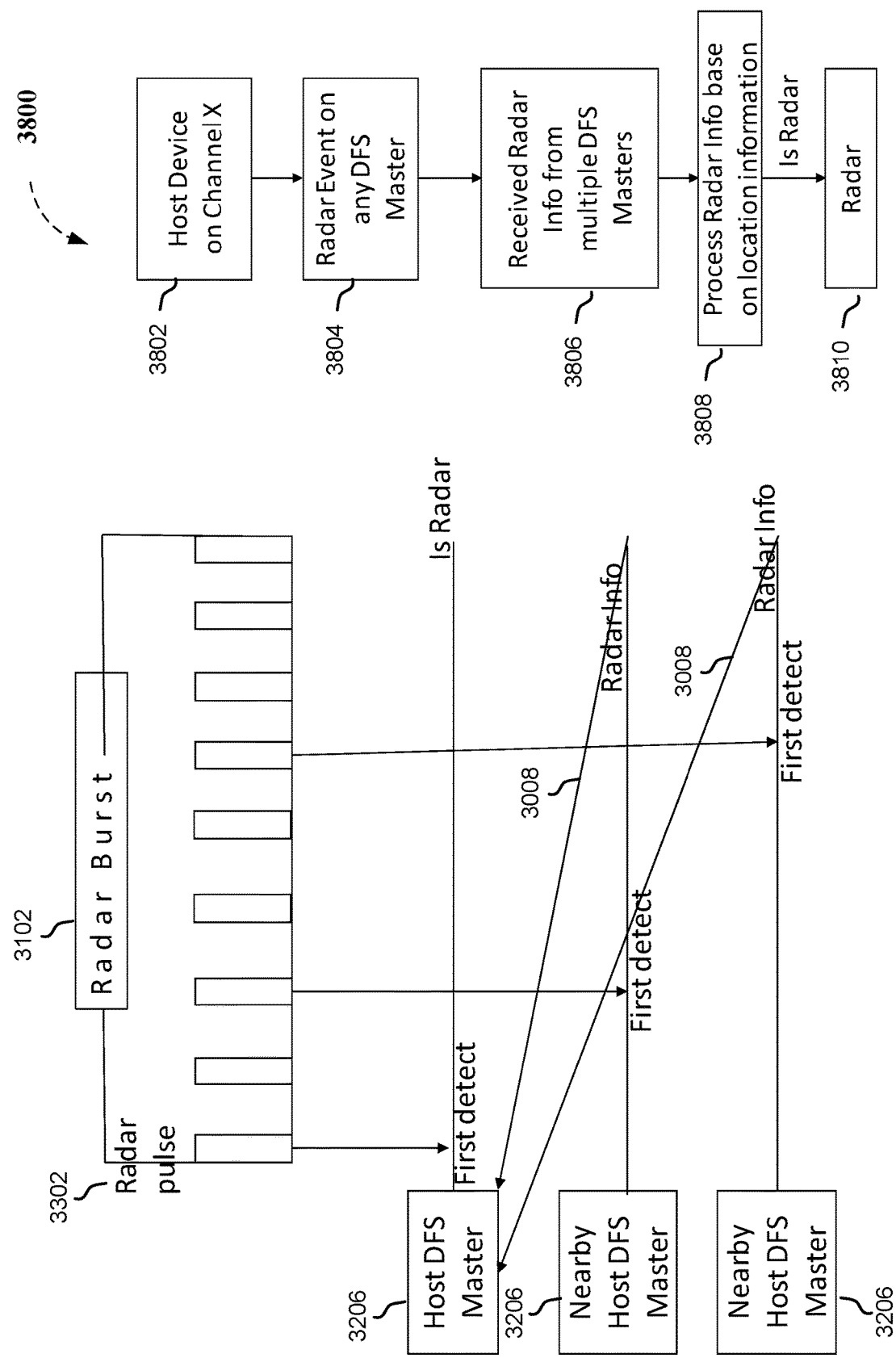
FIG. 38 depicts still other exemplary methods for reducing false detections and/or network downtime in exemplary mesh networks employing DFS channels, according to various non-limiting aspects.

FIG. 38 depicts exemplary methods 3800 for reducing false detections and/or network downtime in exemplary mesh networks 3000, 3100, 3200, etc. employing DFS channels, according to various non-limiting aspects. FIG. 38 depicts portions of an exemplary mesh network 3200 comprising an exemplary mesh network node host device 3206, configured as a DFS master (e.g., a multi-channel DFS master), and a set of nearby or neighbor exemplary mesh network node host devices 3206, configured as DFS masters, as described herein, for example, regarding FIGS. 2, 13, 14, 24, 30-32, etc. FIG. 38 further depicts exemplary mesh network 3200 in the presence of a radar 3102 burst, comprising a series of radar pulses (e.g., radar pulses of a PRI). In a non-limiting aspect, FIG. 38 depicts exemplary mesh network node host devices 3206, configured as DFS masters (e.g., multi-channel DFS masters), detecting a first radar pulse 3302 in the series of radar pulses of radar 3102 burst. As further described herein, exemplary mesh network node host device 3206, configured as a DFS master can make an independent determination that it has detected a suspected radar event, as described herein, for example, regarding FIGS. 2, 13, 14, 24, etc. Subsequently, FIG. 38 depicts a first one of the set of exemplary mesh network node host devices 3206, configured as DFS masters (e.g., multi-channel DFS masters), detecting a third radar pulse 3302 in the series of radar pulses of radar 3102 burst, whereupon the first one of the set of exemplary mesh network node host devices 3206, configured as DFS masters (e.g., multi-channel DFS masters), can undertake radar information propagation 3008, as further described herein. It is noted that radar information propagation 3008 can be undertaken in response to a call from exemplary mesh network node host device 3206, configured as a DFS master (e.g., a primary DFS master) based on its own detection of a suspected radar event and signaling thereof or based on the first one or the second one of the set of exemplary mesh network node host devices 3206, configured as DFS masters (e.g., multi-channel DFS masters), detecting the third radar pulse 3302 or the sixth radar pulse 3302, as described herein, for example, regarding FIGS. 2, 13, 14, 24, etc. Accordingly, FIG. 38 depicts a second one of the set of exemplary mesh network node host devices 3206, configured as DFS masters (e.g., multi-channel DFS masters), detecting a sixth radar pulse 3302 in the series of radar pulses of radar 3102 burst, whereupon the second one of the set 3204 of distributed agility agents 3208 can also undertake radar information propagation 3008, as further described herein. In various non-limiting embodiments, the suspected radar events detected by exemplary mesh network node host device 3206, configured as a DFS master (e.g., a multi-channel DFS master), the first one of the set of exemplary mesh network node host devices 3206, configured as DFS masters (e.g., multi-channel DFS masters), and the second one of the set of exemplary mesh network node host devices 3206, configured as DFS masters (e.g., multi-channel DFS masters) can be validated according to inferences, algorithms, voting, and/or data fusion, etc., as further described herein, for example, regarding FIGS. 2, 13, 14, 24, 30-32, etc. It is noted that, as depicted in FIG. 38, an exemplary inference for validating a detected radar event comprises basing the conclusion that the detected radar event is valid on a probability exceeding a threshold (e.g., three of three radar sensing mesh nodes detecting suspected radar events within a predetermined period of time, such as a low numbered multiple of PRI after a first detection of a suspected radar event, etc.) and based on selecting such radar sensing mesh nodes based on location information associated with the set of nearby or neighboring exemplary mesh network node host devices 3206, configured as DFS masters.

Accordingly, at 3802, FIG. 38 depicts exemplary methods 3800 comprising a host device (e.g., exemplary mesh network node host device 3206, configured as a DFS master, such as a multi-channel DFS master) of exemplary mesh network 3200 operating on channel X (e.g., communicating on and sensing of a DFS channel), as further described herein, for example, regarding FIGS. 2, 13, 14, 24, 30-32, etc. At 3804, exemplary methods 3800 can comprise any DFS master (e.g., a primary DFS master, a secondary DFS master, a multi-channel DFS master, a standalone DFS master, an agility agent 3208, whether embedded or distributed, etc.) detecting a suspected radar event, as further described herein. In addition, exemplary methods 3800 can further comprise collecting or receiving radar information from multiple DFS masters (e.g., primary DFS masters, secondary DFS masters, multi-channel DFS masters, standalone DFS masters, agility agents 3208, whether embedded or distributed, etc.) at 3806, as further described herein. As described herein, radar information propagation 3008 can be undertaken in response to a call from exemplary mesh network node host device 3206, configured as a DFS master (e.g., a primary DFS master, a multi-channel DFS master, etc.) based on its own detection of a suspected radar event and signaling thereof or based on the first one or the second one of the set of nearby or neighboring exemplary mesh network node host devices 3206, configured as DFS masters (e.g., secondary DFS master, multi-channel DFS masters), detecting the third radar pulse 3302 or the sixth radar pulse, respectively, and so on as described herein, for example, regarding FIGS. 2, 13, 14, 24, etc., and can be collected between exemplary mesh network 3200 mesh nodes, whether employing a cloud intelligence engine, or otherwise. Exemplary methods 3800 can further comprise, at 3808, processing the collected radar information to facilitate making a determination about the validity of one or more detected radar events, or lack thereof, among exemplary mesh network 3200 mesh nodes, based on location information associated with the set of nearby or neighboring exemplary mesh network node host devices 3206, configured as DFS masters. As depicted in FIG. 38, an exemplary inference that validates the one or more detected radar events results in the determination that the detected radar event is valid, at 3810, can be based on a probability exceeding a threshold (e.g., three of three radar sensing mesh nodes detecting suspected radar events within a predetermined period of time, such as a low numbered multiple of PRI after a first detection of a suspected radar event, etc.) and based on selecting such radar sensing mesh nodes based on location information associated with the set of nearby or neighboring exemplary mesh network node host devices 3206, configured as DFS masters.

Figure 39:
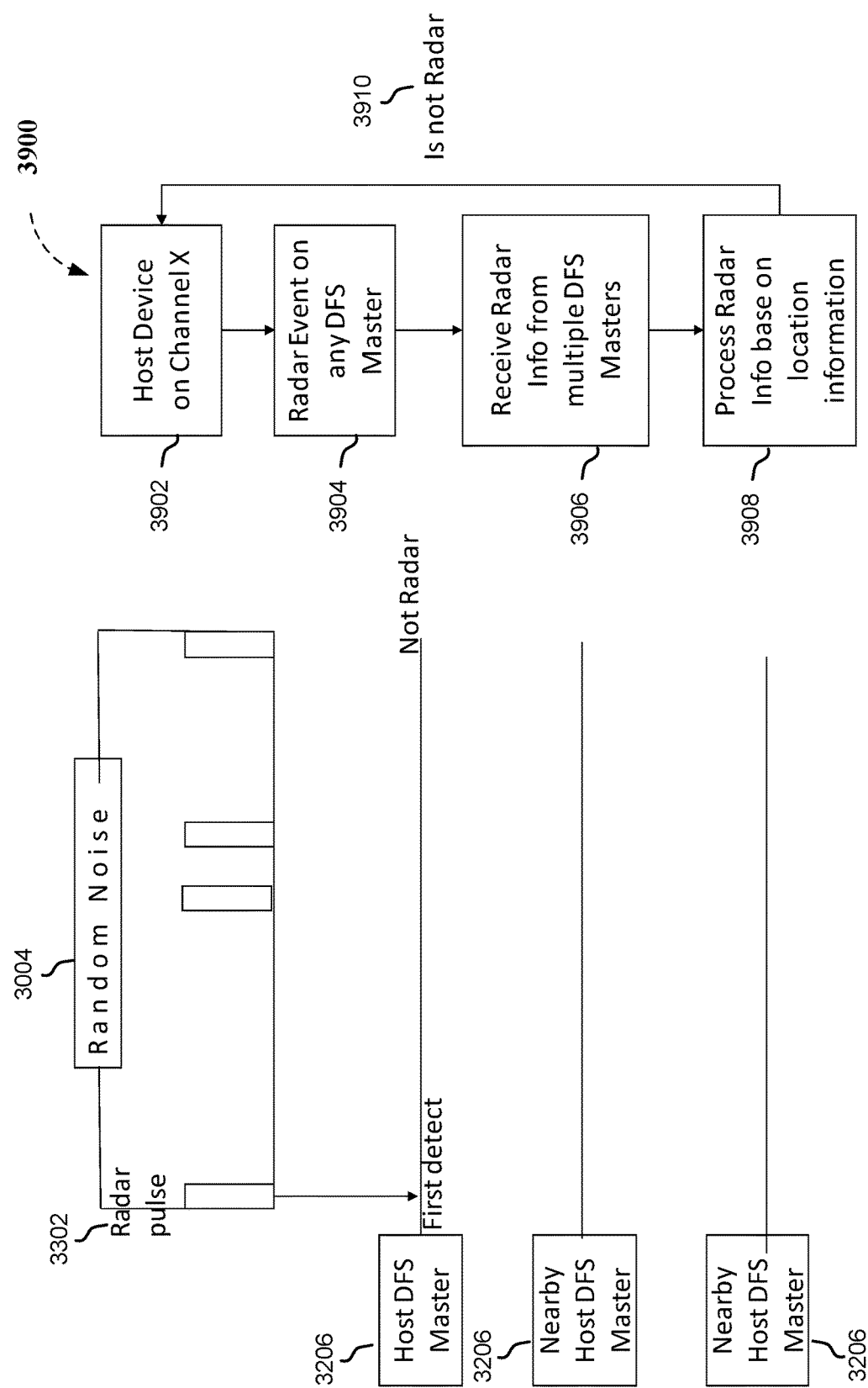
FIG. 39 depicts still further non-limiting aspects of exemplary methods for reducing false detections and/or network downtime in exemplary mesh networks employing DFS channels.

FIG. 39 depicts still further non-limiting aspects of exemplary methods 3900 for reducing false detections and/or network downtime in exemplary mesh networks 3000, 3100, 3200, etc. employing DFS channels. FIG. 39 depicts portions of an exemplary mesh network 3200 comprising an exemplary mesh network node host device 3206, configured as a DFS master (e.g., a multi-channel DFS master), and a set of nearby or neighbor exemplary mesh network node host devices 3206, configured as DFS masters, as described herein, for example, regarding FIGS. 2, 13, 14, 24, 30-32, etc. FIG. 39 further depicts exemplary mesh network 3200 in the presence of sources of interference (e.g., random noise 3004, adjacent channel leakages and/or interference from other channels, etc.), which are not valid radar events, but which can be misdiagnosed as valid radar events (e.g., a false radar detection or false detect). As described above, random noise 3004 refers to any source of interference that can be misdiagnosed as a valid radar event, for example, at exemplary mesh network node host device 3206, or otherwise, including, but not limited to, noise, random, or otherwise, adjacent channel interference or leakages, fleeting, diminishing, weak and/or transient radar pulses, and so on. In a non-limiting aspect, FIG. 39 depicts exemplary mesh network node host devices 3206, configured as DFS masters (e.g., multi-channel DFS masters), detecting a first pulse which could appear as a radar pulse 3302 in a series of radar pulses a series of radar pulses (e.g., radar pulses of a PRI) of a radar 3102 burst, which as depicted in FIG. 39 is not present in the context of exemplary mesh network 3200. As further described herein, exemplary mesh network node host device 3206, configured as a DFS master can make an independent determination that it has detected a suspected radar event, as described herein, for example, regarding FIGS. 2, 13, 14, 24, etc. Subsequently, FIG. 39 depicts a first one and a second one of the set of exemplary nearby or neighboring mesh network node host devices 3206, configured as DFS masters (e.g., multi-channel DFS masters), not detecting any subsequent expected radar pulse 3302 in a series of radar pulses (e.g., radar pulses of a radar 3102 burst, which is not present in the context of exemplary mesh network 3200), whereupon the first one and the second one of the set of nearby or neighbor exemplary mesh network node host devices 3206, configured as DFS masters, does not undertake radar information propagation 3008, as further described herein. It is noted that lack of radar information propagation 3008 by one or more of the first one or the second one of the set of nearby or neighbor exemplary mesh network node host devices 3206, configured as DFS masters, as described herein, for example, regarding FIGS. 2, 13, 14, 24, etc., can be taken as an indication that the detected first pulse, which could appear as a radar pulse 3302 in a series of radar pulses a series of radar pulses (e.g., radar pulses of a PRI) of a radar 3102 burst, detected by exemplary mesh network node host device 3206, configured as a DFS master (e.g., a primary DFS master), independently or along with independent analysis of exemplary mesh network node host device 3206, configured as a DFS master (e.g., a primary DFS master), is an invalid detected radar event. In a non-limiting aspect, this determination of invalidity of the detected first pulse can be undertaken passively (e.g., by waiting for and noting lack of radar information propagation 3008 from one or more of the first one or the second one of the set of nearby or neighbor exemplary mesh network node host devices 3206, configured as DFS masters, on independent analysis of the detected first pulse, etc.) or actively (e.g., where radar information propagation 3008 can be undertaken in response to a call from exemplary mesh network node host device 3206, configured as a DFS master (e.g., a multi-channel DFS master), where radar information propagation 3008 comprises a negative acknowledgement of the lack of radar on a DFS channel, etc.). In various non-limiting embodiments, the suspected radar event (e.g., the first detected pulse) detected by exemplary mesh network node host device 3206, configured as a DFS master (e.g., multi-channel DFS masters) can be validated according to inferences, algorithms, voting, and/or data fusion, etc., as further described herein, for example, regarding FIGS. 2, 13, 14, 24, 30-32, etc. It is noted that, as depicted in FIG. 39, an exemplary inference for invalidating a detected radar event (e.g., the first detected pulse) comprises basing the conclusion that the detected radar event is invalid on a probability being below a threshold (e.g., one of three radar sensing mesh nodes detecting suspected radar events within a predetermined period of time, such as a low numbered multiple of PRI after a first detection of a suspected radar event, etc.) and based on selecting such radar sensing mesh nodes based on location information associated with the set of nearby or neighboring exemplary mesh network node host devices 3206, configured as DFS masters.

Accordingly, at 3902, FIG. 39 depicts exemplary methods 3300 comprising a host device (e.g., exemplary mesh network node host device 3206, configured as a DFS master, such as a multi-channel DFS master) of exemplary mesh network 3200 operating on channel X (e.g., communicating on and sensing of a DFS channel), as further described herein, for example, regarding FIGS. 2, 13, 14, 24, 30-32, etc. At 3904, exemplary methods 3900 can comprise any DFS master (e.g., a primary DFS master, a secondary DFS master, a multi-channel DFS master, a standalone DFS master, an agility agent 3208, whether embedded or distributed, etc.) detecting a suspected radar event, as further described herein. In addition, exemplary methods 3900 can further comprise collecting or receiving radar information from multiple DFS masters (e.g., primary DFS masters, secondary DFS masters, multi-channel DFS masters, standalone DFS masters, agility agents 3208, whether embedded or distributed, etc.) at 3906, as further described herein. As described herein, radar information propagation 3008 can be undertaken in response to a call from exemplary mesh network node host device 3206, configured as a DFS master (e.g., a primary DFS master) based on its own detection of a suspected radar event (e.g., the first detected pulse, a multi-channel DFS master, etc.) and signaling thereof or based on another one of the first one or the second one of the set of nearby or neighbor exemplary mesh network node host devices 3206, configured as DFS masters, detecting a suspected radar event (e.g., the first detected pulse), and so on as described herein, for example, regarding FIGS. 2, 13, 14, 24, etc., and can be collected between exemplary mesh network 3200 mesh nodes, whether with a cloud intelligence engine, or otherwise. It is further noted that lack radar information propagation 3008 by other exemplary mesh network 3200 mesh nodes during a time frame of interest can be employed in an inference that no other of exemplary mesh network 3200 mesh nodes experienced a corroborating suspected radar event (e.g., a detected pulse) during the time frame of interest. Exemplary methods 3900 can further comprise, at 3908, processing the collected radar information, or lack thereof, to facilitate making a determination about the validity of one or more detected radar events, or lack thereof, among exemplary mesh network 3200 mesh nodes, based on location information associated with the set of nearby or neighboring exemplary mesh network node host devices 3206, configured as DFS masters. As depicted in FIG. 39, an exemplary inference that invalidates a detected radar event (e.g., the first detected pulse) results in the determination that the detected radar event is invalid at 3910, can be based on a probability being below a threshold (e.g., one of three radar sensing mesh nodes detecting suspected radar events within a predetermined period of time, such as a low numbered multiple of PRI after a first detection of a suspected radar event, etc.) and based on selecting such radar sensing mesh nodes based on location information associated with the set of nearby or neighboring exemplary mesh network node host devices 3206, configured as DFS masters.

Accordingly, in a non-limiting aspect, an exemplary mesh network node (e.g., exemplary mesh network node host device 3206, etc.) can be configured to call upon or signal its nearby or neighboring exemplary mesh network nodes to assist in the radar detection, based on the exemplary mesh network node (e.g., exemplary mesh network node host device 3206, etc.) detection of a suspected radar event. As a non-limiting example, in response to receiving the call or signal to assist on the radar detection, one or more nearby or neighboring exemplary mesh network nodes can be configured to temporarily suspend its transmissions (e.g., temporarily suspend its transmissions on one or more DFS channels, etc.), increase its receiver gain to facilitate focusing on radar detection, and/or send out an exemplary clear-to-send (CTS) frame to silent one or more DFS channels of interest, for example, as further described herein. In addition, exemplary mesh network nodes (e.g., exemplary mesh network node host devices 3206, etc.) can be further configured to vote on whether the radar signal, which is the subject of the suspected radar event, is a real radar 3104, radar 3102 (e.g., an actual radar source, capable of resulting in a validated and/or detected radar event).

As a non-limiting aspect, in further non-limiting embodiments of exemplary mesh networks 3000, 3100, 3200, etc. associated with a centrally or singularly managed or controlled network employing DFS channels (e.g., such as an enterprise or other network comprising a controller that controls multiple access points, other multi-node networks comprising a combination of wired or wireless segments, whether having central management or control, or otherwise, etc.), employing a CTS frame may not be necessary or desirable. For instance, an exemplary radar detector (e.g., a primary DFS master, a secondary DFS master, a multi-channel DFS master, a standalone DFS master, an agility agent 3208, whether embedded or distributed, etc.) that detects a suspected radar signal can be configured to be wired or wirelessly connected to the enterprise network and can be further configured to send a signal over the centrally or singularly managed or controlled network employing DFS channels network to ask one or more other routers/access points or any other mesh node in the mesh network (e.g., itself, and/or via any other device associated with the mesh network, etc.) to silence, without having to send out a CTS frame (e.g., via an out of band method such as via a secondary radio like 2.4 GHz WLAN, via wired network segments, via a direct ethernet frame, etc.), to facilitate propagation of the message/signal to mesh nodes in exemplary mesh networks employing DFS channels without generating a signal on the one or more DFS channels. As a result, in a non-limiting aspect, exemplary embodiments, as described herein, can be configured to send a packet or data that signals nearby or neighboring devices on the same network, for which such nearby or neighboring devices can also be configured to turn off their transmitter for a predetermined period of time, request neighbor devices on the same network to assist in radar detection on the DFS channel, etc.

In a further non-limiting example, consider an exemplary router employing DFS detection, (e.g., comprising or being associated with a primary DFS master, a secondary DFS master, a multi-channel DFS master, a standalone DFS master, an agility agent 3208, whether embedded or distributed, etc.), as described herein, for example, regarding FIGS. 2, 13, 14, 20, 24, 30-32, etc. In a non-limiting aspect, instead of blocking or silencing all DFS channels and only listening in response to a suspected radar event, exemplary router having DFS detection can be configured to be directed, e.g., via agility agents, to facilitate focusing on listening on the same DFS channel having the suspected radar signal, to create redundant radar event information, and so on, as described herein, for example, regarding FIGS. 2, 13, 14, 20, 24, 30-42, etc. Accordingly, in further non-limiting embodiments of the disclosed subject matter, redundant radar event information (e.g., radar information propagation 3008) can be propagated throughout exemplary networks, to facilitate further reducing instances of false radar detection, and/or resultant network downtime.

In yet another non-limiting example, assuming a plurality of exemplary devices on an exemplary network employing DFS detection (e.g., comprising or being associated with a primary DFS master, a secondary DFS master, a multi-channel DFS master, a standalone DFS master, an agility agent 3208, whether embedded or distributed, etc.), as described herein, for example, regarding FIGS. 2, 13, 14, 20, 24, 30-32, etc., various embodiments can employ inference and algorithms employing this redundant radar event information, to facilitate further reducing instances of false radar detection. For instance, as described above, in an exemplary mesh network of five mesh nodes, where each mesh node comprises or is associated with an exemplary DFS detector (e.g., comprising or being associated with a primary DFS master, a secondary DFS master, a multi-channel DFS master, a standalone DFS master, an agility agent 3208, whether embedded or distributed, etc.), if the mesh center node DFS detector senses a suspected radar event, and the other four mesh node DFS detectors do not, various non-limiting embodiments can infer that the suspected radar event sensed by the center mesh node DFS detector is not a valid radar event. Conversely, in an exemplary mesh network of five mesh nodes, where each mesh node comprises an exemplary DFS detector (e.g., comprising or being associated with a primary DFS master, a secondary DFS master, a multi-channel DFS master, a standalone DFS master, an agility agent 3208, whether embedded or distributed, etc.), if the center mesh node DFS detector senses a suspected radar event, and one or more of the other four DFS detectors senses a suspected radar event as well, various non-limiting embodiments can infer that the suspected radar event sensed by the center mesh node DFS detector is a valid radar event. Accordingly, as further described herein, for example, regarding FIGS. 2, 13, 14, 20, 24, 30-42, etc., by exploiting knowledge of location, distance, and proximity, of other mesh nodes in the exemplary mesh network, various embodiments as described herein, can further ensure that spurious interference (e.g., noise) on the DFS channel is not mistaken for an real radar signal, thus further reducing the probability of false detections and/or resultant network downtime.

Moreover, by employing radar information propagation 3008 (or lack thereof, by a particular exemplary mesh node) and information regarding device location, radar and channel availability (e.g., whitelists, blacklists, etc.), voting, accuracy, history, etc. available in exemplary networks (e.g., exemplary mesh networks), as described herein, further derivative information regarding radar detection effectiveness (e.g., node trust information) can be generated and/or employed by various embodiments herein, e.g., via a cloud intelligence engine, or otherwise, to facilitate employing inference and/or algorithms to discriminate between random noise 3004 and radar 3102 to facilitate reducing false detections and/or network downtime in exemplary networks exemplary networks (e.g., exemplary mesh networks) employing DFS channels, as described herein. As a non-limiting example, consider portions of an exemplary mesh network 3200 comprising an exemplary mesh network node host device 3206, configured as a DFS master (e.g., a multi-channel DFS master), and a set of nearby or neighbor exemplary mesh network node host devices 3206, configured as DFS masters, as described herein, for example, regarding FIGS. 2, 13, 14, 24, 30-32, etc. As a non-limiting example, if a particular nearby or neighbor exemplary mesh network node host device 3206, configured as a DFS master, (or other device) has a voting history (e.g., stored, analyze, etc., via a cloud intelligence engine, etc.) that is consistently antithetical with the results of radar information propagation 3008, voting, validating and/or invalidating suspected radar events, then, a trust metric for that exemplary mesh network node host device 3206 (or other device) can be deprecated, updated, and/or otherwise annotated, such that inferences and/or algorithms employing radar information propagation 3008 from that exemplary mesh network node host device 3206 (or other device) can be taken into account to facilitate reducing false detections and/or network downtime, improving the quality of radar detection in exemplary networks employing channels and/or exemplary network response to valid radar signals.

Figure 40:
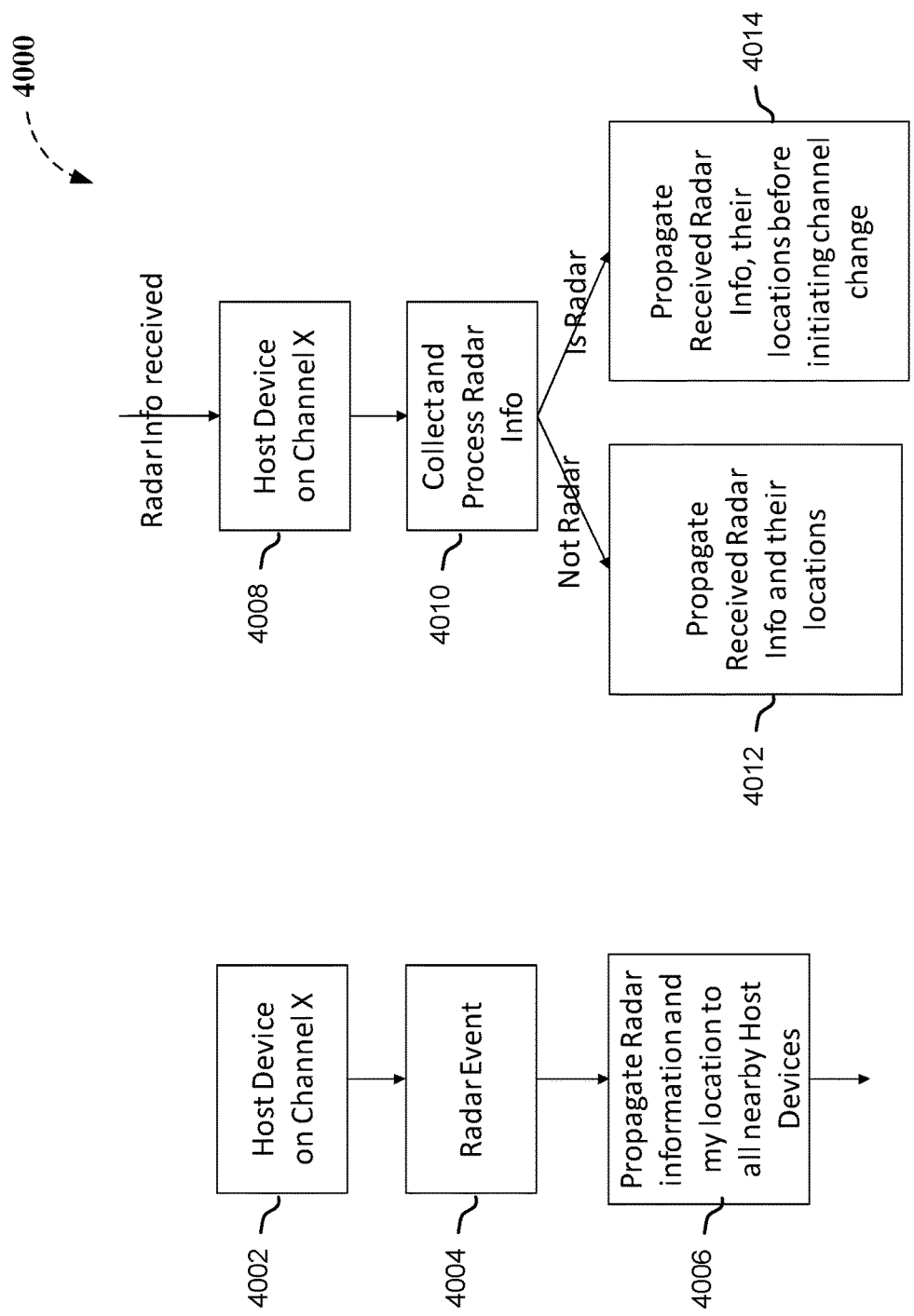
FIG. 40 depicts other exemplary methods for reducing false detections and/or network downtime, based on propagating radar and location information, in exemplary mesh networks employing DFS channels, according to various non-limiting aspects.

FIG. 40 depicts other exemplary methods 4000 for reducing false detections and/or network downtime, based on propagating radar and location information, in exemplary mesh networks 3000, 3100, 3200, etc. employing DFS channels, according to various non-limiting aspects. Accordingly, at 4002, FIG. 40 depicts exemplary methods 4000 comprising an exemplary host device (e.g., exemplary mesh network node host device 3206, configured as a DFS master, such as a multi-channel DFS master) of an exemplary mesh network (e.g., exemplary mesh network 3200) operating on channel X (e.g., communicating on and sensing of a DFS channel), as further described herein, for example, regarding FIGS. 2, 13, 14, 24, 30-39, etc. At 4004, exemplary methods 4000 can comprise exemplary host device (e.g., exemplary mesh network node host device 3206, configured as a DFS master, such as a multi-channel DFS master) detecting a suspected radar event, as further described herein. In addition, radar information propagation 3008 including location information can be undertaken in response to an exemplary host device (e.g., exemplary mesh network node host device 3206, configured as a DFS master, such as a multi-channel DFS master) detection of the suspected radar event and/or signaling thereof, as described herein, for example, regarding FIGS. 2, 13, 14, 24, 30-39, etc., which can be distributed among exemplary mesh network 3200 mesh nodes, whether employing a cloud intelligence engine, or otherwise.

In another non-limiting embodiment of exemplary methods 4000 for reducing false detections and/or network downtime, based on propagating radar and location information, in exemplary mesh networks 3000, 3100, 3200, etc. employing DFS channels, exemplary methods 4000 can comprise, at 4008, receiving radar information propagation 3008, including location information, at an exemplary host device (e.g., exemplary mesh network node host device 3206, configured as a DFS master, such as a multi-channel DFS master) of an exemplary mesh network (e.g., exemplary mesh network 3200) operating on channel X (e.g., communicating on and sensing of a DFS channel), as further described herein, for example, regarding FIGS. 2, 13, 14, 24, 30-39, etc.

In addition, exemplary methods 4000 can further comprise collecting or receiving further radar information from one or more multiple DFS masters (e.g., primary DFS masters, secondary DFS masters, multi-channel DFS masters, standalone DFS masters, agility agents 3208, whether embedded or distributed, etc.) at 4010, as further described herein. As described herein, radar information propagation 3008 can be undertaken in response to a call from an exemplary host device (e.g., exemplary mesh network node host device 3206, configured as a DFS master, such as a multi-channel DFS master) detection of the suspected radar event based on its own detection of a suspected radar event and signaling thereof or based on one or more of a set of nearby or neighboring exemplary mesh network node host devices 3206, configured as DFS masters (e.g., multi-channel DFS masters), detecting the same or a subsequent radar pulse 3302, and so on as described herein, for example, regarding FIGS. 2, 13, 14, 24, etc., and can be collected between exemplary mesh network 3200 mesh nodes, whether employing a cloud intelligence engine, or otherwise. Accordingly, exemplary methods 4000 can further comprise, at 4010, processing the collected radar information to facilitate making a determination about the validity of one or more detected radar events, or lack thereof, among exemplary mesh network 3200 mesh nodes, based on location information associated with the set of nearby or neighboring exemplary mesh network node host devices 3206, e.g., configured as DFS masters, etc.

As described above, as depicted in FIG. 40, an exemplary inference that invalidates a detected radar event (e.g., a first detected pulse in an exemplary mesh network employing DFS detection, as described herein) results in the determination that the detected radar event is invalid (e.g., is Not Radar), can be based on a probability being below a threshold (e.g., one of three radar sensing mesh nodes detecting suspected radar events within a predetermined period of time, such as a low numbered multiple of PRI after a first detection of a suspected radar event, etc.) and based on selecting such radar sensing mesh nodes based on location information associated with the set of nearby or neighboring exemplary mesh network node host devices 3206, configured as DFS masters. As a result, exemplary methods 4000 can further comprise, at 4012, radar information propagation 3008, including location information, e.g., via one or more exemplary mesh network node host device 3206, configured as a DFS master, etc., which can be undertaken as a result of invalidating the suspected radar event, e.g., via an exemplary host device (e.g., exemplary mesh network node host devices 3206, configured as DFS masters, such as multi-channel DFS masters), via a cloud intelligence engine, or otherwise.

As further described above, as depicted in FIG. 40, an exemplary inference that validates the one or more detected radar events results in the determination that the detected radar event is valid (e.g., Is Radar), can be based on a probability exceeding a threshold (e.g., three of three radar sensing mesh nodes detecting suspected radar events within a predetermined period of time, such as a low numbered multiple of PRI after a first detection of a suspected radar event, etc.) and based on selecting such radar sensing mesh nodes based on location information associated with the set of nearby or neighboring exemplary mesh network node host devices 3206, configured as DFS masters. As a result, exemplary methods 4000 can further comprise, at 4012, radar information propagation 3008, including location information, e.g., via one or more exemplary mesh network node host devices 3206, configured as DFS masters, etc., which can be undertaken as a result of invalidating the suspected radar event, e.g., via an exemplary host device (e.g., exemplary mesh network node host devices 3206, configured as DFS masters, such as multi-channel DFS masters), via a cloud intelligence engine, or otherwise. In addition, exemplary methods 4000 can further comprise, at 4012, initiating DFS channel change (e.g., after radar information propagation 3008, including location information), for example, via an encoded beacon signal, propagated via one or more exemplary mesh network node host devices 3206, configured as DFS masters, via other mechanisms such as data, action, management frames, or using out of band mechanisms such as another radio, Bluetooth, and/or via an exemplary cloud intelligence engine, etc., as further described above.

Figure 41:
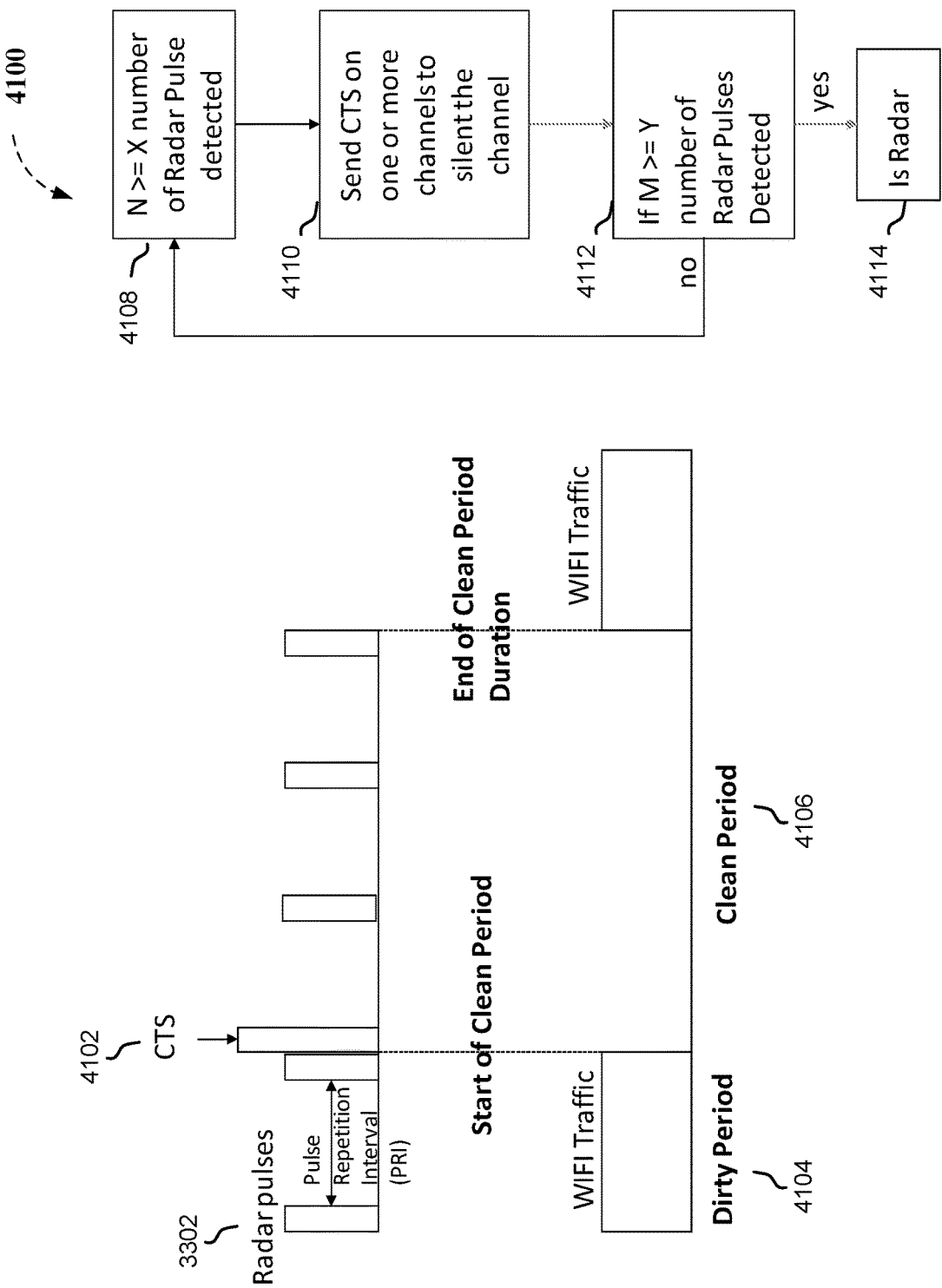
FIG. 41 depicts still other exemplary methods for reducing false detections and/or network downtime, based on employing a control, management, and/or data frame, in exemplary mesh networks employing DFS channels, according to various non-limiting aspects.

FIG. 41 depicts still other exemplary methods 4100 for reducing false detections and/or network downtime, based on employing a control, management, and/or data frame, in exemplary mesh networks 3000, 3100, 3200, etc., employing DFS channels, according to various non-limiting aspects. In further non-limiting embodiments of an exemplary mesh network node host device 3206, configured as a DFS master (e.g., a multi-channel DFS master), a set of nearby or neighbor exemplary mesh network node host devices 3206, configured as DFS masters, as described herein, for example, regarding FIGS. 2, 13, 14, 24, 30-32, etc. for an exemplary DFS master (e.g., a primary DFS master, a secondary DFS master, a multi-channel DFS master, a standalone DFS master, an agility agent 3208, whether embedded or distributed, etc.) detecting a suspected radar event (e.g., detecting a number N of radar pulses 3302 greater than or equal to a predetermined number X of radar pulses 3302), the exemplary DFS master can be configured to transmit an exemplary control, management, and/or data frame, e.g., an exemplary CTS frame 4102, etc. on one or more DFS channels to facilitate silencing the one or more DFS channels. In a further non-limiting aspect, an exemplary DFS master, after it transmits exemplary control, management, and/or data frame, e.g., an exemplary CTS frame 4102, etc., on one or more DFS channels, and can be further configured to continue to sense for a radar 3102 signal, as further described herein. Whereas in exemplary mesh networks 3000, 3100, 3200, etc. associated with the controlled network employing DFS channels (e.g., an enterprise network comprising a controller that controls multiple access points, etc.), employing a control, management, and/or data frame, e.g., an exemplary CTS frame 4102, etc., on one or more DFS channels may not be necessary or desirable, as described above, an exemplary radar detector (e.g., a primary DFS master, a secondary DFS master, a multi-channel DFS master, a standalone DFS master, an agility agent 3208, whether embedded or distributed, etc.) associated with an uncontrolled network employing DFS channels that detects a suspected radar event (e.g., detecting a number N of radar pulses 3302 greater than or equal to a predetermined number X of radar pulses 3302) can also be configured to be wired or wirelessly connected to the network and can be further configured to send a signal over the enterprise network to ask one or more other routers/access points or any other mesh node in the mesh network to silence, without having to send out a CTS frame 4102 (e.g., an out of band method, a direct ethernet frame, etc.). However, in the instance of non-limiting embodiments of uncontrolled exemplary mesh networks, comprising exemplary mesh network node host device 3206, configured as a DFS master (e.g., a multi-channel DFS master), a set of nearby or neighbor exemplary mesh network node host devices 3206, configured as DFS masters, as described herein, for example, regarding FIGS. 2, 13, 14, 24, 30-32, etc., and so on, the exemplary DFS master (e.g., a primary DFS master, a secondary DFS master, a multi-channel DFS master, a standalone DFS master, an agility agent 3208, whether embedded or distributed, etc.) can be configured to transmit an exemplary control, management, and/or data frame, e.g., an exemplary CTS frame 4102, etc., on one or more DFS channels to facilitate silencing the one or more DFS channels (e.g., silence transmitters on one or more DFS channels of nearby or neighboring nodes to terminate or to hold transmissions on the one or more DFS channels, etc.), for example, upon detecting a suspected radar event (e.g., detecting a number N of radar pulses 3302 greater than or equal to a predetermined number X of radar pulses 3302), as further described herein. In a further non-limiting aspect, exemplary embodiments of exemplary mesh network mesh nodes can be configured to terminate or to hold its transmissions on the one or more DFS channels upon receipt of the exemplary control, management, and/or data frame, e.g., an exemplary CTS frame 4102, etc., for example, while a suspected radar event (e.g., indicated by detection of a number N of radar pulses 3302 greater than or equal to a predetermined number X of radar pulses 3302) is validated or invalidated.

As a non-limiting example, FIG. 41 depicts an exemplary Wi-Fi communications period in which exemplary mesh networks 3000, 3100, 3200, etc., comprising an exemplary mesh network node host device 3206, configured as a DFS master (e.g., a multi-channel DFS master), and a set of nearby or neighbor exemplary mesh network node host devices 3206, configured as DFS masters, as described herein, for example, regarding FIGS. 2, 13, 14, 24, 30-32, etc., and or other network devices are communicating wirelessly while employing one or more DFS channels. The communications period depicted in FIG. 41 comprises a dirty period 4104 comprising Wi-Fi traffic, followed by a clean period 4106, as a result of terminating or holding transmissions on the one or more DFS channels upon receipt of the exemplary control, management, and/or data frame, e.g., an exemplary CTS frame 4102, etc., for example, while the suspected radar event (e.g., indicated by detection of a number N of radar pulses 3302 greater than or equal to a predetermined number X of radar pulses 3302) is validated or invalidated. Presuming that the suspected radar event (e.g., indicated by detection of a number N of radar pulses 3302 greater than or equal to a predetermined number X of radar pulses 3302) is invalidated (e.g., by failing to detect a number M of radar pulses 3302 greater than or equal to a second predetermined number Y of radar pulses 3302, within a predetermined timeframe, etc.), FIG. 41 further depicts resumption of Wi-Fi traffic following expiration of the clean period 4106.

For example, as further described herein, on a DFS channel, whenever there is an indication of a suspected radar event (e.g., detecting a number N of radar pulses 3302 greater than or equal to a predetermined number X of radar pulses 3302), an exemplary DFS master does not have initial understanding of whether the suspected radar event (e.g., detecting a number N of radar pulses 3302 greater than or equal to a predetermined number X of radar pulses 3302) is real, or whether it is a false detection (e.g., by failing to detect a number M of radar pulses 3302 greater than or equal to a second predetermined number Y of radar pulses 3302, within a predetermined timeframe, etc.), as a result of various sources of interference (e.g., random noise 3004, adjacent channel leakages and/or interference from other channels, etc.). Accordingly, whenever there is indication of a suspected radar event (e.g., detecting a number N of radar pulses 3302 greater than or equal to a predetermined number X of radar pulses 3302) at an exemplary DFS master, exemplary DFS master can be configured to transmit (e.g., broadcast or otherwise) an exemplary control, management, and/or data frame, e.g., a silence frame or packet, an exemplary CTS frame 4102, etc., on one or more DFS channels to facilitate silencing network transmissions on the one or more DFS channels, for a predetermined time, e.g., two radar pulses 3302 (e.g., radar pulses 3032 of a PRI), for example, as depicted in FIG. 41. As a result of silencing the one or more DFS channels, any further indications of radar 3102 or subsequent indications of a suspected radar event (e.g., detecting a number M of radar pulses 3302 greater than or equal to a second predetermined number Y of radar pulses 3302, within a predetermined timeframe, etc.), on the exemplary DFS master, another exemplary DFS master, or on any other radar detector associated with exemplary mesh networks 3000, 3100, 3200, etc., the suspected radar event can be validated or invalidated during the silent or clean period 4106, without unnecessary interference on the one or more DFS channels.

In a non-limiting aspect, an exemplary control, management, and/or data frame, e.g., an exemplary CTS frame 4102, etc., can be configured (e.g., generated and transmitted, etc.) between two successive radar pulses 3302 (e.g., generated and transmitted less than about 1 ms after initial sensing indication of the suspected radar event and of duration less than PRI), such that it can be received by other radar detectors in the exemplary mesh network before next expected radar pulse (e.g., based on the initial detection of the suspected radar event and the PRI). In another non-limiting example, one or more DFS channels can be silenced in response to receiving exemplary control, management, and/or data frame, e.g., an exemplary CTS frame 4102, etc., to facilitate one or more of the other radar detectors in the exemplary mesh network having sufficient time after receiving the exemplary control, management, and/or data frame, e.g., an exemplary CTS frame 4102, etc., to receive the next expected, successive radar pulse 3302 (if it is to occur) without interference on the one or more DFS channels.

In the non-limiting example, regarding FIG. 41 having five successive radar pulses 3302 (e.g., radar pulses 3302 of a PRI), exemplary non-limiting embodiments can be configured to, upon detection of the first radar pulse 3302 of the five radar pulses 3302, wait to detect the second radar pulse 3302 of the five radar pulses 3302 (e.g., configured to wait to detect a number N of radar pulses 3302 greater than or equal to a predetermined number X of radar pulses 3302, where N is 2 and X is 2) before making a determination that there is an indication of possible radar 3102 or a possible valid radar event. Accordingly, various non-limiting embodiments can ensure that any single spurious interference (e.g., random noise 3004, adjacent channel leakages and/or interference from other channels, etc.) on the one or more DFS channels is not mistaken for indication of possible radar 3102 or a possible valid radar event, thus reducing the probability of false detections and resultant network downtime, as further described herein. As described above, exemplary non-limiting embodiments can then transmit (e.g., broadcast or otherwise) an exemplary control, management, and/or data frame, e.g., a silence frame or packet, an exemplary CTS frame 4102, etc., on one or more DFS channels to facilitate silencing network transmissions on the one or more DFS channels, for a predetermined time, e.g., two radar pulses 3302 (e.g., radar pulses 3032 of a PRI), for example, as depicted in FIG. 41.

In a non-limiting aspect, exemplary control, management, and/or data frame, e.g., a silence frame or packet, an exemplary CTS frame 4102, etc., on one or more DFS channels can be transmitted (e.g., broadcast or otherwise) immediately after the second radar pulse 3302 is detected (e.g., within a specified amount of time, such as generated and sent less than about 1 ms after initial sensing indication of the radar event (e.g., detecting a number N of radar pulses 3302 greater than or equal to a predetermined number X of radar pulses 3302, where N is 2 and X is 2)). In another non-limiting aspect, exemplary control, management, and/or data frame, e.g., a silence frame or packet, an exemplary CTS frame 4102, etc., on one or more DFS channels can be transmitted (e.g., broadcast or otherwise) immediately after the second radar pulse 3302 is detected (e.g., within a specified amount of time, such as generated and sent less than about 120 microseconds (μs) after initial sensing indication of the radar event (e.g., detecting a number N of radar pulses 3302 greater than or equal to a predetermined number X of radar pulses 3302, where N is 2 and X is 2)). In a further non-limiting aspect, if no further pulses 3302 are detected or sensed on the one or more DFS channels during the clean period 4106 (e.g., by failing to detect a number M of radar pulses 3302 greater than or equal to a second predetermined number Y of radar pulses 3302, where M is 2 and Y is 3, within a predetermined timeframe, such as clean period 4106, etc.), then exemplary embodiments can resume transmission on the one or more DFS channels after the clean period 4106 expires. Accordingly, various non-limiting embodiments can further ensure that spurious interference (e.g., random noise 3004, adjacent channel leakages and/or interference from other channels, etc.) on the one or more DFS channels is not mistaken for a real radar pulse 3302, thus further reducing the probability of false detections and resultant network downtime.

In yet another on-limiting aspect, various non-limiting embodiments can be further configured to cease transmission on the one or more DFS channels after the clean period 4106, for example, if further radar pulses 3302 are detected or sensed on the DFS channel during the clean period 4106 (e.g., where a number N of detected radar pulses 3302 greater than or equal to a predetermined number X of radar pulses 3302, where N is 2 and X is 2, but where a number M of detected radar pulses 3302 is not greater than or equal to a second predetermined number Y of radar pulses 3302, within the predetermined timeframe, such as clean period 4106, etc.). In still further non-limiting aspects, exemplary embodiments can be further configured to transmit (e.g., broadcast or otherwise) exemplary control, management, and/or data frames, e.g., silence frames or packets, exemplary CTS frames 4102, etc., on one or more DFS channels to facilitate silencing network transmissions on the one or more DFS channels, for a predetermined time, e.g., two radar pulses 3302 (e.g., radar pulses 3032 of a PRI), for example, as depicted in FIG. 41, simultaneously (e.g., within a specified amount of time, such as within about 2 ms, in a further non-limiting aspect), immediately after making a determination that there is an indication of possible radar 3102 or a possible valid radar event (e.g., after waiting to detect a number N of radar pulses 3302 greater than or equal to a predetermined number X of radar pulses 3302, where N is 2 and X is 2). As a result, various non-limiting implementations, as described herein, can facilitate determining whether signals on one or more DFS channels are noise 3004 or actual radar 3102, while simultaneously reducing the probability of false detections that can reduce DFS channel availability, and/or reducing network downtime, as described herein.

In another non-limiting aspect, exemplary control, management, and/or data frame, e.g., a silence frame or packet, an exemplary CTS frame 4102, etc., transmitted on one or more DFS channels can be configured to encode the duration of the clean period 4106. In yet another non-limiting aspect, an exemplary CTS frame 4102 can comprise a NAV field, as described above regarding FIG. 19A, that can be encoded by various disclosed embodiments the duration of the clean period 4106. In still further non-limiting aspects, the duration of the clean period 4106 encoded in the NAV field can comprise or be associated with a value or duration equivalent of a number, C, equal to a number of pulse repetition intervals (PRIs) of the pulse 3302 of radar 3102. In yet another non-limiting aspect, an exemplary CTS frame 4102, etc., transmitted on one or more DFS channels can be (e.g., broadcast or otherwise) can be configured to be encoded, such that the exemplary CTS frame 4102 is specific and identifiable to a specific exemplary DFS master expecting to silence the one or more DFS channels. In still further non-limiting aspects, other data can be supplied by various non-limiting embodiments to facilitate radar information propagation 3008 associated with a suspected radar event (e.g., detecting a number N of radar pulses 3302 greater than or equal to a predetermined number X of radar pulses 3302, detecting a number M of radar pulses 3302 greater than or equal to a second predetermined number Y of radar pulses 3302, within a predetermined timeframe, etc.), such as, in a non-limiting example, a predetermined and/or special destination MAC, which specifies and indicates to devices communicating on one or more DFS channels that the exemplary CTS frame 4102 is specific to a radar detection purpose (e.g., from an exemplary DFS master). In still other non-limiting aspects, exemplary disclosed embodiments can be configured to transmit (e.g., broadcast or otherwise) can an exemplary CTS frame 4102, etc., transmitted on one or more DFS channels which can comprise an exemplary CTS-Self frame 4102. As a non-limiting example, if an exemplary radar detector suspects it detects a suspected radar event, an embodiment such as an exemplary DFS master can be configured to transmit (e.g., broadcast or otherwise) an exemplary CTS-Self frame 4102, which can be further configured to encode a time field of the CTS-Self frame 4102 that specifies a duration for which exemplary mesh network, mesh nodes can be directed to silence the one or more DFS channels. In a further non-limiting example, a time field of the CTS-Self frame 4102 can be employed by various disclosed embodiments to identify a specified duration to silence the channel, a predetermined amount of time (e.g., 2 radar pulses of PRI, etc.), or otherwise, not based on the predetermined amount or a protocol specific standard duration for receiving CTS frames.

Accordingly, FIG. 41 depicts exemplary methods 4100 for reducing false detections and/or network downtime, based on employing a control, management, and/or data frame, in exemplary mesh networks 3000, 3100, 3200, etc. employing DFS channels. For example, exemplary non-limiting embodiments (e.g., a primary DFS master, a secondary DFS master, a multi-channel DFS master, a standalone DFS master, an agility agent 3208, whether embedded or distributed, etc.) of an exemplary mesh network (e.g., exemplary mesh network 3200, etc.) can, at 4108, detect a suspected radar event (e.g., detect a number N of radar pulses 3302 greater than or equal to a predetermined number X of radar pulses 3302). At 4110, exemplary methods 4100 can further comprise transmitting an exemplary control, management, and/or data frame, e.g., an exemplary CTS frame 4102, etc. on one or more DFS channels to facilitate silencing the one or more DFS channels. As described above, exemplary non-limiting embodiments can continue to sense for a radar 3102 signal. Accordingly, at 4112, exemplary methods 4100 can further comprise further detection of the suspected radar event (e.g., detection of a number M of radar pulses 3302 greater than or equal to a second predetermined number Y of radar pulses 3302, within a predetermined timeframe, clean period 4106, etc.). In a further non-limiting aspect, exemplary embodiments of exemplary mesh network mesh nodes can be configured to terminate or to hold its transmissions on the one or more DFS channels upon receipt of the exemplary control, management, and/or data frame, e.g., an exemplary CTS frame 4102, etc., for example, while a suspected radar event (e.g., indicated by detection of a number N of radar pulses 3302 greater than or equal to a predetermined number X of radar pulses 3302) is validated or invalidated, as further described above. Presuming that the suspected radar event (e.g., indicated by detection of a number N of radar pulses 3302 greater than or equal to a predetermined number X of radar pulses 3302) is invalidated (e.g., by failing to detect a number M of radar pulses 3302 greater than or equal to a second predetermined number Y of radar pulses 3302, within a predetermined timeframe, etc.), FIG. 41 further depicts, at 4112, resumption of Wi-Fi traffic following expiration of the clean period 4106, and exemplary embodiments of exemplary mesh network mesh nodes can resume exemplary methods 4100 at 4108. Presuming that the suspected radar event (e.g., indicated by detection of a number N of radar pulses 3302 greater than or equal to a predetermined number X of radar pulses 3302) is validated (e.g., by failing to detect a number M of radar pulses 3302 greater than or equal to a second predetermined number Y of radar pulses 3302, within a predetermined timeframe, etc.), FIG. 41 further depicts, at 4114, identification of a valid radar 3102, for which, as described herein, communication on DFS channels with a radar 3102 signal is prohibited.

Figure 42:
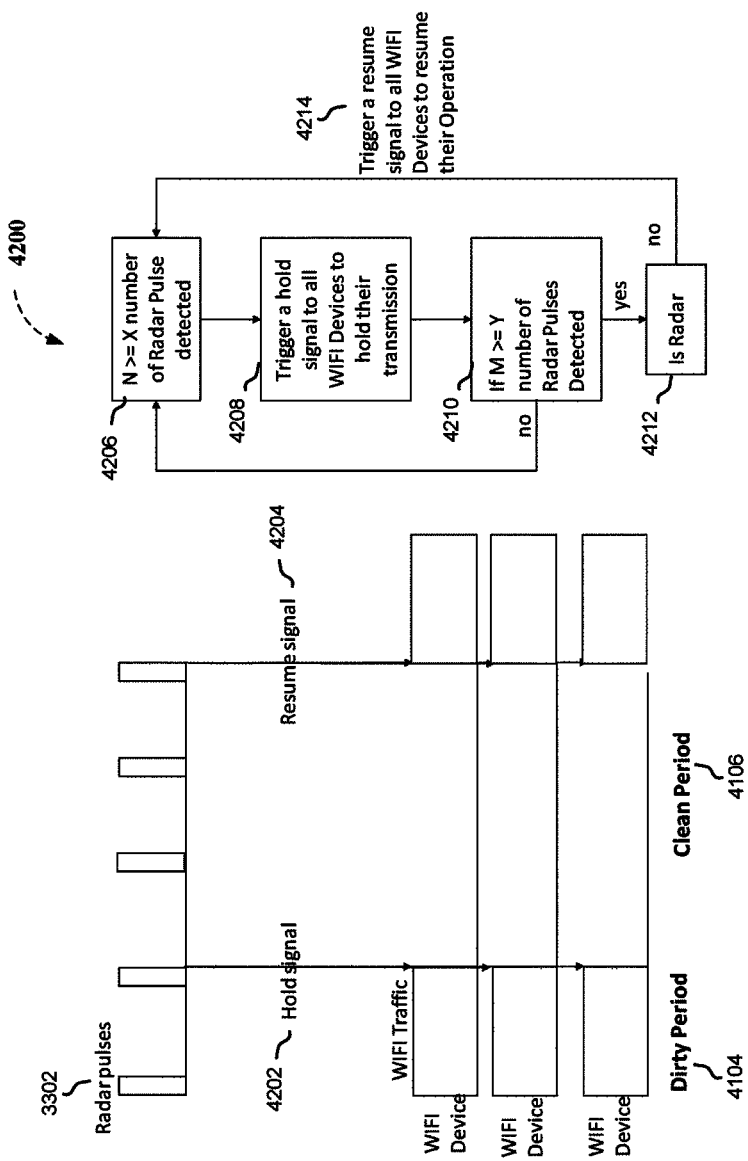
FIG. 42 depicts still further exemplary methods for reducing false detections and/or network downtime, based on employing a hold signal and/or a resume signal, in exemplary mesh networks employing DFS channels, according to various non-limiting aspects.

FIG. 42 depicts still other exemplary methods 4200 for reducing false detections and/or network downtime, based on employing a hold signal 4202 and/or a resume signal 4204, in exemplary mesh networks 3000, 3100, 3200, etc., employing DFS channels, according to various non-limiting aspects. In contrast to exemplary methods 4100, FIG. 42 depicts exemplary methods 4200 for reducing false detections and/or network downtime, based on employing a hold signal 4202 and/or a resume signal 4204 in exemplary mesh networks 3000, 3100, 3200, etc. For example, exemplary non-limiting embodiments (e.g., a primary DFS master, a secondary DFS master, a multi-channel DFS master, a standalone DFS master, an agility agent 3208, whether embedded or distributed, etc.) of an exemplary mesh network (e.g., exemplary mesh network 3200, etc.) can, at 4206, detect a suspected radar event (e.g., detect a number N of radar pulses 3302 greater than or equal to a predetermined number X of radar pulses 3302). At 4210, exemplary methods 4200 can further comprise transmitting an exemplary hold signal 4202 on one or more DFS channels to facilitate silencing the one or more DFS channels. As described above, an exemplary radar detector (e.g., a primary DFS master, a secondary DFS master, a multi-channel DFS master, a standalone DFS master, an agility agent 3208, whether embedded or distributed, etc.) that detects a suspected radar event (e.g., detect a number N of radar pulses 3302 greater than or equal to a predetermined number X of radar pulses 3302) can also be configured to be wired or wirelessly connected to an exemplary mesh network and can be further configured to send a signal (e.g., one or more of an exemplary hold signal 4202 and/or an exemplary resume signal 4204, etc.) over the enterprise network to ask one or more other routers/access points or any other mesh node in the mesh network to silence, without having to send out a CTS frame (e.g., via an out of band method, a direct ethernet frame, etc.). As a result, in a non-limiting aspect, exemplary embodiments, as described herein, can be configured to send a packet or data (e.g., one or more of an exemplary hold signal 4202 and/or an exemplary resume signal 4204, etc.) that signals nearby or neighboring devices on the same network, for which such nearby or neighboring devices can also be configured to turn off their transmitter for a predetermined period of time, request neighbor devices on the same network to assist in radar detection on the one or more DFS channels, etc. As further described above, exemplary non-limiting embodiments can continue to sense for a radar 3102 signal. Accordingly, at 4210, exemplary methods 4200 can further comprise further detection of the suspected radar event (e.g., detection of a number M of radar pulses 3302 greater than or equal to a second predetermined number Y of radar pulses 3302, within a predetermined timeframe, clean period 4106, etc.). In a further non-limiting aspect, exemplary embodiments of exemplary mesh network mesh nodes can be configured to terminate or to hold its transmissions on the one or more DFS channels upon receipt of the exemplary hold signal 4202, for example, while a suspected radar event (e.g., indicated by detection of a number N of radar pulses 3302 greater than or equal to a predetermined number X of radar pulses 3302) is validated or invalidated, as further described above. Presuming that the suspected radar event (e.g., indicated by detection of a number N of radar pulses 3302 greater than or equal to a predetermined number X of radar pulses 3302) is invalidated (e.g., by failing to detect a number M of radar pulses 3302 greater than or equal to a second predetermined number Y of radar pulses 3302, within a predetermined timeframe, etc.), FIG. 42 further depicts, at 4210, resumption of Wi-Fi traffic following expiration of an exemplary clean period 4206, and exemplary embodiments of exemplary mesh network mesh nodes can resume exemplary methods 4200 at 4206. Presuming that the suspected radar event (e.g., indicated by detection of a number N of radar pulses 3302 greater than or equal to a predetermined number X of radar pulses 3302) is validated (e.g., by failing to detect a number M of radar pulses 3302 greater than or equal to a second predetermined number Y of radar pulses 3302, within a predetermined timeframe, etc.), FIG. 42 further depicts, at 4212, identification of a valid radar 3102, for which, as described herein, communication on DFS channels with a radar 3102 signal is prohibited.

As described above, exemplary embodiments can be configured to send a packet or data (e.g., an exemplary resume signal 4204, etc.) that signals nearby or neighboring devices on the same network, for which such nearby or neighboring devices can also be configured to resume wireless communication on the one or more DFS channels, etc. Subsequently, as exemplary radar detector (e.g., a primary DFS master, a secondary DFS master, a multi-channel DFS master, a standalone DFS master, an agility agent 3208, whether embedded or distributed, etc.) determines that the suspected radar event (e.g., indicated by detection of a number N of radar pulses 3302 greater than or equal to a predetermined number X of radar pulses 3302) is no longer present on the one or more DFS channels (e.g., by failing to detect a number M of radar pulses 3302 greater than or equal to a second predetermined number Y of radar pulses 3302, within a predetermined timeframe, etc.), FIG. 42 further depicts, at 4214, resumption of Wi-Fi traffic (e.g., upon receipt of an exemplary resume signal 4204, following expiration of an exemplary clean period 4206, etc.), and exemplary embodiments of exemplary mesh network mesh nodes can resume exemplary methods 4200 at 4206.

In further non-limiting implementations, exemplary mesh networks can comprise or be associated with an exemplary, standalone, dedicated DFS sensor agility agent and/or DFS master, for example, as further described herein, regarding FIGS. 2, 13-14, 20-29, etc. In a non-limiting aspect, an exemplary, standalone, dedicated DFS sensor agility agent and/or DFS master can be configured to be directly attached to one or more of the exemplary mesh nodes. In another non-limiting aspect, an exemplary, standalone, dedicated DFS sensor agility agent and/or DFS master (e.g., a multi-channel DFS master, etc.) can be configured to be part of the exemplary mesh network, for example, as further described herein, regarding exemplary mesh networks 3000, 3100, 3200, etc. and/or FIGS. 2, 13, 14, 24, 30-32, etc. Accordingly, exemplary non-limiting embodiments can be configured to continuously detect radar on multiple DFS channels, can be configured to provide white and black list of channels for individual mesh nodes, and/or can be configured to provide white and black list of channels for an entire exemplary mesh network, as described herein, via an exemplary cloud intelligence engine, or otherwise. In a further non-limiting aspect, one or more exemplary mesh nodes can be configured to receive one or more of the black/white channel lists from the exemplary, standalone, dedicated DFS sensor agility agent and/or DFS master. In yet another non-limiting aspect, one or more exemplary mesh nodes can be further configured to fuse the black/white channel lists from the exemplary, standalone, dedicated DFS sensor agility agent and/or DFS master against the mesh node's local information, e.g., via an exemplary cloud intelligence engine, or otherwise, to facilitate deriving one or more radar free channels, and/or exemplary channel preference lists. In still another non-limiting aspect, one or more exemplary mesh nodes can be further configured to employ one or more exemplary channel preference lists, such that, in the event of an actual radar 3102 event, the one or more exemplary mesh nodes and/or the entire mesh network can move to another DFS channel without first performing a CAC on the new channel, thus reducing the resultant network downtime such a CAC would necessitate, as further described herein In still further non-limiting embodiments, one or more exemplary mesh node, one or more exemplary DFS sensor agility agent and/or DFS master, and so on, can be configured to transmit its radar events (e.g., radar information propagation 3008, etc.) to an exemplary cloud intelligence engine, for example, as further described herein, regarding FIGS. 2, 13-14, 20-42, etc. In a non-limiting aspect, an exemplary cloud intelligence engine, as described herein, can be further configured to data fuse the one or more radar events (e.g., radar information propagation 3008, etc.) against other information sources, as further described herein. In another non-limiting aspect, an exemplary cloud intelligence engine, as described herein, can be further configured to employ inference and/or algorithms to discriminate between random noise 3004 and radar 3102 to facilitate reducing false detections and/or network downtime in exemplary mesh networks employing DFS channels, as described herein, and can be further configured to make one or more determinations regarding the probability of the one or more radar events (e.g., radar information propagation 3008, etc.) being an actual radar 3102. In yet another non-limiting aspect, an exemplary cloud intelligence engine, as described herein, can be further configured to transmit one or more recommendations regarding the one or more radar events, e.g., to one or more exemplary mesh nodes, to one or more exemplary mesh network groups, and so on, regarding the one or more radar event, regarding channel switching, regarding updates to one or more of blacklists, whitelists, preference lists, etc., as further described herein.

As described above, in a further non-limiting aspect, one or more exemplary mesh networks, and/or portions thereof, can be operated in one or more groups of exemplary mesh nodes, for example, based in part on one or more grouping criteria. In a non-limiting aspect, it can be desirable to group certain exemplary mesh nodes of an exemplary mesh network together, e.g., from a network performance perspective, from a location perspective, from a quality of service perspective, and so on, without limitation. Accordingly, exemplary embodiments, as described herein, can employ one or more of blacklists, whitelists, and/or channel preference lists, that can be different in at least one aspect between different groups of exemplary mesh nodes, that can be similar or substantially similar between exemplary mesh nodes within an exemplary group, based in part on one or more grouping criteria. In still further non-limiting aspects, the one or more grouping criteria can comprise or be associated with network performance, location information, and/or device characteristics associated with one or more exemplary mesh nodes, quality of service, regulatory information, spectral information, and so on, without limitation. Accordingly, in a non-limiting aspect, one or more of the blacklists, whitelists, and/or channel preference lists can be shared within an exemplary mesh group. Thus, in a further non-limiting aspect, exemplary mesh nodes, such as, for example, an exemplary access point, an exemplary router, an exemplary agility agent, an exemplary mesh network node host device 3206, configured as a DFS master (e.g., a multi-channel DFS master), and so on, can be configured to segregate exemplary mesh nodes into two or more groups, can be configured group two or more exemplary mesh nodes within an exemplary group, based in part on one or more grouping criteria, as described herein, e.g., via an exemplary cloud intelligence engine, or otherwise.

Accordingly, exemplary mesh nodes, such as, for example, an exemplary access point, an exemplary router, an exemplary agility agent, an exemplary mesh network node host device 3206, configured as a DFS master (e.g., a multi-channel DFS master), and so on, can be configured as a radar sensor, which can be further configured to provide an exemplary cloud intelligence engine with DFS channel radar information (e.g., radar information propagation 3008), location information, spectral information, etc., as further described herein, regarding FIGS. 2, 13-14, 20-42, etc. Thus, in a further non-limiting aspect, an exemplary cloud intelligence engine can be configured to data fuse such information and against external sources, as described herein, and can be further configured to provide one or more of blacklists, whitelists, and/or channel preference lists (e.g., one or more of group blacklists, group whitelists, group channel preference lists, etc.) to the exemplary mesh network, based in part on one or more grouping criteria. As a result, exemplary mesh nodes, such as, for example, an exemplary access point, an exemplary router, an exemplary mesh network node host device 3206, configured as a DFS master (e.g., a multi-channel DFS master), etc., can be configured to employ one or more group blacklists, group whitelists, group channel preference lists, etc., for two or more groups in communication with the exemplary mesh node, as described herein, e.g., via an exemplary cloud intelligence engine, or otherwise. As described herein, an exemplary channel preference list can comprise a list of DFS channels, where if one DFS channel is required to be vacated, every exemplary mesh node in the exemplary mesh network having the exemplary channel preference lists can be configured to switch to the next DFS channel in the exemplary channel preference list, which facilitates an exemplary mesh network of exemplary mesh nodes as single mesh network group configured to share the singular exemplary group channel preference list. Further non-limiting embodiments, can be configured to employ similar sharing of exemplary blacklists and exemplary whitelists among a singular exemplary group of exemplary mesh nodes as single mesh network group and/or can be configured to employ two or more groups of the blacklists, whitelists, and/or channel preference lists (e.g., one or more of group blacklists, group whitelists, group channel preference lists, etc.), as described herein.

Figure 43:
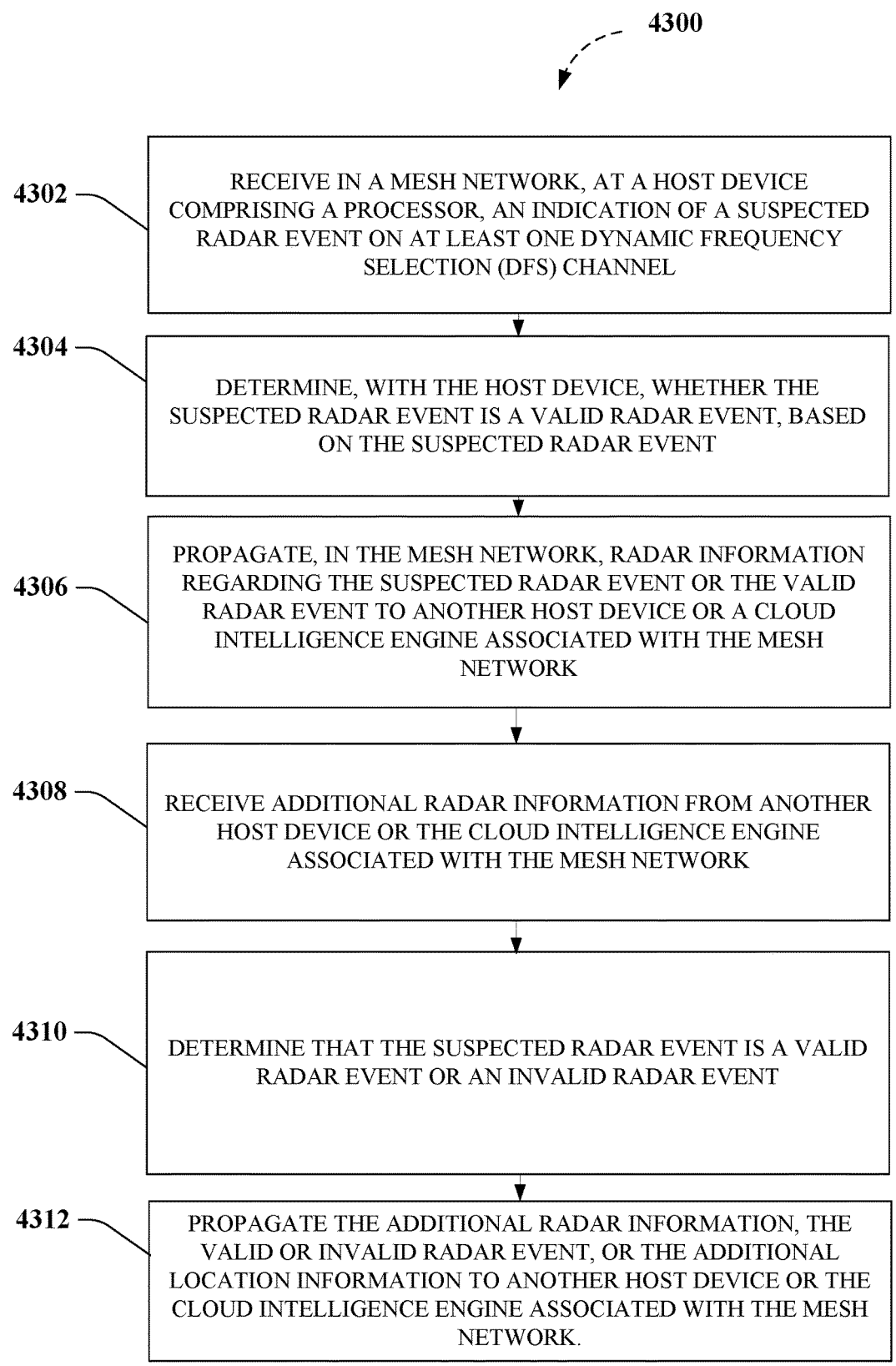
FIG. 43 depicts further exemplary methods for reducing false detections and/or network downtime in exemplary mesh networks employing DFS channels, according to various non-limiting aspects.

FIG. 43 depicts further exemplary methods 4300 for reducing false detections and/or network downtime in exemplary mesh networks employing DFS channels, according to various non-limiting aspects. Accordingly, at 4302, FIG. 43 depicts exemplary methods 4300 comprising receiving in a mesh network (e.g., exemplary mesh network 3200, etc.), at a host device comprising a processor (e.g., exemplary mesh network node host device 3206, configured as a DFS master, such as a multi-channel DFS master, etc.), an indication of a suspected radar event on one or more dynamic frequency selection (DFS) channel, as further described herein, for example, regarding FIGS. 2, 13, 14, 24, 30-42, etc.

In addition, at 4304, exemplary methods 4300 for reducing false detections and/or network downtime can further comprise determining, with the host device (e.g., exemplary mesh network node host device 3206, configured as a DFS master, such as a multi-channel DFS master, etc.), whether the suspected radar event is a valid radar event, based at least in part on the suspected radar event, as further described herein, for example, regarding FIGS. 2, 13, 14, 24, 30-42, etc. As a non-limiting example, exemplary methods 4300 can further comprise determining whether the suspected radar event is the valid radar event based in part on additional radar information (e.g., from another, nearby, or neighbor mesh node, or host device (e.g., exemplary mesh network node host device 3206, configured as a DFS master, such as a multi-channel DFS master, etc.), etc.).

In further non-limiting embodiments, at 4306, exemplary methods 4300 can further comprise propagating, in the mesh network (e.g., exemplary mesh network 3200, etc.), radar information (e.g., radar information propagation 3008, etc.) regarding one or more of the suspected radar event or the valid radar event to one or more of another host device (e.g., exemplary mesh network node host device 3206, configured as a DFS master, such as a multi-channel DFS master, etc.) or a cloud intelligence engine (e.g., cloud intelligence engine 235, 2435, etc.) associated with the mesh network (e.g., exemplary mesh network 3200, etc.), as further described herein, for example, regarding FIGS. 2, 13, 14, 24, 30-42, etc. In a non-limiting aspect, exemplary methods 4300 can comprise propagating location information associated with the host device (e.g., exemplary mesh network node host device 3206, configured as a DFS master, such as a multi-channel DFS master, etc.). In non-limiting aspects, exemplary methods 4300 can further comprise propagating next channel information that identifies to the one or more of another host device (e.g., exemplary mesh network node host device 3206, configured as a DFS master, such as a multi-channel DFS master, etc.) or the cloud intelligence engine (e.g., cloud intelligence engine 235, 2435, etc.) associated with the mesh network (e.g., exemplary mesh network 3200, etc.) a next channel of the one or more DFS channels to transfer communications based in part on one or more of the suspected radar event or the valid radar event, and/or encoding the next channel information in one or more beacon signal of the host device (e.g., exemplary mesh network node host device 3206, configured as a DFS master, such as a multi-channel DFS master, etc.), as further described herein, for example, regarding FIGS. 2, 13, 14, 24, 30-42, etc.

At 4308 of FIG. 43, exemplary methods 4300 can further comprise receiving additional radar information (e.g., radar information propagation 3008, etc.), including, but not limited to, location information, from one or more of another host device (e.g., exemplary mesh network node host device 3206, configured as a DFS master, such as a multi-channel DFS master, etc.) or the cloud intelligence engine (e.g., cloud intelligence engine 235, 2435, etc.) associated with the mesh network (e.g., exemplary mesh network 3200, etc.).

In addition, FIG. 43, depicts exemplary methods 4300 further comprising determining that the suspected radar event is a valid radar event or an invalid radar event, at 4310, and propagating one or more of the additional radar information (e.g., radar information propagation 3008, etc.), the valid radar event, or the additional location information to the one or more of another host device (e.g., exemplary mesh network node host device 3206, configured as a DFS master, such as a multi-channel DFS master, etc.) or the cloud intelligence engine (e.g., cloud intelligence engine 235, 2435, etc.) associated with the mesh network (e.g., exemplary mesh network 3200, etc.), at 4312, as further described herein, for example, regarding FIGS. 2, 13, 14, 24, 30-42, etc. As a non-limiting example, exemplary methods 4300 can comprise determining that the suspected radar event is a valid or an invalid radar event, such as, for example, by validating the radar event with two or more radar sensors or detectors (e.g., a primary DFS master, a secondary DFS master, a multi-channel DFS master, a standalone DFS master, an agility agent, whether embedded or distributed, etc.) associated with the host device (e.g., exemplary mesh network node host device 3206, configured as a DFS master, such as a multi-channel DFS master, etc.), and/or based in part on one or more of the additional radar information (e.g., radar information propagation 3008, etc.), the additional location information, or other information received from the one or more of another host device (e.g., exemplary mesh network node host device 3206, configured as a DFS master, such as a multi-channel DFS master, etc.) or the cloud intelligence engine (e.g., cloud intelligence engine 235, 2435, etc.) associated with the mesh network (e.g., exemplary mesh network 3200, etc.).

In still further non-limiting implementations, exemplary methods 4300 can further comprise transmitting, in the mesh network (e.g., exemplary mesh network 3200, etc.), one or more of a CTS signal 4102 or a hold signal 4202 on the one or more DFS channel based in part on the receiving the indication of the suspected radar event, encoding information in the one or more of the CTS signal 4102 or the hold signal 4202, wherein the information is associated with a predetermined time or duration during which communication on the one or more DFS channel is to be silenced, and/or transmitting, in the mesh network (e.g., exemplary mesh network 3200, etc.), a resume signal 4204, for which the communication on the one or more DFS channel is to be resumed, as further described herein, for example, regarding FIGS. 2, 13, 14, 24, 30-42, etc. In addition, exemplary methods for 300 can further comprise updating, with the host device (e.g., exemplary mesh network node host device 3206, configured as a DFS master, such as a multi-channel DFS master, etc.), one or more of a channel blacklist, a channel whitelist, or a channel preference list based at least in part on one or more of the suspected radar event or the valid radar event, and/or updating the one or more of the channel blacklist, the channel whitelist, or the channel preference list for a group comprising at least the host device (e.g., exemplary mesh network node host device 3206, configured as a DFS master, such as a multi-channel DFS master, etc.) and the another host device (e.g., exemplary mesh network node host device 3206, configured as a DFS master, such as a multi-channel DFS master, etc.), based at least in part on one or more grouping criterion for the group, wherein the group comprises less than all mesh nodes in the mesh network (e.g., exemplary mesh network 3200, etc.) communicating on the one or more DFS channels, as further described herein, for example, regarding FIGS. 2, 13, 14, 24, 30-42, etc.

Figure 44:
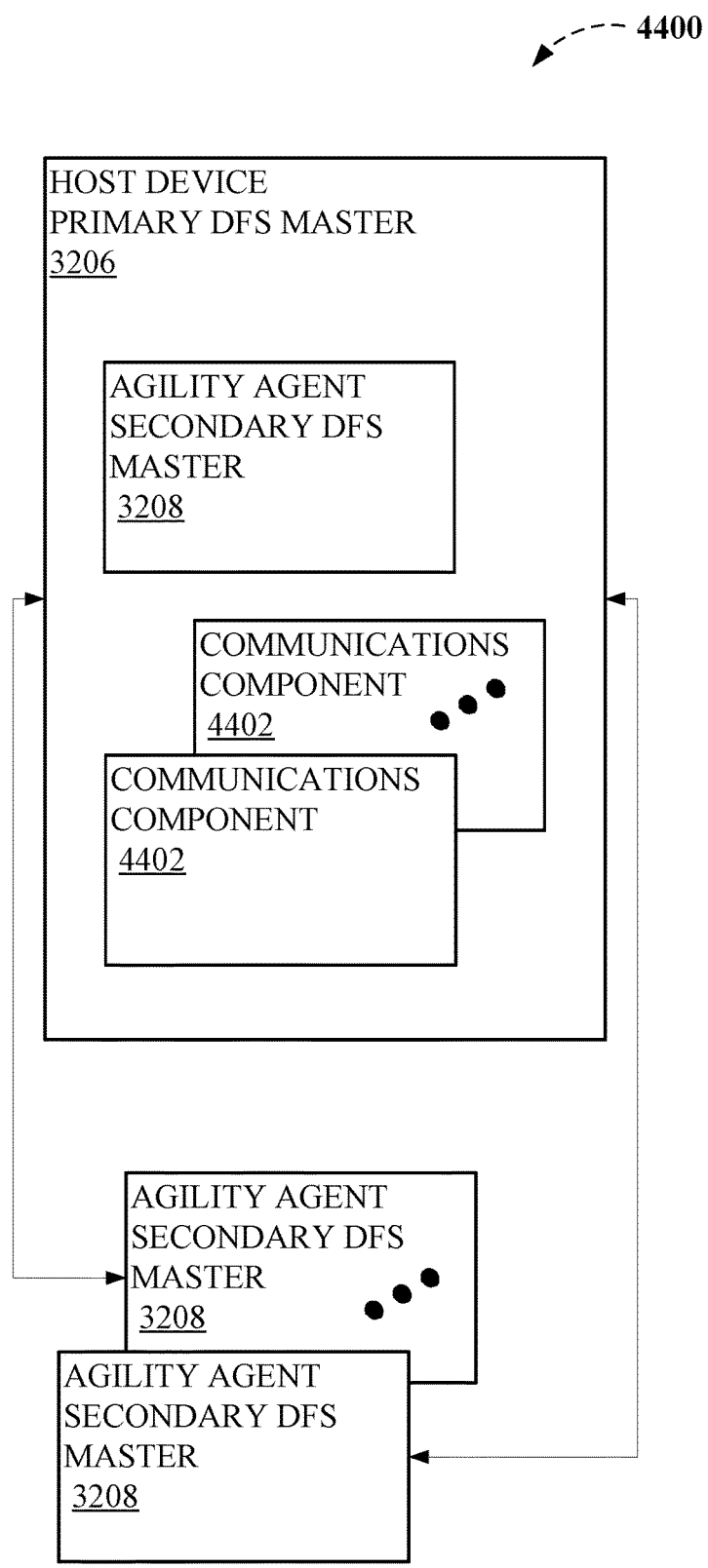
FIG. 44 depicts a functional block diagram illustrating example non-limiting devices or systems suitable for use with aspects of the disclosed subject matter.

FIG. 44 depicts a functional block diagram illustrating example non-limiting devices or systems suitable for use with aspects of the disclosed subject matter. For instance, FIG. 44 illustrates example non-limiting devices or systems 4400 suitable for performing various aspects of the disclosed subject matter in accordance with an exemplary DFS master 3206, 3208, etc. (e.g., a primary DFS master, a secondary DFS master, a multi-channel DFS master, a standalone DFS master, an agility agent, whether embedded or distributed, etc.) detecting a suspected radar event, as further described herein. In non-limiting embodiments, exemplary devices or systems 4400 can comprise one or more radar sensors or detectors (e.g., a primary DFS master, a secondary DFS master, a multi-channel DFS master, a standalone DFS master, an agility agent, whether embedded or distributed, etc.) associated with the host device (e.g., exemplary mesh network node host device 3206, configured as a DFS master, such as a multi-channel DFS master, etc.) configured to receive an indication of a suspected radar event on one or more DFS channel in a mesh network (e.g., exemplary mesh network 3200, etc.), as further described herein, for example, regarding FIGS. 2, 13, 14, 24, 30-42, etc.

In further non-limiting embodiments, example devices or systems 4400 can comprise one or more processors of a multi-channel DFS master device (e.g., exemplary mesh network node host device 3206, configured as a DFS master, such as a multi-channel DFS master, etc.) configured to determine whether the suspected radar event is a valid radar event, based at least in part on the indication of the suspected radar event, as further described herein, for example, regarding FIGS. 2, 13, 14, 24, 30-42, etc. In a non-limiting example, exemplary limitations of devices or systems 4400 can comprise the multi-channel DFS master device (e.g., exemplary mesh network node host device 3206, configured as a DFS master, such as a multi-channel DFS master, etc.) further configured to determine that the suspected radar event is a valid or an invalid radar event, for example, as further described herein, via one or more radar detectors, such as an exemplary agility agent 3208, whether embedded, or distributed, associated with the multi-channel DFS master device (e.g., exemplary mesh network node host device 3206, configured as a DFS master, such as a multi-channel DFS master, etc.), and whether via an exemplary cloud intelligence engine (e.g., cloud intelligence engine 235, 2435, etc.), or otherwise.

In other non-limiting implementations of example devices or systems 4400, disclose embodiments can comprise exemplary multi-channel DFS master device (e.g., exemplary mesh network node host device 3206, configured as a DFS master, such as a multi-channel DFS master, etc.) further configured to update one or more of a channel blacklist, a channel whitelist, or a channel preference list based in part on one or more of the suspected radar event or the valid radar event, as further described herein, for example, regarding FIGS. 2, 13, 14, 24, 30-42, etc. in another non-limiting aspect, the exemplary multi-channel DFS master device (e.g., exemplary mesh network node host device 3206, configured as a DFS master, such as a multi-channel DFS master, etc.) can be further configured to update the one or more of the channel blacklist, the channel whitelist, or the channel preference list for a group comprising at least the multi-channel DFS master device and the mesh node, based at least in part on one or more grouping criterion for the group, wherein the group comprises less than all mesh nodes in the mesh network (e.g., exemplary mesh network 3200, etc.) communicating on the one or more DFS channels.

In addition, example devices or systems 4400 can further comprise one or more communications components 4402 associated the multi-channel DFS master device configured to propagate, in the mesh network, radar information regarding one or more of the suspected radar event or the valid radar event to one or more of a mesh node (e.g., an exemplary mesh node) or a cloud intelligence engine (e.g., cloud intelligence engine 235, 2435, etc.) associated with the mesh network. In a non-limiting aspect, exemplary communications component 4402 can comprise or be associated with one or more of agility agent 200, DFS master 2400, host device 3002, exemplary mesh network node host device 3206, configured as a DFS master, such as a multi-channel DFS master, etc., and so on, or portions thereof. In a non-limiting aspect, the one or more communications components 4402 can be further configured to propagate location information associated with the multi-channel DFS master device (e.g., exemplary mesh network node host device 3206, configured as a DFS master, such as a multi-channel DFS master, etc.). In another non-limiting aspect, the one or more communications components 4402 can be further configured to receive and/or propagate additional radar information (e.g., radar information propagation 3008) from the one or more of the mesh node (e.g., exemplary mesh node) or the cloud intelligence engine (e.g., cloud intelligence engine 235, 2435, etc.) associated with the mesh network (e.g., exemplary mesh network 3200, etc.), and can be configured to propagate one or more of the additional radar information (e.g., radar information propagation 3008, etc.), a valid or an invalid radar event, or the additional location information to the one or more of mesh node (e.g., exemplary mesh node) or the cloud intelligence engine (e.g., cloud intelligence engine 235, 2435, etc.) associated with the mesh network (e.g., exemplary mesh network 3200, etc.), and so on.

In still further non-limiting aspects, the one or more communications components 4402 can be further configured to transmit, in the mesh network (e.g., exemplary mesh network 3200, etc.), one or more of a CTS signal 4102 or a hold signal 4202 on the one or more DFS channels based at least in part on the indication of the suspected radar event, and can be configured to encode information in the one or more of the CTS signal 4102 or the hold signal 4204, wherein the information is associated with a predetermined time or duration during which communication on the one or more DFS channels is to be silenced, as further described herein, for example, regarding FIGS. 2, 13, 14, 24, 30-42, etc. In addition, the one or more communications components 4402 can be further configured to transmit, in the mesh network (e.g., exemplary mesh network 3200, etc.) a resume signal 4204, for which the communication on the one or more DFS channels is to be resumed, as further described herein.

In still other non-limiting aspects, the one or more communications components 4402 can be further configured to propagate next channel information that identifies to the one or more of mesh node (e.g., exemplary mesh node) or the cloud intelligence engine (e.g., cloud intelligence engine 235, 2435, etc.) associated with the mesh network (e.g., exemplary mesh network 3200, etc.) a next channel of the one or more DFS channels to transfer communications based in part on one or more of the suspected radar event or the valid radar event, and/or can be configured to encode the next channel information in one or more beacon signal of the multi-channel DFS master device (e.g., exemplary mesh network node host device 3206, configured as a DFS master, such as a multi-channel DFS master, etc.), as further described herein, for example, regarding FIGS. 2, 13, 14, 24, 30-42, etc.

Figure 45:
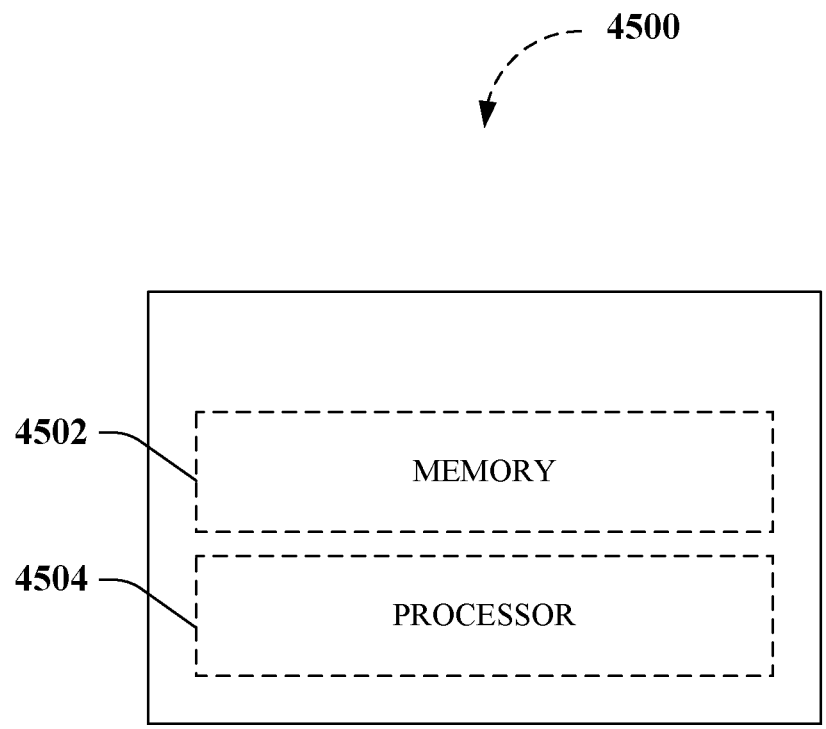
FIG. 45 depicts an example non-limiting device or system suitable for performing various aspects of the disclosed subject matter.

FIG. 45 depicts an example non-limiting device or system 4500, or portions thereof, suitable for performing various aspects of the disclosed subject matter. The device or system 4500, or portions thereof, can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, example non-limiting device or system 4500, or portions thereof, can comprise example devices and/or systems regarding FIGS. 2, 24, etc., as described above, or portions thereof, for example, regarding agility agent 200, DFS master 2400, a multi-channel DFS master device (e.g., exemplary mesh network node host device 3206, configured as a DFS master, such as a multi-channel DFS master, etc.), and so on. For example, FIG. 45 depicts an example device 4500, such as an exemplary mesh node, as further described herein, for example, regarding FIGS. 2, 13, 14, 24, 30-42, etc.

Accordingly, device or system 4500 can comprise a memory 4502 that retains various instructions with respect to facilitating various operations, for example, such as: receiving in a mesh network (e.g., mesh network 3200, etc.) an indication of a suspected radar event on one or more DFS channels; determining whether the suspected radar event is a valid radar event, based in part on the suspected radar event; propagating, in the mesh network (e.g., mesh network 3200, etc.), radar information (e.g., radar information propagation 3008, etc.) regarding one or more of the suspected radar event or the valid radar event to one or more of one or more mesh (e.g., exemplary mesh node) or a cloud intelligence engine (e.g., cloud intelligence engine 235, 2435, etc.) associated with the mesh network (e.g., exemplary mesh network 3200, etc.); means for transmitting, in the mesh network (e.g., exemplary mesh network 3200, etc.), one or more of a CTS signal 4102 or a hold signal 4202 on the one or more DFS channel based in part on the receiving the indication of the suspected radar event; means for transmitting, in the mesh network (e.g.), a resume signal 4202, for which the communication on the at least one DFS channel is to be resumed; and/or the like.

Additionally, memory 4502 can retain further and/or alternative instructions for performing various functions and/or operations described herein including instructions associated with performing exemplary methods described herein, for example, as further described herein, for example, regarding FIGS. 2, 13, 14, 24, 30-43, etc. Thus, the above example instructions and other suitable instructions for functionalities and/or operations as described herein for example, regarding FIGS. 2, 13, 14, 24, 30-43, etc., can be retained within memory 4502, such as memory 202, 2402, 249, 2449, and a processor 4504, such as processor 203, 2403, 250, 2450, etc. can be utilized in connection with executing the instructions, without limitation.

Example Networked and Distributed Environments

One of ordinary skill in the art can appreciate that the various embodiments of the disclosed subject matter and related systems, devices, and/or methods described herein can be implemented in connection with any computer or other client or server device, which can be deployed as part of a communications system, a computer network, and/or in a distributed computing environment, and can be connected to any kind of data store. In this regard, the various embodiments described herein can be implemented in any computer system or environment having any number of memory or storage units, and any number of applications and processes occurring across any number of storage units or volumes, which may be used in connection with communication systems using the techniques, systems, and methods in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving, storing, and/or transmitting information in connection with remote or local services and processes.

Distributed computing provides sharing of computer resources and services by communicative exchange among computing devices and systems. These resources and services can include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices can have applications, objects or resources that may utilize disclosed and related systems, devices, and/or methods as described for various embodiments of the subject disclosure.

Figure 46:
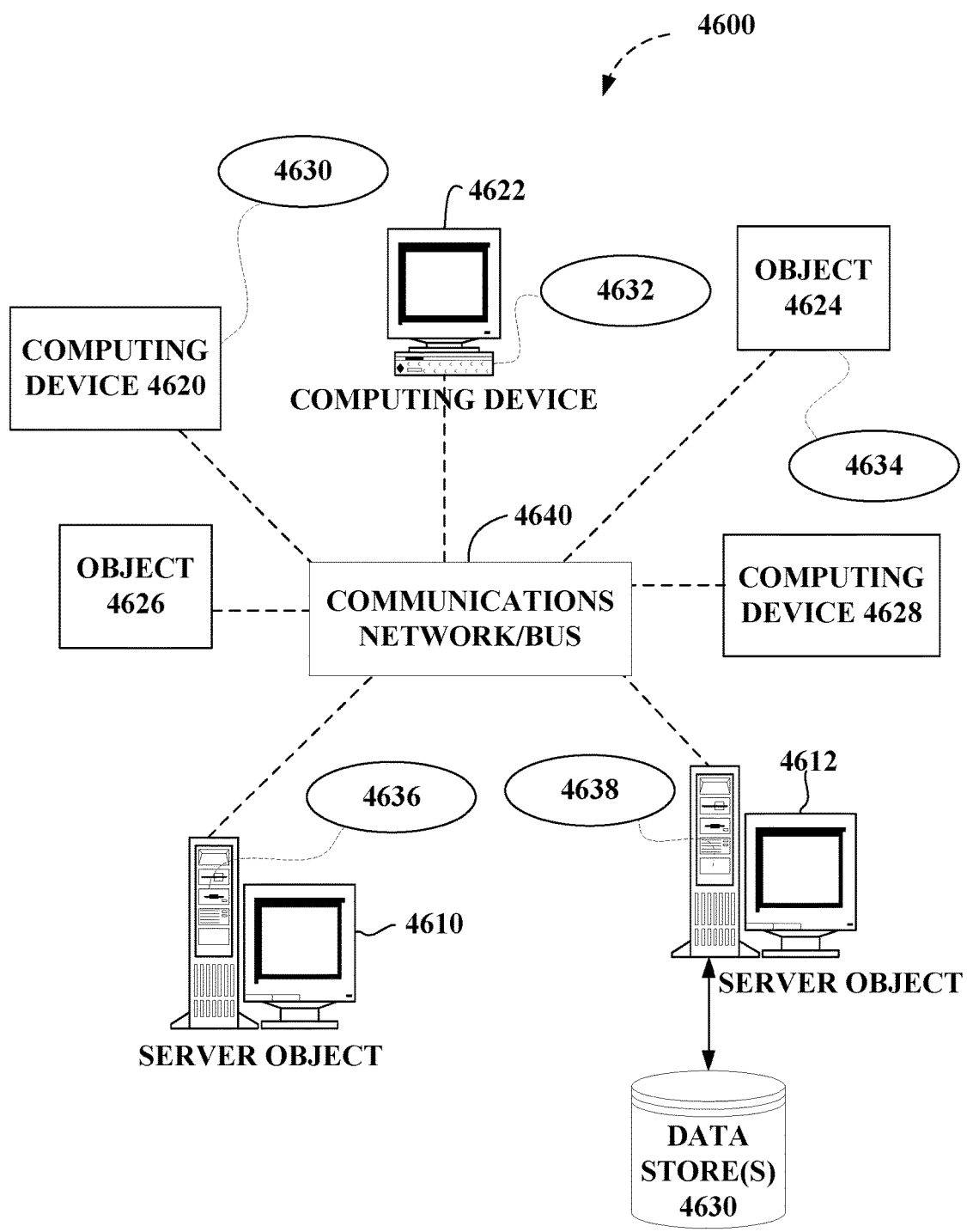
FIG. 46 is a block diagram representing example non-limiting networked environments in which various embodiments described herein can be implemented.

FIG. 46 provides a schematic diagram of an example networked or distributed computing environment. The distributed computing environment comprises computing objects 4610, 4612, etc. and computing objects or devices 4620, 4622, 4624, 4626, 4628, etc., which may include programs, methods, data stores, programmable logic, etc., as represented by applications 4630, 4632, 4634, 4636, 4638. It can be understood that objects 4610, 4612, etc. and computing objects or devices 4620, 4622, 4624, 4626, 4628, etc. may comprise different devices, such as PDAs, audio/video devices, mobile phones, MP3 players, personal computers, laptops, etc.

Each object 4610, 4612, etc. and computing objects or devices 4620, 4622, 4624, 4626, 4628, etc. can communicate with one or more other objects 4610, 4612, etc. and computing objects or devices 4620, 4622, 4624, 4626, 4628, etc. by way of the communications network 4640, either directly or indirectly. Even though illustrated as a single element in FIG. 46, network 4640 may comprise other computing objects and computing devices that provide services to the system of FIG. 46, and/or may represent multiple interconnected networks, which are not shown. Each object 4610, 4612, etc. or 4620, 4622, 4624, 4626, 4628, etc. can also contain an application, such as applications 4630, 4632, 4634, 4636, 4638, that can make use of an API, or other object, software, firmware and/or hardware, suitable for communication with or implementation of disclosed and related systems, devices, methods, and/or functionality provided in accordance with various embodiments of the subject disclosure. Thus, although the physical environment depicted may show the connected devices as computers, such illustration is merely example and the physical environment may alternatively be depicted or described comprising various digital devices, any of which can employ a variety of wired and/or wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many networks are coupled to the Internet, which can provide an infrastructure for widely distributed computing and can encompass many different networks, though any network infrastructure can be used for example communications made incident to employing disclosed and related systems, devices, and/or methods as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 46, as a non-limiting example, computers 4620, 4622, 4624, 4626, 4628, etc. can be thought of as clients and computers 4610, 4612, etc. can be thought of as servers where servers 4610, 4612, etc. provide data services, such as receiving data from client computers 4620, 4622, 4624, 4626, 4628, etc., storing of data, processing of data, transmitting data to client computers 4620, 4622, 4624, 4626, 4628, etc., although any computer can be considered a client, a server, or both, depending on the circumstances. Any of these computing devices may be processing data, forming metadata, synchronizing data or requesting services or tasks that may implicate disclosed and related systems, devices, and/or methods as described herein for one or more embodiments.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to disclosed and related systems, devices, and/or methods can be provided standalone, or distributed across multiple computing devices or objects.

In a network environment in which the communications network/bus 4640 is the Internet, for example, the servers 4610, 4612, etc. can be Web servers with which the clients 4620, 4622, 4624, 4626, 4628, etc. communicate via any of a number of known protocols, such as the hypertext transfer protocol (HTTP). Servers 4610, 4612, etc. may also serve as clients 4620, 4622, 4624, 4626, 4628, etc., as may be characteristic of a distributed computing environment.

Example Computing Device

Figure 47:
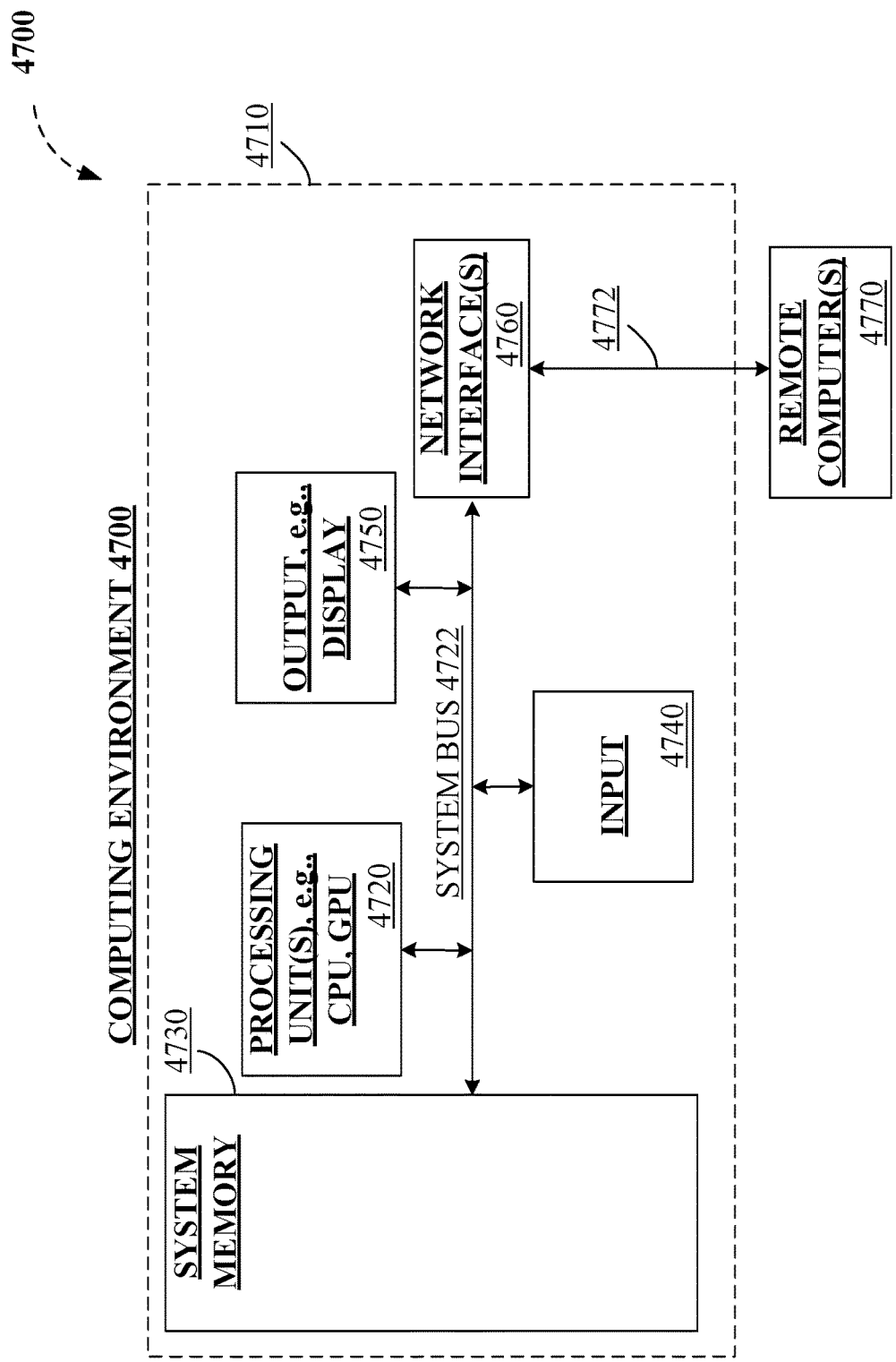
FIG. 47 is a block diagram representing an example non-limiting computing system or operating environment in which one or more aspects of various embodiments described herein can be implemented.

As mentioned, advantageously, the techniques described herein can be applied to devices or systems where it is desirable to employ disclosed and related systems, devices, and/or methods. It should be understood, therefore, that handheld, portable and other computing devices and computing objects of all kinds are contemplated for use in connection with the various disclosed embodiments. Accordingly, the below general purpose remote computer described below in FIG. 47 is but one example of a computing device. Additionally, disclosed and related systems, devices, and/or methods can include one or more aspects of the below general purpose computer, such as display, storage, analysis, control, etc.

Although not required, embodiments can partly be implemented via an operating system, for use by a developer of services for a device or object, and/or included within application software that operates to perform one or more functional aspects of the various embodiments described herein. Software can be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 47 thus illustrates an example of a suitable computing system environment 4700 in which one or aspects of the embodiments described herein can be implemented, although as made clear above, the computing system environment 4700 is only one example of a suitable computing environment and is not intended to suggest any limitation as to scope of use or functionality. Neither should the computing environment 4700 be interpreted as having any dependency or requirement relating to any one or combination of components illustrated in the example operating environment 4700.

With reference to FIG. 47, an example remote device for implementing one or more embodiments includes a general purpose computing device in the form of a computer 4710. Components of computer 4710 can include, but are not limited to, a processing unit 4720, a system memory 4730, and a system bus 4722 that couples various system components including the system memory to the processing unit 4720.

Computer 4710 typically includes a variety of computer readable media and can be any available media that can be accessed by computer 4710. The system memory 4730 can include computer storage media in the form of volatile and/or nonvolatile memory such as read only memory (ROM) and/or random access memory (RAM). By way of example, and not limitation, memory 4730 can also include an operating system, application programs, other program modules, and program data.

A user can enter commands and information into the computer 4710 through input devices 4740. A monitor or other type of display device is also connected to the system bus 4722 via an interface, such as output interface 4750. In addition to a monitor, computers can also include other peripheral output devices such as speakers and a printer, which can be connected through output interface 4750.

The computer 4710 can operate in a networked or distributed environment using logical connections to one or more other remote computers, such as remote computer 4770. The remote computer 4770 can be a personal computer, a server, a router, a network PC, a peer device or other common network node, or any other remote media consumption or transmission device, and can include any or all of the elements described above relative to the computer 4710. The logical connections depicted in FIG. 47 include a network 4772, such local area network (LAN) or a wide area network (WAN), but can also include other networks/buses. Such networking environments are commonplace in homes, offices, enterprise-wide computer networks, intranets and the Internet.

As mentioned above, while example embodiments have been described in connection with various computing devices and network architectures, the underlying concepts can be applied to any network system and any computing device or system in which it is Also, there are multiple ways to implement the same or similar functionality, e.g., an appropriate API, tool kit, driver code, operating system, control, standalone or downloadable software object, etc. which enables applications and services to use disclosed and related systems, devices, methods, and/or functionality. Thus, embodiments herein are contemplated from the standpoint of an API (or other software object), as well as from a software or hardware object that implements one or more aspects of disclosed and related systems, devices, and/or methods as described herein. Thus, various embodiments described herein can have aspects that are wholly in hardware, partly in hardware and partly in software, as well as in software.

Example Mobile Device

Figure 48:
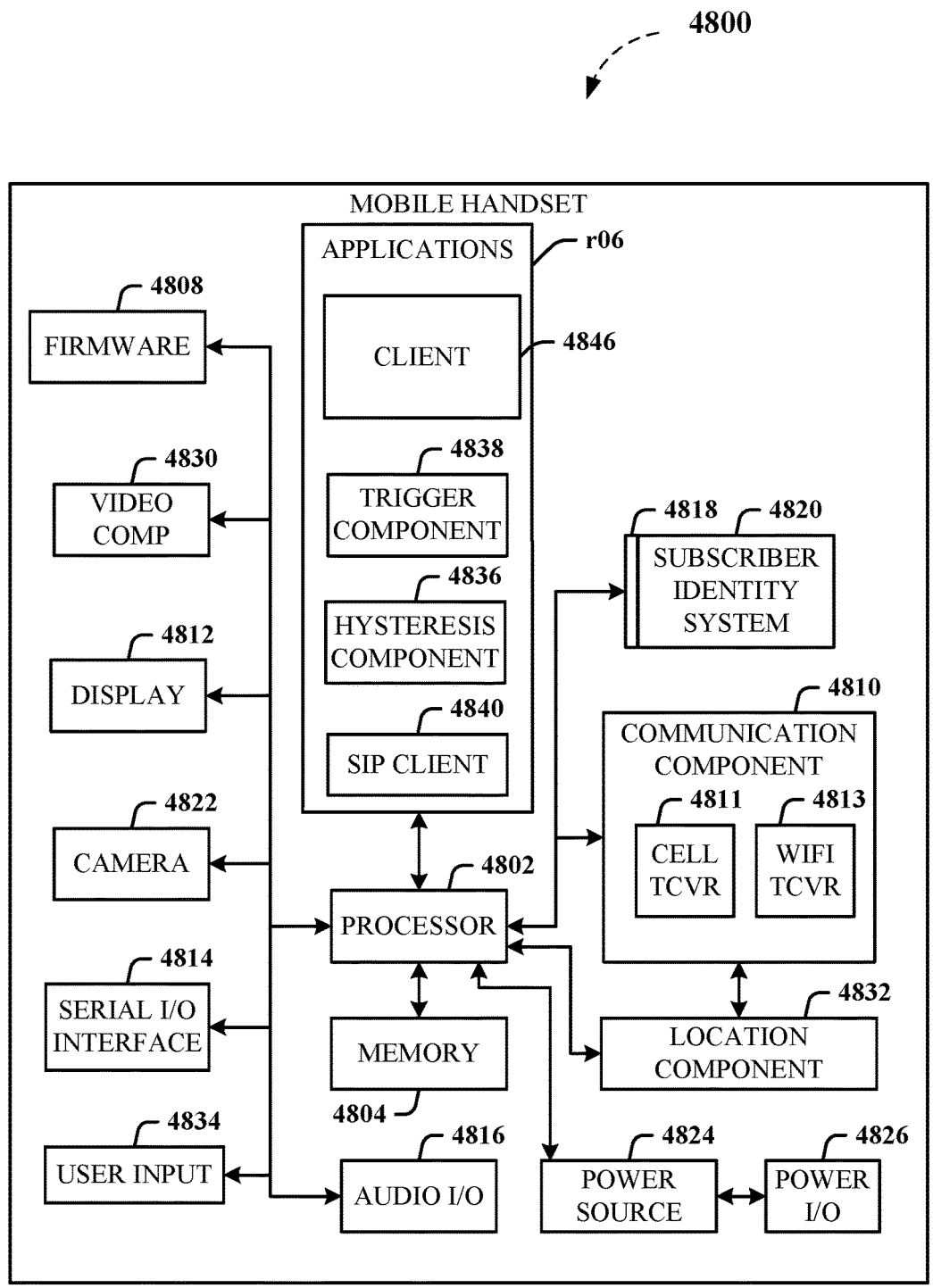
FIG. 48 illustrates a schematic diagram of an example mobile device (e.g., a mobile handset, peer-peer device, mesh node, etc.) that can facilitate various non-limiting aspects of the disclosed subject matter in accordance with the embodiments described herein.

FIG. 48 depicts a schematic diagram of an example mobile device 4800 (e.g., a mobile handset) that can facilitate various non-limiting aspects of the disclosed subject matter in accordance with the embodiments described herein. Although mobile handset 4800 is illustrated herein, it will be understood that other devices can be a mobile device, as described herein, for instance, and that the mobile handset 4800 is merely illustrated to provide context for the embodiments of the subject matter described herein. The following discussion is intended to provide a brief, general description of an example of a suitable environment 4800 in which the various embodiments can be implemented. While the description includes a general context of computer-executable instructions embodied on a tangible computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer readable media. Computer readable media can comprise any available media that can be accessed by the computer and includes both volatile and non-volatile media, removable and non-removable media. By way of example and not limitation, computer readable media can comprise tangible computer readable storage and/or communication media. Tangible computer readable storage can include volatile and/or non-volatile media, removable and/or non-removable media implemented in any method or technology for storage of information, such as computer readable instructions, data structures, program modules, or other data. Tangible computer readable storage can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media, as contrasted with tangible computer readable storage, typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 4800 can include a processor 4802 for controlling and processing all onboard operations and functions. A memory 4804 interfaces to the processor 4802 for storage of data and one or more applications 4806 (e.g., communications applications such as browsers, apps, etc.). Other applications can support operation of communications and/or financial communications protocols. The applications 4806 can be stored in the memory 4804 and/or in a firmware 4808, and executed by the processor 4802 from either or both the memory 4804 or/and the firmware 4808. The firmware 4808 can also store startup code for execution in initializing the handset 4800. A communications component 4810 interfaces to the processor 4802 to facilitate wired/wireless communication with external systems, e.g., cellular networks, VoIP networks, and so on. Here, the communications component 4810 can also include a suitable cellular transceiver 4811 (e.g., a GSM transceiver) and/or an unlicensed transceiver 4813 (e.g., Wireless Fidelity (WiFi™), Worldwide Interoperability for Microwave Access (Wi-Max®)) for corresponding signal communications. The handset 4800 can be a device such as a cellular telephone, a PDA with mobile communications capabilities, and messaging-centric devices. The communications component 4810 also facilitates communications reception from terrestrial radio networks (e.g., broadcast), digital satellite radio networks, and Internet-based radio services networks.

The handset 4800 includes a display 4812 for displaying text, images, video, telephony functions (e.g., a Caller ID function), setup functions, and for user input. For example, the display 4812 can also be referred to as a "screen" that can accommodate the presentation of multimedia content (e.g., music metadata, messages, wallpaper, graphics, etc.). The display 4812 can also display videos and can facilitate the generation, editing and sharing of video quotes. A serial I/O interface 4814 is provided in communication with the processor 4802 to facilitate wired and/or wireless serial communications (e.g., Universal Serial Bus (USB), and/or Institute of Electrical and Electronics Engineers (IEEE) 4894) through a hardwire connection, and other serial input devices (e.g., a keyboard, keypad, and mouse). This supports updating and troubleshooting the handset 4800, for example. Audio capabilities are provided with an audio I/O component 4816, which can include a speaker for the output of audio signals related to, for example, indication that the user pressed the proper key or key combination to initiate the user feedback signal. The audio I/O component 4816 also facilitates the input of audio signals through a microphone to record data and/or telephony voice data, and for inputting voice signals for telephone conversations.

The handset 4800 can include a slot interface 4818 for accommodating a SIC (Subscriber Identity Component) in the form factor of a card Subscriber Identity Module (SIM) or universal SIM 4820, and interfacing the SIM card 4820 with the processor 4802. However, it is to be appreciated that the SIM card 4820 can be manufactured into the handset 4800, and updated by downloading data and software.

The handset 4800 can process Internet Protocol (IP) data traffic through the communication component 4810 to accommodate IP traffic from an IP network such as, for example, the Internet, a corporate intranet, a home network, a person area network, etc., through an ISP or broadband cable provider. Thus, VoIP traffic can be utilized by the handset 4800 and IP-based multimedia content can be received in either an encoded or a decoded format.

A video processing component 4822 (e.g., a camera and/or associated hardware, software, etc.) can be provided for decoding encoded multimedia content. The video processing component 4822 can aid in facilitating the generation and/or sharing of video. The handset 4800 also includes a power source 4824 in the form of batteries and/or an alternating current (AC) power subsystem, which power source 4824 can interface to an external power system or charging equipment (not shown) by a power input/output (I/O) component 4826.

The handset 4800 can also include a video component 4830 for processing video content received and, for recording and transmitting video content. For example, the video component 4830 can facilitate the generation, editing and sharing of video. A location-tracking component 4832 facilitates geographically locating the handset 4800. A user input component 4834 facilitates the user inputting data and/or making selections as previously described. The user input component 4834 can also facilitate selecting perspective recipients for fund transfer, entering amounts requested to be transferred, indicating account restrictions and/or limitations, as well as composing messages and other user input tasks as required by the context. The user input component 4834 can include such conventional input device technologies such as a keypad, keyboard, mouse, stylus pen, and/or touch screen, for example.

Referring again to the applications 4806, a hysteresis component 4836 facilitates the analysis and processing of hysteresis data, which is utilized to determine when to associate with an access point. A software trigger component 4838 can be provided that facilitates triggering of the hysteresis component 4838 when a WiFi™ transceiver 4813 detects the beacon of the access point. A SIP client 4840 enables the handset 4800 to support SIP protocols and register the subscriber with the SIP registrar server. The applications 4806 can also include a communications application or client 4846 that, among other possibilities, can be target for transfer money plugin or user interface component functionality as described above.

The handset 4800, as indicated above related to the communications component 4810, includes an indoor network radio transceiver 4813 (e.g., WiFi™ transceiver). This function supports the indoor radio link, such as IEEE 802.11, for the dual-mode Global System for Mobile Communications (GSM) handset 4800. The handset 4800 can accommodate at least satellite radio services through a handset that can combine wireless voice and digital radio chipsets into a single handheld device.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
    receiving in a mesh network, at a host device comprising a processor, an indication of a suspected radar event on at least one dynamic frequency selection (DFS) channel;
    determining, with the host device, whether the suspected radar event is a valid radar event, based at least in part on the suspected radar event;
    propagating, in the mesh network, radar information regarding at least one of the suspected radar event or the valid radar event to at least one of another host device or a cloud intelligence engine associated with the mesh network; and
    transmitting, in the mesh network, at least one of a Clear To Send (CTS) signal based at least in part on the receiving the indication of the suspected radar event, a hold signal on the at least one DFS channel based at least in part on the receiving the indication of the suspected radar event, or a resume signal, for which the communication on the at least one DFS channel is to be resumed.

2. The method of claim 1, wherein the propagating radar information further comprises propagating location information associated with the host device.

3. The method of claim 1, further comprising:
    receiving additional radar information from the at least one of the another host device or the cloud intelligence engine associated with the mesh network.

4. The method of claim 3, wherein the determining whether the suspected radar event is the valid radar event comprises determining whether the suspected radar event is the valid radar event based at least in part on the additional radar information.

5. The method of claim 3, wherein the receiving additional radar information comprises receiving additional location information associated with the another host device.

6. The method of claim 5, further comprising:
    determining that the suspected radar event is the valid radar event; and
    propagating at least one of the additional radar information, the valid radar event, or the additional location information to the at least one of another host device or the cloud intelligence engine associated with the mesh network.

7. The method of claim 6, wherein the determining that the suspected radar event is the valid radar event comprises determining that the suspected radar event is the valid radar event based at least in part on at least one of the additional radar information, the additional location information, or other information received from the at least one of the another host device or the cloud intelligence engine associated with the mesh network.

8. The method of claim 5, further comprising:
    determining that the suspected radar event is an invalid radar event; and
    propagating at least one of the additional radar information, the invalid radar event, or the additional location information to the at least one of another host device or the cloud intelligence engine associated with the mesh network.

9. The method of claim 1, wherein the transmitting the at least one of the CTS signal or the hold signal comprises encoding information in the at least one of the CTS signal or the hold signal, wherein the information is associated with a predetermined time or duration during which communication on the at least one DFS channel is to be silenced.

10. The method of claim 1, wherein the propagating radar information regarding at least one of the suspected radar event or the valid radar event, further comprises propagating next channel information that identifies to the at least one of another host device or the cloud intelligence engine associated with the mesh network a next channel of the at least one DFS channel to transfer communications based at least in part on at least one of the suspected radar event or the valid radar event.

11. The method of claim 10, wherein the propagating the next channel information comprises encoding the next channel information in at least one beacon signal of the host device.

12. An apparatus comprising:
    means for receiving in a mesh network an indication of a suspected radar event on at least one dynamic frequency selection (DFS) channel;
    means for determining whether the suspected radar event is a valid radar event, based at least in part on the suspected radar event;
    means for propagating, in the mesh network, radar information regarding at least one of the suspected radar event or the valid radar event to at least one mesh node or a cloud intelligence engine associated with the mesh network, wherein the means for propagating radar information is further configured for propagating location information associated with the apparatus;
    means for receiving additional radar information from the at least one of the mesh node or the cloud intelligence engine associated with the mesh network, wherein the means for determining whether the suspected radar event is the valid radar event is further configured for determining whether the suspected radar event is the valid radar event based at least in part on the additional radar information;
    means for determining that the suspected radar event is the valid radar event;
    means for determining that the suspected radar event is an invalid radar event;
    means for propagating at least one of the additional radar information, the valid radar event, the invalid radar event, or additional location information associated with the at least one mesh node to the at least one mesh node or the cloud intelligence engine associated with the mesh network; and
    means for transmitting, in the mesh network, at least one of a Clear To Send (CTS) signal based at least in part on information associated with the means for receiving the indication of the suspected radar event, a hold signal on the at least one DFS channel based at least in part on the information associated with the means for receiving the indication of the suspected radar event, or a resume signal, for which the communication on the at least one DFS channel is to be resumed.

13. The apparatus of claim 12, wherein the means for transmitting the at least one of the CTS signal, the hold signal, or the resume signal comprises means for encoding information in the at least one of the CTS signal or the hold signal, wherein the information is associated with a predetermined time or duration during which communication on the at least one DFS channel is to be silenced.

14. The apparatus of claim 12, further comprising:
means for propagating next channel information that identifies to the at least one of mesh node or the cloud intelligence engine associated with the mesh network a next channel of the at least one DFS channel to transfer communications based at least in part on at least one of the suspected radar event or the valid radar event.

15. The apparatus of claim 14, wherein the means for propagating the next channel information is further configured for encoding the next channel information in at least one beacon signal of the apparatus.

16. The apparatus of claim 12, further comprising:
means for updating at least one of a channel blacklist, a channel whitelist, or a channel preference list based at least in part on at least one of the suspected radar event, the valid radar event, or the invalid radar event for a group comprising at least the apparatus and the mesh node, based at least in part on at least one grouping criterion for the group, wherein the group comprises less than all mesh nodes in the mesh network communicating on the at least one DFS channel.

17. A system comprising:
at least one radar detector configured to receive an indication of a suspected radar event on at least one dynamic frequency selection (DFS) channel in a mesh network;
at least one processor of a multi-channel DFS master device configured to determine whether the suspected radar event is a valid radar event, based at least in part on the suspected radar event;
at least one communications component associated the multi-channel DFS master device configured to propagate, in the mesh network, radar information regarding at least one of the suspected radar event or the valid radar event to at least one of a mesh node or a cloud intelligence engine associated with the mesh network, wherein the at least one communications component is further configured to receive additional radar information from the at least one of the mesh node or the cloud intelligence engine associated with the mesh network, and wherein the multi-channel DFS master device is further configured to determine whether the suspected radar event is the valid radar event based at least in part on at least one of the suspected radar event or the additional radar information; and
the at least one communications component is further configured to transmit, in the mesh network, at least one of a Clear To Send (CTS) signal based at least in part on the indication of the suspected radar event, a hold signal on the at least one DFS channel based at least in part on the indication of the suspected radar event, a resume signal, for which the communication on the at least one DFS channel is to be resumed.

18. The system of claim 17, wherein the at least one communications component is further configured to propagate location information associated with the multi-channel DFS master device.

19. The system of claim 17, wherein the at least one communications component is further configured to receive additional location information associated with the mesh node.

20. The system of claim 19, wherein the multi-channel DFS master device is further configured to determine that the suspected radar event is the valid radar event based at least in part on at least one of the additional radar information, the additional location information, or other information received from the at least one of the mesh node or the cloud intelligence engine associated with the mesh network, and wherein the at least one communications component is further configured to propagate at least one of the additional radar information, the valid radar event, or the additional location information to the at least one of mesh node or the cloud intelligence engine associated with the mesh network.

21. The system of claim 19, wherein the multi-channel DFS master device is further configured to determine that the suspected radar event is an invalid radar event, and wherein the at least one communications component is further configured to propagate at least one of the additional radar information, the invalid radar event, or the additional location information to the at least one of mesh node or the cloud intelligence engine associated with the mesh network.

22. The system of claim 17, wherein the at least one communications component is further configured to encode information in the at least one of the CTS signal or the hold signal, wherein the information is associated with a predetermined time or duration during which communication on the at least one DFS channel is to be silenced.

23. The system of claim 17, wherein the at least one communications component is further configured to propagate next channel information that identifies to the at least one of mesh node or the cloud intelligence engine associated with the mesh network a next channel of the at least one DFS channel to transfer communications based at least in part on at least one of the suspected radar event or the valid radar event, and wherein at least one communications component is further configured to encode the next channel information in at least one beacon signal of the multi-channel DFS master device.

* * * * *